US011941944B2

(12) United States Patent
Takeda

(10) Patent No.: US 11,941,944 B2
(45) Date of Patent: Mar. 26, 2024

(54) INFORMATION PROCESSING APPARATUS, INFORMATION READING APPARATUS, GAMING MACHINE, AND GAMING SYSTEM

(71) Applicant: Universal Entertainment Corporation, Tokyo (JP)

(72) Inventor: Kengo Takeda, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 479 days.

(21) Appl. No.: 16/944,488

(22) Filed: Jul. 31, 2020

(65) Prior Publication Data

US 2020/0357232 A1 Nov. 12, 2020

Related U.S. Application Data

(62) Division of application No. 15/229,548, filed on Aug. 5, 2016, now abandoned.

(30) Foreign Application Priority Data

Aug. 18, 2015 (JP) ................................ 2015-161456
Aug. 18, 2015 (JP) ................................ 2015-161457
(Continued)

(51) Int. Cl.
*G07F 17/00* (2006.01)
*G07F 17/32* (2006.01)

(52) U.S. Cl.
CPC ...... *G07F 17/3239* (2013.01); *G07F 17/3211* (2013.01); *G07F 17/3234* (2013.01)

(58) Field of Classification Search
None
See application file for complete search history.

(56) References Cited

U.S. PATENT DOCUMENTS 10,664,772 B1 * 5/2020 Poel .................... G06F 3/04842
2006/0252530 A1 * 11/2006 Oberberger ......... G07F 17/3239 463/29
(Continued)

OTHER PUBLICATIONS

References Are Not Being Filed Herewith. They Are Already of Record in One or More of the Following Applications, Which Are Being Relied on for Priority Under 35 U.S.C. Section 120 (see 37 C.F.R. Section 1.98(d)(1)): U.S. Appl. No. 15/229,548, filed Aug. 5, 2016.

*Primary Examiner* — James S. McClellan
*Assistant Examiner* — Jeffrey K Wong
(74) *Attorney, Agent, or Firm* — United IP Counselors, LLC; Kenneth M. Fagin

(57) ABSTRACT

Provided is an information processing apparatus including an interface capable of receiving identification information on a user retrieved by an information reading apparatus installed in a gaming hall, and a controller capable of retrieving locational information on an object related to the user in the gaming hall from a storage device based on the identification information on the user and performing image processing to create a floor map of the gaming hall in which an image associated with the object is mapped to a corresponding position of the object in the gaming hall. The storage device stores identification information for identifying the object together with the identification information on the user and further stores the locational information for locating the object together with the identification information on the object. The information processing apparatus enables grasp of objects related to the user in the gaming hall.

8 Claims, 63 Drawing Sheets

(30) Foreign Application Priority Data

| | | |
|---|---|---|
| Aug. 18, 2015 | (JP) | 2015-161458 |
| Aug. 18, 2015 | (JP) | 2015-161459 |

(56) References Cited

U.S. PATENT DOCUMENTS

| | | | | |
|---|---|---|---|---|
| 2011/0105208 | A1* | 5/2011 | Bickley | G07F 17/323 463/13 |
| 2011/0183732 | A1* | 7/2011 | Block | G06Q 50/34 463/1 |
| 2014/0100030 | A1 | 4/2014 | Burke et al. | |
| 2015/0310698 | A1* | 10/2015 | Polis | G07F 17/323 463/20 |
| 2016/0275706 | A1 | 9/2016 | Nolan et al. | |

* cited by examiner

FIG.11

Symbol combination table

| Combination of symbols | | | | | Number of payouts | Winning combination |
|---|---|---|---|---|---|---|
| First video reel | Second video reel | Third video reel | Fourth video reel | Fifth video reel | | |
| JACKPOT 7 | JACKPOT 7 | JACKPOT 7 | JACKPOT 7 | JACKPOT 7 | Amount of jackpot | Jackpot |
| APPLE | APPLE | APPLE | APPLE | APPLE | Bonus game※ | Bonus game trigger |
| BLUE 7 | BLUE 7 | BLUE 7 | BLUE 7 | BLUE 7 | 10 | BLUE |
| BELL | BELL | BELL | BELL | BELL | 8 | BELL |
| CHERRY | CHERRY | CHERRY | CHERRY | CHERRY | 5 | CHERRY 3 |
| STRAWBERRY | STRAWBERRY | STRAWBERRY | STRAWBERRY | STRAWBERRY | 5 | STRAWBERRY |
| PLUM | PLUM | PLUM | PLUM | PLUM | 4 | PLUM |
| ORANGE | ORANGE | ORANGE | ORANGE | ORANGE | 3 | ORANGE 3 |
| CHERRY | CHERRY | CHERRY | (ANY) | (ANY) | 2 | CHERRY 2 |
| ORANGE | ORANGE | ORANGE | (ANY) | (ANY) | 2 | ORANGE 2 |
| CHERRY | (ANY) | (ANY) | (ANY) | (ANY) | 1 | CHERRY 1 |
| ORANGE | (ANY) | (ANY) | (ANY) | (ANY) | 1 | ORANGE 1 |

FIG.22

Member management table

| Member identification code | Name of member | Icon data | ··· | Membership class |
|---|---|---|---|---|
| 0001 | ○○○○ | ..¥image0001.jpg | ··· | VIP |
| 0002 | △△△△ | ..¥image0002.jpg | ··· | MEMBER |
| 0003 | ▽▽▽▽ | ..¥image0003.jpg | ··· | MEMBER |
| 0004 | □□□□ | ..¥image0004.jpg | ··· | VISITOR |
| 0005 | ×××× | ..¥image0005.jpg | ··· | MEMBER |
| 0006 | ◎◎◎◎ | ..¥image0006.jpg | ··· | MEMBER |
| 0007 | ◇◇◇◇ | ..¥image0007.jpg | ··· | MEMBER |
| 0008 | ⊿⊿⊿⊿ | ..¥image0008.jpg | ··· | VIP |
| 0009 | ☆☆☆☆ | ..¥image0009.jpg | ··· | VISITOR |
| ··· | ··· | ··· | ··· | ··· |

FIG.23

Related-person management table

| Member identification code | Related-person identification code | Status | Relationship |
|---|---|---|---|
| 0001 | 0002 | OK | FRIEND |
| 0001 | 0003 | OK | FRIEND |
| 0001 | 0005 | BLOCK | FRIEND |
| 0001 | 0007 | OK | FRIEND |
| 0001 | 0009 | OK | FRIEND |
| 0001 | 0010 | OK | FAMILY |
| ··· | ··· | ··· | ··· |
| 0002 | 0001 | OK | FRIEND |
| 0002 | 0003 | Communication | FRIEND |
| 0002 | 0008 | OK | FRIEND |
| 0003 | 0001 | OK | FRIEND |
| 0003 | 0002 | Communication | FRIEND |
| ··· | ··· | ··· | ··· |

FIG.24

Address management table

| Apparatus identification code | IP address | Apparatus identifier | Object data | Coordinate data | Apparatus status |
|---|---|---|---|---|---|
| 0001 | 192.168.52.4 | GM-1 | obj0001 | (x1, y1) | ON LINE |
| 0002 | 192.168.52.8 | GM-2 | obj0002 | (x2, y2) | ON LINE |
| 0003 | 192.168.52.13 | GM-3 | obj0003 | (x3, y3) | ON LINE |
| 0004 | 192.168.52.22 | GM-4 | obj0004 | (x4, y4) | ON LINE |
| 0005 | 192.168.52.28 | GM-8 | obj0005 | (x5, y5) | ON LINE |
| 0006 | 192.168.52.29 | GM-10 | obj0006 | (x6, y6) | ON LINE |
| 0007 | 192.168.52.48 | GM-9 | obj0007 | (x7, y7) | ON LINE |
| 0008 | 192.168.52.51 | KIOSK-1 | obj0008 | (x8, y8) | ON LINE |
| 0009 | 192.168.52.09 | SIGNAGE-1 | obj0009 | (x9, y9) | ON LINE |
| 0010 | 192.168.52.10 | GM-5 | obj0010 | (x10, y10) | ON LINE |
| 0011 | 192.168.52.11 | GM-11 | obj0011 | (x11, y11) | OFF LINE |
| 0012 | 192.168.52.12 | GM-12 | obj0012 | (x12, y12) | JACKPOT |
| 0013 | 192.168.52.35 | GM-13 | obj0013 | (x13, y13) | HAND PAY |
| 0014 | 192.168.52.14 | GM-14 | obj0014 | (x14, y14) | MAINTENANCE |
| ... | ... | ... | ... | ... | ... |
| 6006 | 192.168.52.16 | CAMERA-1 | obj0016 | (x16, y16) | ERROR |
| 6007 | 192.168.52.17 | CAMERA-2 | obj0017 | (x17, y17) | ON LINE |
| ... | ... | ... | ... | ... | ... |

FIG.25

Login management table

| Member identification code | Apparatus identification code | Login time |
|---|---|---|
| 0001 | 0003 | 20150701 10:50 |
| 0002 | 0005 | 20150701 11:50 |
| 0003 | 0006 | 20150701 9:40 |
| ··· | ··· | ··· |
| 0005 | 0008 | 20150701 11:37 |
| 0007 | 0007 | 20150701 11:12 |
| 0008 | 0010 | 20150701 10:23 |
| ··· | ··· | ··· |

FIG.26

Apparatus status history table

| Apparatus identification code | Update time | Apparatus status |
|---|---|---|
| 0001 | 20150701 11:50 | ON LINE |
| ... | ... | ... |
| 0002 | 20150701 13:00 | ON LINE |
| ... | ... | ... |
| 00012 | 20150701 08:15 | MAINTENANCE |
| 00012 | 20150701 10:25 | ON LINE |
| 00012 | 20150701 11:03 | JACKPOT |
| ... | ... | ... |

1800

1801

INFORMATION PROCESSING APPARATUS, INFORMATION READING APPARATUS, GAMING MACHINE, AND GAMING SYSTEM

CROSS-REFERENCE TO RELATED APPLICATIONS

This application is a division of and claims the priority benefit of U.S. application Ser. No. 15/229,548 filed Aug. 5, 2016, the contents of which are incorporated herein by reference. This application also claims the benefit of Japanese Patent Applications No. 2015-161456 filed Aug. 18, 2015, No. 2015-161457 filed Aug. 18, 2015, No. 2015-161458 filed Aug. 18, 2015, and No. 2015-161459 filed Aug. 18, 2015, all of which are incorporated herein by reference in their entirety.

TECHNICAL FIELD

The present invention relates to an information processing apparatus, an information reading apparatus, a gaming machine, and a gaming system.

BACKGROUND ART

Gaming halls including casinos have a large number of gaming machines. Large-scale gaming halls have floor areas over 50,000 $m^2$ and are equipped with more than 3,000 gaming machines.

Such gaming halls or casinos have a large gaming floor; it is difficult to know who is at which place and doing what.

The gaming halls or casinos have a plurality of surveillance cameras because of a large floor. In general and in most cases, installation of surveillance cameras require works of determining where to place surveillance cameras so as to include the places to be watched in the view ranges and setting the surveillance cameras. After the surveillance cameras have been installed, the shop watches the images on a display device that can change the monitoring screens at predetermined intervals or a display device that shows the images on a split screen.

Furthermore, the apparatuses installed in a gaming hall including gaming machines need expenses and labors for the maintenance or troubleshooting.

To address the foregoing issues, U.S. Patent Application Publication No. 2012/0135799 discloses the following gaming system.

U.S. Patent Application Publication No. 2012/0135799 discloses a gaming system that is capable of indicating the positions of staff members of a casino in an image of a schematic top plan view of the casino.

Further, U.S. Patent Application Publication No. 2012/0135799 discloses a game system including surveillance cameras for taking images of the inside of the casino.

Still further, U.S. Patent Application Publication No. 2012/0135799 discloses a gaming machine configured to minimize repair or replacement work, preparation of spare parts, or expenses for maintenance.

SUMMARY OF INVENTION

Technical Problem

The game system according to U.S. Patent Application Publication No. 2012/0135799, however, is not capable of locating a player (user) who acts a major role in a gaming hall.

The gaming hall like a casino has a large gaming floor; a large number of gaming machines are installed in and a large number of persons visit the gaming hall. Accordingly, objects associated with a user, such as friends and family members of the user, cannot be located either with this game system (first problem).

Furthermore, when the shop using the game system according to U.S. Patent Application Publication No. 2012/0135799 wants to check a monitoring target in the gaming hall, the operator needs to search for the monitoring target on the monitoring screens changed on a display device or on the small monitoring screens on a split screen. That is to say, the shop cannot speedily determine which camera is capturing the intended monitoring target (second problem).

Still further, the technique according to U.S. Patent Application Publication No. 2012/0135799 cannot handle all kinds of apparatuses or errors (third problem).

For example, when a gaming machine is failed, the failure has to be addressed; however, a gaming hall like a casino includes a large number of gaming machines and it is difficult to grasp where and in which status each gaming machine is.

The present invention has been accomplished in view of the above-described problems and the first object of the present invention is to enable grasp of objects related to a user in a gaming hall.

The second object of the present invention is to facilitate acquisition of captured-image information of a desired subject.

The third object of the present invention is to enable grasp of the statuses of apparatuses in a gaming hall.

It should be noted that the objects, challenges, and effects (benefits) of the present invention are to be understood from the appended claims and not to be interpreted improperly based on the following description.

Solution to Problem

In the first aspect of the present invention, an information processing apparatus of the present invention includes:

an interface capable of receiving identification information on a user retrieved by an information reading apparatus installed in a gaming hall, and a controller configured to retrieve locational information on an object related to the user in the gaming hall from a storage device based on the identification information on the user and perform image processing to create a floor map of the gaming hall in which an image associated with the object is mapped to a corresponding position of the object in the gaming hall.

The storage device stores identification information for identifying the object together with the identification information on the user and further stores the locational information for locating the object together with the identification information on the object.

According to this configuration, locational information associated with the received identification information on the user is retrieved from the stored locational information for locating objects related to users in the gaming hall and an image associated with the object is displayed at the corresponding position on the floor map. For example, when a user makes an information reading apparatus read a storage medium (e.g., an IC card), objects related to the user are displayed on the floor map. The shop can accurately and quickly locate the objects related to the user in the gaming hall.

Accordingly, this configuration enables grasp of the objects related to a user in the gaming hall.

The information processing apparatus may be configured as follows.

The storage device further holds attribute information representing an attribute of each object together with the identification information of the user; and the controller is configured to retrieve the attribute information associated with the identification information of the object from the storage device and create the floor map in such a manner that the attribute information is mapped.

According to this configuration, the shop can grasp the attribute of the object through the attribute information of the object displayed on the floor map: the shop can more accurately grasp the object related to the user in the gaming hall.

The attribute information may be information for indicating personal relationship to the player, such as friend or family member, information for indicating the client class for the shop, such as visitor, member, VIP, suspected visitor, or suspected member, or information on recommended machines for the player. The attribute information on the floor map may be indicated in the form of an image different in color, shape, size, or combination of these for each attribute or text information; however, note that these are merely examples.

Furthermore, the information processing apparatus is capable of communicating with another information reading apparatus installed in the gaming hall different from the information reading apparatus;

the interface is configured to receive identification information on another user upon retrieval of the identification information on the other user at the other information reading apparatus; and the controller is configured to determine whether the identification information on the user is associated with the identification information on the other user based on the identification information stored in the storage device and create the floor map in such a manner that an image associated with the user is mapped to a corresponding position of the information reading apparatus in the gaming hall and an image associated with the other user is mapped to a corresponding position of the other information reading apparatus in the gaming hall if determining that the identification information on the user is associated with the identification information on the other user.

According to this configuration, if a user who has made the information reading apparatus read a storage medium is associated with another user who had made another information reading apparatus read a storage medium, an image associated with the user is mapped to the corresponding position of the information reading apparatus in the gaming hall and an image associated with the other user is mapped to the corresponding position of the other information reading apparatus on the floor map. For example, the shop can easily grasp the positional relation between the user and the other user by seeing the floor map.

Accordingly, this configuration enables the object related to the user in the gaming hall to be grasped more accurately.

The information processing apparatus may also be configured as follows.

The controller is configured to create the floor map in such a manner that the image associated with the user is highlighted in a case where the image associated with the user is selected by a user operation and create the floor map in such a manner that the image associated with the other user is highlighted in a case where the image associated with the other user is selected by a user operation.

According to this configuration, the shop can clearly grasp the other user related to the user by selecting the image associated with the user. This configuration enables the object related to the user in the gaming hall to be grasped more accurately.

In the first aspect of the present invention, an information processing apparatus includes:

an interface capable of receiving image information captured by each of a plurality of imaging devices installed in a gaming hall, and a controller configured to perform image processing to create a floor map of the gaming hall in which view range information for indicating view ranges of the plurality of imaging devices is mapped by associating image information received at the interface with a view range related to the image information.

According to this configuration, the floor map shows all the view ranges of the plurality of imaging devices installed in the gaming hall. For example, the shop can accurately locate the view range to capture an intended subject by seeing the floor map; the shop can select captured-image information including the intended subject.

Accordingly, this configuration facilitates acquisition of image information including an intended subject.

In the information processing apparatus, the controller is configured to create the floor map in such a manner that icons of the plurality of imaging devices are mapped; and the interface is configured to send, upon selection of one of the icons by a user operation, an instruction requesting captured-image information to an imaging device corresponding to the selected icon and receive captured-image information from the imaging device.

According to this configuration, since the icons of the imaging devices are displayed on the floor map, the image capturing direction can be identified more easily, compared to the floor map showing only the view ranges. For example, if a specific monitoring target is captured from a plurality of angles, the shop can acquire image information captured from a desired angle more easily.

Accordingly, this configuration facilitates acquisition of image information including an intended subject furthermore.

In the information processing apparatus, the interface is configured to send, upon selection of one of the view ranges by a user operation, an instruction requesting captured-image information to an imaging device corresponding to the selected view range and receive captured-image information from the imaging device.

According to this configuration, image information captured by the imaging device corresponding to the view range selected on the floor map is acquired. For example, the shop can acquire the captured-image information with simple operation of selecting a view range displayed on the floor map.

Accordingly, this configuration facilitates acquisition of image information including an intended subject furthermore.

With respect to the information processing apparatus, the gaming hall includes a plurality of gaming machines;

in the floor map, the plurality of gaming machines are mapped;

the interface is configured to receive anomaly information from a gaming machine in an abnormal state in the plurality of gaming machines; and the controller is configured to create the floor map by indicating the gaming machine in the abnormal state distinguishably from the other gaming machines.

According to this configuration, the gaming machine in an abnormal state is indicated distinguishably on the floor map showing the view ranges. For example, the shop can easily locate the view range including the gaming machine in an abnormal state.

Accordingly, this configuration facilitates acquisition of captured-image information including the gaming machine in an abnormal state.

In an another aspect of the present invention, an information processing apparatus of the present invention includes:

an interface capable of receiving identification information on a user retrieved by an information reading apparatus, which is installed in a gaming hall and capable of retrieving identification information for identifying a user stored in a storage medium, and a controller configured to retrieve identification information on an object related to the user associated with the identification information on the user and locational information on the object associated with the identification information on the object from a storage device and perform image processing to create a floor map of the gaming hall in which an image associated with the user is mapped to a corresponding position of the information reading apparatus in the gaming hall and an image associated with the object is mapped to a corresponding position of the object in the gaming hall.

The storage device stores identification information for identifying the object together with the identification information on the user and further stores the locational information for locating the object together with the identification information on the object.

In yet another aspect of the present invention, an information processing apparatus of the present invention includes:

an interface capable of receiving identification information on a user retrieved by an information reading apparatus and locational information for locating a position of the user on a floor map of a gaming hall from the information reading apparatus, the information reading apparatus being installed in the gaming hall and capable of retrieving identification information for identifying a user stored in a storage medium, and a controller configured to retrieve identification information on an object related to the user associated with the identification information on the user and locational information on the object associated with the identification information on the object from a storage device and perform image processing to create the floor map of the gaming hall by mapping an image associated with the user to a position of the information reading apparatus in the gaming hall and an image associated with the object to a position of the object in the gaming hall, based on the locational information on the user and the locational information on the object.

The storage device stores identification information for identifying the object together with the identification information on the user and further stores the locational information for locating the object together with the identification information on the object.

In the first aspect of the present invention, an information processing apparatus of the present invention includes:

an interface capable of receiving locational information for locating an information reading apparatus retrieved by the information reading apparatus installed in a gaming hall, and a controller configured to perform image processing on a floor map of the gaming hall in which information reading apparatuses installed in the gaming hall are mapped to corresponding positions of the information reading apparatuses.

The interface is configured to receive locational information on an information reading apparatus installed in the gaming hall, receive locational information on another information reading apparatus different from the information reading apparatus, and receive information indicating that the information reading apparatus starts communication with the other information reading apparatus; and the controller is configured to create the floor map by showing the information reading apparatus and the other information reading apparatus in such a manner that the information reading apparatus is communicating with the other information reading apparatus, based on the locational information on the information reading apparatus and the locational information on the other information reading apparatus.

According to this configuration, if communication between an information reading apparatus and another information reading apparatus is detected, the floor map shows that the information reading apparatus is communicating with the other information reading apparatus. For example, the shop grasps that a user is communicating with another user by seeing the floor map.

To indicate the information reading apparatuses are in communication, the caller and the callee may be connected by a line or the caller and the callee may be blinked; however, note that these are merely examples.

This configuration enables grasp of an object related to a user (a person communicating with the user) in the gaming hall.

The information processing apparatus may also be configured as follows.

The interface unit is configured to receive information indicating that communication different from the communication between the information reading apparatus and the other information reading apparatus is started; and the controller is configured to create the floor map by showing that the different communication is being held in addition to showing that the information reading apparatus is communicating with the other information reading apparatus, based on the information indicating that the different communication is started.

According to this configuration, when new communication is started, the floor map shows the previous communication as well.

This configuration enables all the callers and all the callees in the gaming hall to be grasped by seeing the floor map.

The information processing apparatus may also be configured as follows.

The controller is configured to determine whether the number of communications being held between information reading apparatuses installed in the gaming hall exceeds a predetermined number and if determining that the number of communications exceeds the predetermined number, reflect excessive communications over the predetermined number to a floor map different from the floor map.

According to this configuration, a predetermined number of communications can be seen in a single floor map and the excessive communications over the predetermined number can be seen in another floor map.

Many communications can be held in a wide gaming hall like a casino; it could be hard to read a single floor map showing all the communications. This configuration limits the number of communications to be indicated on a floor map to the predetermined number at maximum, preventing the situation where the floor map is hard to be read as far as possible.

In the information processing apparatus, the controller is configured to dispose a first icon at a corresponding position of the information reading apparatus and a second icon at a corresponding position of the other information reading apparatus on the floor map, highlight the second icon if determining that the first icon is selected by a user operation, and highlight the first icon if determining that the second icon is selected by a user operation.

According to this configuration, icons are displayed at the positions of a caller and a callee on the floor map and upon selection of either one of the icons, the other person in communication is highlighted.

Since icons are displayed at the corresponding positions of a caller and a callee, the caller and the callee can be easily grasped even in a wide gaming hall like a casino.

Furthermore, in the first aspect of the present invention, an information processing apparatus includes:

an interface capable of retrieving status information for indicating statuses of apparatuses installed in a gaming hall and locational information for locating the apparatuses, and a controller configured to perform image processing to create a floor map of the gaming hall in which the apparatuses installed in the gaming hall are mapped to corresponding positions by associating the status information with the positions of the apparatuses based on the locational information.

According to this configuration, status information on an apparatus is collected from each of the apparatuses installed in the gaming hall to the information processing apparatus and a floor map is created by mapping the apparatuses and the status information.

The floor map can correctly and quickly tell which apparatus is in which status even in the case where the floor is wide like a casino.

Accordingly, this configuration enables grasp of the statuses of the apparatuses in the gaming hall.

The information processing apparatus may be configured as follows.

The controller is configured to create the floor map by indicating the statuses of the apparatuses in different colors.

Since the statuses of the apparatuses are indicated in different colors, the statuses of the apparatuses in the gaming hall can be grasped more easily.

In the information processing apparatus, the controller is configured to retrieve status information and locational information at predetermined intervals from a storage device storing the status information and the locational information with time information and create the floor map by mapping the status information based on the locational information.

According to this configuration, the floor map is updated at predetermined intervals. For example, if the gaming hall includes a large number of apparatuses, creating the floor map causes high load to the information processing apparatus. The load to the information processing apparatus can be reduced by updating the floor map at predetermined intervals.

In the information processing apparatus, the controller is configured to create the floor map by mapping the status information based on the locational information every time the interface receives status information and locational information.

According to this configuration, the floor map is updated in real time.

Accordingly, the statuses of the apparatuses in the gaming hall can be grasped sooner.

For example, as soon as the user of the information processing apparatus becomes aware that a gaming machine is in error status, the user can swiftly issue an instruction to send a staff to the gaming machine to quickly take actions to the trouble. For another example, as soon as the user becomes aware of an improper operation to a gaming machine, the user can immediately start recording with a camera that can take the video of the action. This configuration enables swift reaction depending on the status of the apparatus.

The information processing apparatus further includes an input device capable of receiving an input of an intended time in accordance with a user operation; and the controller is configured to retrieve status information and locational information as of the intended time received from the input device from the storage device storing the status information and the locational information with time information and create the floor map by mapping the status information based on the locational information.

According to this configuration, a floor map showing previous statuses of the apparatuses can be created.

For example, this configuration enables checking the statuses of the apparatuses in the gaming hall as of an intended time. Also, checking the previous statuses of the gaming machines in series leads to grasp of gaming machines on which improper operations are frequently made. That is to say, future statuses of the apparatuses can be presumed in view of the previous statuses of the apparatuses.

This configuration enables grasp of the statuses of the apparatuses in the gaming hall not only as of this moment but also in the past or in future.

In the second aspect of the present invention, an information reading apparatus of the present invention includes:

a reading device capable of retrieving identification information for identifying a user stored in a storage medium, and an interface configured to send, upon retrieval of the identification information on the user at the reading device, the identification information on the user to an information processing apparatus configured to perform image processing to create a floor map of a gaming hall in which an image associated with an object related to the user is mapped to a corresponding position of the object in the gaming hall based on the identification information on the user.

In the second aspect of the present invention, an information reading apparatus includes:

an input device capable of receiving a start request indicating that the information reading apparatus starts communication with another information reading apparatus installed in a gaming hall in accordance with a user operation, and an interface configured to send, based on the start request, locational information for locating the information reading apparatus installed in the gaming hall to an information processing apparatus configured to perform image processing on a floor map of the gaming hall in which information reading apparatuses installed in the gaming hall are mapped to corresponding positions of the information reading apparatuses.

The interface is configured to receive the floor map created by indicating that the communication is being held from the information processing apparatus.

In the third aspect of the present invention, a gaming machine of the present invention includes the foregoing information reading apparatus.

In the fourth aspect of the present invention, a gaming system of the present invention includes:

a plurality of information reading apparatuses installed in a gaming hall, and an information processing apparatus capable of communicating with the plurality of information reading apparatuses.

Each of the information reading apparatuses includes:

a reading device capable of retrieving identification information for identifying a user stored in a storage medium, and a first interface configured to send the identification information on the user to the information processing apparatus upon retrieval of the identification information on the user at the reading device; and the information processing apparatus includes:

a second interface capable of receiving the identification information retrieved by the plurality of information reading apparatuses, and a controller configured to retrieve locational information on an object related to the user in the gaming hall from a storage device based on the identification on the user and perform image processing to create a floor map of the gaming hall in which an image associated with the object is mapped to a corresponding position of the object in the gaming hall.

The storage device stores identification information for identifying the object together with the identification information on the user and further stores the locational information for locating the object together with the identification information on the object.

In the fourth aspect of the present invention, a gaming system of the present invention includes:

a plurality of information reading apparatuses installed in a gaming hall, and an information processing apparatus capable of communicating with the plurality of information reading apparatuses.

Each of the plurality of information reading apparatuses includes:

an input device capable of receiving a start request indicating that the information reading apparatus starts communication with another information reading apparatus installed in the gaming hall in accordance with a user operation, and a first interface unit configured to send, based on the start request, locational information for locating the information reading apparatus installed in the gaming hall to the information processing apparatus;

the information processing apparatus includes:

a second interface configured to receive the locational information; and a controller configured to perform image processing on a floor map of the gaming hall in which the information reading apparatuses installed in the gaming hall are mapped to corresponding positions of the information reading apparatuses;

the second interface is configured to receive locational information of an information reading apparatus installed in the gaming hall, receive locational information of another information reading apparatus different from the information reading apparatus, receive information indicating that the information reading apparatus starts communication with the other information reading apparatus; and the controller is configured to create the floor map by showing the information reading apparatus and the other information reading apparatus in such a manner that the information reading apparatus is communicating with the other information reading apparatus, based on the locational information on the information reading apparatus and the locational information on the other information reading apparatus.

In the fourth aspect of the present invention, a gaming system of the present invention includes:

a plurality of apparatuses installed in a gaming hall, and an information processing apparatus capable of communicating with the plurality of apparatuses.

Each of the plurality of apparatuses includes a first interface configured to send status information for indicating the status of the apparatus to the information processing apparatus; and the information processing apparatus includes:

a second interface configured to receive status information for indicating the status of the apparatus and locational information for locating the apparatus from each of the plurality of apparatuses, and a controller configured to perform image processing to create a floor map of the gaming hall in which the apparatuses installed in the gaming hall are mapped to corresponding positions by associating the status information with the positions of the apparatuses, based on the locational information.

In the fifth aspect of the present invention, an information processing apparatus of the present invention includes:

an interface capable of receiving identification information on a user retrieved by an information reading apparatus, which is installed in a gaming hall and capable of retrieving identification information for identifying a user stored in a storage medium, and a controller configured to retrieve identification information on an object related to the user associated with the identification information on the user and locational information on the object associated with the identification information on the object from a storage device and perform image processing to create a floor map of the gaming hall in which an image associated with the user is mapped to a corresponding position of the information reading apparatus in the gaming hall and an image associated with the object is mapped to a corresponding position of the object in the gaming hall.

The storage device stores identification information for identifying the object together with the identification information on the user and further stores the locational information for locating the object together with the identification information on the object.

In the sixth aspect of the present invention, an information processing apparatus of the present invention includes:

an interface capable of receiving identification information on a user retrieved by an information reading apparatus and locational information for locating a position of the user on a floor map of a gaming hall from the information reading apparatus, the information reading apparatus being installed in the gaming hall and capable of retrieving identification information for identifying a user stored in a storage medium, and a controller configured to retrieve identification information on an object related to the user associated with the identification information on the user and locational information on the object associated with the identification information on the object from a storage device and perform image processing to create the floor map of the gaming hall by mapping an image associated with the user to a corresponding position of the information reading apparatus in the gaming hall and mapping an image associated with the object to a corresponding position of the object in the gaming hall, based on the locational information on the user and the locational information on the object.

The storage device stores identification information for identifying the object together with the identification information on the user and further stores the locational information for locating the object together with the identification information on the object.

Advantageous Effects of Invention

The present invention enables grasp of objects related to a user in a gaming hall.

The present invention further facilitates acquisition of captured-image information of a desired subject.

The present invention further enables grasp of the statuses of apparatuses in a gaming hall.

BRIEF DESCRIPTION OF DRAWINGS

FIG. 11 is a diagram for illustrating an example of a symbol combination table included in a slot machine in an embodiment of the present invention;

FIG. 22 is a view of an example of a table to be used in the game system in an embodiment of the present invention;

FIG. 23 is a view of an example of a table to be used in the game system in an embodiment of the present invention;

FIG. 24 is a view of an example of a table to be used in the game system in an embodiment of the present invention;

FIG. 25 is a view of an example of a table to be used in the game system in an embodiment of the present invention;

FIG. 26 is a view of an example of a table to be used in the game system in an embodiment of the present invention;

DESCRIPTION OF EMBODIMENTS

First Embodiment

The first embodiment of the present invention is described with reference to the drawings.

[Overview of Monitoring System]

Figure 1:
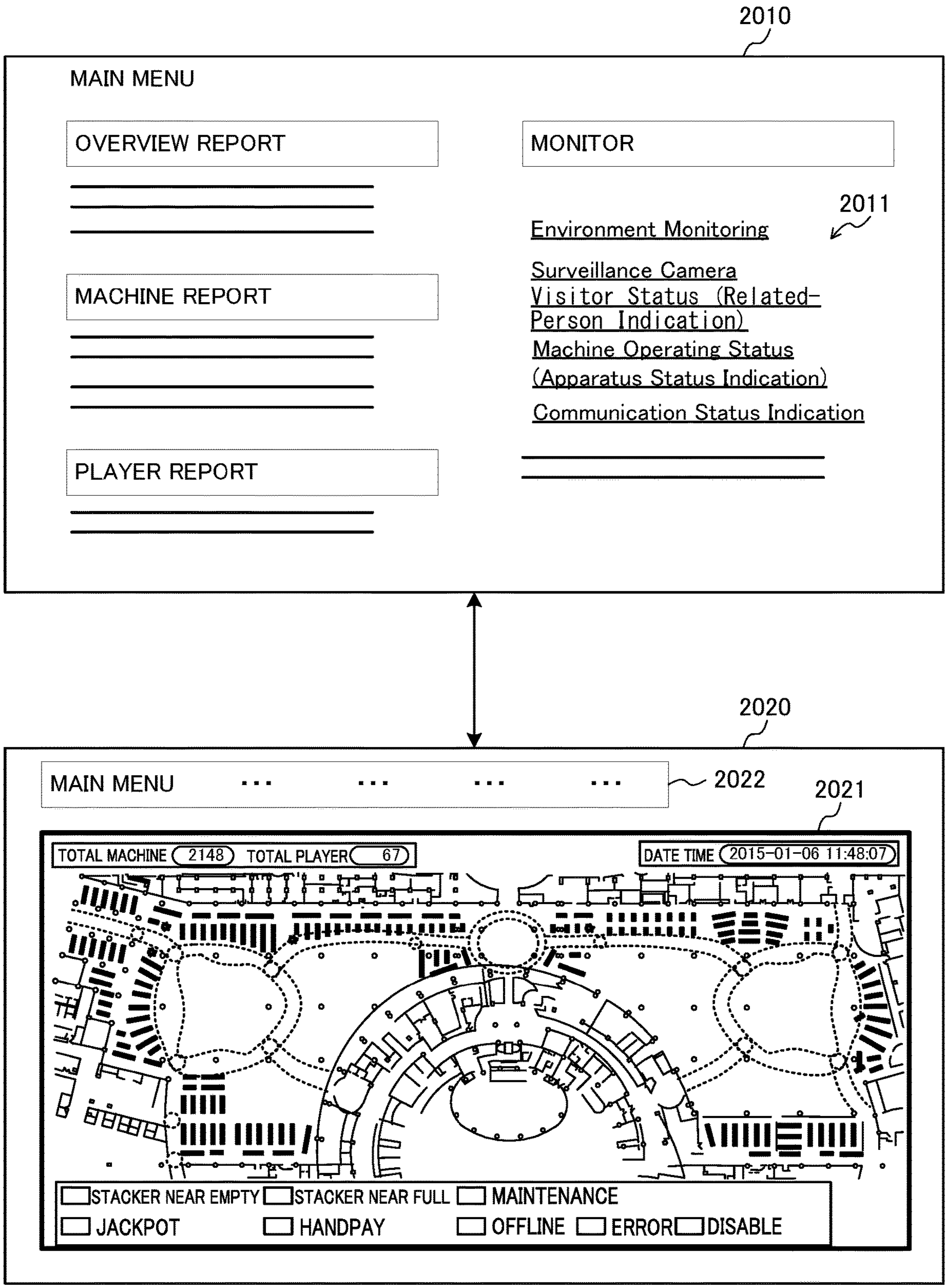
FIG. 1 is a diagram for illustrating a general representation of a monitoring system in an embodiment of the present invention.

The overview of a monitoring system in the present embodiment is described, using the floor map 2021 shown in FIG. 1 by way of example.

This monitoring system provides information on various places of a gaming hall using the floor map 2021 of the gaming hall. The floor map 2021 includes a variety of information on the current gaming hall mapped thereto periodically or in real time. Mapping means laying out the variety of information or distribution of the variety of information at corresponding positions to the places of the gaming hall where the information is acquired. Information in the past can also be mapped to the floor map 2021. The current and the previous information mapped to the floor map 2021 could be used to presume the future condition of the gaming hall.

Information on the gaming hall includes environmental information such as room temperature, captured-image information (image information) acquired by taking a picture of the gaming hall, and information indicating the statuses of apparatuses. The information on the gaming hall is information acquired and transmitted by apparatuses installed in the gaming hall.

In the example shown in FIG. 1, in response to selection of a menu 2011 (such as environment monitoring menu, surveillance camera menu, related-person indication menu, machine status indication menu, or a communication status indication menu) related to monitoring of the gaming hall from a main menu 2010, the screen changes to the monitoring screen 2020.

The monitoring screen 2020 includes a floor map 2021 and buttons 2022 for executing the various functions. The buttons 2022 include a button to return to the main menu (an exit button to exit the displayed screen) and other buttons depending on the kind of the monitoring screen 2020.

The floor map 2021 shows, depending on the kind of the monitoring screen, information received from the apparatuses mapped to the corresponding positions of the individual apparatuses. The appearances and the kinds (types) of information on the floor map are listed on the lower part of the floor map 2021. The floor map 2021 initially includes a plurality of apparatuses (such as gaming machines) installed in the gaming hall which are mapped to the corresponding positions.

Figure 2:
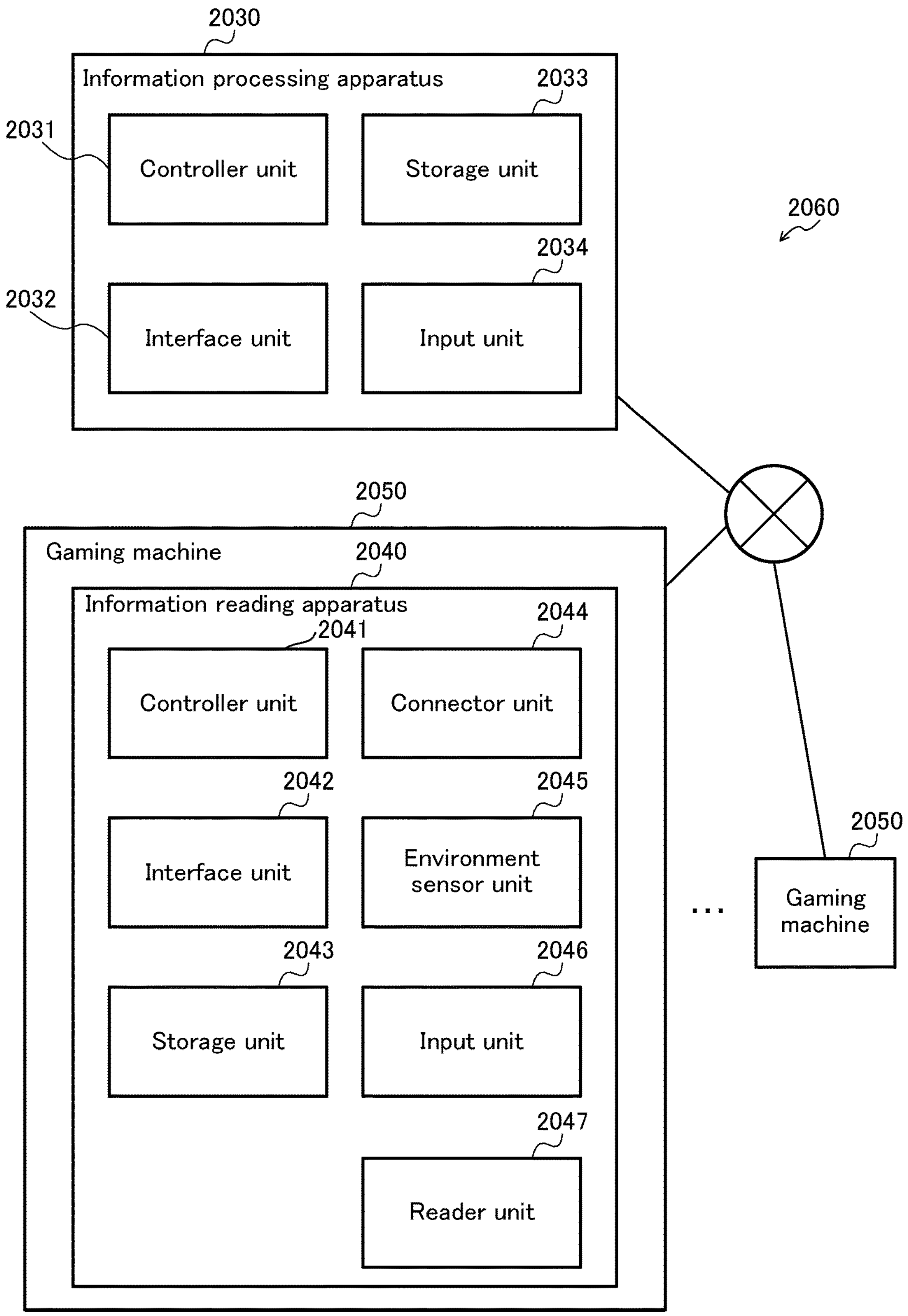
FIG. 2 is a diagram for illustrating a configuration of the monitoring system in an embodiment of the present invention.

FIG. 2 is a diagram for illustrating an example of a system (monitoring system 2060) for providing a floor map 2011. The monitoring system 2060 includes an information processing apparatus 2030 and a plurality of gaming machines 2050.

The information processing apparatus 2030 includes a controller unit 2031, an interface unit 2032, a storage unit 2033, and an input unit 2034.

The controller unit 2031 is capable of controlling the interface unit 2032 and the storage unit 2033. The controller unit 2031 is capable of performing processing such as mapping a variety of information to the floor map. A CPU (Central Processing Unit), an MCU (Micro-Control Unit), a motherboard, a GPU (Graphics Processing Unit), and/or a video card (graphic board) function as the controller unit 2031.

A display control unit capable of controlling a display unit such as a display device for displaying images may be provided independently from the controller unit 2031.

The interface unit 2032 is capable of communicating with the apparatuses connected with the network. Communication devices for wired and/or wireless communication (for example, communication modules for wired LAN, wireless LAN, and/or cell phone communication) function as the interface unit 2032.

The storage unit 2033 is capable of storing a variety of information (such as programs and tables for controlling the monitoring system 2060). A ROM (Read Only Memory), a RAM (Random Access Memory), a silicon disk, and/or a hard disk function as the storage unit 2033.

For example, the functions of the controller unit 2031, the interface unit 2032, and the input unit 2034 are implemented by a CPU through operations of loading programs and table data stored in a ROM to a RAM and executing the programs.

The input unit 2034 is capable of inputting a variety of information to the information processing apparatus 2030 in accordance with user operations. An input and output interface such as a USB terminal, a physical button, a physical keyboard, a physical mouse, and/or a user interface displayed on a liquid crystal touch panel are function as the input unit 2034.

Each gaming machine 2050 includes an information reading apparatus 2040.

The information reading apparatus 2040 includes a controller unit 2041, an interface unit 2042, a storage unit 2043, a connector unit 2044, an environment sensor unit 2045, an input unit 2046, and a reader unit 2047.

The controller unit 2041 is capable of controlling the other units 2042 to 2045. A CPU, an MCU, a motherboard, a GPU, and/or a video card (graphic board) function as the controller unit 2041.

A display control unit capable of controlling a display unit such as a display device for displaying images may be provided independently from the controller unit 2041.

The interface unit 2042 is capable of communicating with the apparatuses connected with the network. Communication devices for wired and/or wireless communication (for example, communication modules for wired LAN, wireless LAN, and/or cell phone communication) function as the interface unit 2042.

The storage unit 2043 is capable of storing a variety of information. A ROM, a RAM, a silicon disk, and/or a hard disk function as the storage unit 2043.

The connector unit 2044 is capable of communicating with the gaming machine. Communication devices for wired and/or wireless communication (for example, a USB terminal, an extension slot, and/or a network terminal) function as the connector unit 2044.

The environment sensor unit 2045 is capable of sensing and acquiring environmental information at the place where the information reading apparatus 2040 is installed. A temperature sensor, a humidity sensor, an odor sensor, an oximeter, a carbon-dioxide level sensor, a pressure sensor, a sound/vibration sensor, and/or a CCD image sensor function as the environment sensor unit 2045.

The input unit 2046 is capable of inputting a variety of information to the information reading apparatus 2040 in accordance with user operations. An input and output interface such as a USB terminal, a physical button, a physical keyboard, a physical mouse, and/or a user interface displayed on a liquid crystal touch panel are function as the input unit 2046.

The reader unit 2047 is capable of reading identification information for identifying a user stored in a storage medium (such as an IC card). A contact-type reader and writer and/or a contactless reader and writer function as the reader unit 2047.

Hereinafter, various aspects of the monitoring system 2060 are described.

[Mode 1-1]

The information processing apparatus 2030 in Mode 1-1 includes an interface unit 2032 capable of receiving environmental information (e.g., temperature information, humidity information, image information, or status information) representing a gaming environment at a place where a gaming machine 2050 is installed in a gaming hall (e.g., a floor) and a controller unit 2031 configured to perform image processing to create or re-create a floor map of the gaming hall in which gaming machines 2050 installed in the gaming hall are mapped to corresponding positions by associating the environmental information with the position of the gaming machine 2050.

The floor map may be stored in the storage unit 2033 or an external storage device.

According to this configuration, the information processing apparatus 2030 can acquire environmental information representing a gaming environment at a place where a given gaming machine 2050 is installed using the gaming machines 2050 installed all over the gaming hall and the floor map of the gaming hall can show the gaming environment at the position corresponding to the gaming machine 2050.

The user of the information processing apparatus 2030 can quickly check the gaming environment at the place by seeing the environmental information associated with the position of the gaming machine 2050 on the floor map.

The gaming environment in this description means external factor(s) surrounding the player and the gaming machine 2050, such as temperature, humidity, barometric pressure, odor, sound, oxygen level, luminance, and/or existence of other person(s). The gaming environment means something that might affect at least either the player or the gaming machine 2050 in the gaming hall. For example, the environmental information, in the case of temperature information, can tell disproportionate air conditioning in a wide casino.

The information processing apparatus 2030 may also be configured as follows.

The interface unit 2032 is configured to receive locational information (e.g., apparatus identification code, coordinate information, and/or positional information) for locating the position of the gaming machine 2050 on the floor map from the gaming machine 2050; and the controller unit 2031 is configured to locate the position of the gaming machine 2050 on the floor map based on the locational information and re-create the floor map by mapping the environmental information to the located position.

The information processing apparatus 2030 may also be configured as follows.

The interface unit 2032 is configured to receive temperature information indicating an internal temperature of the gaming machine 2050 (e.g., temperature(s) of the CPU, the GPU, the HDD, and/or the motherboard) as the environmental information.

According to this configuration, a temperature of the inside of the gaming machine 2050 can be acquired. For example, if the acquired temperature is higher than the reference value, the shop can determine that a failure occurs in the gaming machine 2050.

The information processing apparatus 2030 may also be configured as follows.

The interface unit 2032 is configured to receive temperature information indicating an external temperature of the gaming machine 2050 (e.g., a room temperature) as the environmental information.

According to this configuration, a temperature at the place where the gaming machine 2050 is installed can be acquired. For example, if the acquired temperature is higher than the reference value, meaning if the shop becomes aware of a hot place, the shop can adjust the air conditioning to cool down the place.

As described above, the user of the information processing apparatus 2030 can adequately grasp temperature information or an example of environmental information and take appropriate actions in accordance with the temperature information.

In the information processing apparatus 2030, the controller unit 2031 is configured to perform image processing to re-create the floor map by mapping the environmental information to the position of the gaming machine 2050.

According to this configuration, environmental information is mapped to the position of the gaming machine 2050 on the floor map.

The user of the information processing apparatus 2030 can accurately know the place in the gaming hall by seeing the gaming machine 2050 on the floor map and quickly check the gaming environment at the place by seeing the associated environmental information.

This configuration enables the user to know the condition on the gaming environment and the place at a glance and grasp the gaming environment in the gaming hall more adequately.

The image representing the gaming machine 2050 on the floor map can employ any shape, such as a rectangle, a circle, an oval, a schematic view of the gaming machine 2050, or a miniature of the gaming machine 2050.

For the image representing the environmental information, the image (e.g., an icon) of the gaming machine 2050 may be colored differently depending on the temperature indicated by the environmental information, for example, in red (for high temperature), in yellow (for medium temperature), and in blue (for low temperature) or alternatively, a colored image may be superimposed onto the image of the gaming machine 2050 and its periphery.

With respect to the information processing apparatus 2030, the gaming hall includes a plurality of gaming machines 2050 inclusive of the gaming machine 2050; the interface unit 2032 is configured to receive environmental information at a place where a gaming machine 2050 is installed from each of the plurality of gaming machines 2050; and the controller unit 2031 is configured to perform image processing to re-create the floor map by correspondingly mapping the environmental information received by the interface unit 2032 to the positions of the plurality of gaming machines 2050.

According to this configuration, environmental information is acquired at each place where a gaming machine 2050 is installed in the gaming hall and the floor map shows the environmental information mapped to the corresponding positions of the plurality of gaming machines 2050.

It is technically difficult for one environmental information acquisition apparatus to acquire environmental information in a wide range at once; however, this configuration enables grasp of the gaming environment based on the plurality of pieces of environmental information acquired by the plurality of gaming machines 2050. For example, assuming that the gaming hall is separated into several areas, if some environmental information in one area shows a value different from the other environmental information, the spot in abnormal gaming environment can be narrowed down to the gaming machine 2050 that has detected the different value of environmental information or its periphery. If environmental information in some area shows values relatively different from environmental information in the other areas, the area in abnormal gaming environment can be narrowed down to the area.

Grouping the environmental information as described above enables the user of the information processing apparatus 2030 to grasp the gaming environment of the gaming hall more adequately.

[Mode 1-2]

The information reading apparatus 2040 in Mode 1-2 includes a connector unit 2044 connectable to a gaming machine 2050, an environment sensor unit 2045 capable of sensing a gaming environment at a place where a gaming machine 2050 connected through the connector unit 2044 is installed and creating environmental information, an interface unit 2042 capable of communicating with an information processing apparatus 2030 capable of image processing to re-create a floor map of a gaming hall in which gaming machines 2050 installed in the gaming hall are mapped to corresponding positions by associating the environmental information with the position of the gaming machine 2050, and a controller unit 2041 configured to send the environmental information to the information processing apparatus 2030 through the interface unit 2042.

The information reading apparatus 2040 is connectable to a gaming machine 2050, which could be an existing gaming machine 2050 in the gaming hall as well as a gaming machine 2050 to be newly installed to the gaming hall.

This configuration enables acquisition of environmental information at any place where a gaming machine 2050 is installable.

Accordingly, this configuration allows environmental information to be acquired continuously from a specific place or from various places by rotation; the shop can adequately grasp the gaming environment in the gaming hall.

The information reading apparatus 2040 may also be configured as follows.

The controller unit 2041 is configured to send locational information for locating the gaming machine 2050 on the floor map to the information processing apparatus 2030.

[Mode 1-3]

The gaming machine 2050 in Mode 1-3 includes the information reading apparatus 2040 in Mode 1-2.

According to this configuration, environmental information can be acquired continuously from a specific place or from various places by rotation; the shop can adequately grasp the gaming environment in the gaming hall.

The gaming machine 2050 may also be configured as follows.

The controller unit 2041 is configured to determine whether the gaming machine 2050 is being used by a user (whether an IC card required to start games has been inserted) and send the environmental information to the information processing apparatus 2030 if determining that the gaming machine 2050 is not being used.

According to this configuration, environmental information is acquired from the place of a gaming machine 2050 not being used by a user.

This configuration eliminates the noise caused by a user, so that more accurate environmental information can be acquired; the shop can grasp the gaming environment more adequately.

The gaming machine 2050 may also be configured as follows.

The environment sensor unit 2045 is configured to measure an internal temperature of the information reading apparatus 2040 and create temperature information for indicating the temperature as the environmental information.

The gaming machine 2050 may also be configured as follows.

The environment sensor unit 2045 is configured to measure an external temperature of the gaming machine 2050 and create temperature information for indicating the temperature as the environmental information.

[Mode 1-4]

The monitoring system 2060 in Mode 1-4 includes information reading apparatuses 2040 connectable to gaming machines 2050 installed in a gaming hall and an information processing apparatus 2030 capable of communicating with the information reading apparatuses 2040. Each of the information reading apparatus 2040 includes an environment sensor unit 2045 capable of sensing a gaming environment at a place where the gaming machine 2050 connected with the information reading apparatus 2040 is installed and creating environmental information, an interface unit 2042 capable of communicating with the information processing apparatus 2030, and a controller unit 2041 configured to send the environmental information to the information processing apparatus 2030 through the interface unit 2042. The information processing apparatus 2030 includes an interface unit 2032 capable of receiving the environmental information sent from the information reading apparatuses 2040 and a controller unit 2031 configured to perform image processing to re-create a floor map of the gaming hall in which gaming machines 2050 installed in the gaming hall are mapped to corresponding positions by associating environmental information with the position of a gaming machine which has sent the environmental information.

According to this configuration, environmental information can be acquired continuously from a specific place or from various places by rotation; for example, the shop can adequately grasp the gaming environment in the gaming hall.

[Mode 2-1]

The information processing apparatus 2030 in Mode 2-1 includes an interface unit 2032 capable of receiving image information captured at places where gaming machines 2050 are installed in a gaming hall from the gaming machines 2050, and a controller unit 2031 configured to perform display control to show the image information on a display device while changing the gaming machines that have sent the image information with predetermined intervals.

The display device may be provided integrally with the information processing apparatus 2030 or separately from the information processing apparatus 2030 and connectable to the information processing apparatus 2030.

According to this configuration, image information representing a gaming environment at a given place where a gaming machine 2050 is installed can be acquired using the gaming machines 2050 installed all over the gaming hall.

For example, upon awareness of a crowded place, the shop can prepare for possible troubles by sending a staff member or monitoring the place.

Accordingly, this configuration can show the image information captured at various places in the gaming hall, allowing the user of the information processing apparatus 2030 to grasp the gaming environment and further, to take appropriate actions depending on the captured-image information.

With respect to the information processing apparatus 2030, the gaming machines 2050 installed in the gaming hall are mapped to corresponding positions on a floor map of the gaming hall; and the controller unit 2031 is configured to re-create the floor map by correspondingly associating the image information received through the interface unit 2032 with the positions of the gaming machines 2050 that have sent the image information.

According to this configuration, the floor map is created in such a manner that the images (captured-image information) are associated with the position of the gaming machine 2050 that has acquired the images.

The user of the information processing apparatus 2030 can quickly and accurately grasp the place of the gaming hall where the images are acquired by seeing the floor map and take appropriate actions depending on the captured-image information.

The information processing apparatus 2030 further includes an input unit 2034 capable of receiving an input requesting a gaming machine 2050 installed in the gaming hall for image information in accordance with a user operation of the floor map; the interface unit 2032 is configured to send an instruction to send image information to the gaming machine 2050 designated by the user operation; and the controller unit 2031 is configured to perform display control to show the image information on the display device.

This configuration enables acquisition of image information captured at the place where the gaming machine 2050 designated by the user operation is installed. For example, the shop can selectively monitor a place where many people are gathering by designating a gaming machine 2050 at the intended place; the shop can take more appropriate actions depending on the captured-image information.

[Mode 2-2]

The gaming machine 2050 in Mode 2-2 may be configured as follows.

The controller unit 2031 is configured to determine whether the image information received at the interface unit 2032 includes a predetermined number or more of persons and perform display control to highlight the image information if determining that the image information includes the predetermined number of more of persons, compared to a case where the controller determines that the image information does not include the predetermined number or more of persons.

For example, when the apparatus layout is changed, an unexpected space may become an aisle. This configuration facilitates grasping places where many people gather and places where many people walk through, enabling selective monitoring such places.

To highlight image information, the display time may be set longer or the size of screen may be set larger; however, note that these are merely examples.

[Mode 2-3]

The monitoring system 2060 in Mode 2-3 includes a plurality of gaming machines 2050 installed in a gaming hall and an information processing apparatus 2030 capable of communicating with the plurality of gaming machines 2050. Each of the plurality of gaming machines 2050 includes an environment sensor unit 2045 capable of creating image information captured at a place where the gaming machine 2050 is installed, and an interface unit 2042 capable of sending the image information to the information processing apparatus 2030. The information processing apparatus 2030 includes an interface unit 2032 capable of receiving the image information captured at the places of the gaming machines 2050 from the gaming machines 2050 and a controller unit 2031 configured to perform display control to show the image information on a display device while changing the gaming machines that have sent the image information with predetermined intervals.

[Mode 3-1]

The information processing apparatus in Mode 3-1 includes an interface unit 2032 capable of receiving identification information (e.g., a member identification code or an IC card identification code) on a user retrieved by an information reading apparatus 2040 installed in a gaming hall, and a controller unit 2031 configured to retrieve locational information (e.g., an apparatus identification code, coordinate information, and positional information) for locating an object (e.g., a friend, a family member, or a recommended gaming machine) related to the user in the gaming hall from a storage device (which may be the storage unit 2033 or an external storage device) based on the identification information on the user and perform image processing to create a floor map of the gaming hall in which an image associated with the object is mapped to a corresponding position of the object in the gaming hall. The storage device stores identification information for identifying the object together with the identification information on the user and further stores the locational information for locating the object together with the identification information on the object.

According to this configuration, locational information associated with the received identification information on the user is retrieved from the stored locational information for locating objects related to users in the gaming hall and an image associated with the object is displayed at the corresponding position on the floor map. For example, when a user makes an information reading apparatus 2040 read a storage medium (e.g., an IC card), objects related to the user are displayed on the floor map. The shop can accurately and quickly locate the objects related to the user in the gaming hall.

Accordingly, this configuration enables grasp of the objects related to a user in the gaming hall.

The information processing apparatus 2030 may be configured as follows.

The storage device further holds attribute information representing an attribute of each object together with the identification information of the user and the controller unit 2031 is configured to retrieve the attribute information associated with the identification information of the object from the storage device and create the floor map in such a manner that the attribute information is mapped.

According to this configuration, the shop can grasp the attribute of the object through the attribute information of the object displayed on the floor map: the shop can more accurately grasp the object related to the user in the gaming hall.

The attribute information may be information for indicating personal relationship to the player, such as friend or family member, information for indicating the client class for the shop, such as visitor, member, VIP, suspected visitor, or suspected member, or information on recommended machines for the player. The attribute information on the floor map may be indicated in the form of an image different in color, shape, size, or combination of these for each attribute or text information; however, note that these are merely examples.

Furthermore, the information processing apparatus 2030 is capable of communicating with another information reading apparatus 2040 installed in the gaming hall different from the information reading apparatus 2040; the interface unit 2032 is configured to receive identification information on another user upon retrieval of the identification information on the other user at the other information reading apparatus 2040; and the controller unit 2031 is configured to determine whether the identification information on the user is associated with the identification information on the other user based on the identification information stored in the storage device and create the floor map in such a manner that an image associated with the user is mapped to a corresponding position of the information reading apparatus 2040 in the gaming hall and an image associated with the other user is mapped to a corresponding position of the other information reading apparatus 2040 in the gaming hall if determining that the identification information on the user is associated with the identification information on the other user.

According to this configuration, if a user who has made the information reading apparatus 2040 read a storage medium is associated with another user who had made another information reading apparatus 2040 read a storage medium, an image associated with the user is mapped to the corresponding position of the information reading apparatus 2040 in the gaming hall and an image associated with the other user is mapped to the corresponding position of the other information reading apparatus 2040 on the floor map. For example, the shop can easily grasp the positional relation between the user and the other user by seeing the floor map.

Accordingly, this configuration enables the object related to the user in the gaming hall to be grasped more accurately.

The information processing apparatus 2030 may also be configured as follows.

The controller unit 2031 is configured to create the floor map in such a manner that the image associated with the user is highlighted in a case where the image associated with the user is selected by a user operation and create a floor map in which the image associated with the other user is highlighted in a case where the image associated with the other user is selected by a user operation.

According to this configuration, the shop can clearly grasp the other user related to the user by selecting the image associated with the user. This configuration enables the object related to the user in the gaming hall to be grasped more accurately.

[Mode 3-2]

The information reading apparatus in Mode 3-2 includes a reader unit 2047 capable of retrieving identification information for identifying a user stored in a storage medium (e.g., an IC card) and an interface unit 2042 configured to send, upon retrieval of the identification information on the user at the reader unit 2047, the identification information on the user to an information processing apparatus 2030 configured to perform image processing to create a floor map in which an image associated with an object related to the user is mapped to a corresponding position of the object in the gaming hall based on the identification information on the user.

[Mode 3-3]

The gaming machine 2050 in Mode 3-3 includes the information reading apparatus 2040 in Mode 3-2.

[Mode 3-4]

The monitoring system 2060 in Mode 3-4 includes a plurality of information reading apparatuses 2040 installed in a gaming hall and an information processing apparatus 2030 capable of communicating with the plurality of information reading apparatuses 2040. Each of the information reading apparatuses 2040 includes a reader unit 2047 capable of retrieving identification information for identifying a user stored in a storage medium and an interface unit 2042 configured to send the identification information on the user to the information processing apparatus 2030 upon retrieval of the identification information on the user at the reader unit 2047. The information processing apparatus 2030 includes an interface unit 2032 capable of receiving the identification information retrieved by the plurality of information reading apparatuses 2040 and a controller unit 2031 configured to retrieve locational information for locating an object related to the user in the gaming hall from a storage device based on the identification on the user, and perform image processing to create a floor map of the gaming hall in which an image associated with the object is mapped to a corresponding position of the object in the gaming hall. The storage device stores identification information for identifying the object together with the identification information on the user and further stores the locational information for locating the object together with the identification information on the object.

[Mode 3-5]

The information processing apparatus in Mode 3-5 includes an interface unit 2032 capable of receiving identification information on a user retrieved by an information reading apparatus 2040, which is installed in a gaming hall and capable of retrieving identification information for identifying a user stored in a storage medium, and a controller unit 2031 configured to retrieve identification information on an object related to the user associated with the identification information on the user and locational information on the object associated with the identification information on the object from a storage device and perform image processing to create a floor map of the gaming hall in which an image associated with the user is mapped to a corresponding position of the information reading apparatus 2040 in the gaming hall and an image associated with the object is mapped to a corresponding position of the object in the gaming hall. The storage device stores identification information for identifying the object together with the identification information on the user and further stores the locational information for locating the object together with the identification information on the object.

[Mode 3-6]

The information processing apparatus in Mode 3-6 includes an interface unit 2032 capable of receiving identification information on a user retrieved by an information reading apparatus 2040, which is installed in a gaming hall and capable of retrieving identification information for identifying a user stored in a storage medium, and locational information for locating a position of the user on a floor map of the gaming hall, and a controller unit 2031 configured to retrieve identification information on an object related to the user associated with the identification information on the user and locational information on the object associated with the identification information on the object from a storage device and perform image processing to re-create the floor map of the gaming hall by mapping an image associated with the user to a corresponding position of the information reading apparatus 2040 in the gaming hall and mapping an image associated with the object to a corresponding position of the object in the gaming hall, based on the locational information on the user and the locational information on the object. The storage device stores identification information for identifying the object together with the identification information on the user and further stores the locational information for locating the object together with the identification information on the object.

[Mode 4-1]

An information processing apparatus 2030 in Mode 4-1 includes an interface unit 2032 capable of receiving image information captured by each of a plurality of cameras installed in a gaming hall and a controller unit 2031 configured to perform image processing to re-create a floor map of the gaming hall in which view range information for indicating view ranges of the plurality of cameras is mapped by associating image information received at the interface with a view range related to the image information.

The cameras are video cameras for surveying the gaming hall and having functions to forward, process, record, and display captured images. Cameras such as box cameras (fixed cameras), dome cameras, PTZ (Pan Tilt Zoom) cameras, infrared cameras, one-cable cameras, wireless cameras, and network cameras may be used.

The view range information may be stored in the storage unit 2033 or an external storage device in advance.

According to this configuration, the floor map shows all the view ranges of the plurality of cameras installed in the gaming hall. For example, the shop can accurately locate the view range to capture an intended subject by seeing the floor map; the shop can select captured-image information including the intended subject.

Accordingly, this configuration facilitates acquisition of image information including an intended subject.

In the information processing apparatus 2030, the controller unit 2031 is configured to create the floor map in such a manner that icons of the plurality of cameras are mapped, and the interface unit 2032 is configured to send, upon selection of one of the icons by a user operation, an instruction requesting captured-image information to a camera corresponding to the selected icon and receive captured-image information from the camera.

According to this configuration, since the icons of the cameras are displayed on the floor map, the image capturing direction can be identified more easily, compared to the floor map showing only the view ranges. For example, if a specific monitoring target is captured from a plurality of angles, the shop can acquire image information captured from a desired angle more easily.

Accordingly, this configuration facilitates acquisition of image information including an intended subject furthermore.

In the information processing apparatus 2030, the interface unit 2032 is configured to send, upon selection of one of the view ranges by a user operation, an instruction requesting captured-image information to a camera corresponding to the selected view range and receive captured-image information from the camera.

According to this configuration, image information captured by the camera corresponding to the view range selected on the floor map is acquired. For example, the shop can acquire the captured-image information with simple operation of selecting a view range displayed on the floor map.

Accordingly, this configuration facilitates acquisition of image information including an intended subject furthermore.

With respect to the information processing apparatus 2030, the gaming hall includes a plurality of gaming machines 2050; in the floor map, the plurality of gaming machines 2050 are mapped; the interface unit 2032 is configured to receive anomaly information from a gaming machine 2050 in an abnormal state in the plurality of gaming machines 2050; and the controller unit 2031 is configured to re-create the floor map by indicating the gaming machine 2050 in the abnormal state distinguishably from the other gaming machines 2050.

The information processing apparatus 2030 may also be configured as follows.

The gaming hall includes a plurality of gaming machines 2050; in the floor map, images representing the plurality of gaming machines 2050 are shown at the corresponding positions in the gaming hall; the interface unit 2032 is configured to receive anomaly information from a gaming machine 2050 in an abnormal state in the plurality of gaming machines 2050; and the controller unit 2031 is configured to re-create the floor map by indicating the gaming machine 2050 in the abnormal state distinguishably from the other gaming machines 2050.

According to this configuration, the gaming machine 2050 in an abnormal state is indicated distinguishably on the floor map showing the view ranges. For example, the shop can easily locate the view range including the gaming machine 2050 in an abnormal state.

Accordingly, this configuration facilitates acquisition of captured-image information including the gaming machine 2050 in an abnormal state.

The information processing apparatus 2030 may also be configured as follows.

The floor map shows images representing the plurality of cameras together with the view ranges; the interface unit 2032 is configured to send, in response to selection of one of the images representing the cameras on the floor map by a user operation, an instruction requesting captured-image information to the camera corresponding to the designated image, and receive captured-image information from the camera; and the controller unit 2031 is configured to display the captured-image information on a display device (e.g., an LCD).

The display device may be provided integrally with the information processing apparatus 2030 or separately from the information processing apparatus 2030 and connectable to the information processing apparatus 2030.

The information processing apparatus 2030 may also be configured as follows.

The display device is a display device different from the display device for displaying the floor map.

The different display device may be provided integrally with the information processing apparatus 2030 or separately from the information processing apparatus 2030 and connectable to the information processing apparatus 2030.

The information processing apparatus 2030 may also be configured as follows.

The controller unit 2031 is configured to re-create the floor map by indicating the designated view range distinguishably from the other view ranges.

According to this configuration, the designated view range is distinguishable; for example, the shop can easily identify from which view range the acquired image information is acquired.

The information processing apparatus 2030 may also be configured as follows.

The interface unit 2032 is configured to send, in a case where a point where the view ranges are overlapped is designated among the view ranges by a user operation, an instruction requesting captured-image information to each of the cameras corresponding to overlapped view ranges and receive captured-image information from each of the cameras; and the controller is configured to display the image information captured by the cameras on the display device all at once or while changing the cameras that have sent the image information.

According to this configuration, image information captured at a plurality of places where view ranges are overlapped is displayed on a single screen all at once or while changing the cameras that have sent the image information. Accordingly, if the intended subject is located at a place where view ranges are overlapped, the shop can acquire captured-image information including the intended subject at once through a simple operation of designating the point where the view ranges are overlapped.

Hence, this configuration facilitates acquisition of captured-image information including an intended subject.

[Mode 5-1]

The information processing apparatus 2030 in Mode 5-1 includes an interface unit 2032 capable of receiving locational information for locating an information reading apparatus 2040 retrieved by the information reading apparatus 2040 installed in a gaming hall and a controller unit 2031 configured to perform image processing on a floor map of the gaming hall in which information reading apparatuses 2040 installed in the gaming hall are mapped to corresponding positions of the information reading apparatuses 2040. The interface unit 2032 is configured to receive locational information on an information reading apparatus 2040 installed in the gaming hall, receive locational information on another information reading apparatus 2040 different from the information reading apparatus 2040, and receive information indicating that the information reading apparatus 2040 starts communication with the other information reading apparatus 2040. The controller unit 2031 is configured to re-create the floor map by showing the information reading apparatus 2040 and the other information reading apparatus 2040 in such a manner that the information reading apparatus 2040 is communicating with the other information reading apparatus 2040, based on the locational information on the information reading apparatus and the locational information on the other information reading apparatus.

According to this configuration, if communication between an information reading apparatus 2040 and another information reading apparatus 2040 is detected, the floor map shows that the information reading apparatus 2040 is communicating with the other information reading apparatus 2040. For example, the shop grasps that a user is communicating with another user by seeing the floor map.

To indicate the information reading apparatuses 2040 are in communication, the caller and the callee may be connected by a line or the caller and the callee may be blinked; however, note that these are merely examples.

This configuration enables grasp of an object related to a user (a person communicating with the user) in the gaming hall.

The information processing apparatus 2030 may also be configured as follows.

The interface unit 2032 is configured to receive information indicating that communication different from the communication between the information reading apparatus 2040 and the other information reading apparatus 2040 is started. The controller unit 2031 is configured to re-create the floor map by showing that the different communication is being held in addition to showing that the information reading apparatus 2040 is communicating with the other information reading apparatus 2040, based on the information indicating that the different communication is started.

According to this configuration, when new communication is started, the floor map shows the previous communication as well.

This configuration enables all the callers and all the callees in the gaming hall to be grasped by seeing the floor map.

The information processing apparatus 2030 may also be configured as follows.

The controller unit 2031 is configured to determine whether the number of communications being held between information reading apparatuses 2040 installed in the gaming hall exceeds a predetermined number and if determining that the number of communications exceeds the predetermined number, reflect excessive number of communications over the predetermined number to a floor map different from the floor map.

According to this configuration, a predetermined number of communications can be seen in a single floor map and the excessive communications over the predetermined number can be seen in another floor map.

Many communications can be held in a wide gaming hall like a casino; it could be hard to read a single floor map showing all the communications. This configuration limits the number of communications to be indicated on a floor map to the predetermined number at maximum, preventing the situation where the floor map is hard to be read as far as possible.

In the information processing apparatus 2030, the controller unit 2031 is configured to dispose a first icon at a corresponding position of the information reading apparatus 2040 and a second icon at a corresponding position of the other information reading apparatus 2040 on the floor map, highlight the second icon if determining that the first icon is selected by a user operation, and highlight the first icon if determining that the second icon is selected by a user operation.

According to this configuration, icons are displayed at the positions of a caller and a callee on the floor map and upon selection of either one of the icons, the other person in communication is highlighted.

Since icons are displayed at the corresponding positions of a caller and a callee, the caller and the callee can be easily grasped even in a wide gaming hall like a casino.

[Mode 5-2]

The information reading apparatus 2040 in Mode 5-2 includes an input unit 2046 capable of receiving a start request indicating that the information reading apparatus 2040 starts communication with another information reading apparatus 2040 installed in a gaming hall in accordance with a user operation, and an interface unit 2042 configured to send, based on the start request, locational information for locating the information reading apparatus 2040 installed in the gaming hall to an information processing apparatus 2030 configured to perform image processing on a floor map of the gaming hall in which information reading apparatuses 2040 installed in the gaming hall are mapped to corresponding positions of the information reading apparatuses 2040. The interface unit 2042 is configured to receive the floor map re-created by indicating that the communication is being held from the information processing apparatus 2030.

[Mode 5-3]

The monitoring system 2060 in Mode 5-3 includes a plurality of information reading apparatuses 2040 installed in a gaming hall and an information processing apparatus 2030 capable of communicating with the plurality of information reading apparatuses 2040. Each of the plurality of information reading apparatuses 2040 includes an input unit 2046 capable of receiving a start request indicating that the information reading apparatus 2040 starts communication with another information reading apparatus 2040 installed in the gaming hall in accordance with a user operation, and an interface unit 2042 configured to send, based on the start request, locational information for locating the information reading apparatus 2040 installed in the gaming hall to the information processing apparatus 2030. The information processing apparatus 2030 includes an interface unit 2032 capable of receiving the locational information and a controller unit 2031 configured to perform image processing on a floor map of the gaming hall in which the information reading apparatuses 2040 installed in the gaming hall are mapped to corresponding positions of the information reading apparatuses 2040. The interface unit 2032 is configured to receive locational information of an information reading apparatus 2040 installed in the gaming hall, receive locational information of another information reading apparatus 2040 different from the information reading apparatus 2040, receive information indicating that the information reading apparatus 2040 starts communication with the other information reading apparatus 2040. The controller unit 2031 is configured to re-create the floor map by showing the information reading apparatus 2040 and the other information reading apparatus 2040 in such a manner that the information reading apparatus 2040 is communicating with the other information reading apparatus 2040, based on the locational information on the information reading apparatus and the locational information on the other information reading apparatus.

[Mode 6-1]

The information processing apparatus 2030 in Mode 6-1 includes an interface unit 2032 capable of receiving status information (e.g., ON-LINE, OFF-LINE, or ERROR) for indicating statuses of apparatuses installed in a gaming hall and locational information (e.g., an apparatus identification code, coordinate information, and positional information) for locating the apparatuses, and a controller unit 2031 configured to perform image processing to re-create a floor map of the gaming hall in which the apparatuses installed in the gaming hall are mapped to corresponding positions by associating the status information with the positions of the apparatuses based on the locational information.

According to this configuration, status information on an apparatus is collected from each of the apparatuses installed in the gaming hall to the information processing apparatus 2030 and a floor map is created by mapping the apparatuses and the status information.

The floor map can correctly and quickly tell which apparatus is in which status even in the case where the floor is wide like a casino.

Accordingly, this configuration enables grasp of the statuses of the apparatuses in the gaming hall.

The apparatuses mean the apparatuses installed in the gaming hall, such as information reading apparatuses 2040, gaming machines 2050, signage apparatuses, kiosk terminals, and surveillance cameras; however, note that these are merely examples.

The information processing apparatus 2030 may be configured as follows.

The controller unit 2031 is configured to re-create the floor map by indicating the statuses of the apparatuses in different colors.

Since the statuses of the apparatuses are indicated in different colors, the statuses of the apparatuses in the gaming hall can be grasped more easily.

In the information processing apparatus 2030, the controller unit 2031 is configured to retrieve status information and locational information at predetermined intervals from a storage device storing the status information and the locational information with time information and re-create the floor map by mapping the status information based on the locational information.

According to this configuration, the floor map is updated at predetermined intervals. For example, if the gaming hall includes a large number of apparatuses, re-creating the floor map causes high load to the information processing apparatus 2030. The load to the information processing apparatus 2030 can be reduced by updating the floor map at predetermined intervals.

In the information processing apparatus 2030, the controller unit 2031 is configured to re-create the floor map by mapping the status information based on the locational information every time the interface unit 2032 receives status information and locational information.

According to this configuration, the floor map is updated in real time.

Accordingly, the statuses of the apparatuses in the gaming hall can be grasped sooner.

For example, as soon as the user of the information processing apparatus 2030 becomes aware that a gaming machine 2050 is in error status, the user can swiftly issue an instruction to send a staff to the gaming machine 2050 to quickly take actions to the trouble. For another example, as soon as the user becomes aware of an improper operation to a gaming machine 2050, the user can immediately start recording with a camera that can take the video of the action. This configuration enables swift reaction depending on the status of the apparatus.

The information processing apparatus 2030 further includes an input unit 2034 capable of receiving an input of an intended time in accordance with a user operation, and the controller unit 2031 is configured to retrieve status information and locational information as of the intended time received from the input unit 2034 from the storage device storing the status information and the locational information with time information and re-create the floor map by mapping the status information based on the locational information.

According to this configuration, a floor map showing previous statuses of the apparatuses can be created.

For example, this configuration enables checking the statuses of the apparatuses in the gaming hall as of an intended time. Also, checking the previous statuses of the gaming machines in series leads to grasp of gaming machines 2050 on which improper operations are frequently made. That is to say, future statuses of the apparatuses can be presumed in view of the previous statuses of the apparatuses.

This configuration enables grasp of the statuses of the apparatuses in the gaming hall not only as of this moment but also in the past or in future.

[Mode 6-2]

The monitoring system 2060 in Mode 6-2 includes a plurality of apparatuses installed in a gaming hall and an information processing apparatus 2030 capable of communicating with the plurality of apparatuses. Each of the plurality of apparatuses includes an interface unit 2042 configured to send status information for indicating the status of the apparatus to the information processing apparatus 2030. The information processing apparatus 2030 includes an interface unit 2032 configured to receive status information for indicating the status of the apparatus and locational information for locating the apparatus from each of the plurality of apparatuses and a controller unit 2031 configured to perform image processing to re-create a floor map of the gaming hall in which the apparatuses installed in the gaming hall are mapped to corresponding positions by associating the status information with the positions of the apparatuses, based on the locational information.

[Description of Overall Game System]

Figure 3:
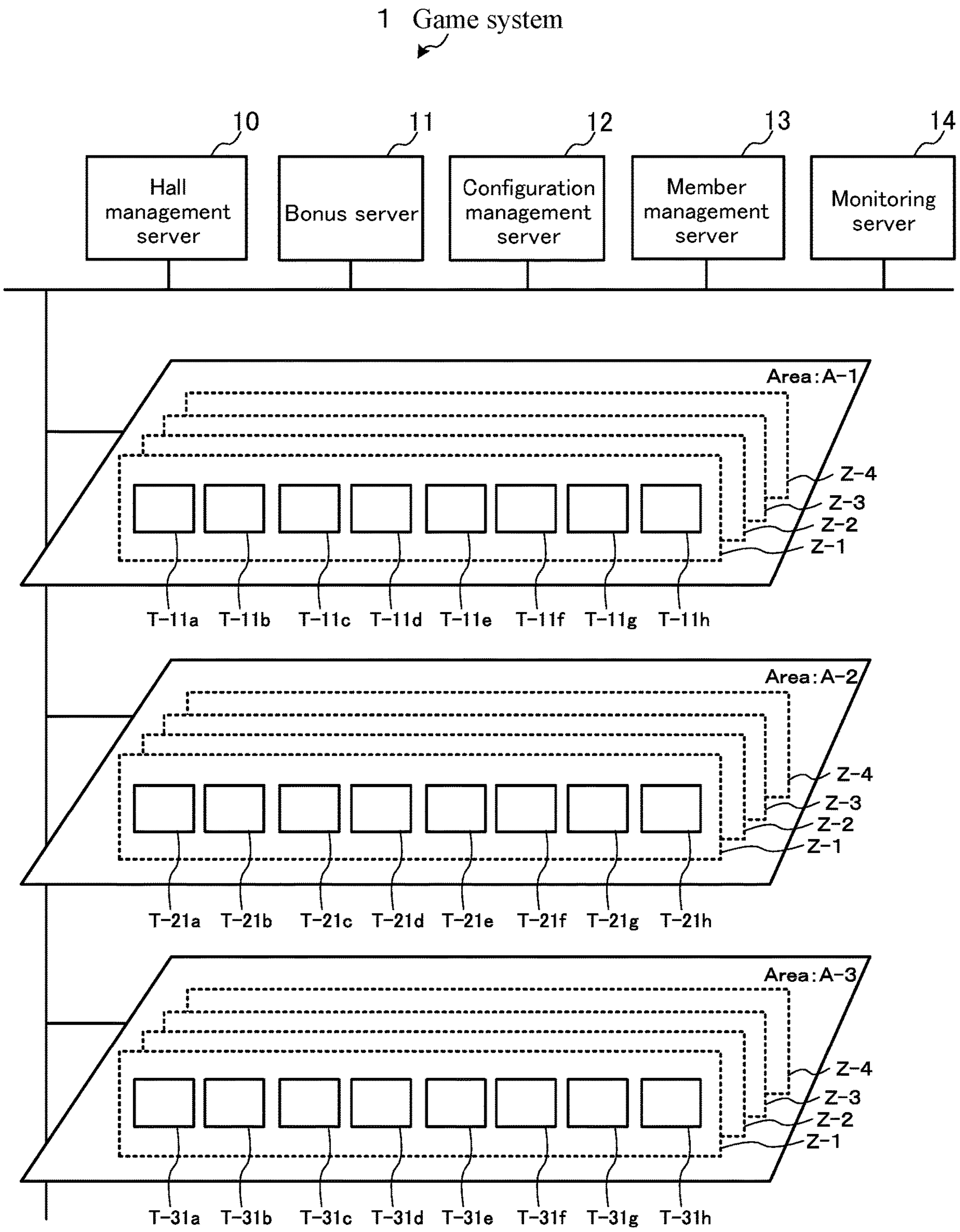
FIG. 3 is a diagram for schematically illustrating a game system in an embodiment of the present invention.

First, the overall game system is described with reference to FIG. 3. FIG. 3 is a schematic diagram for illustrating a general representation of a game system 1 in the first embodiment.

The game system 1 includes a hall management server 10, a bonus server 11, a configuration management server 12, a member management server 13, a monitoring server 14, and a plurality of gaming machines.

The hall management server 10 aggregates and manages the money flow within the hall (gaming hall) and prepares a balance sheet, and in addition, manages the other servers. Furthermore, the hall management server 10 acquires accounting information including the start time, the end time, and the lottery result of a unit game from each gaming machine and accumulates the information.

The bonus server 11 controls bonus lotteries in bonus games and collaborated effects to be produced with the bonus lotteries. The bonus server 11 further manages the accumulation to provide a bonus (for example, credits saved for a progressive bonus).

The configuration management server 12 stores and manages the configuration on the gaming machines to join a bonus lottery and the configuration on the collaborated effects. Although the present embodiment provides description based on bonus games by way of example, other kind of games such as a slot tournament can be employed The member management server 13 is a server for storing and managing information such as personal information on the members, information on membership cards (IC cards), and previous game results of the members. The membership cards (IC cards) can be issued by a membership card issuing terminal. At registration of a member, the entered personal information on the member is stored to the member management server 13 together with an identification code of the membership card. The membership card issuing terminal can be equipped with a camera and take a picture of the face of the player to be provided with an IC card at issuance of the membership card. The captured image is stored to the management server 13 together with the identification code.

The monitoring server 14 is a server for monitoring and recording the conditions of the hall.

More specifically, the monitoring server 14 acquires environmental information such as temperature, humidity, and perimeter images from the apparatuses such as gaming machines installed in the hall as necessary (for example, in real time, periodically, or in response to a user operation), maps the acquired environmental information to a floor map, and displays the floor map.

The monitoring server 14 also acquires captured-image information from surveillance cameras installed in the hall as necessary (for example, in real time, periodically, or in response to a user operation) and shows the acquired captured-image information on the display device. In the following description, the environmental information and captured-image information may be referred to as monitoring information.

The gaming machines are installed in a plurality of areas (for example, areas A-1 to A-3 as shown in FIG. 3). Each of these areas corresponds to one floor of the gaming hall or an area on one floor. Although FIG. 3 shows areas A-1 to A-3, this is merely an example.

The gaming machines are installed in zones (for example, zones Z-1 to Z4 as shown in FIG. 3) provided in the individual areas. Each of these zones corresponds to a specific space in an area. Although FIG. 3 shows four zones (Z-1 to Z-4) in each area, this is merely an example. Furthermore, FIG. 3 shows eight gaming machines in each zone; however, this is merely an example. Various numbers of gaming machines can be installed in a zone.

As illustrated in FIG. 3, eight gaming machines T-11*a* to T-11*h* are installed in the zone Z-1 of the area A-1. Likewise, although not shown in FIG. 3, eight gaming machines T-12*a* to T-12*h* are installed in the zone Z-2 of the area A-1; eight gaming machines T-13*a* to T-13*h* are installed in the zone Z-3 of the area A-1; and eight gaming machines T-14*a* to T-14*h* are installed in the zone Z-4 of the area A-1.

Furthermore, as illustrated in FIG. 3, eight gaming machines T-21*a* to T-21*h* are installed in the zone Z-1 of the area A-2. Likewise, although not shown in FIG. 3, eight gaming machines T-22*a* to T-22*h* are installed in the zone Z-2 of the area A-2; eight gaming machines T-23*a* to T-23*h* are installed in the zone Z-3 of the area A-2; and eight gaming machines T-24*a* to T-24*h* are installed in the zone Z-4 of the area A-2.

Still further, eight gaming machines T-31*a* to T-31*h* are installed in the zone Z-1 of the area A-3. Likewise, although not shown in FIG. 3, eight gaming machines T-32*a* to T-32*h* are installed in the zone Z-2 of the area A-3; eight gaming machines T-33*a* to T-33*h* are installed in the zone Z-3 of the area A-3; and eight gaming machines T-34*a* to T-34*h* are installed in the zone Z-4 of the area A-3.

These gaming machines are connected with the servers such as the hall management server 10, the bonus server 11, and the monitoring server 14 through Ethernet™ LAN connection. FIG. 3 illustrates the connection schematically and details thereof will be described later.

Each gaming machine is assigned a unique identifier; the servers such as the hall management server 10 identify the source of data sent from a gaming machine with the identifier. To send data from a server such as the hall management server 10 to a gaming machine, the server designates the destination with the identifier. This identifier can be a network address such as an IP address; any identifier other than the network address can be employed to manage the individual gaming machines.

The game system 1 can be constructed within a single hall (gaming hall) where various games are conducted, or constructed among a plurality of halls. In the case where the game system 1 is constructed in a single hall, the game system 1 can be constructed on each floor or in each section of the hall. The communication lines connecting the servers and the gaming machines can be either wired or wireless and either dedicated or switched.

[Overview of Gaming Machine]

Figure 4:
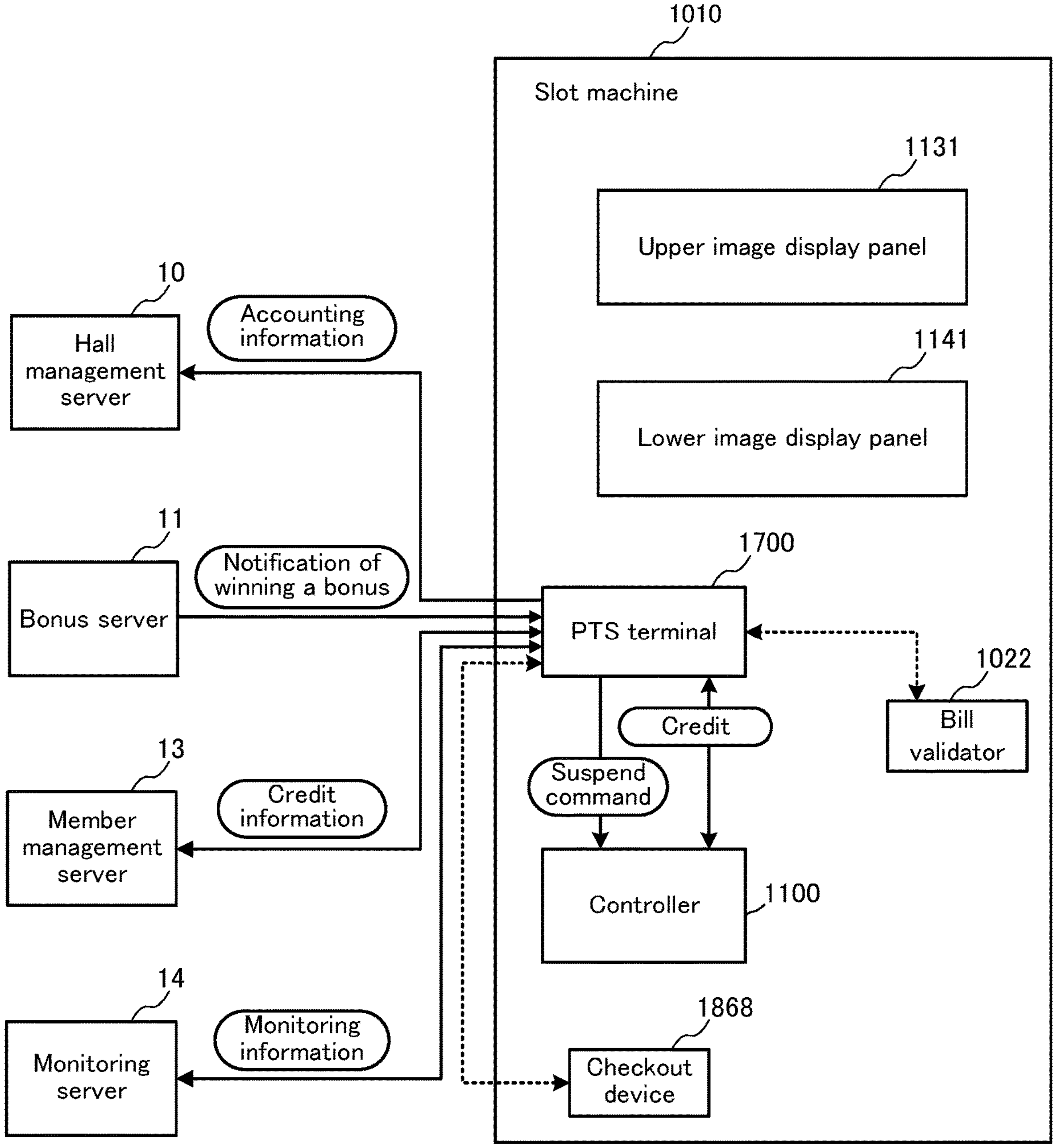
FIG. 4 is a diagram for schematically illustrating a slot machine in an embodiment of the present invention.

An overview of a gaming machine in the present embodiment is described with reference to FIG. 4. FIG. 4 conceptually illustrates a configuration of a slot machine 1010, which is a gaming machine integrated with a player tracking device. The player tracking device is a terminal for implementing a player tracking system; hereinafter, this device is referred to as PTS terminal. The following description is provided about the case where slot machines are used as gaming machines; however, the present invention is applicable to various gaming machines offering different games, not only slot machines.

As illustrated in FIG. 4, a slot machine 1010 includes a PTS terminal 1700 and further, a checkout device 1868. The slot machine 1010 is connected with the servers such as the hall management server 10, the bonus server 11 and the monitoring server 14 through the PTS terminal 1700 and the network. In the present embodiment, each slot machine 1010 has one PTS terminal 1700 in the cabinet of the slot machine.

The PTS terminal 1700 is connected with a bill validator 1022 through a communication line (or the slot machine 1010).

The PTS terminal 1700 sends and receives data with the controller (the controller 1100 of the slot machine 1010 to be described later) and further, performs data communication with the servers such as the hall management server 10, the bonus server 11, and the monitoring server 14 via the network. For example, the PTS terminal 1700 sends information on the credits required to start a game or a suspend command to interrupt a unit game for collaborated effects to the controller 1100; the controller 1100 sends information on the credits as a game result, a notification of start of a unit game, and a notification of end of a unit game to the PTS terminal 1700.

The PTS terminal 1700 sends information such as accounting information including a notification of start or end of a unit game and a lottery result of a unit game to the hall management server 10; the bonus server 11 sends a notification of winning a bonus to the PTS terminal 1700 (of a relevant slot machine 1010). The PTS terminal 1700 exchanges information such as information on the credits of the member with the member management server 13.

The PTS terminal 1700 sends monitoring information such as information on the temperature of the CPU 1751 measured by the temperature sensor 1770 and captured-image information taken by the human detection camera 1713 to the monitoring server 14.

Now, the outline of a game-play process for a member player is described. First, the player makes registration to become a member with a membership card issuing terminal. In return, the player is provided with a membership card (IC card). The player inserts the membership card into the PTS terminal 1700 of a slot machine 1010 and then inserts cash. Upon insertion of a bill, the bill validator 1022 identifies the kind and the amount of the bill and sends data on the kind and the amount of the bill to the PTS terminal 1700 as an identification result. The PTS terminal 1700 calculates the number of credits for the games from the data on the kind and the amount of the bill and informs the controller 1100 of the number of credits.

The controller 1100 conducts a game based on the number of credits sent from the PTS terminal 1700. The controller 1100 informs the PTS terminal 1700 of the number of credits in accordance with a result of the game. The PTS terminal 1700 calculates a payout based on the game result to determine the amount to be paid out to the player. The PTS terminal 1700 writes this determined amount to the membership card and ejects the membership card. The membership card is also charged with points specified depending on the service such as the number of played games.

When the member player plays games on the next occasion, the PTS terminal 1700 reads the inserted membership card to retrieve the amount of money stored in the membership card. The PTS terminal 1700 converts the retrieved amount of money into credits and informs the controller 1100 of the number of credits. Again, the controller 1100 informs the PTS terminal 1700 of the number of credits in accordance with a game result and the PTS terminal 1700 calculates a payout based on the game result to determine the amount to be paid out to the player. The PTS terminal 1700 updates the amount in the membership card by adding the amount determined as the result of the game to the original amount.

Concurrently, the PTS terminal 1700 sends the identification code (or the member ID) retrieved from the membership card and the updated amount to the member management server 13. The member management server 13 updates the account information of the member identified by the identification code with the amount received from the PTS terminal 1700. Through this operation, the amount held by the member can be managed consistently.

The member player can check out at the casher counter as necessary based on the amount stored in the membership card. If the slot machine 1010 is equipped with a checkout device 1868 as described above, the player can check out with the membership card at the slot machine 1010.

In contrast, the outline of a game-play process for a non-member player is as follows. The player inserts cash into the bill validator 1022 of a slot machine 1010. Upon insertion of a bill, the bill validator 1022 identifies the kind and the amount of the bill and sends data on the kind and the amount of the bill to the PTS terminal 1700. The PTS terminal 1700 calculates the number of credits for the games from the data on the kind and the amount of the bill and informs the controller 1100 of the number of credits.

The controller 1100 conducts a game based on the number of credits sent from the PTS terminal 1700. The controller 1100 informs the PTS terminal 1700 of the number of credits in accordance with a game result. The PTS terminal 1700 calculates a payout based on the game result to determine the amount to be paid out to the player. The PTS terminal 1700 writes this determined amount to a new IC card stocked in the slot machine 1010 and ejects the IC card. The non-member player gets an IC card first time.

The non-member player can check out at the casher counter as necessary based on the amount stored in the IC card. If the slot machine 1010 is equipped with a checkout device 1868 as described above, the player can check out with the IC card at the slot machine 1010.

[Explanation of Function Flow Diagram]

Figure 5:
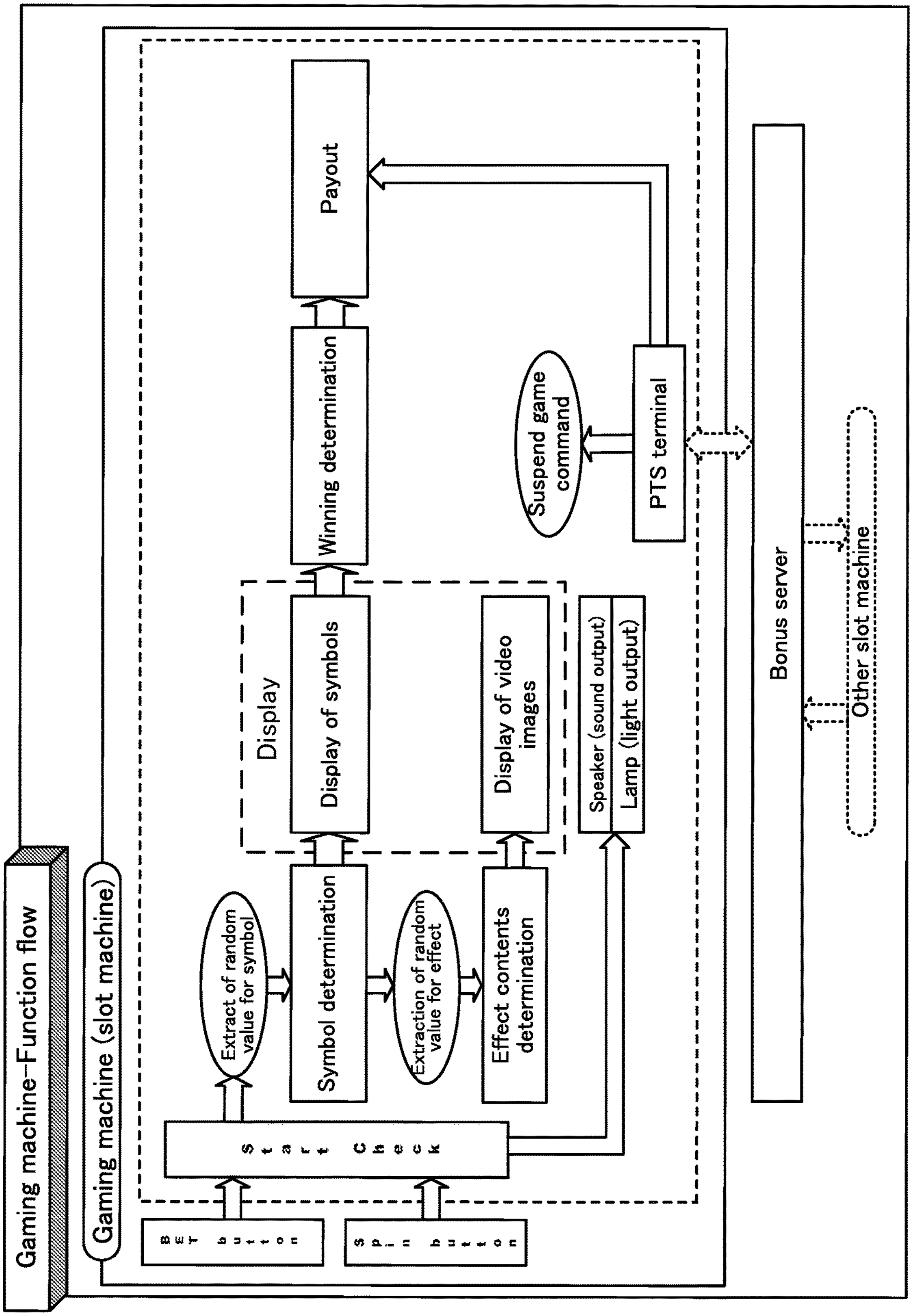
FIG. 5 is a diagram for illustrating basic functions of a slot machine in an embodiment of the present invention.

With reference to FIG. 5, basic functions of a slot machine according to an embodiment of the present invention are described. As illustrated in FIG. 5, the slot machine 1010 is connected with an external control apparatus (e.g., the bonus server 11) to be able to communicate data; the external control apparatus is connected with the other slot machines 1010 installed in the hall to be able to communicate data.

<Start Check>

First, the slot machine 1010 checks whether or not a BET button has been pressed by a player, and subsequently checks whether or not a spin button has been pressed by the player.

<Symbol Determination>

Next, when the spin button has been pressed by the player, the slot machine 1010 extracts random values for symbol determination, and determines symbols to be displayed at the time of stopping scrolling of symbol arrays for the player, for a plurality of respective video reels displayed to a display.

<Symbol Display>

Next, the slot machine 1010 starts scrolling of the symbol array of each of the video reels and then stops scrolling so that the determined symbols are displayed for the player.

<Winning Determination>

When scrolling of the symbol array of each video reel has been stopped, the slot machine 1010 determines whether or not a combination of symbols displayed for the player is a combination related to winning.

<Payout>

When the combination of symbols displayed for the player is a combination related to winning, the slot machine 1010 offers benefits according to the combination to the player. For example, when a combination of symbols related to a payout has been displayed, the slot machine 1010 pays out credits corresponding to the combination of symbols to the player.

When a unit game has started in the slot machine 1010 in response to press of the spin button by the player and when the unit game has finished in the slot machine 1010, the bonus server 11 conducts a bonus game lottery. If some slot machine 1010 wins this bonus game lottery, the participant slot machines 1010 suspend the unit game being processed and their PTS terminals 1700 produce collaborated effects. A unit game is a series of operations from the start of acceptance of betting until determination of a win or a loss.

The slot machine 1010 that has won a bonus game is provided with a payout from the bonus server 11 via the PTS terminal 1700. The bonus server 11 accumulates a part of the credits spent on each slot machine 1010 by each player for a progressive bonus and when a slot machine 1010 wins a bonus game, the bonus server 11 pays out a part of the progressive bonus to the slot machine 1010.

<Determination of Effects>

The slot machine 1010 produces effects by displaying images to the display, outputting light from lamps, and outputting sounds from speakers. The slot machine 1010 extracts a random value for effect and determines contents of the effects based on the symbols and the like determined by lottery.

Furthermore, the display device, the lighting unit, and the speaker of the PTS terminal 1700 produce collaborated effects among a plurality of slot machines 1010 when a bonus game lottery is conducted.

[Overall Configuration of Slot Machine]

Figure 6:
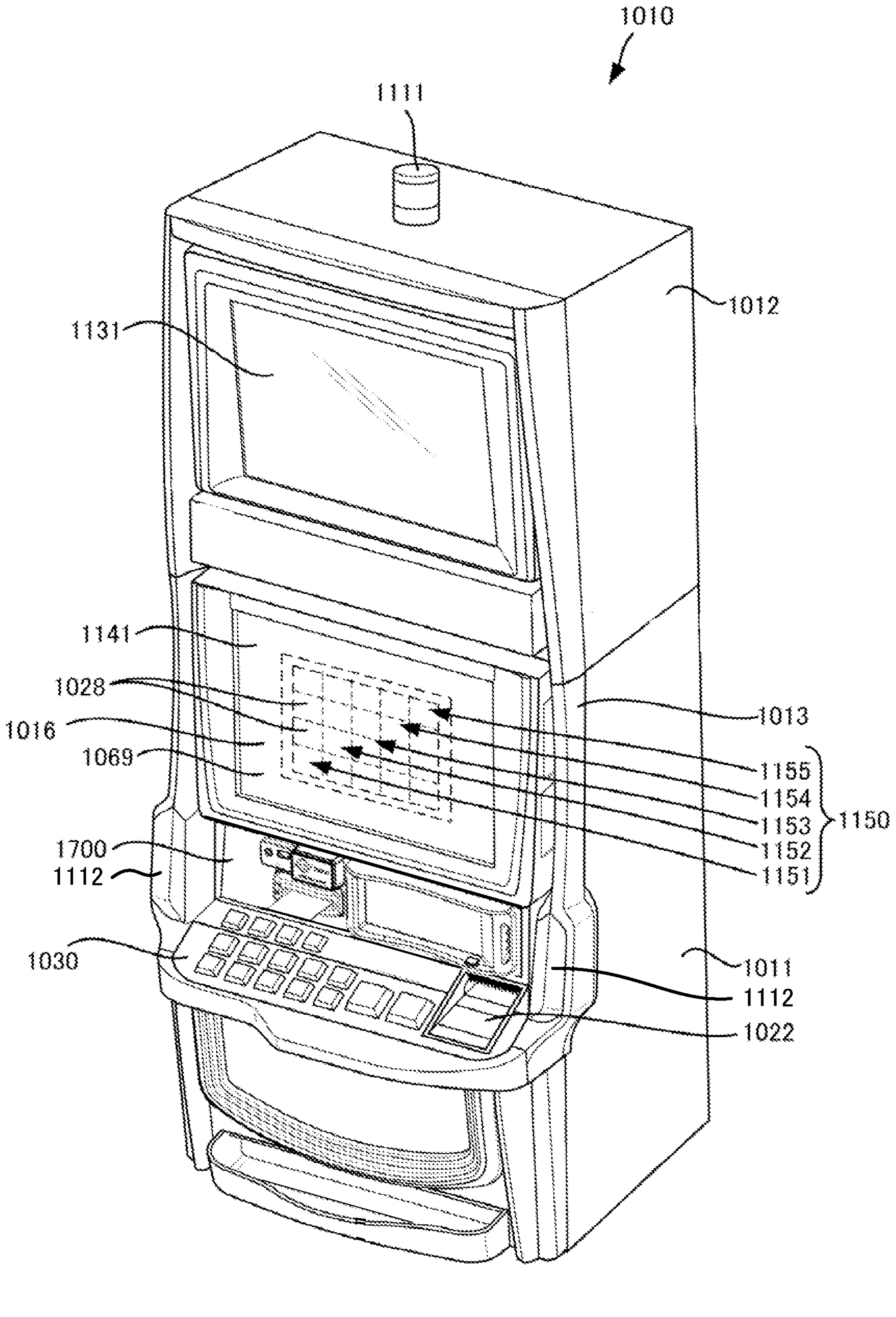
FIG. 6 is a diagram for illustrating an overall structure of a slot machine in an embodiment of the present invention.

Next, with reference to FIG. 6, an overall configuration of the slot machine 1010 is described.

The slot machine 1010 employs a membership card (IC card), a bill, or electrically valuable information corresponding to these as a game medium. Particularly, the slot machine

1010 in the present embodiment uses credit-related data such as monetary data stored in the IC card 1500.

The slot machine 1010 includes a cabinet 1011, a top box 1012 installed on the upper side of the cabinet 1011, and a main door 1013 provided at the front face of the cabinet 1011.

The main door 1013 is provided with a symbol display device 1016 called a lower image display panel 1141 thereon. The symbol display device 1016 includes a clear liquid crystal panel. The screen displayed by the symbol display device 1016 includes a display window 1150 at the center thereof. The display window 1150 is composed of five columns by four rows, twenty in total, of display blocks 1028. The four display blocks on the individual columns form pseudo reels 1151 to 1155, which are configured to spin in response to the player's operation. On each of the pseudo reels 1151 to 1155, four display blocks 1028 are displayed as if they are moving downward while changing the speed, which enables the symbols shown in the display blocks 1028 to be rearranged by being spun in the longitudinal direction and then stopped.

Rearranging means an action of arranging symbols after releasing an arrangement of symbols. Arrangement means a state in which symbols can be visibly identified by the player. The slot machine 1010 executes so-called slot games that provide a payout for a specific winning combination depending on the arrangement of symbols when the spinning pseudo reels 1151 to 1155 are stopped.

The present embodiment describes a case where the slot machine 1010 is a so-called video slot machine; however, the slot machine 1010 may employ so-called mechanical reels for a part or all of the pseudo reels 1151 to 1155.

The symbol display device 1016 includes a touch panel 1069 on the front thereof; the player can input instructions by operating the touch panel 1069. The touch panel 1069 sends an input signal to the main CPU 1071.

The top box 1012 is provided with an upper image display panel 1131 on the front of the top box 1012. The upper image display panel 1131 includes a liquid crystal panel, and forms the display. The upper image display panel 1131 displays images related to effects and images showing introduction of the game contents and explanation of the game rules. Further, the top box 1012 is provided with a speaker 1112 and a lamp 1111. The slot machine 1010 produces effects on a unit game by displaying images, outputting sounds, and outputting light.

The lower image display panel 1141 displays a credit indicator (not shown) above the display window 1150 to show the number of credits as of the moment. The "credit" is a virtual game medium for the player to use in betting. The credit indicator shows the total number of credits owned by the player as of the moment.

The lower image display panel 1141 further displays a fractional cash amount indicator (not shown) below the credit indicator. The fractional cash amount indicator shows the amount of fractional cash. The "fractional cash" means the cash not exchanged to credits because the amount is not enough.

In response to insertion of an IC card 1500 into the later-described PTS terminal 1700, the credit indicator displays the number of credits stored in the IC card and the fractional cash amount indicator displays the fractional amount of cash stored in the IC card. These numerical values are stored in the member management server 13 together with the identification code of the membership card.

The IC card is a contactless IC card including an IC (Integrated Circuit) for recording a variety of data such as the number of credits and computing; the IC card is capable of close-range wireless communication using RFID (Radio Frequency Identification) technology, such as NFC (Near Field Communication). The player can hold credit-related data with the IC card 1500 and further, freely transport this data from a slot machine to another. The player can play games such as unit games on a slot machine 1010 using the credit-related data (the amount data) stored in the IC card 1500 by inserting the IC card 1500 to the PTS terminal 1700 of the slot machine 1010.

The player can also store the amount of coins or bills to the IC card 1500 as cash data by using an apparatus installed in the hall.

The slot machine 1010 further includes a PTS terminal 1700 embedded in the cabinet 1011 below the lower image display panel 1141, speakers 1112 on the left and right of the PTS terminal 1700, and a lamp 1111 on the top of the top box 1012. The slot machine 1010 produces effects on unit games by displaying images to the upper image display panel 1131, outputting sounds from the speakers 1112, and outputting light from the lamp 1111.

[Configuration of PTS Terminal]

Figure 7:
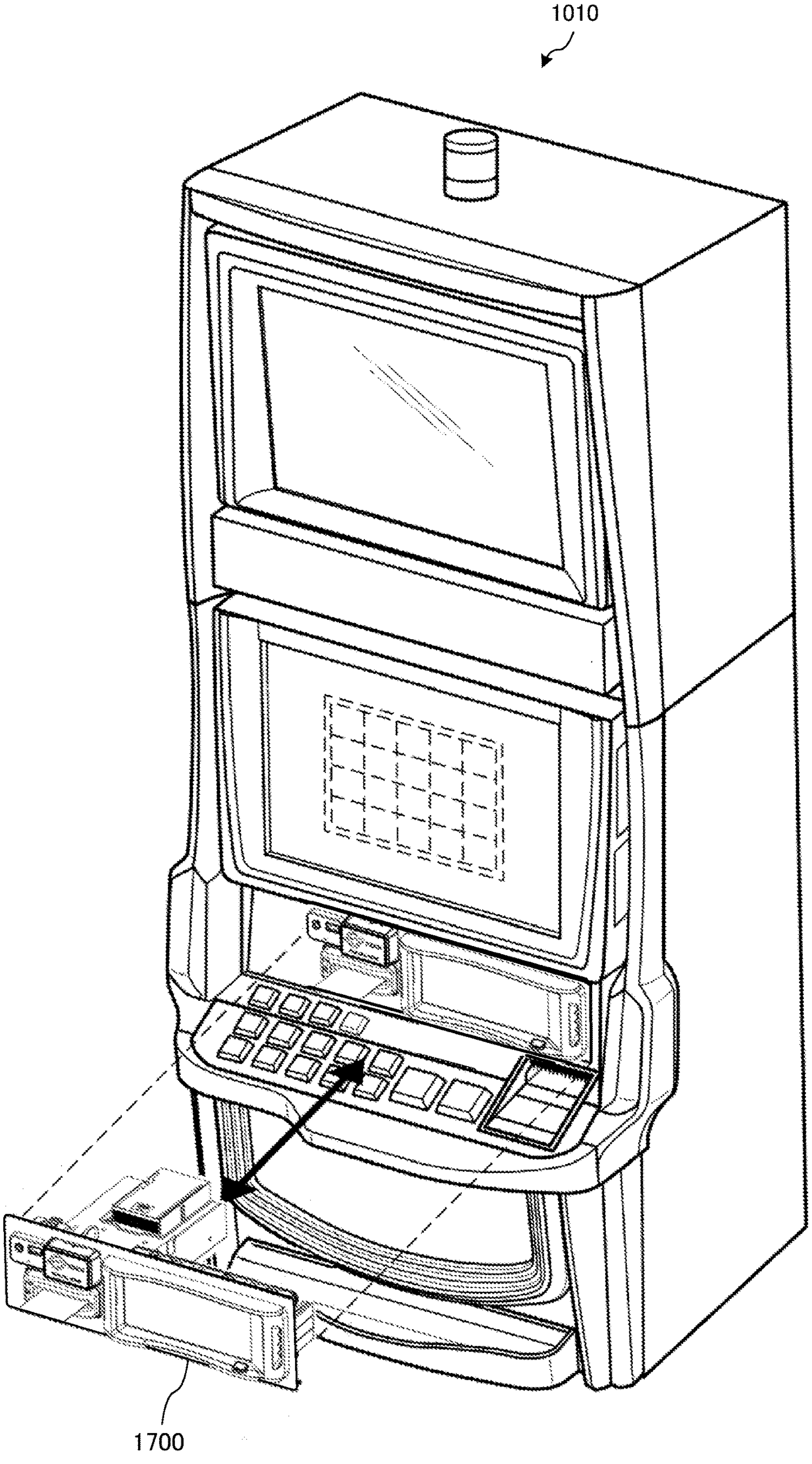
FIG. 7 is a diagram for illustrating a PTS terminal embedded in a slot machine in an embodiment of the present invention.

FIG. 7 is a diagram for illustrating a PTS terminal embedded in the slot machine 1010. The PTS terminal 1700 uses a standardized data interface to communicate data with the gaming machine; accordingly, it can be mounted to various types of gaming machines of various manufacturers.

Figure 8:
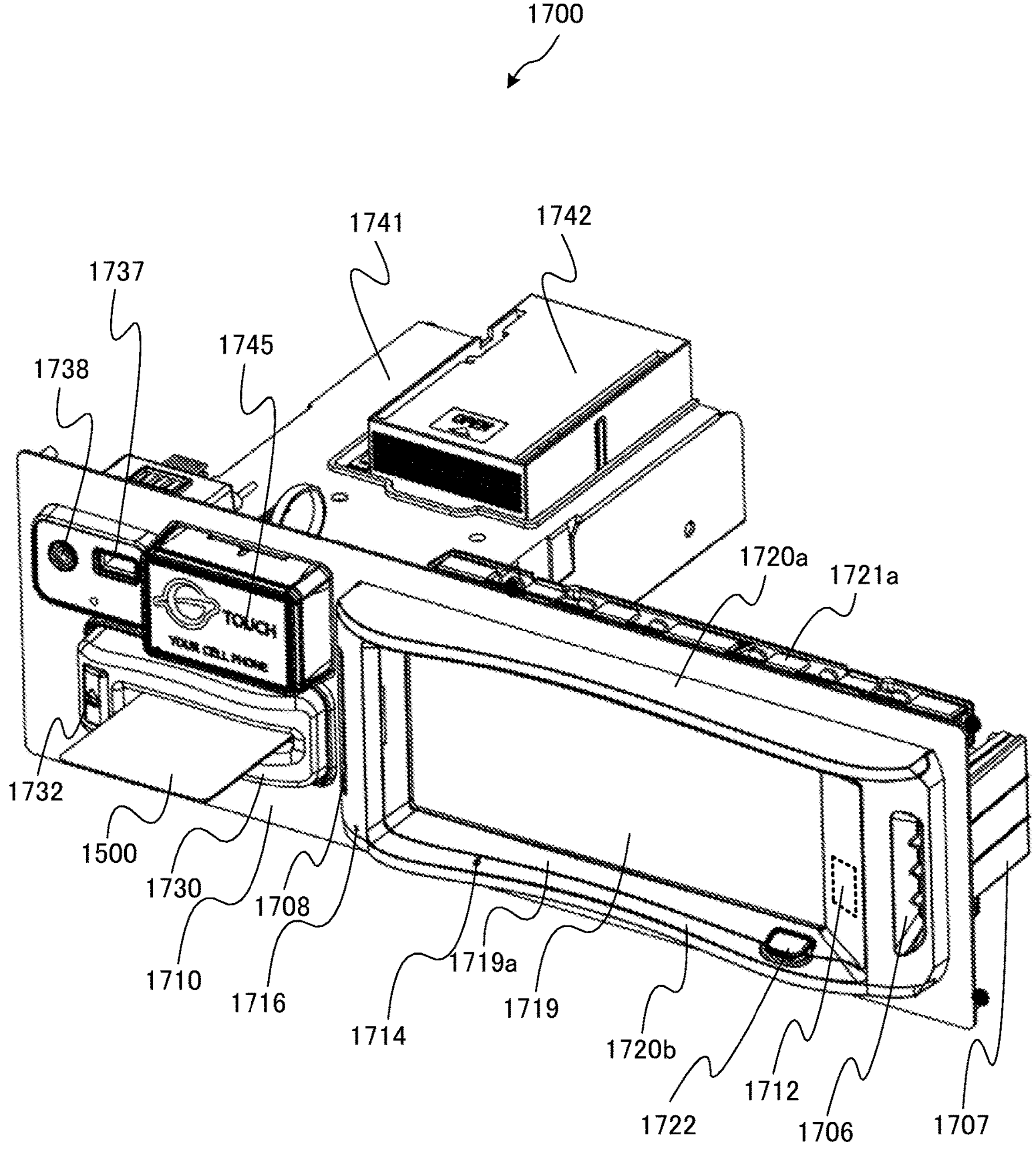
FIG. 8 is a diagram for illustrating an enlarged PTS terminal in an embodiment of the present invention.

FIG. 8 is an enlarged view of the PTS terminal 1700 shown in FIG. 7. As illustrated in FIG. 8, the PTS terminal 1700 has a panel 1710. The components disposed on the front of the panel 1710 can be seen by the player; the components disposed behind the panel 1710 are placed inside the slot machine 1010 and cannot be seen by the player.

On the right of the front face of the panel 1710, an LCD 1719 having a touch panel function is provided. The LCD 1719 displays information on a member or information for members, for example, and the screen size thereof is 6.2 inches (approximately 15.7 cm). Around the LCD 1719, an LCD cover **1719*a* is provided. Although the LCD 1719** in this example has a touch panel function, a different input device such as a keyboard or a mouse can be provided to receive the player's instructions.

Above the LCD 1719 and the LCD cover **1719*a*, a lighting plate 1720*a* is provided and connected with LEDs to shine. The lighting plate 1720*a* may be made of polycarbonate, and connected to a plurality of (seven, for example) full-color LEDs 1721*a* provided behind the panel 1710 to shine with the lighting of the full-color LEDs 1721*a***.

Likewise, below the LCD 1719 and the LCD cover **1719*a*, a lighting plate 1720*b* is provided and connected with LEDs to shine. The lighting plate 1720*b* may be made of polycarbonate, and connected to a plurality of (seven, for example) full-color LEDs 1721*b* (not shown) provided behind the panel 1710 to shine with the lighting of the full-color LEDs 1721*b***.

On the right side of the LCD 1719, an image-capturing window 1712 is provided. A human detection camera 1713 (not shown) provided inside the LCD cover **1719*a* or behind the panel 1710 takes a picture of the player through this image-capturing window 1712. The image-capturing window 1712** may be covered by a half mirror or other shield with a smoke coating applied, for example.

On the lower right of the LCD cover **1719*a*, a home button 1722 is provided. The home button 1722 is to change the screen displayed on the LCD 1719** to a predetermined home screen.

On the right of the LCD cover 1719*a*, a speaker duct 1706 is provided and a bass reflex speaker 1707 is provided at the corresponding place behind the panel 1710. Likewise, a speaker duct 1708 is provided on the left of the LCD cover 1719*a* and a bass reflex speaker 1709 (not shown) is provided at the corresponding place behind the panel 1710. These speakers are dedicated for the PTS terminal 1700 and they are provided separately from the speakers of the slot machine 1010 for slot machine games. These speakers are used for producing collaborated effects, making voice calls, and outputting an alarm sound not to leave an IC card 1500. Since the aforementioned speaker ducts 1706 and 1708 are structured so that the player in front of the PTS terminal 1700 can hear the sound from the speakers in stereo, the speakers can be placed behind the panel 1710 to achieve space-saving in the PTS terminal 1700 (particularly, in the panel thereof).

On the lower left of the LCD cover 1719*a*, openings 1714 and 1716 for microphones are provided; microphones 1715 and 1717 (not shown) are provided at the corresponding places inside the LCD cover 1719*a*.

On the lower left of the front face of the panel 1710, an IC card slot 1730 is provided to insert or take out an IC card 1500. Beside the IC card slot 1730, a full-color LED 1731 (not shown) is provided; the LED 1731 lights in different colors to indicate the number of IC cards 1500 remaining in the later-described card stacker 1742. The IC card slot 1730 is provided with an eject button 1732; a red LED 1733 (not shown) provided near the eject button 1732 lights to notify the player of the place of the eject button 1732 or the operation to take out an IC card.

At the corresponding place to the IC card slot 1730 behind the panel 1710, a card unit 1741 and a card stacker 1742 are provided; the IC card slot 1730 is structured as a part of the card unit 1741. The card stacker 1742 can store approximately thirty IC cards 1500; when a player who has newly played unit games checks out, the card unit 1741 takes an IC card 1500 stored in the card stacker 1742 and ejects the IC card 1500 through the IC card slot 1730.

As to an IC card 1500 inserted into the IC card slot 1730 and stored in the card unit 1741, the card unit 1741 updates the credit information using the NFC and ejects the IC card 1500 through the IC card slot 1730 at a checkout. The IC card 1500 is kept inside the card unit 1741 all the time while the player is playing unit games.

The PTS terminal 1700 can be configured to collect an IC card 1500 to the card stacker 1742 in the case where the IC card 1500 is left but the human detection camera detects no player at a checkout. This configuration prevents the IC card 1500 from being held in the card unit 1741 for a long time even if a player knowing that the remaining credits are few has left the slot machine 1010 without taking the IC card 1500 or a player has merely forgotten to take the IC card 1500 and left the slot machine 1010.

On the upper left of the front face of the panel 1710, a USB terminal 1737 and an audio terminal 1738 are provided. The USB terminal 1737 allows connection of a USB device for electric charging. The audio terminal 1738 may be a four-pole terminal; a headset may be connected to the terminal to enable the player to talk with another person over the headphone and the microphone. Alternatively, the audio terminal 1738 may be a two-pole or three-pole terminal to enable the player to hear sound with the headphone.

On the front face of the panel 1710, a touch unit 1745 is provided on the left side of the LED 1719. The touch unit 1745 includes an RFID module for functioning as a writer for writing data to an IC device including an IC chip (for example, a contactless IC card, or a cell phone or a smartphone having an NFC communication function) through data communication. The RFID module also functions as a reader for reading data from the IC device through data communication. On the four corners of the front face of the touch unit 1745, LEDs 1746 (not shown) are provided. In addition to or instead of the touch unit 1745, an information recording medium reader for reading information stored in an information recording medium such as a magnetic card can be provided. In this case, the membership card can be a magnetic card, instead of the IC card 1500.

As described above, the PTS terminal 1700 in an embodiment of the present invention is a unit in which devices having various functions such as a microphone function, a camera function, a speaker function, and a display function are integrated, so that space-saving is achieved. This single-unit structure eliminates inconvenience in arranging separate devices each having one function, such that if the LCD is placed to face the player, the speakers cannot be placed to face the player.

[Advantages of Including Both of Card Unit and Touch Unit]

The PTS terminal 1700 in an embodiment of the present invention is configured so that, in response to insertion of an IC card 1500 into the IC card slot 1730, the card unit 1741 reads the information in the IC card 1500 and holds the entirety of the inserted IC card 1500 within the PTS terminal 1700. In addition to the card unit, the PTS terminal 1700 includes a touch unit 1745 to enable data communication with another IC card, a cell phone, or a smartphone.

Such configuration of the PTS terminal 1700 in the present invention provides the following advantages. For example, in a case where a gaming machine needs some maintenance when a member player is playing games with the gaming machine (the membership card is held in the card unit 1741), a hall staff touches the touch unit 1745 with an IC card for maintenance to display a maintenance screen on the LCD 1719 of the PTS terminal 1700 and send information and records on the maintenance to a server to be stored.

In another case where a plurality of gaming machines need maintenance concurrently or in series, the hall staff successively touches the touch units 1745 with a maintenance card to expedite operations such as displaying maintenance screens and registering the specifics of the maintenance.

In contrast, if the PTS terminal 1700 is configured to be able to access an IC card only from the touch unit 1745, when a player uses the gaming machine after a previous player who had played games by touching the touch unit 1745 with an IC card 1500 has left the gaming machine, the gaming machine cannot recognize that the player has changed. To eliminate such impropriety, a card unit 1741 configured to hold an IC card 1500 during the games is required. For example, if a player uses cash (without using an IC card) to play games on the gaming machine after a previous player has left the gaming machine who had played games with an IC card 1500, the credit-related data will be stored in the previous player's IC card 1500 when the second player checks out.

[Configuration of Circuit Included in Gaming Machine]

Figure 9:
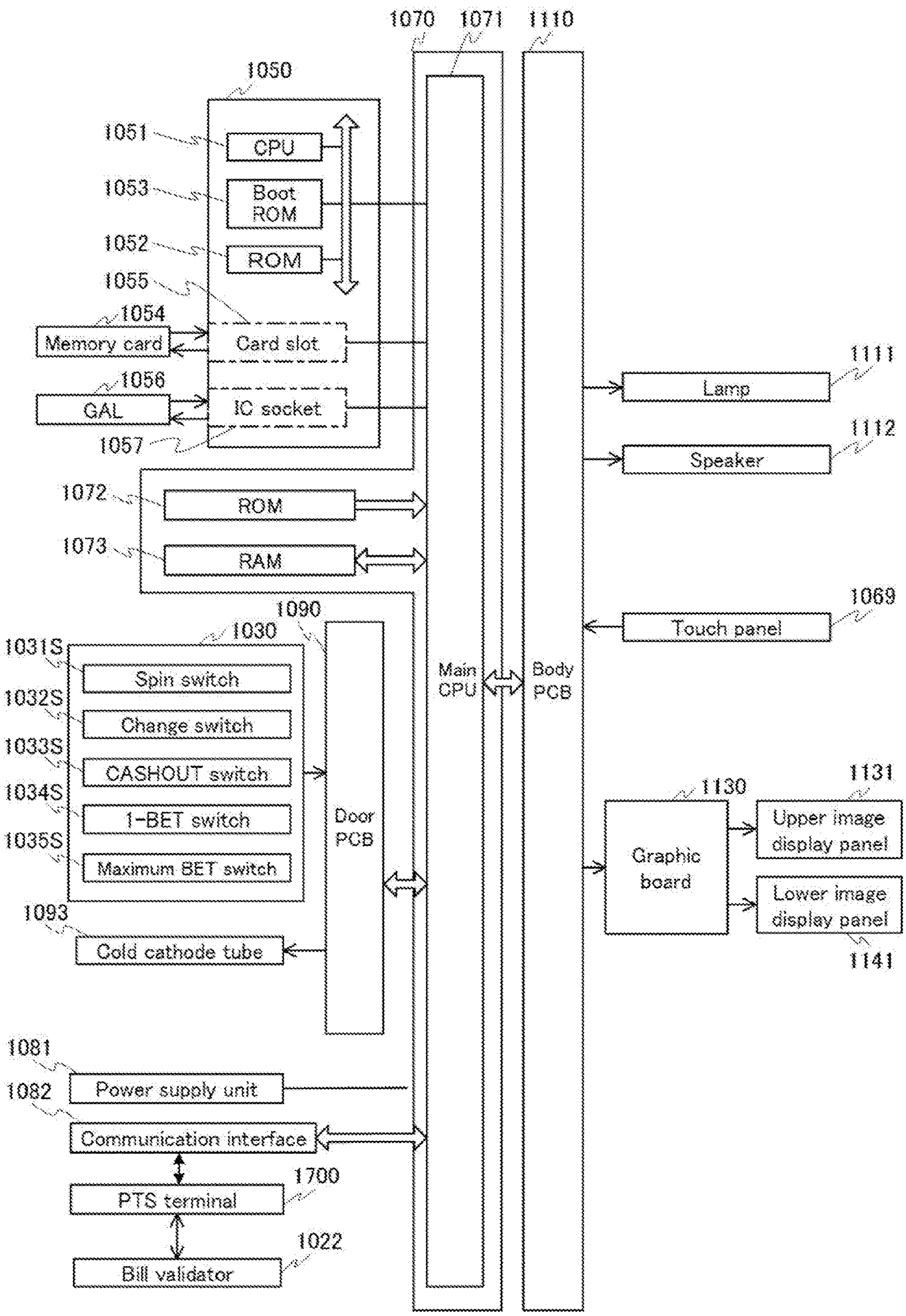
FIG. 9 is a diagram for illustrating circuitry of a slot machine in an embodiment of the present invention.

Next, with reference to FIG. 9, a configuration of a circuit included in the slot machine 1010 is described.

A gaming board 1050 is provided with: a CPU 1051, a ROM 1052, and a boot ROM 1053, which are mutually connected by an internal bus; a card slot 1055 corresponding to a memory card 1054; and an IC socket 1057 corresponding to a GAL (Generic Array Logic) 1056.

The memory card 1054 includes a non-volatile memory, and stores a game program and a game system program. The game program includes a program related to game progression and a program for producing effects by images and sounds. Further, the aforementioned game program includes a symbol determination program. The symbol determination program is a program for determining symbols to be rearranged in the display blocks 1028.

Further, the card slot 1055 is configured so that the memory card 1054 can be inserted thereinto and removed therefrom, and is connected to a motherboard 1070 by an IDE bus. Accordingly, the kind and the content of the games to be conducted in the slot machine 1010 can be changed by removing the memory card 1054 from the card slot 1055, writing another game program to the memory card 1054, and inserting the memory card 1054 to the card slot 1055.

The GAL 1056 is a type of PLD (Programmable Logic Device) having a fixed OR array structure. The GAL 1056 is provided with a plurality of input ports and output ports, and predetermined input into the input port causes output of the corresponding data from the output port.

Further, the IC socket 1057 is configured so that the GAL 1056 can be inserted thereinto and removed therefrom, and is connected to the motherboard 1070 by a PCI bus. The contents of the game to be played on the slot machine 1010 can be changed by replacing the memory card 1054 with another memory card 1054 having another program written therein or by rewriting the program written into the memory card 1054 as another program.

The CPU 1051, the ROM 1052, and the boot ROM 1053 mutually connected by the internal bus are connected to the motherboard 1070 by a PCI bus. The PCI bus enables a signal transmission between the motherboard 1070 and the gaming board 1050, and power supply from the motherboard 1070 to the gaming board 1050.

The ROM 1052 stores an authentication program. The boot ROM 1053 stores a pre-authentication program, a program (boot code) to be used by the CPU 1051 for activating the pre-authentication program, and the like.

The authentication program is a program (tamper check program) for authenticating the game program and the game system program. The pre-authentication program is a program for authenticating the aforementioned authentication program. The authentication program and the pre-authentication program are written along a procedure (authentication procedure) for proving that the program to be the subject has not been tampered.

The motherboard 1070 is a commercially available general-use mother board (a printed-wiring board with basic components for a personal computer) and includes a main CPU 1071, a ROM (Read Only Memory) 1072, a RAM (Random Access Memory) 1073, and a communication interface 1082. The mother board 1070 corresponds to a controller 1100 in the present embodiment.

The ROM 1072 includes a memory device such as a flash memory, and stores a program such as BIOS to be executed by the main CPU 1071, and permanent data. When the BIOS is executed by the main CPU 1071, processing for initializing predetermined peripheral devices is conducted; further, through the gaming board 1050, processing of loading the game program and the game system program stored in the memory card 1054 is started. In the present invention, the ROM 1072 may be rewritable or non-rewritable.

The RAM 1073 stores data and programs including the symbol determination program which are used in operation of the main CPU 1071. For example, when the processing of loading the aforementioned game program, game system program or authentication program is conducted, the RAM 1073 can store the program. The RAM 1073 is provided with working areas used for operations in execution of these programs. Examples of the areas include: an area that stores counters for managing the number of games, the number of BETs, the number of payouts, the number of credits and the like; and an area that stores symbols (code numbers) determined by lottery.

The communication interface 1082 is to control data transfer with the PTS terminal 1700. Further, the motherboard 1070 is connected with a later-described door PCB (Printed Circuit Board) 1090 and a body PCB 1110 by respective USBs. The motherboard 1070 is also connected with a power supply unit 1081.

When the power is supplied from the power supply unit 1081 to the motherboard 1070, the main CPU 1071 of the motherboard 1070 is activated, and then the power is supplied to the gaming board 1050 through the PCI bus so as to activate the CPU 1051.

The door PCB 1090 and the body PCB 1110 are connected with input devices such as a switch and a sensor, and peripheral devices the operations of which are controlled by the main CPU 1071.

The door PCB 1090 is connected with a control panel 1030 and a cold cathode tube 1093.

The control panel 1030 is provided with a spin switch 1031S, a change switch 1032S, a CASHOUT switch 1033S, a 1-BET switch 1034S, and a maximum BET switch 1035S which correspond to the aforementioned respective buttons. Each of the switches outputs a signal to the main CPU 1071 upon detection of press of the button corresponding thereto by the player.

The cold cathode tube 1093 functions as a backlight installed on the rear face sides of the upper image display panel 1131 and the lower image display panel 1141, and lights up based on a control signal outputted from the main CPU 1071.

The body PCB 1110 is connected with the lamp 1111, the speakers 1112, a touch panel 1069, and a graphic board 1130. In this example, the bill validator 1022 is connected with the PTS terminal 1700; however, the bill validator 1022 may be connected with the slot machine 1010.

The lamp 1111 lights up based on a control signal outputted from the main CPU 1071. The speakers 1112 output sounds such as BGM, based on a control signal outputted from the main CPU 1071.

The touch panel 1069 detects a place on the lower image display panel 1141 touched by the player's finger or the like, and outputs to the main CPU 1071 a signal corresponding to the detected place.

The bill validator is to determine whether a bill is acceptable and accept a genuine bill into the cabinet 1011. The bill inserted in the cabinet 1011 is exchanged into credits, which are added to the credits owned by the player.

The graphic board 1130 controls display of images conducted by the respective upper image display panel 1131 and lower image display panel 1141, based on a control signal outputted from the main CPU 1071. The graphic board 1130 is provided with a VDP (Video Display Processor) generating image data, a video RAM temporarily storing the image data generated by the VDP, and the like. It is to be noted that the image data used in generation of image data by the VDP is included in the game program that has been read from the memory card 1054 and stored into the RAM 1073.

[Configuration of Circuit Included in PTS Terminal]

Figure 10:
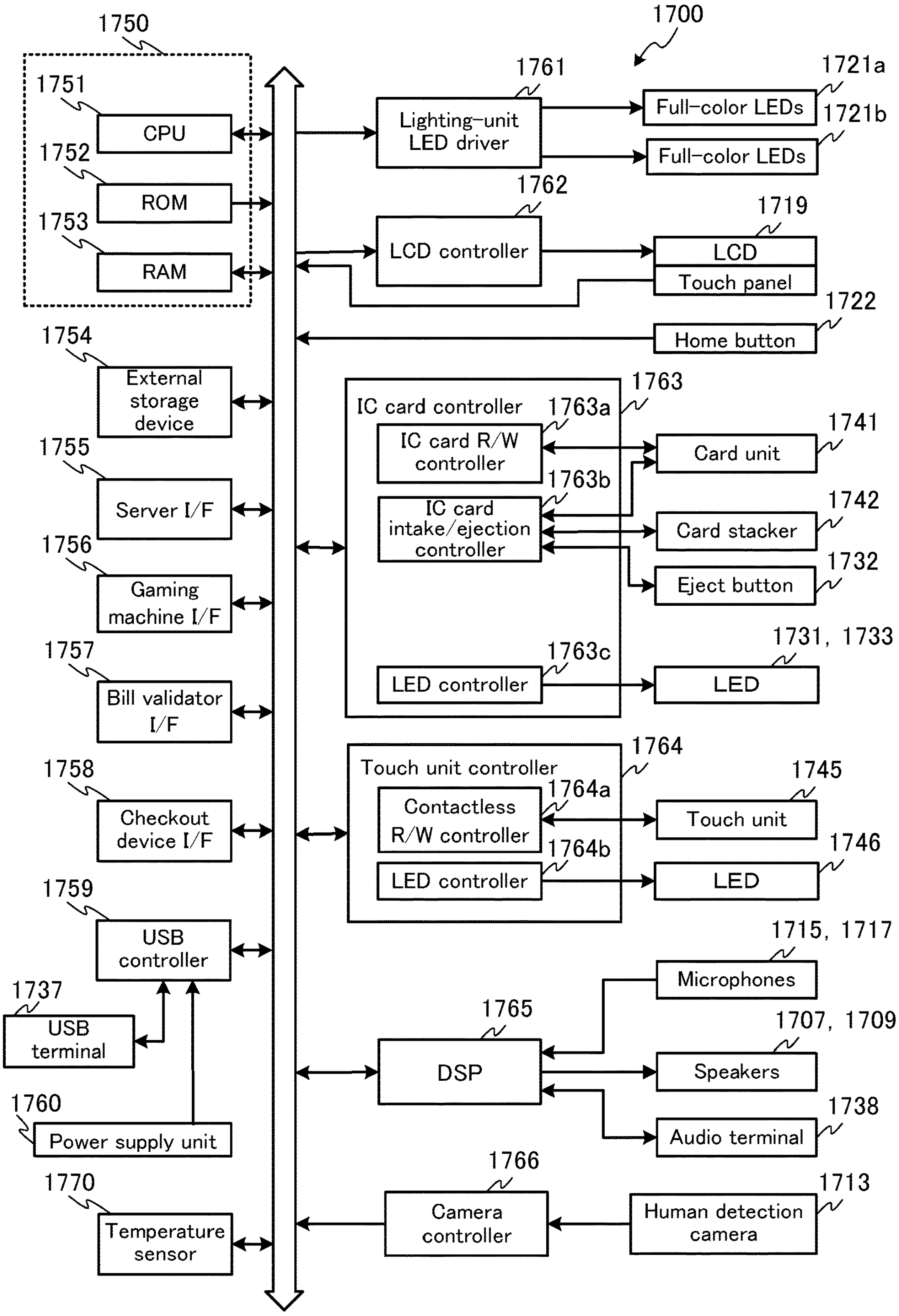
FIG. 10 is a diagram for illustrating circuitry of a PTS terminal in an embodiment of the present invention.

Next, with reference to FIG. 10, a configuration of a circuit included in the PTS terminal 1700 is described.

The PTS controller 1750 for controlling the PTS terminal 1700 includes a CPU 1751, a ROM 1752, and a RAM 1753.

The CPU 1751 controls operation of the components of the PTS terminal 1700, executes the programs stored in the ROM 1752, and carries out operations. For example, the CPU 1751 executes a credit update program to update the credit-related data stored in the IC card 1500.

The ROM 1752 includes a memory device such as a flash memory and stores permanent data to be used by the CPU 1751. For example, the ROM 1752 can store the credit update program for rewriting the credit-related data stored in an IC card 1500 and a collaborated-effect control program to be executed in accordance with a request from the bonus server 11.

The RAM 1753 stores data required to execute the programs stored in the ROM 1752 on a temporary basis.

The external storage device 1754 is a storage device such as a hard disk drive and stores programs to be executed by the CPU 1751 and data to be used by the programs executed by the CPU 1751.

The server I/F (interface) 1755 performs data communication of the PTS terminal 1700 with the servers such as the hall management server 10, the bonus server 11, and the monitoring server 14. The gaming machine I/F (interface) 1756 performs data communication of the PTS terminal 1700 with the controller 1100 of the slot machine 1010. For the data communication, a predetermined protocol is used.

The PTS terminal 1700 is further connected with the bill validator 1022 through a bill validator I/F (interface) 1757 and with the checkout device 1868 through a checkout device I/F (interface) 1758 to send and receive data with the devices as necessary.

The USB controller 1759 determines whether to supply the power from the power supply unit 1760 at the USB terminal 1737 and if predetermined conditions are satisfied, permits charging at the USB terminal 1737. When the predetermined conditions are satisfied, the player is allowed to connect an electronic device to the USB terminal to charge the electronic device.

The lighting-unit LED driver 1761 controls the full-color LEDs 1721*a* to light with predetermined timing so that the lighting plate 1720*a* above the LCD 1719 will shine and further, controls the full-color LEDs 1721*b* to light with predetermined timing so that the lighting plate 1720*b* under the LCD 1719 will shine, in accordance with a request from the bonus server 11 to start collaborated effects.

The LCD controller 1762 controls the LCD 1719 to display information on a member, information for members, data retrieved from an IC card 1500, or data entered by the player. The LCD 1719 has a touch panel function; when the touch panel is operated by the player, the LCD 1719 sends a corresponding signal to the CPU 1751.

The home button 1722 is a button provided close to the LCD 1719 and to change the screen displayed on the LCD 1719 to a predetermined home screen. In response to press of the home button 1722 by the player, the operation of the player is sent to the CPU 1751 and the CPU 1751 sends an instruction to update the display of the LCD 1719 in accordance with the operation to the LCD controller 1762.

The IC card controller 1763 controls intake and ejection of an IC card 1500 and writing credit data to the IC card. The IC card controller 1763 includes an IC card R/W (reader/writer) controller 1763*a*, an IC card intake/ejection controller 1763*b*, and an LED controller 1763*c*.

The IC card R/W controller 1763*a* controls the card unit 1741 to update the credit-related data stored in the IC card 1500. In the case where the slot machine 1010 issues a new IC card 1500, the IC card R/W controller 1763*a* stores credit-related data corresponding to the calculated amount to the new IC card 1500. The card unit 1741 has an antenna for reading data from or writing data to an IC card 1500 using NFC.

The card unit 1741 has functions of an IC card reader for reading information stored in an IC card 1500 and an IC card writer for writing information to an IC card 1500; however, the card unit 1741 may be configured to have either one of the functions as necessary.

The IC card intake/ejection controller 1763*b* controls intake and ejection of an IC card 1500. When an IC card is inserted into the card slot by the player, the IC card intake/ejection controller 1763*b* controls the card unit 1741 to hold the IC card therein when the player is playing games. Further, at checkout, the IC card intake/ejection controller 1763*b* controls the card unit 1741 to eject the IC card 1500 after credit-related data is written to the IC card 1500. Moreover, the IC card intake/ejection controller 1763*b* ejects an IC card 1500 when the eject button 1732 is pressed.

In issuing a new IC card 1500, the IC card intake/ejection controller 1763*b* takes a new IC card 1500 from the card stacker 1742 and supplies the IC card 1500 to the card unit 1741 to store credit-related data.

The LED controller 1763*c* controls on/off of the LEDs (full-color LEDs 1731) provided near the IC card slot 1730 of the card unit 1741 and controls on/off of the LED (red LED 1733) provided near the eject button 1732.

The touch unit controller 1764 controls data transmission responsive to a touch operation with an IC card 1500, a cell phone, or a smartphone. The touch unit controller 1764 includes a contactless R/W (reader/writer) controller 1764*a* and an LED controller 1764*b*.

The contactless R/W controller 1764*a* determines whether the touch unit 1745 is approached by an IC card 1500 or a cell phone close enough (for example, by determining whether the touch unit has detected a touch operation) and if the touch unit 1745 is approached close enough, acquires retrieved information from the touch unit 1745. The touch unit 1745 has an antenna for data communication with an IC card 1500 or a cell phone using NFC.

The touch unit 1745 has functions of an IC card reader for reading information stored in an IC card 1500 or a cell phone and an IC card writer for writing information to an IC card 1500 or a cell phone; however, the touch unit 1745 may be configured to have either one of the functions as necessary.

The LED controller 1764*b* controls the LEDs 1746 provided on the four corners of the front face of the touch unit 1745 to light with predetermined timing.

The DSP 1765 receives audio data acquired from the microphones 1715 and 1717, applies predetermined audio processing to the data, and sends the data to the CPU 1751. The DSP 1765 also sends received audio data to the speakers 1707 and 1709. In addition, the DSP 1765 sends received audio data to the audio terminal connected with a headset to output sound from the headphone and further, processes the sound received from the microphone and sends the audio data to the CPU 1751. FIG. 10 illustrates an outline of the configuration and omits components such as an A/D converter, a D/A converter, and an amplifier.

The camera controller 1766 acquires an image of the player taken by the human detection camera 1713, applies predetermined image processing as necessary, and sends the processed data to the CPU 1751. The data is sent to a server such as the hall management server 10, the member management server 13, or the monitoring server 14 through the server I/F 1755.

The camera controller 1766 further sends captured-image information acquired from the human detection camera 1713 to the monitoring server 14 in accordance with an instruction from the monitoring server 14.

The temperature sensor 1770 acquires temperature data on the components such as the CPU 1751, the motherboard (not shown), the external storage device 1754, and LCD controller 1762, in real time. The temperature sensor 1770 may be the temperature sensor mounted on the mother board or separate thermometers dedicated to the components from which temperatures are to be acquired.

The acquired temperature data is sent to the monitoring server 14 as temperature information via the server I/F 1755.

The temperature sensor 1770 has been described based on an assumption that the temperature sensor 1770 is to measure the temperature of the inside (more specifically, the temperature of the hardware such as the CPU 1751) of the PTS terminal 1700; however, the place to measure the temperature is not limited to these. For example, the temperature sensor 1770 may measure the temperature (room temperature) of the place where the PTS terminal 1700 is installed.

For example, in addition to or in place of the temperature sensor 1770, a humidity sensor, an odor sensor, an oximeter, a carbon-dioxide level sensor, a pressure sensor, a sound/vibration sensor, and/or a luminance sensor, or a combination thereof may be employed to measure the humidity, the odor, the level of oxygen, the barometric pressure, the noise, and/or the luminance.

[Configuration of Symbol Combination Table]

Next, with reference to FIG. 11, a symbol combination table is described.

The symbol combination table specifies combinations of drawn symbols relating to winning, and the number of payouts. On the slot machine 1010, the scrolling of symbol arrays of five pseudo reels 1151 to 1155 (the first video reel to the fifth video reel) is stopped, and winning is established when the combination of symbols displayed along the winning line matches one of the combinations of symbols specified by the symbol combination table. According to the winning combination, a benefit such as payout in credits is offered to the player. It is to be noted that winning is not established (i.e. the game is lost) when the combination of symbols displayed along the winning line does not match any of the combinations of symbols specified by the symbol combination table.

Basically, winning is established when symbols on the five pseudo reels 1151 to 1155 displayed along a winning line are of the same type, "RED", "APPLE", "BLUE 7", "BELL", "CHERRY", "STRAWBERRY", "PLUM" or "ORANGE". However, with respect to the respective types of symbols of "CHERRY" and "ORANGE", winning is also established when one or three symbols of either type are displayed along the winning line by the pseudo reels.

For example, when all the symbols displayed along the winning line by all the five pseudo reels 1151 to 1155 are "BLUE 7", the winning combination is "BLUE", and "10" is determined as the number of payouts. Based on the determined number of payouts, payout in credits is conducted. The payout in credits can be conducted by recording the summed credits in the IC card 1500 and ejecting the IC card from the IC card slot 1730.

[Contents of Program to be Executed in Slot Machine]

Next, with reference to FIGS. 12 to 16, the program to be executed by the slot machine 1010 is described. The slot machine 1010 sends status information to the monitoring server 14 upon detection of an apparatus status such as an error.

<Main Control Processing>

Figure 12:
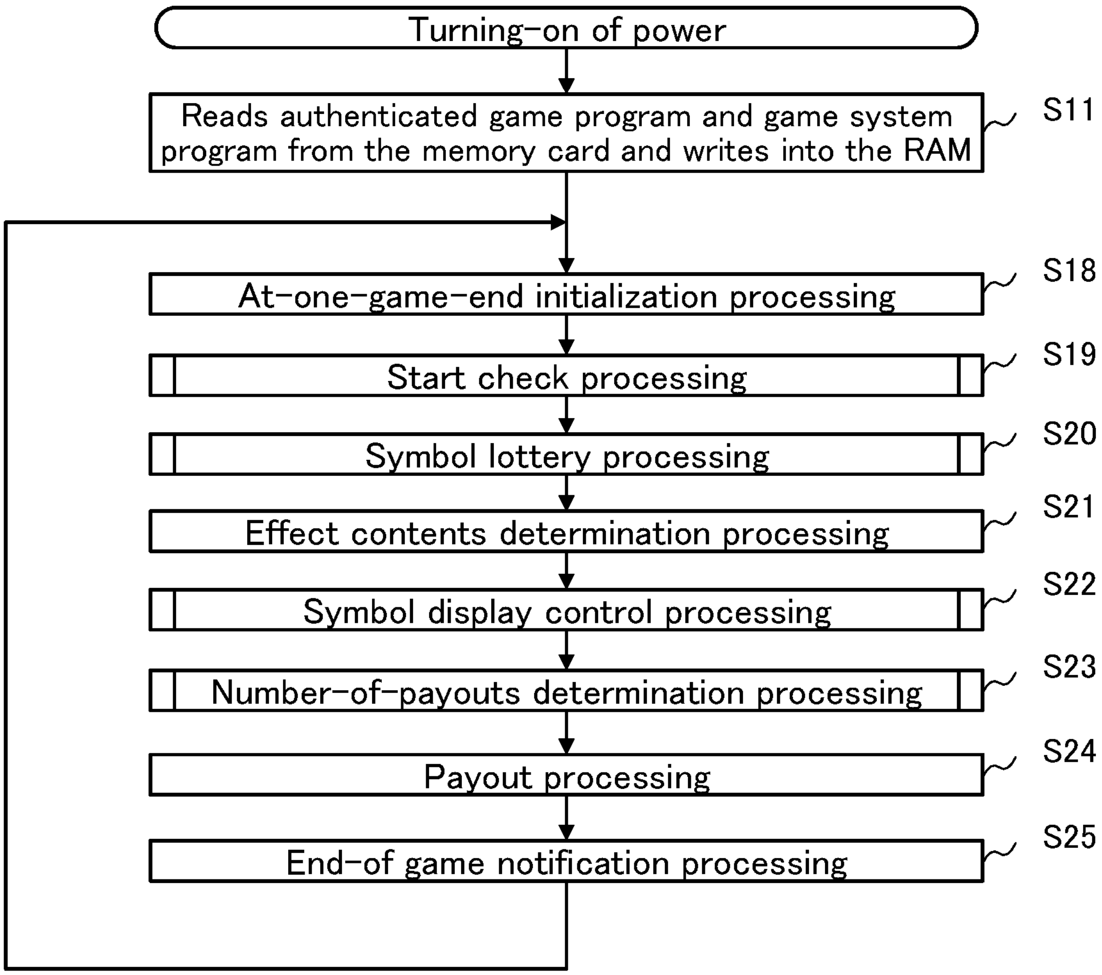
FIG. 12 is a flowchart for illustrating a procedure of main control processing of a slot machine in an embodiment of the present invention.

First, with reference to FIG. 12, main control processing is described.

When the power is supplied to the slot machine 1010, the main CPU 1071 reads the authenticated game program and game system program from the memory card 1054 through the gaming board 1050, and writes the programs into the RAM 1073 (Step 11, hereinafter, Step is abbreviated as S).

Next, the main CPU 1071 conducts at-one-game-end initialization processing (S18). For example, data that becomes unnecessary after each game in the working areas of the RAM 1073, such as the number of BETs and the symbols determined by lottery, is cleared.

The main CPU 1071 conducts start check processing which is described later (S19). In the processing, input from the BET switch and the spin switch is checked.

The main CPU 1071 then conducts symbol lottery processing which is described later (S20). In the processing, to-be stopped symbols are determined based on the random values for symbol determination.

Next, the main CPU 1071 conducts effect contents determination processing (S21). The main CPU 1071 extracts a random value for effect, and determines one of the effect contents from the preset plurality of effect contents by lottery. The effect content can be determined depending on the winning combination or the status of the game on the slot machine 1010. For example, the probabilities to draw individual effect contents can be specified differently depending on the winning combination and the status of the game on the slot machine 1010.

The main CPU 1071 then conducts symbol display control processing which is described later (S22). In the processing, scrolling of the five pseudo reels 1151 to 1155 (the first video reel to the fifth video reel) is started, and the to-be stopped symbol determined in the symbol lottery processing of S20 is stopped at a predetermined position (e.g. the display window 1150 on the lower image display panel 1141). That is, with respect to each reel, four symbols including the to-be stopped symbol are displayed in the display window 1150. For example, when the to-be stopped symbol is the symbol associated with the code number of "10" and it is to be displayed to the upper region, the symbols associated with the respective code numbers of "11", "12" and "13" are to be displayed to the respective upper central region, lower central region and lower region in the display window 1150.

Next, the main CPU 1071 conducts number-of-payouts determination processing which is described later (S23). In the processing, the number of payouts is determined based on the combination of symbols displayed along the winning line, and is stored into a payout counter provided in the RAM 1073.

Next, the main CPU 1071 conducts payout processing (S24). The main CPU 1071 adds the value stored in the payout counter to the credit counter provided in the RAM 1073. If the player presses the CASHOUT button, the CASHOUT switch 1033S that has detected the operation outputs a signal to the main CPU 1071 to update the number of credits stored in the IC card 1500 held in the card unit 1741 with the value of the credit counter.

Next, the main CPU 1071 conducts end-of-game notification processing (S25). The processing is to send data indicating that one unit game has finished to the PTS terminal 1700 (together with the identification code of the inserted IC card 1500, if an IC card 1500 has been inserted and the player is identifiable). The PTS terminal 1700 sends this data to the hall management server 10 and in response, the bonus server 11 conducts a bonus game lottery. After completion of S25, the main CPU 1071 returns to S18 and repeats to conduct a unit game.

<Start Check Processing>

Figure 13:
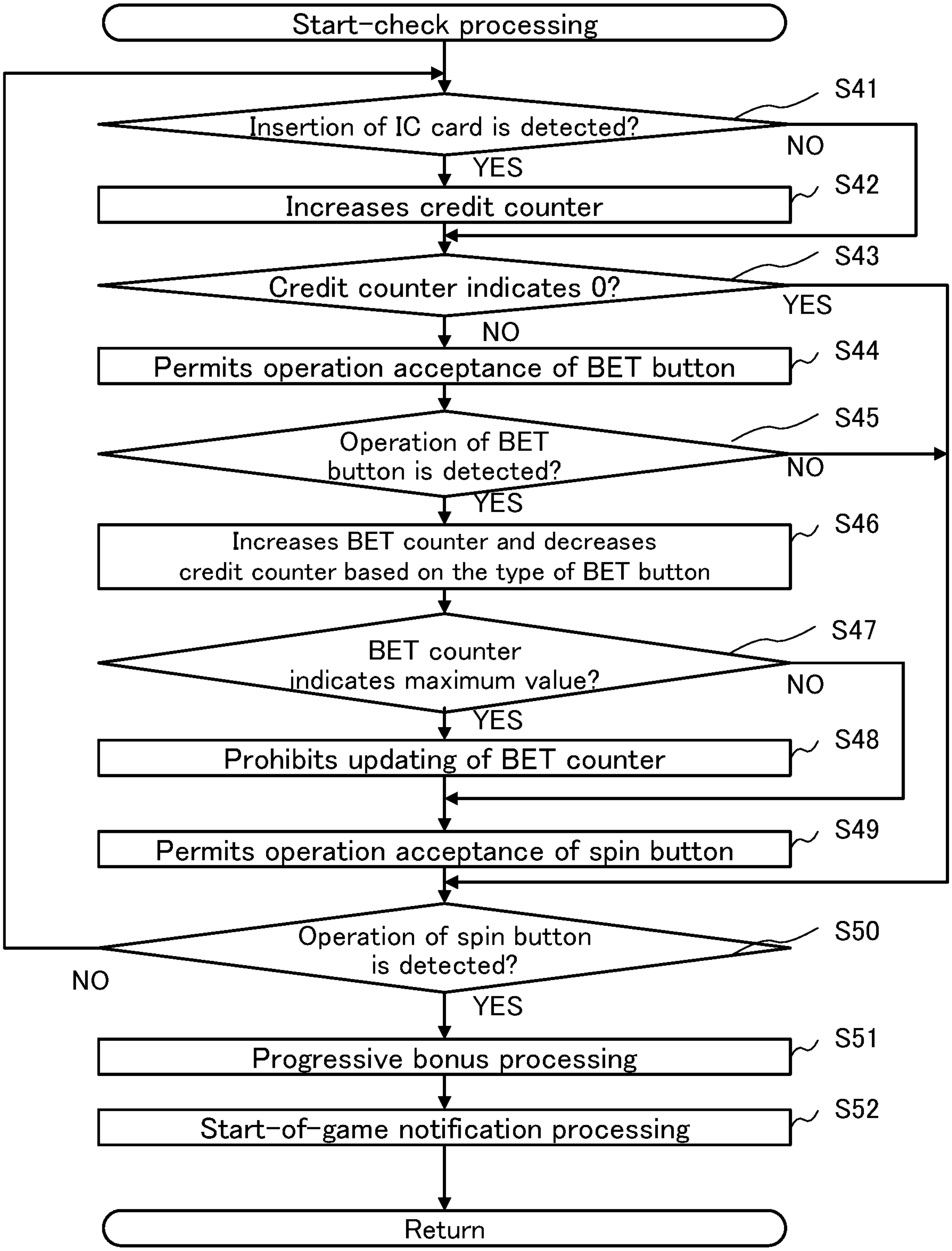
FIG. 13 is a flowchart for illustrating a procedure of start check processing of a slot machine in an embodiment of the present invention.

Next, with reference to FIG. 13, start-check processing is described. First, the main CPU 1071 determines whether or not insertion of an IC card 1500 has been detected (S41). When determining that the insertion of IC card 1500 has been detected, the main CPU 1071 makes an addition to the credit counter (S42). In addition to the insertion of an IC card 1500, the main CPU 1071 determines whether or not insertion of a bill has been detected by the bill validator 1022, and when determining that the insertion of a bill has been detected, the main CPU 1071 may add a value according to the bill to the credit counter.

After S42 or when determining in S41 that the insertion of an IC card 1500 has not been detected, the main CPU 1071 determines whether or not the credit counter indicates zero (S43). When the main CPU 1071 determines that the credit counter does not indicate zero, the main CPU 1071 permits operation acceptance of the BET buttons (S44).

Next, the main CPU 1071 determines whether or not operation of any of the BET buttons has been detected (S45). When the main CPU 1071 determines that the BET switch has detected press of the BET button by the player, the main CPU 1071 makes an addition to the BET counter provided in the RAM 1073 and makes a subtraction from the credit counter, based on the type of the BET button (S46).

The main CPU 1071 then determines whether or not the BET counter indicates a maximum value (S47). When the main CPU 1071 determines that the BET counter indicates a maximum value, the main CPU 1071 prohibits updating of the BET counter (S48). After S48 or when determining in S47 that the BET counter does not indicate a maximum value, the main CPU 1071 permits operation acceptance of the spin button (S49).

After S49, when determining in S45 that the operation of any of the BET buttons has not been detected, or when determining in S43 that the credit counter indicates zero, the main CPU 1071 determines whether or not operation of the spin button has been detected (S50). When the main CPU 1071 determines that the operation of the spin button has not been detected, the processing is shifted to S41.

When determining that the operation of the spin button has been detected, the main CPU 1071 conducts progressive bonus processing. This processing is paying out a part of the bet credits to the bonus server 11 via the PTS terminal 1700 as credits to be accumulated for the progressive bonus (S51).

Next, the main CPU 1071 conducts start-of-game notification processing (S52). This processing is sending data indicating that a unit game has started to the PTS terminal 1700 (together with the identification code of the inserted IC card 1500, if an IC card 1500 has been inserted and the player is identifiable). The PTS terminal 1700 sends this data to the hall management server 10 and in response, the bonus server 11 conducts a bonus game lottery. After completion of S52, the main CPU 1071 terminates the start check processing.

<Symbol Lottery Processing>

Figure 14:
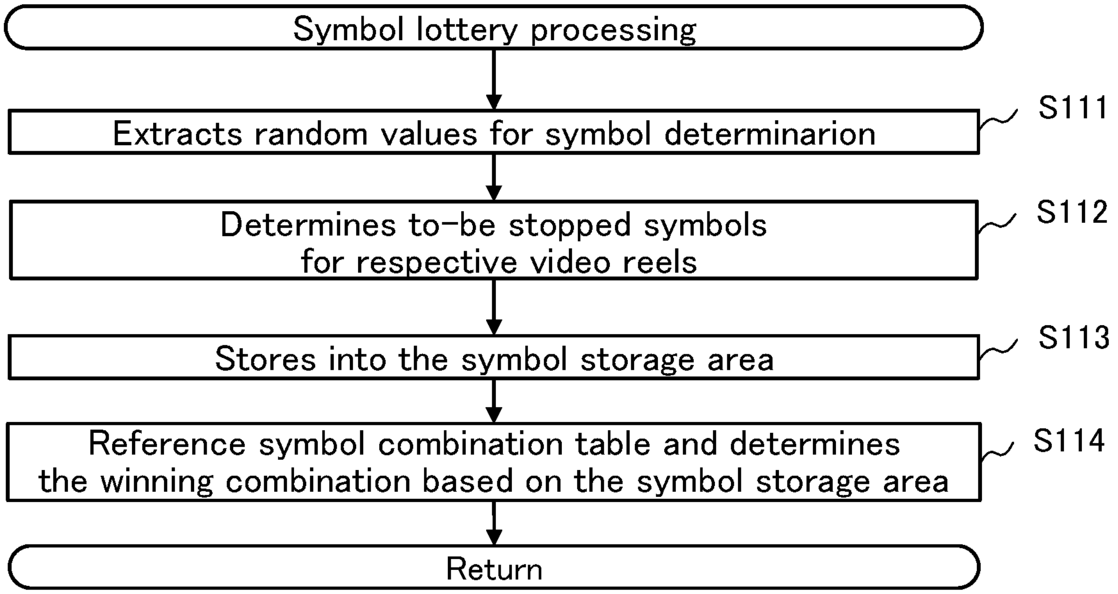
FIG. 14 is a flowchart for illustrating a procedure of symbol lottery processing of a slot machine in an embodiment of the present invention.

Next, with reference to FIG. 14, the symbol lottery processing is described. First, the main CPU 1071 extracts random values for symbol determination (S111). The main CPU 1071 then determines to-be stopped symbols for the five pseudo reels 1151 to 1155 (the first video reel to the fifth video reel) by lottery (S112). The main CPU 1071 holds a lottery for each video reel, and determines any one of the 22 symbols (code numbers from "00" to "21") as a to-be stopped symbol. At this time, each of the 22 symbols (code numbers from "00" to "21") is determined at an equal probability (i.e. 1/22).

The main CPU 1071 then stores the determined to-be stopped symbols for the video reels into a symbol storage area provided in the RAM 1073 (S113). Next, the main CPU 1071 references the symbol combination table (FIG. 11) and determines a winning combination based on the symbol storage area (S114). The main CPU 1071 determines whether or not the combination of symbols to be displayed along the winning line by the video reels matches any of the combinations of symbols specified by the symbol combination table, and determines the winning combination. After the processing has been conducted, the symbol lottery processing is completed.

<Symbol Display Control Processing>

Figure 15:
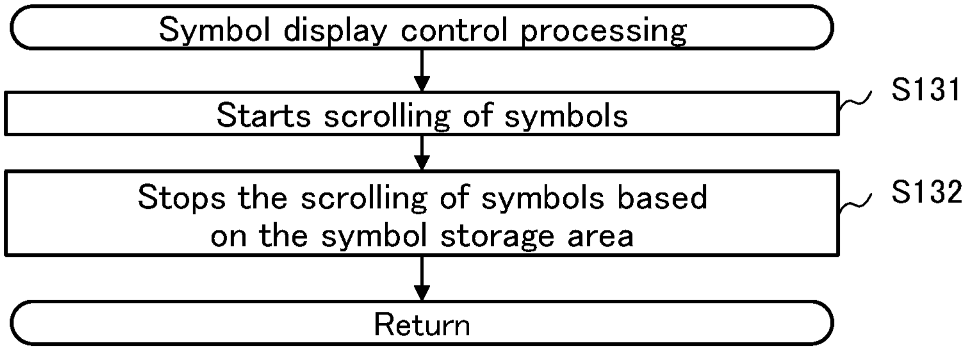
FIG. 15 is a flowchart for illustrating a procedure of symbol display control processing of a slot machine in an embodiment of the present invention.

Next, with reference to FIG. 15, the symbol display control processing is described. First, the main CPU 1071 starts scrolling of the symbol arrays of the video reels that are displayed to the display window 1150 of the lower image display panel 1141 (S131). The main CPU 1071 then stops the scrolling of the symbol arrays of the video reels, based on the aforementioned symbol storage area (S132). After the processing has been conducted, the symbol display control processing is completed.

Together with start and stop of the scrolling of the symbol arrays by the symbol display control processing or other action, the effects determined in the effect content determination processing (FIG. 12) are produced. For example, the main CPU 1071 makes the upper image display panel 1131 of the slot machine 1010 display a video or a still image and makes the speakers 1112 output sounds and the lamp 1111 to flash synchronously with the display to produce the effects.

<Number-of-Payouts Determination Processing>

Figure 16:
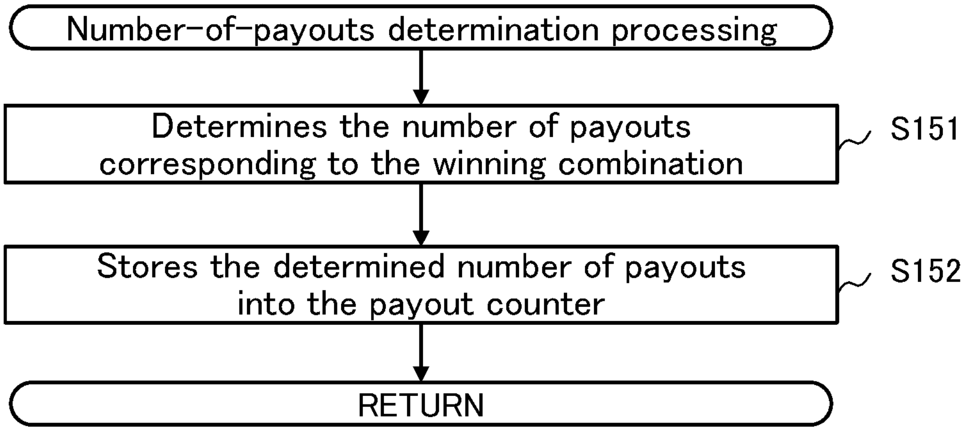
FIG. 16 is a flowchart for illustrating a procedure of number-of-payouts determination processing of a slot machine in an embodiment of the present invention.

Next, with reference to FIG. 16, the number-of-payouts determination processing is described. The main CPU 1071 first determines the number of payouts corresponding to the winning combination (S151). For example, when the winning combination is "BELL", the main CPU 1071 determines "8" as the number of payouts (see FIG. 11). It is to be noted that the main CPU 1071 determines "0" as the number of payouts in the case where the game is lost. Next, the main CPU 1071 stores the determined number of payouts into the payout counter (S152). After the processing has been conducted, the number-of-payouts determination processing is completed.

When some slot machine 1010 wins a bonus game lottery held by the bonus server 11, collaborated effects are produced among the PTS terminals 1700 of a plurality of slot machines 1010 inclusive of the slot machine 1010 that has won and a bonus is paid out from the bonus server 11. The bonus may be added to the payout counter.

[Configuration of Signage Apparatus]

Figure 17:
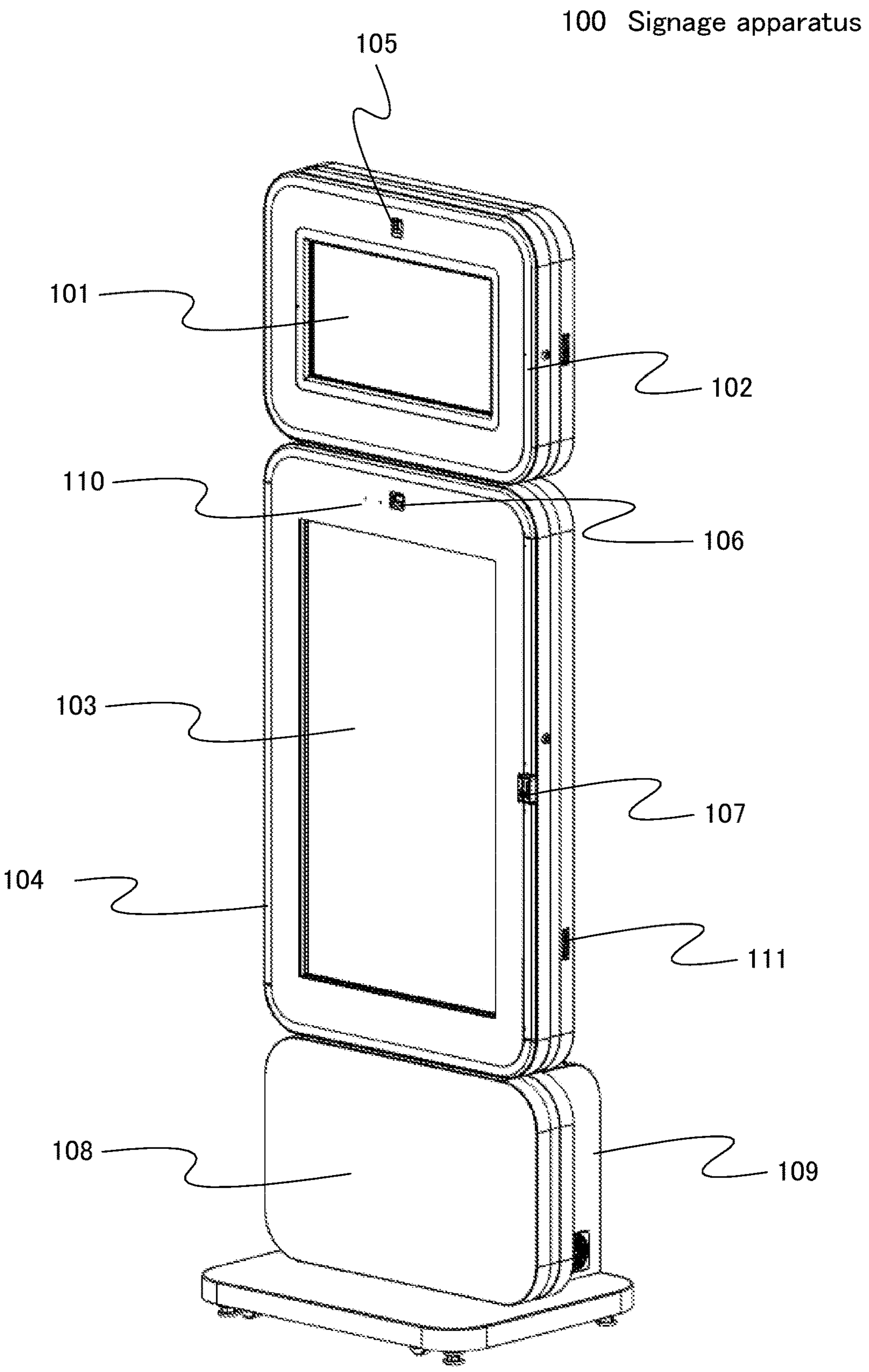
FIG. 17 is a diagram for illustrating an overall structure of a signage in an embodiment of the present invention.

FIG. 17 illustrates a signage apparatus 100 to be used in the game system 1 in an embodiment of the present invention. The signage apparatus 100 is an information display apparatus to be used to display advertisements (inclusive of billboards) of shops and a floor guide of the hall and can be connected with the servers (such as the bonus server 11 and the member management server 13) of the game system 1 via the network.

The signage apparatus 100 includes an LCD 101 and an LCD 103 having a touch panel function. The LCD 101 may be a 24-inch liquid crystal display device (24 inches equal to approximately 60.96 cm) and the LCD 103 may be a 46-inch liquid crystal display device (46 inches equal to approximately 116.84 cm). As described above, these LCDs display information such as advertisement information and guidance information. The touch panel function of the LCD 103 may be based on infrared technology. Although the LCD 103 in this example is configured to have a touch panel function, instructions may be input through other input devices such as a keyboard or a mouse.

The LCD 101 and the LCD 103 are held by cabinets. Around the rims of the front faces of the cabinets, effect-use LEDs 102 and 104 are provided. The effect-use LEDs 102 and 104 can be tape LED lights.

The signage apparatus 100 further includes motion sensors 105 and 106 on the cabinet for the LCD 101 and the cabinet for the LCD 103, respectively. The motion sensors 105 and 106 can be cameras; images taken by the motion sensors 105 and 106 are used to analyze the behaviors of the users of the signage apparatus 100 and the people walking down the aisles.

The signage apparatus 100 also includes a touch unit 107, which includes an RFID module capable of data communication with a contactless IC card, or a cell phone or a smartphone having an NFC function. A member can log in the system by holding a membership card (IC card) associated with the member over the touch unit 107 to display a menu screen for members and information on the member on the LCD 101 or the LCD 103. The information on the member may be acquired from the member management server 13.

The hall staffs can log in the system by holding an IC card for staff to display a menu screen for staff on the LCD 101 or the LCD 103.

Compared to the PTS terminal 1700, the signage apparatus 100 does not have a card unit for holding an IC card 1500 but merely includes a touch unit 107. The signage apparatus 100 is configured to hide the information displayed on the LCD 103 and automatically log off the user when a predetermined time has elapsed after the user touches the touch unit 107 with an IC card and then leaves the signage apparatus 100 without log-off operation.

The signage apparatus 100 includes a microphone 133 in the cabinet for the LCD 103 to collect sounds. The cabinet for the LCD 103 has an opening 110 for a microphone at the position corresponding to the microphone 133. FIG. 17 shows this opening 110 for a microphone beside the motion sensor 106.

The signage apparatus 100 further includes speakers 134 and 135 in the cabinet for the LCD 103 to output sounds. The cabinet for the LCD 103 is provided with speaker ducts at the positions corresponding to the speakers. FIG. 17 shows a speaker duct 111 for one of the speakers.

In addition to the foregoing, the signage apparatus 100 includes a base unit 108 for supporting the cabinet for the LCD 101 and the cabinet for the LCD 103, and a control unit 109 containing a controller for controlling components such as the LCDs and LEDs.

[Configuration of Circuit in Signage Apparatus]

Figure 18:
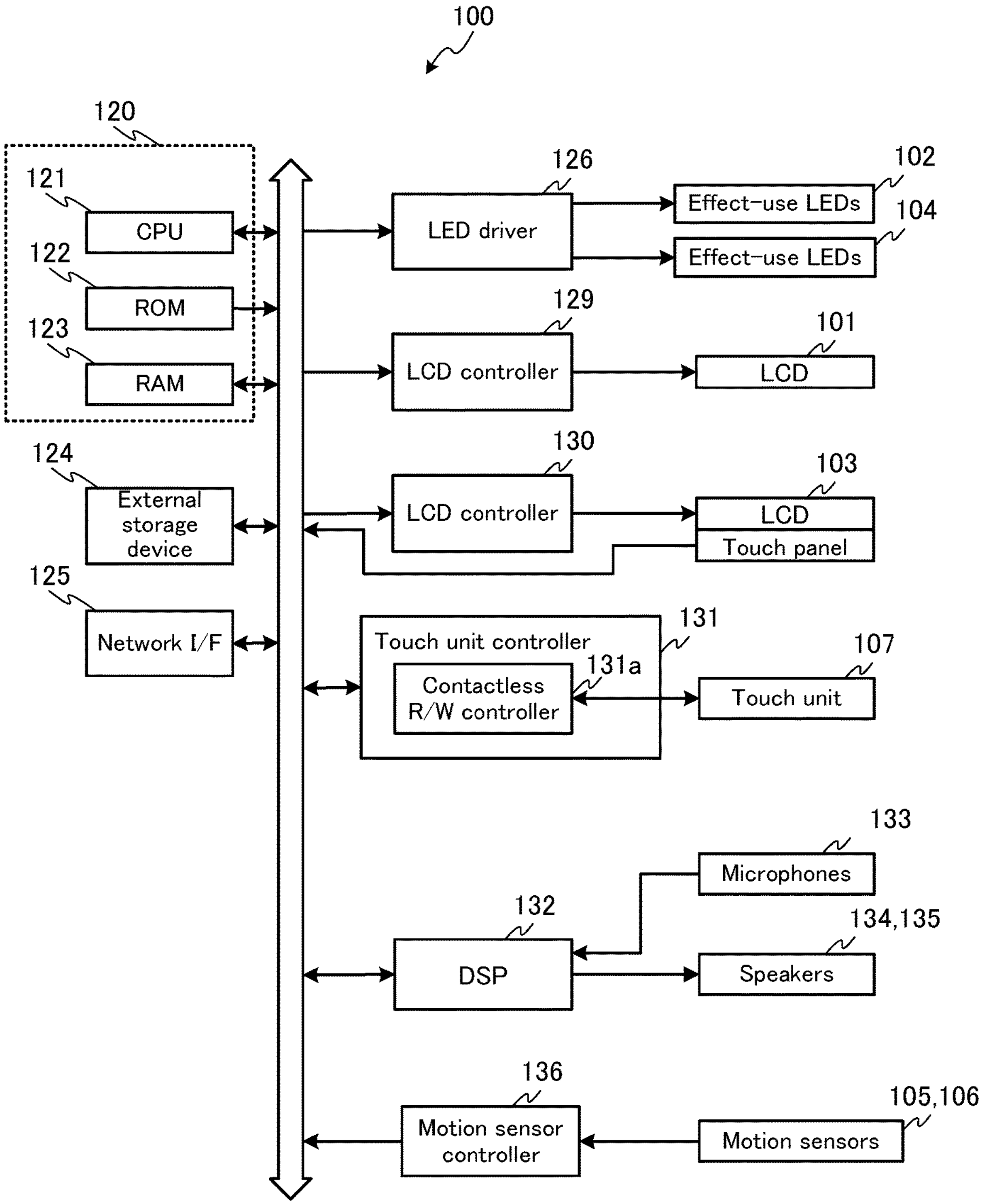
FIG. 18 is a diagram for illustrating circuitry of a signage in an embodiment of the present invention.

Next, with reference to FIG. 18, a configuration of a circuit included in the signage apparatus 100 is described.

The signage controller 120 for controlling the signage apparatus 100 includes a CPU 121, a ROM 122, and a RAM 123.

The CPU 121 controls operation of the components of the signage apparatus 100 and executes the programs stored in the ROM 122 and carries out operations.

The ROM 122 includes a memory device such as a flash memory and stores permanent data to be used by the CPU 121. For example, the ROM 122 can store a collaborated-effect control program to be executed in accordance with a request from the bonus server 11.

The RAM 123 stores data required to execute the programs stored in the ROM 122 on a temporary basis.

The external storage device 124 is a storage device such as a hard disk drive and stores programs to be executed by the CPU 121 and data to be used by the programs executed by the CPU 121.

The network I/F (interface) 125 performs data communication of the signage apparatus 100 with servers such as the bonus server 11 and the member management server 13, and the PTS terminals 1700.

The LED driver 126 controls the effect-use LEDs 102 and 104 to light with predetermined timing in accordance with a request from the bonus server 11 to start collaborated effects. Further, the LED driver 126 can light the effect-use LEDs 102 and 104 synchronously with the display of advertisement information, guidance information, or membership information to be displayed in response to an operation by a member.

The LCD controller 129 controls the LCD 101 to display information such as the aforementioned advertisement information.

The LCD controller 129 can also control the LCD 101 to display a floor map created by the monitoring server 14.

The LCD controller 130 controls the LCD 103 to display information such as the aforementioned advertisement information. The LCD 103 has a touch panel function, which forwards an operation of the user to the CPU 121.

The touch unit controller 131 controls data transmission responsive to a touch operation on the touch unit 107 with an IC card or a cell phone. The touch unit controller 131 includes a contactless R/W (reader/writer) controller 131*a*.

The contactless R/W controller 131*a* determines whether the touch unit 107 is operated with an IC card or a cell phone and if the touch unit 107 is operated, acquires information retrieved by the touch unit 107. The touch unit 107 has an antenna for data communication with an IC card or a cell phone using NFC.

Upon acquisition of the identification code of a membership card (IC card) from the touch unit 107, the CPU 121 acquires information on the member associated with the identification code from the member management server 13, and displays the information on the LCD 101 or the LCD 103. Furthermore, the CPU 121 can display an operation menu for the member on the LCD 103 or display advertisement information suitable for the member on the LCD 101 or the LCD 103.

The DSP 132 receives audio data acquired from the microphone 133, applies predetermined processing to the data, and sends the data to the CPU 121. In addition, the DSP 132 sends received audio data to the speakers 134 and 135 to output sounds.

The motion sensor controller 136 acquires images of a user or other objects captured by the motion sensors (for example, cameras) 105 and 106, applies predetermined image processing as necessary, and sends the processed data to the CPU 121.

The motion sensor controller 136 can acquire captured-image information from the motion sensors 105 and 106 and send the captured-image information to the monitoring server 14 in response to an acquisition request of the monitoring server 14.

[Configuration of Kiosk Terminal]

Figure 19:
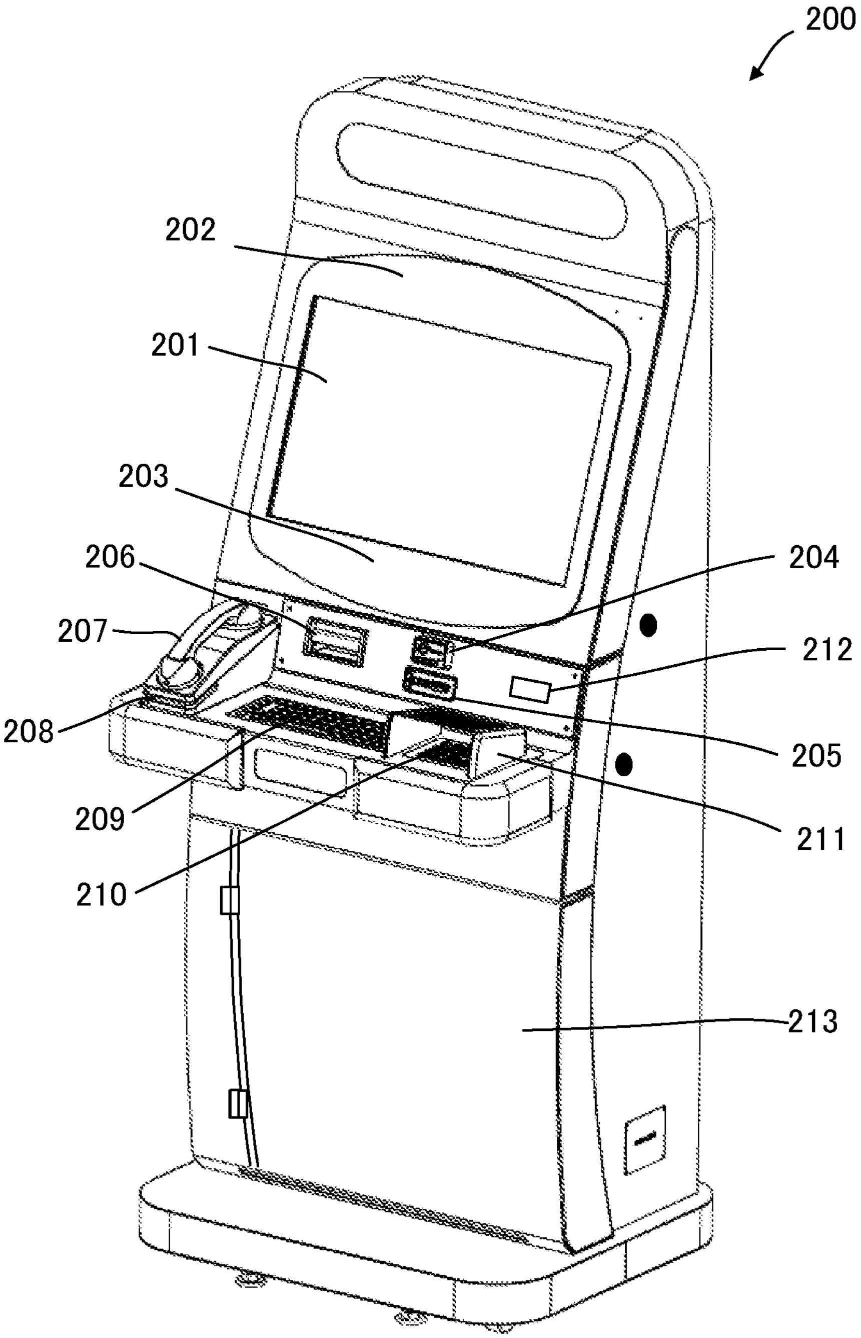
FIG. 19 is a diagram for illustrating an overall structure of a kiosk terminal in an embodiment of the present invention.

FIG. 19 illustrates a kiosk terminal 200 to be used in the game system 1 in an embodiment of the present invention. The kiosk terminal 200 is an information display apparatus to be used to mainly indicate information on the games being played in the hall, such as start of a bonus game held in the bonus server 11, countdown for the start of the bonus game, winning ranking of the day, and popular machine ranking. The kiosk terminal 200 can be connected to the servers (such as the bonus server 11 and the member management server 13) in the game system 1 via the network.

The kiosk terminal 200 includes an LCD 201 having a touch panel function. The LCD 201 may be a 24-inch liquid crystal display device (24 inches equal to approximately 60.96 cm). As described above, this LCD displays information on the games being played in the hall. Although the LCD 201 in this example is configured to have a touch panel function, instructions may be input through other input devices such as a keyboard or a mouse.

The kiosk terminal 200 further includes motion sensors 202 and 203 above and below the LCD 201. The motion sensors 202 and 203 can be cameras; images taken by the motion sensors 202 and 203 are used to analyze the behaviors of the users of the kiosk terminal 200 and the people walking down the aisles.

The kiosk terminal 200 also includes a touch unit 204, which includes an RFID module capable of data communication with a contactless IC card, or a cell phone or a smartphone having an NFC function. A member can log in the system by holding a membership card (IC card) associated with the member over the touch unit 204 and display a menu screen for members and information on the member on the LCD 201. The information on the member may be acquired from the member management server 13. In addition to the touch unit 204 or instead of the touch unit 204, an information recording medium reader for reading information stored in an information recording medium such as a magnetic card may be provided. In this case, the membership card can be a magnetic card, instead of the IC card 1500.

The hall staffs can log in the system by holding an IC card for staff and display a menu screen for staff on the LCD 201.

The kiosk terminal 200 has an IC card slot 205 to insert or take out an IC card 1500. The IC card slot 205 is provided with an eject button.

At the corresponding place to the IC card slot 205 inside the cabinet of the kiosk terminal 200, a card unit 230 is provided; the IC card slot 205 is structured as a part of the card unit 230.

When a membership card is inserted from the IC card slot 205, the kiosk terminal 200 can display a menu screen for members and information on the member on the LCD 201. The card unit 230 can issue and collect a card such as a limited card or a reward card.

The kiosk terminal 200 has a ticket printer 206. The ticket printer 206 can issue and collect a ticket or a coupon; further, the ticket printer 206 may have the functions of a bill validator.

The kiosk terminal 200 further has a receiver 207 to be used in VoIP calls. The user of the kiosk terminal 200 can talk with a user of another kiosk terminal 200 or a player of a gaming machine by using the receiver 207. The incoming alert LED 208 is controlled to light when a VoIP call is coming.

The kiosk terminal 200 has a keyboard 209 and a numeric keypad 210 for the user to enter data (for membership registration or text chat); on the both sides of the numeric keypad 210, LED plates 211 are provided for privacy protection.

The kiosk terminal 200 further has a QR code scanner 212 for reading a QR Code™, which may be attached to an e-mail sent to a cell phone.

The kiosk terminal 200 includes a cabinet 213 containing the controller of the LCD and LEDs.

[Configuration of Circuit in Kiosk Terminal]

Figure 20:
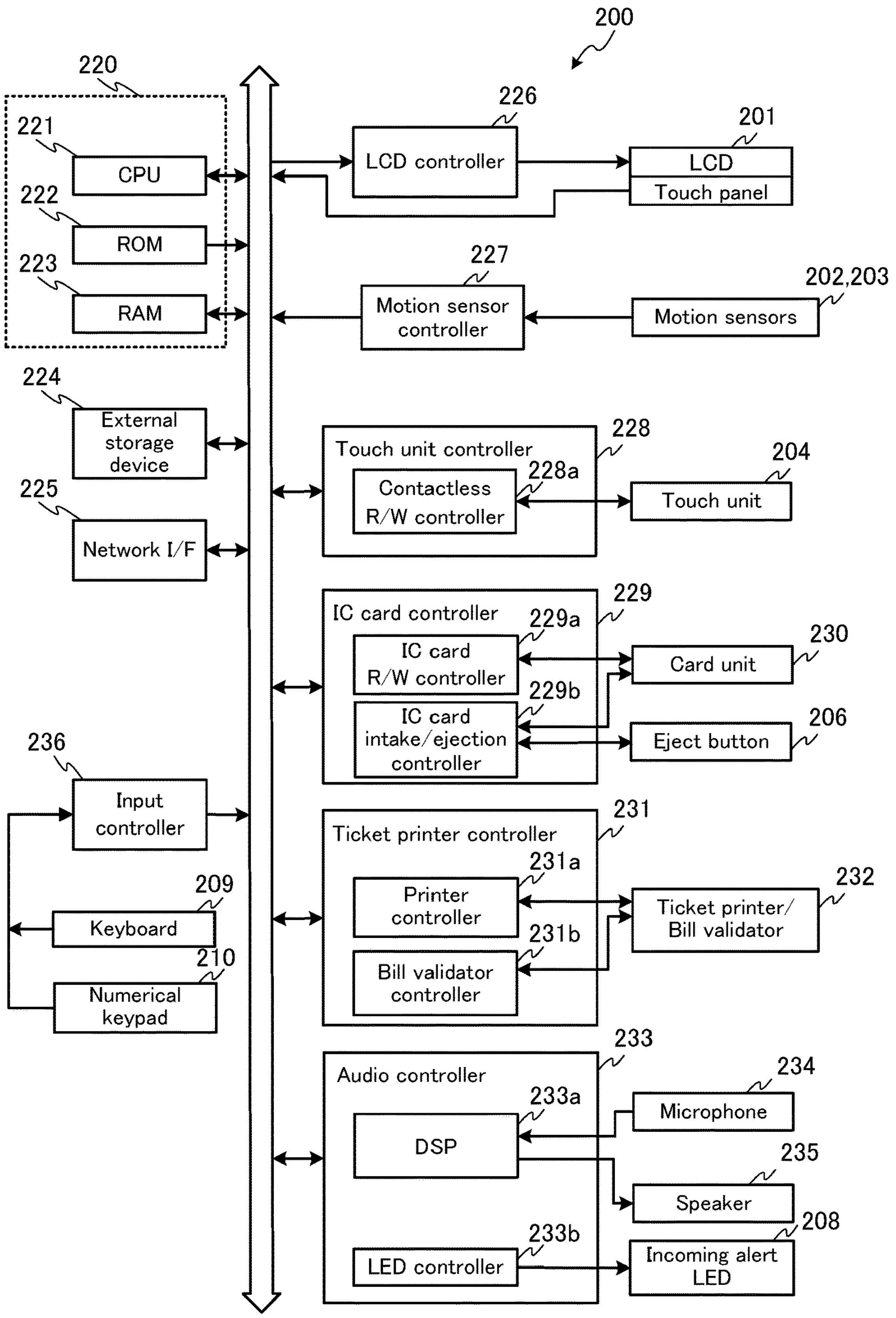
FIG. 20 is a diagram for illustrating circuitry of a kiosk terminal in an embodiment of the present invention.

Next, with reference to FIG. 20, a configuration of a circuit included in the kiosk terminal 200 is described.

The kiosk terminal controller 220 for controlling the kiosk terminal 200 includes a CPU 221, a ROM 222, and a RAM 223.

The CPU 221 controls operation of the components of the kiosk terminal 200 and executes the programs stored in the ROM 222 and carries out operations.

The ROM 222 includes a memory device such as a flash memory and stores permanent data to be used by the CPU 221. For example, the ROM 222 can store a VoIP phone control program.

The RAM 223 stores data required to execute the programs stored in the ROM 222 on a temporary basis.

The external storage device 224 is a storage device such as a hard disk drive and stores programs to be executed by the CPU 221 and data to be used by the programs executed by the CPU 221.

The network I/F (interface) 225 performs data communication with the servers such as the bonus server 11, the member management server 13, and the monitoring server 14, and the PTS terminals 1700.

The LCD controller 226 controls the LCD 201 to display information such as the aforementioned information on the games. The LCD 201 has a touch panel function, which sends an operation of the user to the CPU 221.

The LCD controller 226 can also control the LCD 201 to display a floor map created by the monitoring server 14.

The motion sensor controller 227 receives images of a user or other objects captured by the motion sensors (for example, cameras) 202 and 203, applies predetermined image processing as necessary, and forwards the processed data to the CPU 221.

The motion sensor controller 227 can acquire captured-image information from the motion sensors 202 and 203 and send the captured-image information to the monitoring server 14 in response to an acquisition request of the monitoring server 14.

The touch unit controller 228 controls data transmission responsive to a touch operation on the touch unit 204 with an IC card or a cell phone. The touch unit controller 228 includes a contactless R/W (reader/writer) controller 228*a*.

The contactless R/W controller 228*a* determines whether the touch unit 204 has detected a touch operation with an IC card or a cell phone and if the touch unit 204 has detected a touch operation, acquires information retrieved by the touch unit 204. The touch unit 204 has an antenna for data communication with an IC card or a cell phone using NFC.

The IC card controller 229 controls intake and ejection of an IC card 1500, and retrieval of data from the IC card 1500. The IC card controller 229 includes an IC card R/W (reader/writer) controller 229*a* and an IC card intake/ejection controller 229*b*.

The contactless R/W controller 229*a* controls the card unit 230 to read information such as the identification code stored in the IC card 1500. The card unit 230 has an antenna for data write to the IC card 1500 using NFC.

The IC card intake/ejection controller 229*b* controls intake and ejection of an IC card 1500. In response to insertion of an IC card 1500 into the IC card slot 205 by the user, the IC card intake/ejection controller 229*b* controls the IC card to be held in the card unit 230 until the user logs off. Furthermore, in response to press of the eject button, the IC card intake/ejection controller 229*b* controls the IC card 1500 to be ejected.

The ticket printer controller 231 controls the ticket printer/bill validator 232 to issue or collect a ticket or a coupon, and to identify a bill. The ticket printer controller 231 includes a printer controller 231*a* and a bill validator controller 231*b*.

The audio controller 233 inputs and outputs sounds with a microphone 234 and a speaker 235 included in the receiver 207. The audio controller 233 includes a DSP 233*a* and an LED controller 233*b*. The DSP 233*a* performs predetermined audio signal processing in receiving sounds from the microphone 234 and outputting sounds from the speaker 235. The LED controller 233*b* controls the incoming alert LED 208 to light based on the incoming signal of a VoIP call.

The input controller 236 converts inputs from the keyboard 209 or the numerical keypad 210 into a signal and sends it to the CPU 221.

[Configuration of Circuit in Monitoring Server]

Figure 21:
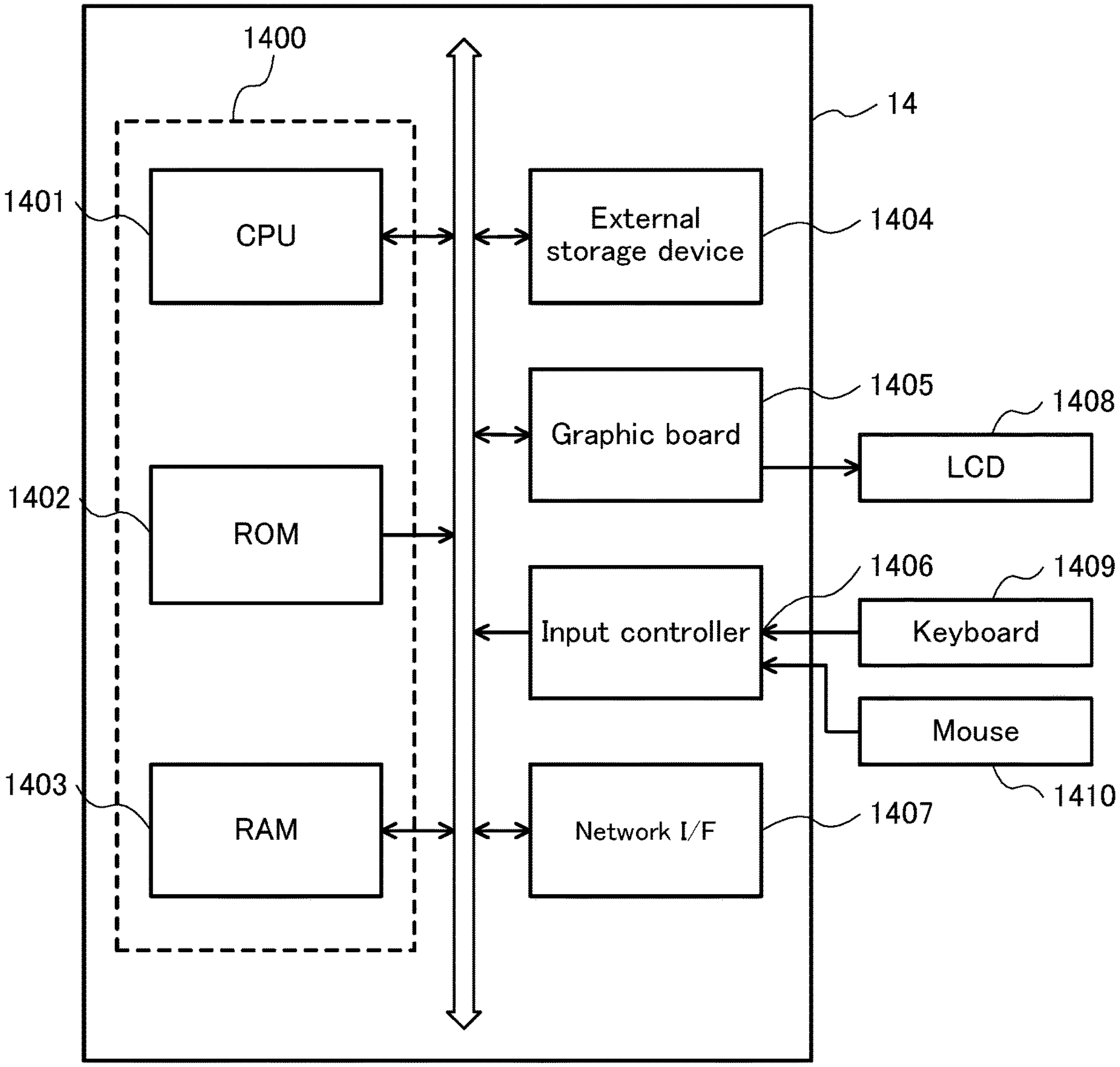
FIG. 21 is a diagram for illustrating circuitry of a monitoring server in an embodiment of the present invention.

Next, with reference to FIG. 21, a configuration of a circuit included in the monitoring server 14 is described.

The monitoring server controller 1400 for controlling the monitoring server 14 includes a CPU 1401, a ROM 1402, and a RAM 1403.

The CPU 1401 controls operation of the components of the monitoring server 14 and executes the programs stored in the ROM 1402 and carries out operations.

The ROM 1402 includes a memory device such as a flash memory and stores permanent data to be used by the CPU 1401. For example, the ROM 1402 can store a program for controlling the monitoring system and a program for controlling information to be included in a floor map.

The RAM 1403 stores data required to execute the programs stored in the ROM 1402 on a temporary basis.

The external storage device 1404 is a storage device such as a hard disk drive and stores programs to be executed by the CPU 1401 and data (such as tables) to be used by the programs executed by the CPU 1401.

The graphic board 1405 controls the LCD 1408 to display floor information or a floor map.

The input controller 1406 converts inputs from the keyboard 1409 or the mouse 1410 into a signal and sends it to the CPU 1401.

The network I/F (interface) 1407 performs data communication with the servers such as the member management server 13, the PTS terminals 1700, the signage apparatuses 100, the kiosk terminals 200, and the surveillance cameras.

[Tables]

FIG. 22 is a view of an example of a member management table. The member management table is stored in the member management server 13 and the monitoring server 14 and is synchronized between these servers. Alternatively, the member management table can be held by one of the member management server 13, the monitoring server 14, and the other servers and a server which does not have the table may acquire the data as necessary.

The member management table stores, for each member identification code for identifying a member, a name of member for indicating the name of the member, icon data for indicating the face of the member, and a membership class for indicating the class the member belongs to.

The member management table is updated basically at registration of a member. However, the column of the membership class is updated by the shop. For example, a membership class can be updated automatically or by the shop administrator based on the frequency of visit or the behavior pattern of the member.

FIG. 23 is a view of an example of a related-person management table. The related-person management table is stored in the member management server 13 and the monitoring server 14 and is synchronized between these servers. Alternatively, the related-person management table can be held by one of the member management server 13, the monitoring server 14, and the other servers and a server which does not have the table may acquire the data as necessary.

The related-person management table stores, for a member identification code, a related-person identification code for identifying a related person, a status for indicating whether the member is available to communicate with the related person, and information on the relationship between the member and the related person.

The related-person management table is updated basically at registration of a friend or start of communication (voice call or text chat).

FIG. 24 is a view of an example of an address management table. The address management table is stored in the member management server 13 and the monitoring server 14 and is synchronized between these servers. Alternatively, the address management table can be held by one of the member management server 13, the monitoring server 14, and the other servers and a server which does not have the table may acquire the data as necessary.

The address management table stores, for each apparatus identification code for identifying an apparatus such as a gaming machine, an IP address for indicating the network address of the apparatus, an apparatus identifier for indicating the name of the apparatus, object data for indicating a reduced-size image, coordinate data for indicating the position of the apparatus on the floor map, and an apparatus status for indicating the status of the apparatus. The information to be stored is not limited to these; for example, locational data for indicating the location of the apparatus on the floor may be employed in place of the coordinate data.

The address management table is updated by the administrator basically at installation of an apparatus, relocation of an apparatus, or removal of an apparatus. However, the information on the apparatus status is updated as appropriate based on the apparatus status data sent from individual apparatuses. Furthermore, the information of the apparatus identification code, the IP address, the apparatus identifier, the object data, and the coordinate data is initially registered basically at creation or update of the floor map (a template in which the apparatuses are mapped to the layout of the floor).

FIG. 25 is a view of an example of a login management table. The login management table is stored in the monitoring server 14. The login management table can be stored in a different place such as a different server.

The login management table stores, for each member identification code, an apparatus identification code and a login time.

The login management table is updated basically at login of a member (when the member inserts the IC card 1500 into a slot machine 1010 or a kiosk terminal 200, or holds the IC card 1500 over a signage apparatus 100).

FIG. 26 is a view of an example of an apparatus status history table. The apparatus status history table is stored in the monitoring server 14. The apparatus status history table can be stored in a different place such as a different server.

The apparatus status history table stores, for each apparatus identification code, an update time for indicating the time when the apparatus status is updated and the apparatus status at the time.

The apparatus status history table is updated (by adding a record) basically at an appropriate interval based on the apparatus status data sent from individual apparatuses.

[Configuration of Image Processing System]

Figure 27:
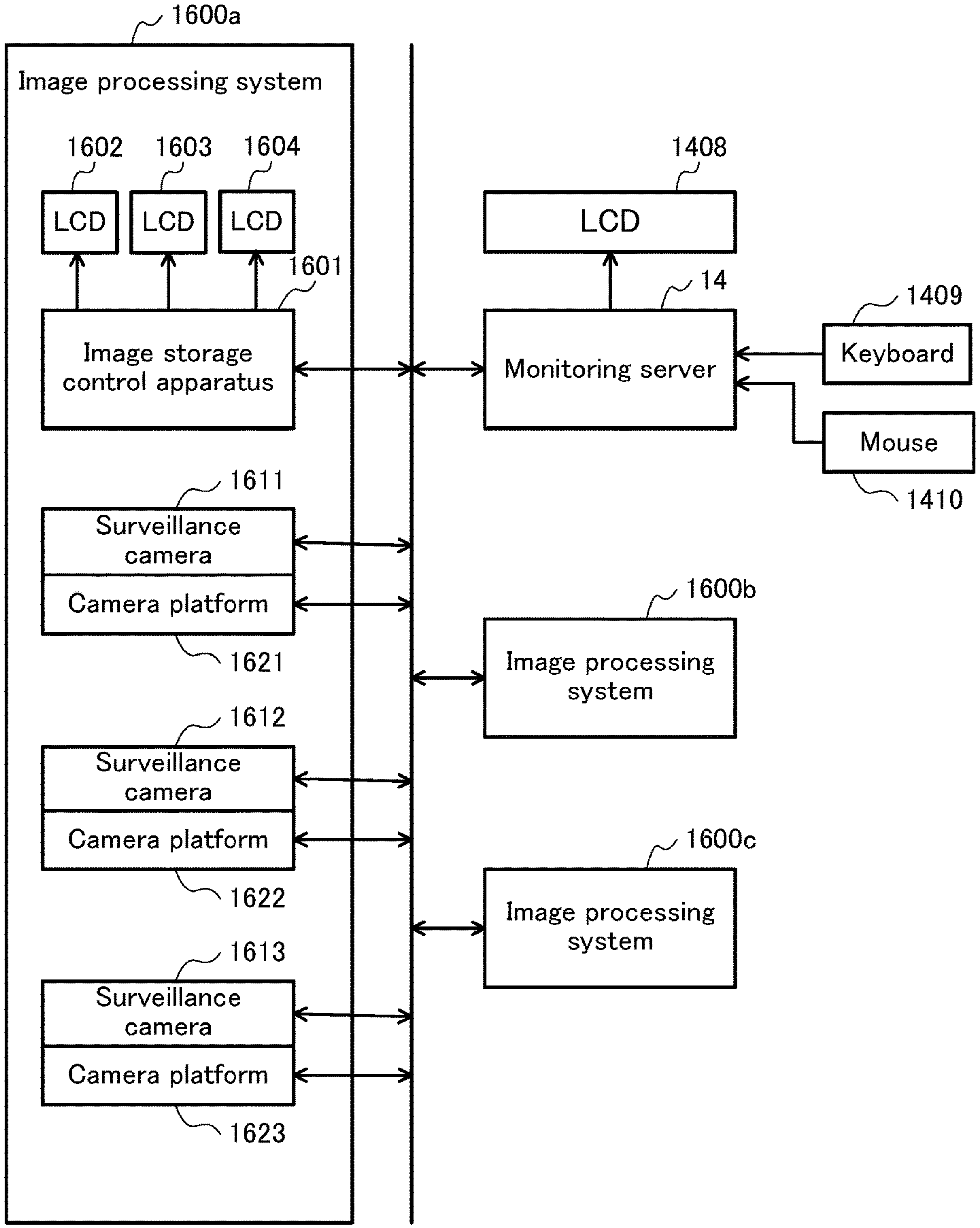
FIG. 27 is a diagram for illustrating a configuration of an image processing system in an embodiment of the present invention.

An image processing system is described with reference to FIG. 27. FIG. 27 is a diagram for illustrating an example of an image processing system (each of image processing systems 1600*a* to 1600*c*). This section describes the image processing system 1600*a* by way of example because the image processing systems 1600*a* to 1600*c* have the same configuration.

The image processing system 1600*a* includes an image storage control apparatus 1601, a plurality of LCDs 1602 to 1604, a plurality of surveillance cameras 1611 to 1613, and a plurality of camera platforms 1621 to 1623. Although FIG. 27 shows three image processing systems 1600*a* to 1600*c*, three LCDs 1602 to 1604, three surveillance cameras 1611 to 1613, and three camera platforms 1621 to 1623, the number is not limited to three. The number may be less than three or not less than three; any appropriate number can be employed.

The image storage control apparatus 1601 receives captured-image information sent from the surveillance cameras 1611 to 1613 in the format of sequential still pictures (such as Motion JPEG) or differential compression (such as MPEG4 or H.264) and displays the images on the plurality of LCDs 1602 to 1604.

The image storage control apparatus 1601 also stores the received captured-image information to an external storage device (not shown) such as a DVD (Digital Versatile Disc) or a hard disk drive. If the remaining storage size is insufficient, the image storage control device 1601 deletes recorded data from the oldest.

The image storage control apparatus 1601 does not need to store captured-image information all the time.

For example, only in the case where the image storage control apparatus 1601 detects a moving object in the capture ranges of the surveillance cameras 1611 to 1613 through moving object detection (utilizing background difference or a human sensor), the image storage control apparatus 1601 may record the captured-image information from several seconds before the object is detected.

This configuration saves the storage size. A wide floor of a casino may be provided with hundreds or thousands of surveillance cameras and in addition, the casino may open for 24 hours a day; saving the storage size can minimize the number of external storage devices. The shop enjoys lower expenses for the equipment and easier operation and maintenance.

The image storage control apparatus 1601 is connected with the monitoring server 14 to be able to communicate with each other. The image storage control apparatus 1601 has a function of selecting captured-image information of the surveillance cameras 1611 to 1613 using a time-sharing method (by changing the surveillance camera of the captured-image information source by rotation at predetermined intervals) to send captured-image information to the monitoring server 14, and a function of processing the captured-image information of the surveillance camera designated by the monitoring server 14 into information for a single screen or multiple screens to send.

The monitoring server 14 displays the captured-image information received from the image storage control apparatus 1601 on the LCD 1408 in a single screen or multiple screens. The monitoring server 14 sends a request for captured-image information of the surveillance camera designated out of the surveillance cameras 1611 to 1613 by a user operation (an operation of the keyboard 1409 or the mouse 1410) to the image storage control apparatus 1601. The request includes an apparatus identification code for identifying the surveillance camera.

The acquisition of captured-image information of the surveillance cameras is not limited to the above-described configuration. For example, the monitoring server 14 may acquire the information directly from the surveillance cameras without using the image storage control apparatus 1601.

The monitoring server 14 further controls the surveillance cameras 1611 to 1613 and the camera platforms 1621 to 1623. More specifically, the monitoring server 14 instructs the surveillance cameras 1611 to 1613 to zoom, focus, or shoot and instructs the camera platforms 1621 to 1623 to pan or tilt based on the user operation.

The LCDs 1602 to 1604 display captured-image information of the surveillance cameras 1611 to 1613. The number of LCDs 1602 to 1604 may or may not be equal to the number of surveillance cameras 1611 to 1613. For example, in the case where the number of LCDs is smaller than the number of surveillance cameras, the screen on an LCD may be split (into two, four, or nine) to display the images of the plurality of surveillance cameras.

The surveillance cameras 1611 to 1613 send captured-image information on the objects to the image storage control apparatus 1601. The surveillance cameras 1611 to 1613 enhance the image quality of a specific area (for example, an area including a person or the face of a person) in each video frame and degrade the image quality of the other area in image compression (encoding).

Although not shown in the drawing, the surveillance cameras 1611 to 1613 have directional microphones and can record the sound.

The camera platforms 1621 to 1623 change and fix the orientation of the surveillance cameras 1611 to 1613 in accordance with instructions from the monitoring server 14.

It should be noted that the configuration of the image processing system is not limited to the above-described configuration. A part or all of the functions of the image storage control apparatus 1601 may be implemented in the monitoring server 14.

[VoIP Phone System]

Figure 28:
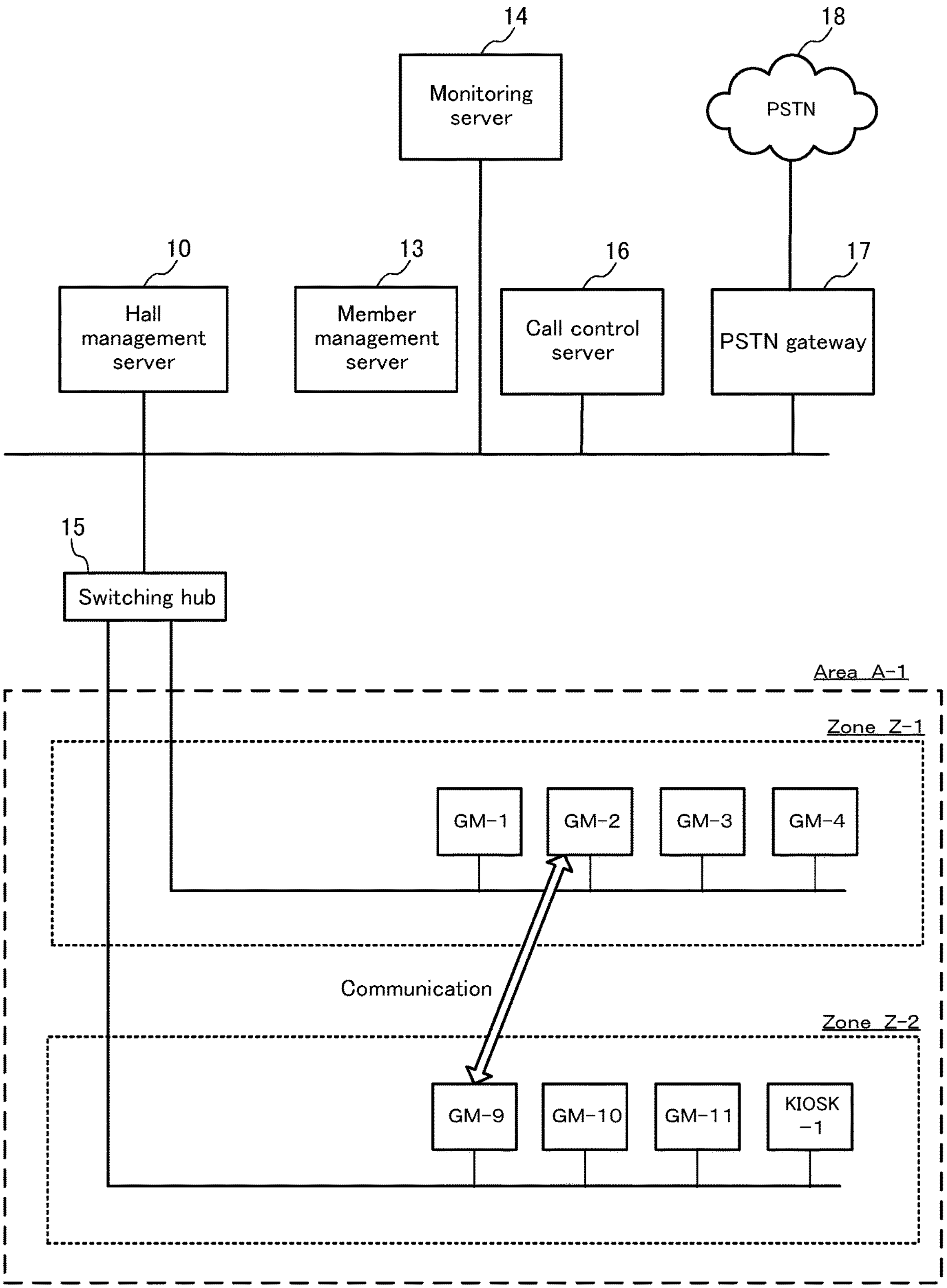
FIG. 28 is a diagram for illustrating a general network configuration of the game system in an embodiment of the present invention.

Next, with reference to FIG. 28, a VoIP phone system that can be used between slot machines 1010 (PTS terminals 1700), between a slot machine 1010 and a kiosk terminal 200, or between kiosk terminals 200 is described.

FIG. 28 is a diagram for illustrating a network topology of the VoIP phone system. In the example shown in FIG. 28, the area A-1 of the hall includes two zones Z-1 and Z-2. In the zone Z-1, four gaming machines (GM-1 to GM-4) are connected as a LAN based on Ethernet, for example. In the zone Z-2, three gaming machines (GM-9 to GM-11) and one kiosk terminal 200 (KIOSK-1) are connected as a LAN based on Ethernet, for example. These gaming machines are slot machines 1010.

The hall management server 10, the member management server 13, the monitoring server 14, a call control server 16, and a PSTN gateway 17 are connected with the aforementioned apparatuses in the two zones via a switching hub 15 by an Ethernet-based network. In FIG. 28, other necessary network connection devices such as routers and hubs are omitted.

The call control server 16 is a server for controlling VoIP calls. The PSTN gateway 17 is a device to control the connection to the PSTN (Public Switched Telephone Network) 18 to achieve communication between an apparatus in the hall and a telephone outside the hall.

[Environment Monitoring Service]

Figure 29:
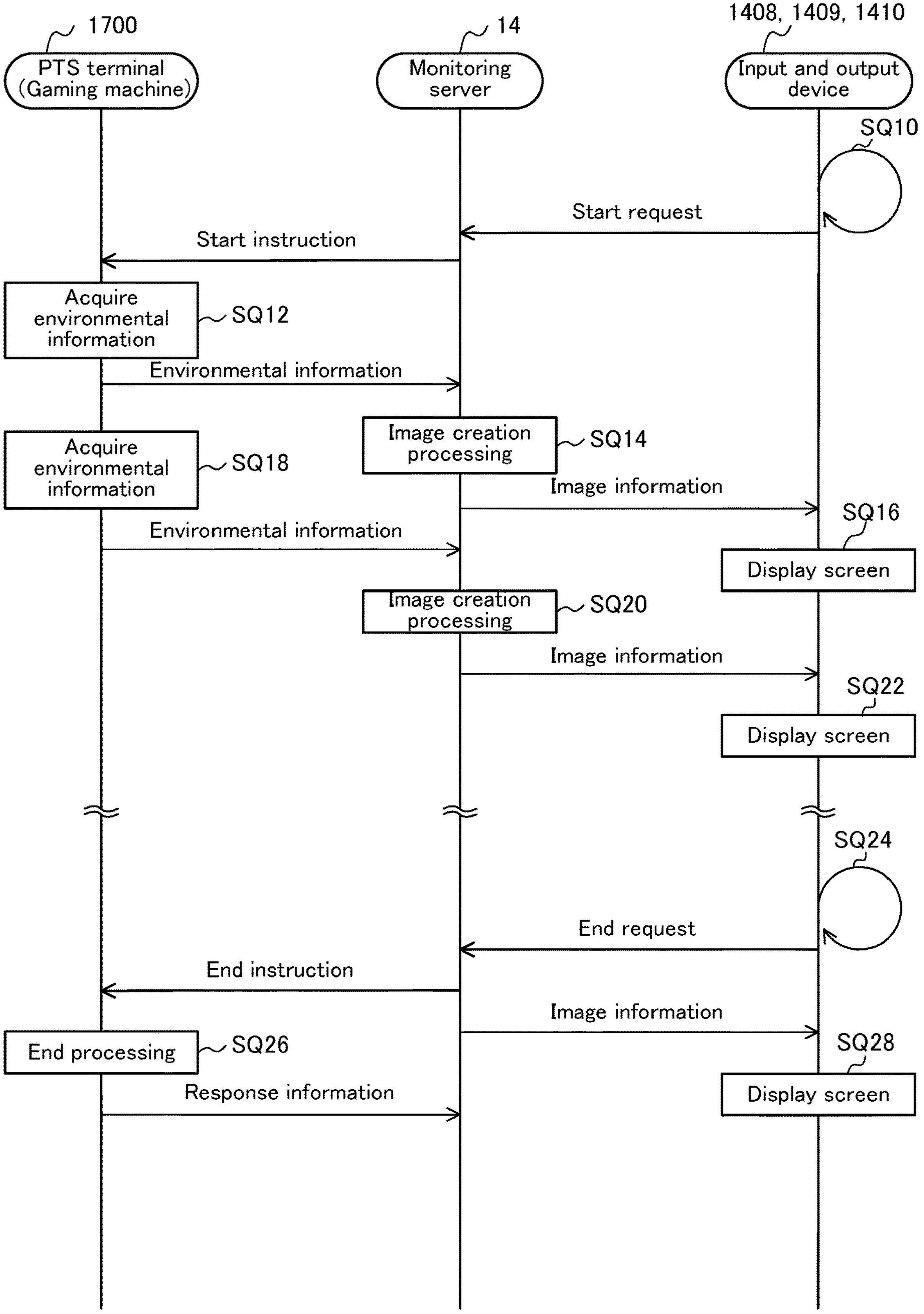
FIG. 29 is a diagram for illustrating a processing sequence of an environment monitoring service in an embodiment of the present invention.

FIG. 29 illustrates an example of a sequence of environment monitoring service. An outline of the environment monitoring service is described with reference to this sequence diagram.

At SQ10, the LCD 1408 displays a main menu screen. In response to selection (user operation) of the environment monitoring menu in the main menu, a start request is sent to to the monitoring server 14. Upon receipt of the start request, the monitoring server 14 sends an instruction (start instruction) for acquiring environmental information to each PTS terminal 1700 (gaming machine). The way to send the start instruction to the PTS terminal 700 can be selected as appropriate, such as unicasting, multicasting, or broadcasting.

Upon receipt of the start instruction, the PTS terminal 1700 acquires environmental information in a predetermined cycle and sends the acquired environmental information to the monitoring server 14 (SQ12, SQ18). The PTS terminal 1700 sends the apparatus identification code of the gaming machine mounting the PTS terminal 1700 together with the environmental information.

The sending the apparatus identification code is not limited to the above-described configuration. For example, the PTS terminal 1700 or the gaming machine can be equipped with a GPS (Global Positioning System) sensor. The PTS terminal 1700 or the gaming machine may calculate positional information based on a signal received from a GPS satellite and send the calculated positional information. Alternatively, the PTS terminal 1700 or the gaming machine may calculate coordinate information of the PTS terminal 1700 or the gaming machine on the floor map from the calculated positional information and send the calculated coordinate information. Still alternatively, the PTS terminal 1700 or the gaming machine can have the coordinate information of the PTS terminal 1700 or the gaming machine on the floor map and send the coordinate information.

Upon receipt of the environmental information, the monitoring server 14 stores the received environmental information to the external storage device 1404 together with the apparatus identification code. The monitoring server 14 holds the environmental information sent from each PTS terminal 1700 for a predetermined time and creates an image (image information) where the environmental information is mapped to the floor map at predetermined intervals (SQ14, SQ20). The monitoring server 14 sends the created image information to the LCD 1408.

Upon receipt of the image information, the LCD 1408 displays a screen (environment monitoring screen) (SQ16, SQ22).

In response to selection (user operation) of an end button in the environment monitoring screen on the LCD 1408, an end request is sent to the monitoring server 14. Upon receipt of the end request, the monitoring server 14 sends an instruction (end instruction) for terminating the acquisition of environmental information to each PTS terminal 1700. The monitoring server 14 further sends an instruction to close the environment monitoring screen (for example, an instruction to display the main menu screen) and image information to the LCD 1408.

Upon receipt of the end instruction, the PTS terminal 1700 performs processing (end processing) to terminate the acquisition of environmental information (SQ26). After completion of the end processing, the PTS terminal 1700 sends response information to the monitoring server 14.

The LCD 1408 receives the image information and displays the main menu screen (SQ28).

It should be noted that the environment monitoring service is not limited to the above-described configuration. For example, the environmental information may be acquired in real time and mapped to the floor map in real time.

[Surveillance Camera Service]

Figure 30:
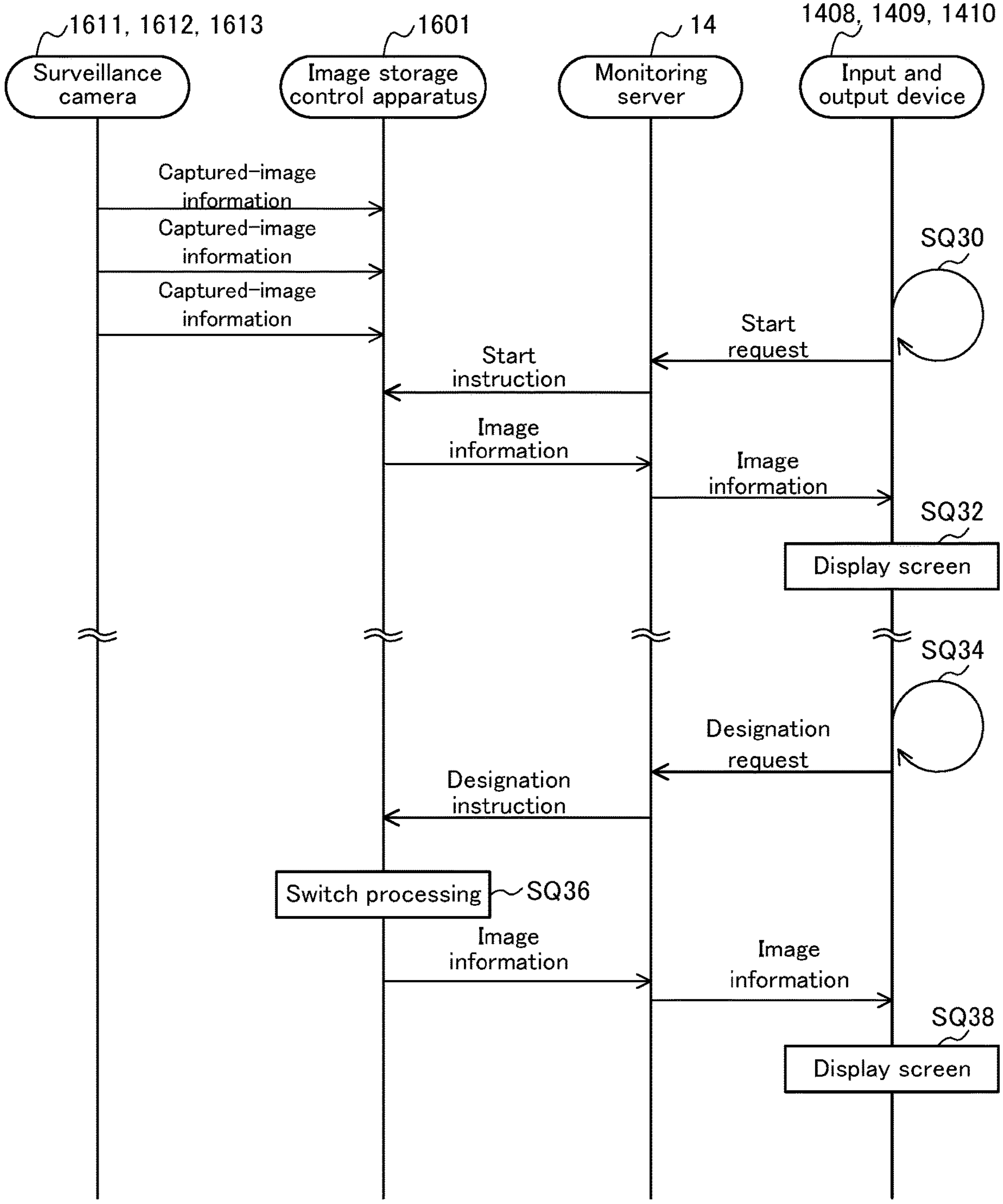
FIG. 30 is a diagram for illustrating a processing sequence of a surveillance camera service in an embodiment of the present invention.

FIG. 30 illustrates an example of a sequence of surveillance camera service. An outline of the environment monitoring service is described with reference to this sequence diagram. The surveillance cameras 1611 to 1613 keep sending image information captured by the surveillance cameras 1611 to 1613 to the image storage control apparatus 1601.

At SQ30, the LCD 1408 displays a main menu screen. In response to selection (user operation) of the surveillance camera menu in the main menu, a start request is sent to the monitoring server 14. Upon receipt of the start request, the monitoring server 14 sends an instruction (start instruction) for acquiring captured-image information to the image storage control apparatus 1601.

Upon receipt of the start instruction, the image storage control apparatus 1601 sends captured-image information of the surveillance cameras 1611 to 1613 by rotation to the monitoring server 14 while changing the information source of surveillance camera at predetermined intervals. The surveillance cameras 1611 to 1613 send their own apparatus identification codes together with the captured-image information.

Upon receipt of the captured-image information, the monitoring server 14 sends the captured-image information to the LCD 1408 as image information.

Upon receipt of the image information, the LCD 1408 displays a screen (surveillance camera screen) (SQ32). In the surveillance camera screen, the displayed images are changed from the images of a surveillance camera to the images of another at predetermined intervals.

Meanwhile, in response to selection of a surveillance camera icon in the surveillance camera screen, a designation request is sent to the monitoring server 14 (SQ34). In this sequence, a signal (such as a coordinate signal or positional signal) for identifying the surveillance camera corresponding to the selected surveillance camera icon is sent from the input controller 1406 connected with the mouse 1410. For example, in the case of the coordinate signal, the monitoring server 14 that has received the coordinate signal identifies the apparatus identification code (or the IP address) of the surveillance camera based on the coordinate signal.

Upon receipt of the designation request, the monitoring server 14 sends an instruction (designation instruction) for acquiring captured-image information of the designated surveillance camera to the image storage control apparatus 1601. The monitoring server 14 sends the apparatus identification code of the designated surveillance camera together with the designation instruction.

Upon receipt of the designation instruction and the apparatus identification code of the surveillance camera, the image storage control apparatus 1601 performs switch processing to switch from sending captured-image information while changing the information source at predetermined intervals to sending captured-image information of the designated surveillance camera (SQ36).

The image storage control apparatus 1601 sends captured-image information of the designated surveillance camera to the monitoring server 14.

Upon receipt of the captured-image information, the monitoring server 14 sends the received captured-image information to the LCD 1408 as image information.

Upon receipt of the image information, the LCD 1408 displays a screen (surveillance camera screen) (SQ38). The surveillance camera screen keeps displaying images captured by the designated surveillance camera until detection of a further user operation.

[Related-Person Indication Service]

Figure 31:
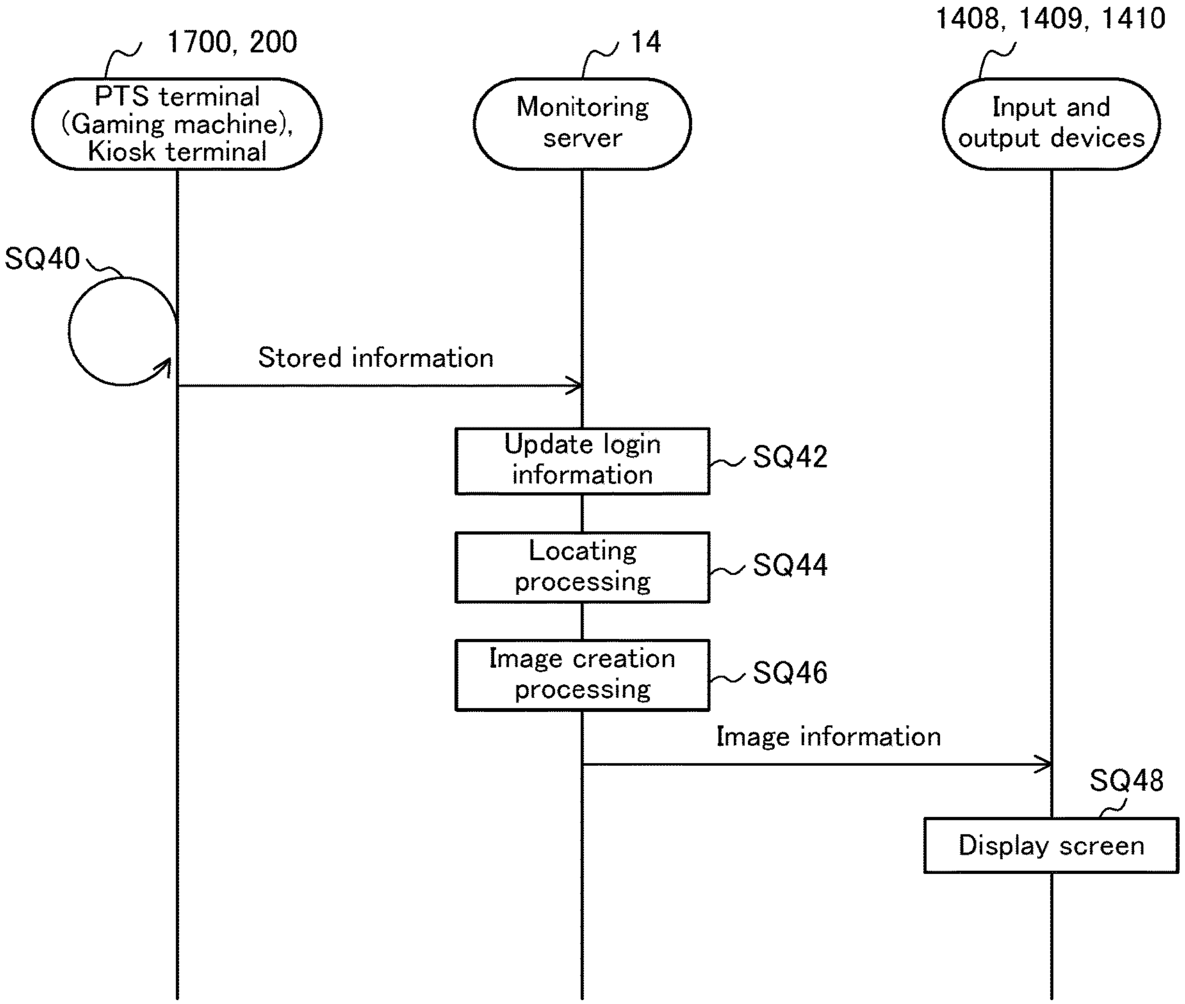
FIG. 31 is a diagram for illustrating a processing sequence of a related-person indication service in an embodiment of the present invention.

FIG. 31 illustrates an example of a sequence of related-person indication service. An outline of the related-person indication service is described with reference to this sequence diagram. This section describes a case where an IC card 1500 is inserted into a PTS terminal 1700 by way of example.

At SQ40, in response to insertion of an IC card 1500, the PTS terminal 1700 retrieves identification information (such as a member identification code or an IC card identification code) for identifying the member from the IC card 1500 and sends the retrieved identification information to the monitoring server 14. The PTS terminal 1700 sends the apparatus identification code of the gaming machine to the monitoring server 14 together with the identification information.

Upon receipt of the identification information, the monitoring server 14 updates the login information (SQ42). More specifically, the monitoring server 14 stores the member identification code to the login management table (the external storage device 1404) together with the apparatus identification code.

Subsequently, the monitoring server 14 performs locating processing (SQ44). Although details thereof will be described later, the monitoring server 14 determines the positions of the member who has logged in and the objects related to the member (such as friends, family, and recommended machines) on the floor map.

Subsequently, the monitoring server 14 creates a floor map (image information) where highlighted icons (member icon and related-person icons) are mapped (arranged) at the positions of the member who has logged in and the objects related to the member (SQ46). The monitoring server 14 sends the created image information to the LCD 1408.

Upon receipt of the image information, the LCD 1408 displays a screen (related-person indication screen) (SQ48).

Although the case of a PTS terminal 1700 has been described by way of example, the same applies to a kiosk terminal 200; the description is omitted herein.

[Apparatus Status Indication Service]

Figure 32:
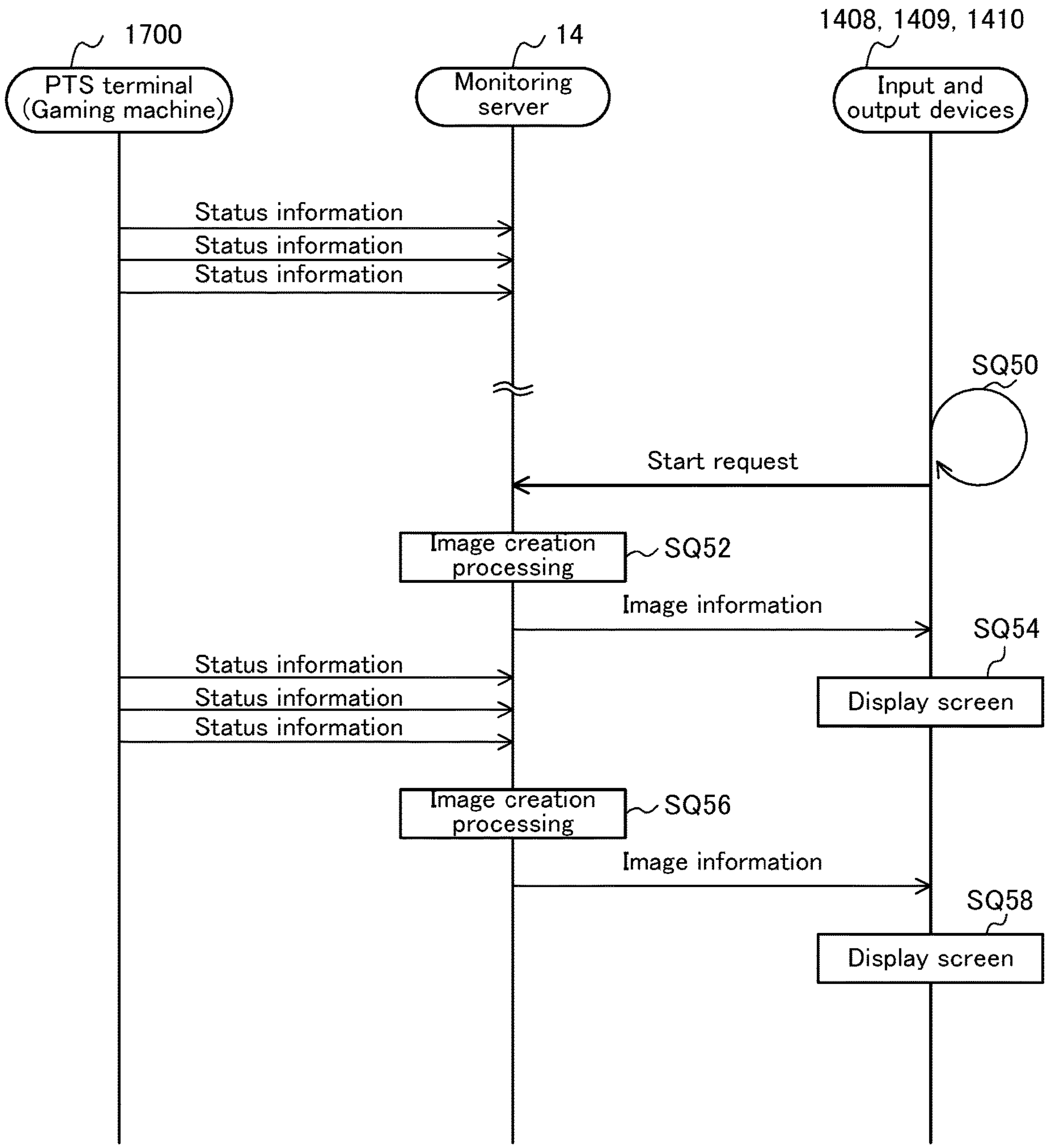
FIG. 32 is a diagram for illustrating a processing sequence of an apparatus status indication service in an embodiment of the present invention.

FIG. 32 illustrates an example of a sequence of apparatus status indication service. An outline of the apparatus status indication service is described with reference to this sequence diagram. The PTS terminals 1700 of the gaming machines keep sending status information indicating the status (condition) of the gaming machine to the monitoring server 14.

At SQ50, the LCD 1408 displays the main menu screen. In response to selection (user operation) of the apparatus status indication menu in the main menu, a start request is sent to the monitoring server 14. Upon receipt of the start request, the monitoring server 14 acquires apparatus statuses of the individual apparatuses based on the address management table and creates a floor map (image information) indicating the apparatus statuses at predetermined intervals (SQ52, SQ56). The monitoring server 14 sends the created image information to the LCD 1408.

Upon receipt of the image information, the LCD 1408 displays a screen (apparatus status indication screen) (SQ54, SQ58).

It should be noted that the apparatus status indication service is not limited to the above-described configuration. For example, the status information may be mapped to the floor map in real time.

[Communication Status Indication Service]

This section describes communication status indication service using an example of a VoIP call from a member having an identification code 0001 to a member having an identification code 0007 (substantially, a VoIP call between the gaming machine GM-2 and the gaming machine GM-9).

Figure 33:
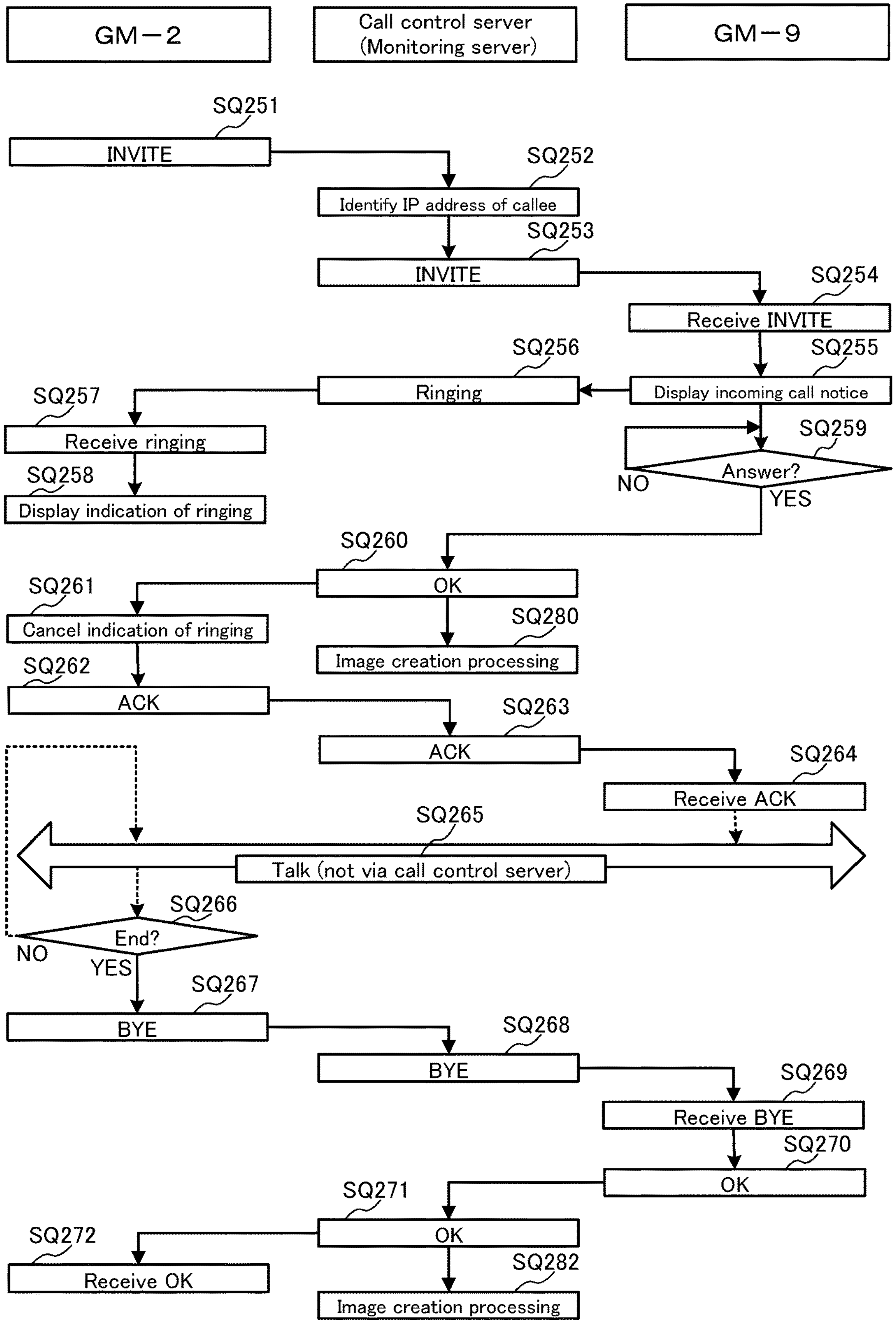
FIG. 33 is a diagram for illustrating a processing sequence of a communication status indication service in an embodiment of the present invention.

FIG. 33 illustrates a control procedure for making a VoIP call between the gaming machine GM-2 and the gaming machine GM-9. FIG. 33 shows the processing by the gaming machine GM-2, the call control server 16, the gaming machine GM-9, and the monitoring server 14 separately. The VoIP phone system can employ various protocols such as SIP (Session Initiation Protocol) and H.323; this section describes a procedure using SIP by way of example. In the case of using SIP, the call control server is called a SIP server.

In advance of description of FIG. 33, registration processing to be performed independently from the VoIP call control is described. Each gaming machine sends its own URI or phone number together with its IP address to the call control server 16 as needed. This example uses the identification code acquired from a membership card for the URI or phone number as a matter of convenience. Accordingly, the call control server 16 has the address management table shown in FIG. 24 and the login management table shown in FIG. 25 and can grasp which gaming machine (the PTS terminal 1700 of a slot machine 1010) at an IP address is being used by which member of an identification code in real time. If a player changes the slot machine 1010 to use, the information in the tables changes accordingly. It should be noted that, although the address management table includes apparatus identifiers of the gaming machines, they are merely for convenience of explanation and unnecessary in actual call control.

In the sequence of FIG. 33, when the member of the identification code 0001 initiates a VoIP call from the gaming machine GM-2 with which the member is playing games to the member of the identification code 0007, who is registered as a friend, the gaming machine GM-2 sends a call request (INVITE) to the call control server 16 (SQ251). The INVITE message from the gaming machine GM-2 includes the identification code of the callee, 0007.

The caller or the member of the identification code 0001 does not need to be conscious of which slot machine 1010 the callee is using or which IP address the slot machine 1010 is using. However, as will be described later, the member who is making a call knows who of the friends are playing games with slot machines 1010 and available to answer a VoIP call.

Upon receipt of this INVITE message, the call control server 16 identifies the IP address of the slot machine 1010 being used by the callee or the member of the identification code 0007 (SQ252). The call control server 16 identifies the IP address by consulting the address management table in FIG. 24 and the login management table in FIG. 25 with the identification code included in the INVITE message. In this example, the IP address of the slot machine 1100 being used by the callee or the member of the identification code 0007 is identified as "192.168.52.48" with the address management table.

The call control server 16 sends the INVITE message to the slot machine 1010 (the gaming machine GM-9 as of this moment) at the identified IP address (SQ253). Upon receipt of the INVITE message (SQ254), the gaming machine GM-9 displays an incoming call notice indicating that a VoIP call is coming in on the LCD 1719 of the PTS terminal 1700 (SQ255). In addition to displaying the incoming call notice, the gaming machine GM-9 can output a ring alert from the speakers 1707 and 1709 of the PTS terminal 1700.

Subsequently, upon receipt of a signal indicating ringing from the gaming machine GM-9, the call control server 16 sends this signal to the gaming machine GM-2 (SQ256). Upon receipt of this ringing signal (SQ257), the gaming machine GM-2 displays indication of ringing the callee on the LCD 1719 of the PTS terminal 1700 of the gaming machine GM-2 (SQ258).

The gaming machine GM-9 keeps the indication of the ringing until the call is answered (NO at SQ259). The answering the call is performed by, for example, touching the answer button in the incoming call notice displayed on the LCD 1719 by the player of the gaming machine GM-9. Upon detection of answering the incoming call at the gaming machine GM-9 (YES at SQ259), the call control server 16 sends a signal indicating that the call is successful (OK) (SQ260) to the gaming machine GM-2 and the monitoring server 14. In the configuration where a separate monitoring server 14 is provided, the call control server 16 sends the apparatus identification codes of the caller and the callee to the monitoring server 14.

The call control server 16 finds the positions of the caller machine and the callee machine on the floor map by consulting the address management table in FIG. 24 based on the apparatus identification codes of the caller and the callee and performs image creation processing to create an image of a floor map showing these gaming machines are communicating with each other (for example, a floor map showing machine icons connected with a line) (SQ280).

Figure 50:
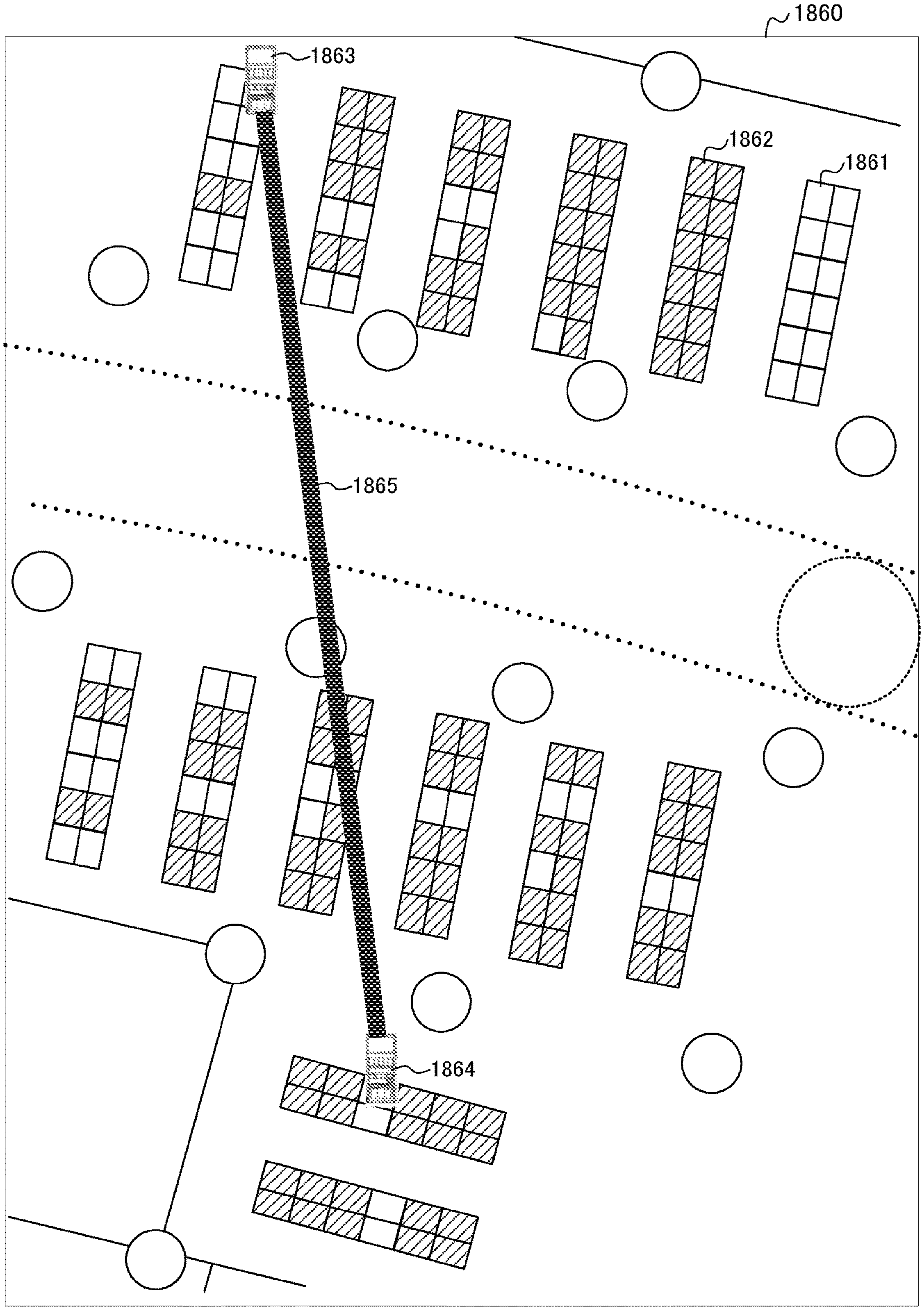
FIG. 50 is a diagram for illustrating a part of a communication status indication screen in an embodiment of the present invention.

Upon completion of the image creation processing, the call control server 16 sends the created image information to the LCD 1408. The LCD 1408 displays a floor map showing that the gaming machines are communicating with each other. On the floor map of the gaming hall, a machine icon is displayed at the position of the gaming machine GM-2 and another machine icon is displayed at the position of the gaming machine GM-9, and a line connecting these machine icons is displayed, as shown in FIG. 50.

It should be noted that, although an example where the processing of SQ280 is performed with the processing of SQ260 has been provided, the configuration is not limited to this. The processing of SQ280 can be performed any time after SQ260; for example, the processing of SQ280 may be performed with the processing of SQ263.

Upon receipt of the OK message indicating that the call is successful, the gaming machine GM-2 cancels the indication of ringing (SQ261) and sends an acknowledgment signal (ACK) (SQ262). Upon receipt of this ACK message, the call control server 16 forwards this ACK message to the gaming machine GM-9 (SQ263).

When the gaming machine GM-9 receives the ACK message (SQ264), a session is established between the gaming machines GM-2 and GM-9 so that talk becomes available therebetween (SQ265, NO at SQ266). Since the gaming machines GM-2 and GM-9 are connected directly with each other, the call control server 16 does not mediate the talk.

Upon end of the talk (assuming that the talk is terminated at the gaming machine GM-2 in this example) (YES at SQ266), the gaming machine GM-2 sends a session completion notice (BYE) to the call control server 16 (SQ267), and the call control server 16 forwards this BYE message to the gaming machine GM-9 (SQ268). Upon receipt of the BYE message (SQ269), the gaming machine GM-9 sends an admission notice (OK) to the call control server 16 (SQ270). Upon receipt of the OK message, the call control server 16 forwards the OK message to the gaming machine GM-2 (SQ271) and the gaming machine GM-2 receives the OK message (SQ272). The series of session is terminated and the call is completed.

In the case where a monitoring server 14 is provided separately, the call control server 16 sends a BYE message to the monitoring server 14 upon receipt of the OK message at SQ271.

The call control server 16 performs image creation processing to create an image of a floor map showing the gaming machines are not in communication (for example, a floor map showing neither the machine icons nor the line connecting the machine icons) (SQ282).

Upon completion of the image creation processing, the call control server 16 sends the created image information to the LCD 1408. The LCD 1408 displays a floor map showing that the gaming machines are not in communication.

The above-described VoIP call control procedure is merely an example; call control is performed in various procedures depending on the employed protocol. Although this example has described communication between gaming machines (slot machines 1010), communication between a slot machine 1010 and a kiosk terminal 200 and communication between kiosk terminals 200 are also available.

In the slot machines 1010, the voice to be heard is provided to one player through the speakers 1707 and 1709 or a headphone connected with the audio terminal 1738 and the spoken voice is provided to the other player through the microphones 1715 and 1717 or a microphone connected with the audio terminal 1738.

In the kiosk terminals 200, voice is input and output with the microphone 234 and the speaker 235 included in the receiver 207. The voice to be heard is provided to the user through the speaker 235 and the spoken voice is provided to the other party through the microphone 234.

[Description of Program to be Executed in Monitoring Server]

Next, with reference to FIGS. 34 to 44, processing (a program) performed by the monitoring server 14 is described.

Figure 34:
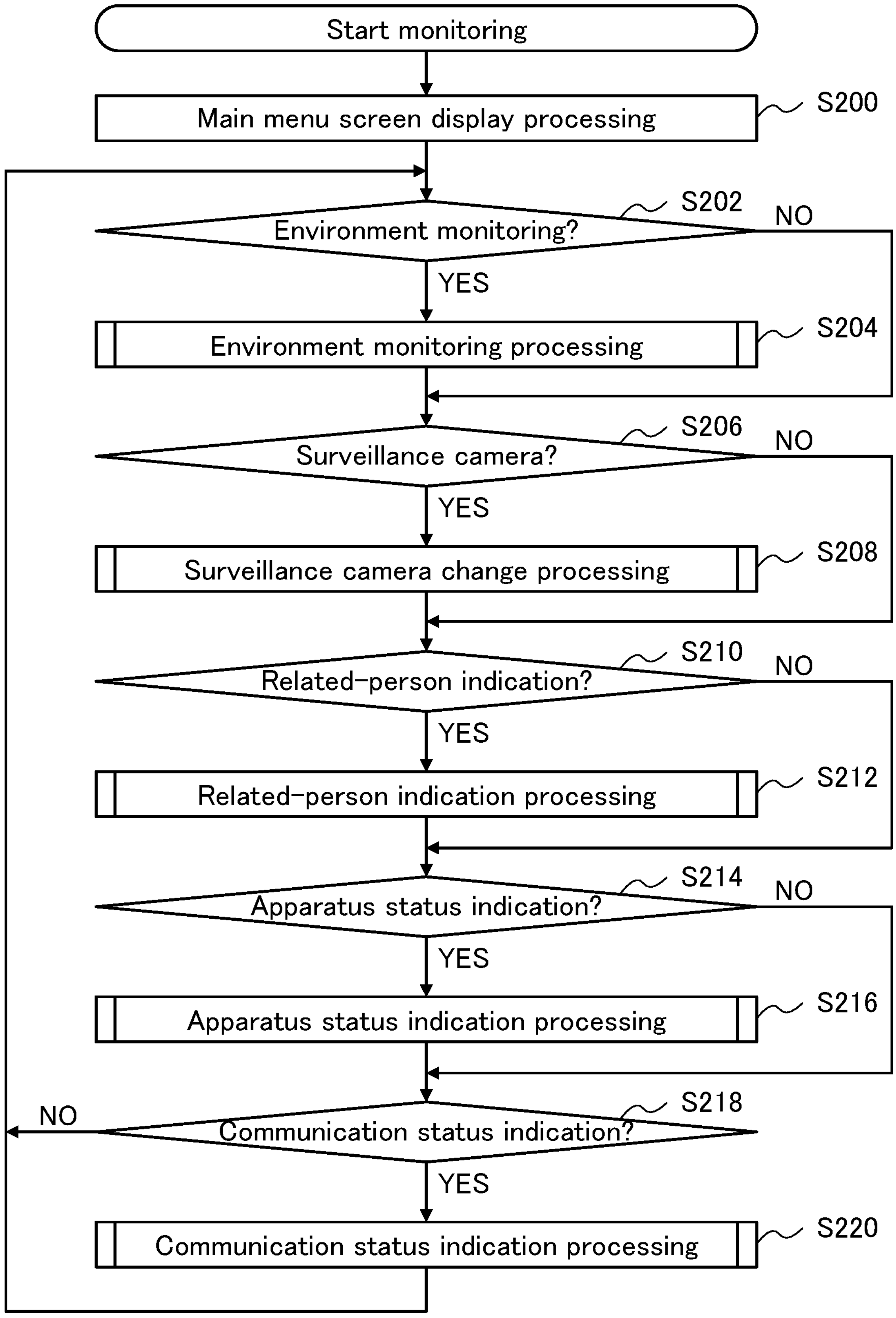
FIG. 34 is a flowchart for illustrating a procedure of monitoring processing of a monitoring server in an embodiment of the present invention.

FIG. 34 is an example of a flowchart of monitoring processing. At S200, the CPU 1401 performs main menu screen display processing. More specifically, the CPU 1401 outputs an instruction to display a main menu screen on the LCD 1408 to the graphic board 1405. The graphic board 1405 creates image information for the main menu screen and outputs the image information to the LCD 1408. The LCD 1408 displays a main menu screen based on the received image information.

At S202, the CPU 1401 determines whether the environment monitoring menu is selected by a user operation. More specifically, the CPU 1401 determines whether a signal indicating selection of the environment monitoring menu is received from the input control unit 1406. If the determination is that the environment monitoring menu is selected, the CPU 1401 proceeds to S204; if the determination is that the environment monitoring menu is not selected, the CPU 1401 proceeds to S206.

At S204, the CPU 1401 conducts environment monitoring processing and proceeds to S206. In the environment monitoring processing, environmental information acquired by the PTS terminals 1700 is reflected to the floor map and displayed on the LCD 1408. The details of this processing will be described later.

At S206, the CPU 1401 determines whether the surveillance camera menu is selected by a user operation. More specifically, the CPU 1401 determines whether a signal indicating selection of the surveillance camera menu is received from the input control unit 1406. If the determination is that the surveillance camera menu is selected, the CPU 1401 proceeds to S208; if the determination is that the surveillance camera menu is not selected, the CPU 1401 proceeds to S210.

At S208, the CPU 1401 conducts surveillance camera change processing and proceeds to S210. In the surveillance camera change processing, the CPU 141 displays images from the surveillance cameras 1611 to 1613 on the LCD 1408 while changing the image source among the surveillance cameras 1611 to 1613 at predetermined intervals or displays images of the surveillance camera designated by a user operation. The details of this processing will be described later.

At S210, the CPU 1401 determines whether the related-person indication menu is selected by a user operation. More specifically, the CPU 1401 determines whether a signal indicating selection of the related-person indication menu is received from the input control unit 1406. If the determination is that the related-person indication menu is selected, the CPU 1401 proceeds to S212; if the determination is that the related-person indication menu is not selected, the CPU 1401 proceeds to S214.

At S212, the CPU 1401 conducts related-person indication processing and proceeds to S214. In the related-person indication processing, a member is associated with his/her related persons on the floor map and displayed on the LCD 1408. The details of this processing will be described later.

At S214, the CPU 1401 determines whether the apparatus status indication menu is selected by a user operation. More specifically, the CPU 1401 determines whether a signal indicating selection of the apparatus status indication menu is received from the input control unit 1406. If the determination is that the apparatus status indication menu is selected, the CPU 1401 proceeds to S216; if the determination is that the apparatus status indication menu is not selected, the CPU 1401 proceeds to S218.

At S216, the CPU 1401 conducts apparatus status indication processing and proceeds to S218. In the apparatus status indication processing, the statuses of the apparatuses including the gaming machines are reflected to the floor map and displayed on the LCD 1408. The details of this processing will be described later.

At S218, the CPU 1401 determines whether the communication status indication menu is selected by a user operation. More specifically, the CPU 1401 determines whether a signal indicating selection of the communication status indication menu is received from the input control unit 1406. If the determination is that the communication status indication menu is selected, the CPU 1401 proceeds to S220; if the determination is that the communication status indication menu is not selected, the CPU 1401 proceeds to S202.

At S220, the CPU 1401 conducts communication status indication processing and proceeds to S202. In the communication status indication processing, the apparatuses in communication are reflected to the floor map in an identifiable manner and displayed on the LCD 1408. The details of this processing will be described later.

Figure 35:
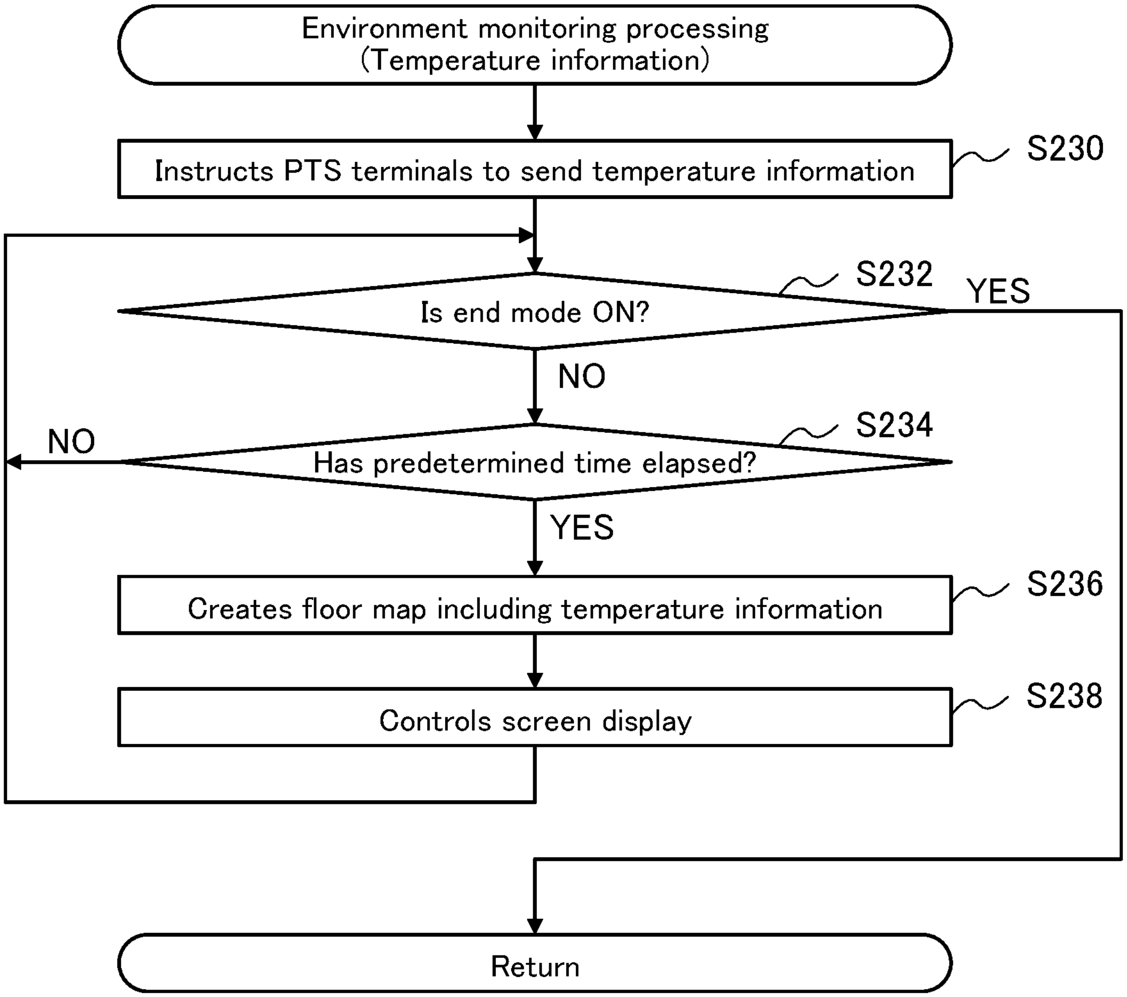
FIG. 35 is a flowchart for illustrating a procedure of environment monitoring processing of a monitoring server in an embodiment of the present invention.

FIG. 35 is an example of a flowchart of environment monitoring processing. The example of the environment monitoring processing described in this section acquires temperature information for environmental information.

At S230, the CPU 1401 instructs all PTS terminals 1700 available for communication to send temperature information. Upon completion of this processing, the CPU 1401 proceeds to S232.

At S232, the CPU 1401 determines whether the end mode is ON. If the determination is that the end mode is ON, the CPU 1401 exits the environment monitoring processing; if the determination is that the end mode is OFF, the CPU 1401 proceeds to S234.

At S234, the CPU 1401 determines whether a predetermined time (for example, one minute) has elapsed. If the determination is that the predetermined time has elapsed, the CPU 1401 proceeds to S236; if the determination is that the predetermined time has not elapsed, the CPU 1401 proceeds to S232.

At S236, the CPU 1401 creates a floor map (image information) including the temperature information. More specifically, the CPU 1401 retrieves temperature information stored with individual apparatus identification codes from the external storage device 1404. The CPU 1401 identifies coordinate data associated with the apparatus identification codes with reference to the address management table. The CPU 1401 determines the positions on the floor map based on the coordinate data and creates a floor map in which the temperature information is mapped (a floor map including icons representing the temperature information at the determined positions). Upon completion of this processing, the CPU 1401 proceeds to S238.

At S238, the CPU 1401 conducts screen display control. More specifically, the CPU 1401 outputs an instruction to display the floor map including the temperature information on the LCD 1408 to the graphic board 1405. Upon completion of this processing, the CPU 1401 proceeds to S232.

The above-described environment monitoring processing collectively processes temperature information received in a predetermined period. This configuration enables adjustment of the number of times of processing by changing the length of the predetermined time, independently from the number of PTS terminals 1700 (gaming machines) installed on the floor. Even if a large number of PTS terminals 1700 (gaming machines) are installed on a floor like in a casino, the screen can be displayed smoothly.

The environment monitoring processing is not limited to the above-described configuration. For example, S234 may be omitted to reflect the temperature information to the floor map in real time. In this case, the CPU 1401 outputs an instruction to display only the differential information to the graphic board 1405. Since a casino floor includes a large number of PTS terminals 1700 (gaming machines), this configuration enables real-time collection of temperature information at the large number of place, allowing more accurate grasp of the gaming environment.

In addition to or instead of the temperature information, the environment monitoring processing may create a floor map including odor information. For example, odor sensors may be provided to detect the odor components in the air and the CPU 1401 maps the odor information to the floor map in a first manner when determining that the amount of the odor components in the room is more than a predetermined amount and in a second manner when determining that the amount of the odor components in the room is less than the predetermined amount.

This configuration facilitates grasping distribution of the odor through the floor map. For example, when some place containing odor components more than the predetermined amount is detected, the shop can adjust the air conditioning or send a staff quickly to address the problem.

The levels of the amount are not limited to two levels of high and low; the levels may be classified as three or more. As a result, more accurate odor distribution can be grasped.

The environment monitoring processing may create a floor map including information on the level of carbon dioxide in addition to or instead of the temperature information. For example, carbon dioxide meters may be provided to measure the level of carbon dioxide in the air and the CPU 1401 maps the information on the level of carbon dioxide to the floor map in a first manner when determining that the level of the carbon dioxide in the room is higher than a predetermined level and in a second manner when determining that the level of the carbon dioxide in the room is lower than the predetermined level.

This configuration facilitates grasping distribution of the levels of the carbon dioxide through the floor map. For example, when some place containing a higher level of carbon dioxide than the predetermined level is detected, the shop can address the problem to remedy the room environment by ventilation or other means.

The levels of the carbon oxide are not limited to two levels of high and low; the levels may be classified as three or more. As a result, more accurate carbon dioxide levels can be grasped.

In addition to the foregoing, other environmental information can be mapped to the floor map.

Figure 36:
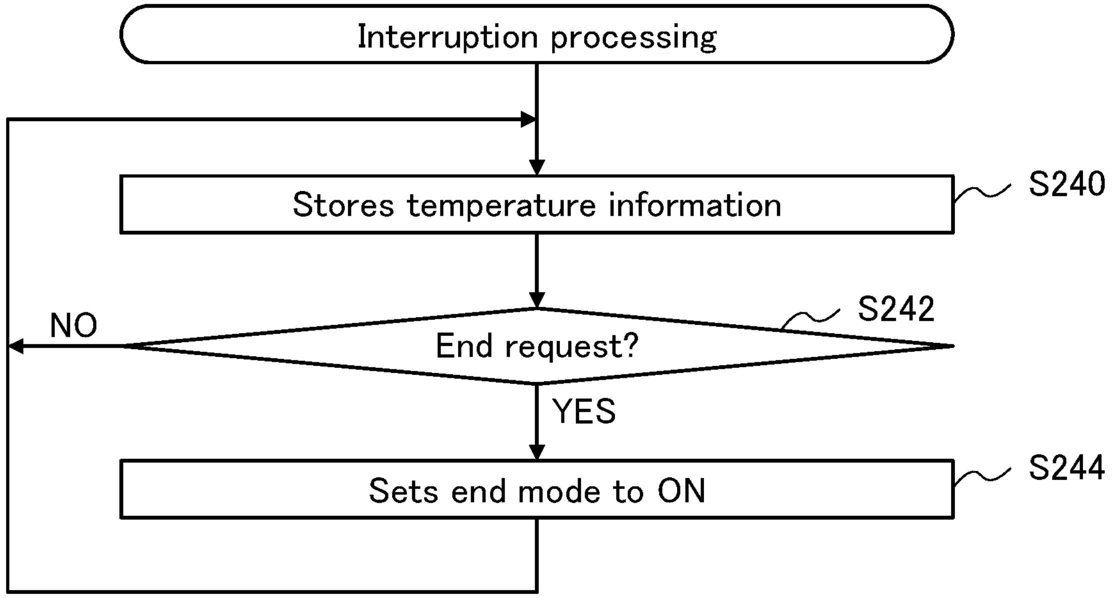
FIG. 36 is a flowchart for illustrating a procedure of interruption processing of a monitoring server in an embodiment of the present invention.

FIG. 36 is an example of a flowchart of interruption processing. The CPU 1401 conducts this interruption processing while executing environment monitoring processing.

At S240, the CPU 1401 stores temperature information. More specifically, upon receipt of temperature information and the apparatus identification code from a PTS terminal 1700, the CPU 1401 stores the temperature information to the external storage device 1404 together with the apparatus identification code. Upon completion of this processing, the CPU 1401 proceeds to S242.

At S242, the CPU 1401 determines whether an end request is received. More specifically, the CPU 1401 determines whether a signal indicating a press of the end button on the environment monitoring screen is received from the input control unit 1406. If the determination is that an end request is received, the CPU 1401 proceeds to S224; if the determination is that no end request is received, the CPU 1401 proceeds to S240.

At S244, the CPU 1401 sets the end mode to ON and proceeds to S240.

Figure 37:
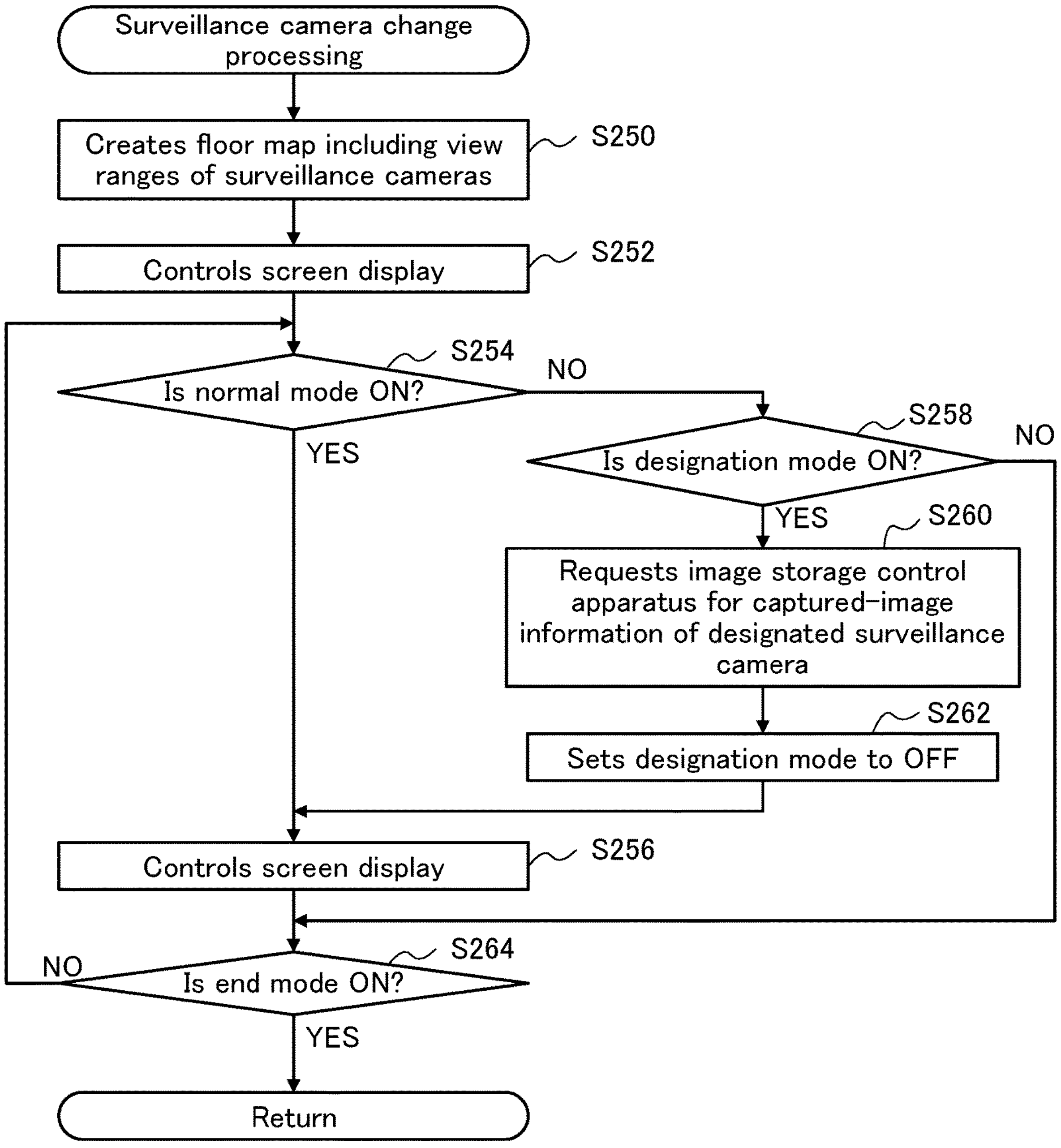
FIG. 37 is a flowchart for illustrating a procedure of surveillance camera switch processing of a monitoring server in an embodiment of the present invention.

FIG. 37 is an example of a flowchart of surveillance camera change processing.

At S250, the CPU 1401 creates a floor map showing the view ranges of the surveillance cameras 1611 to 1613. Upon completion of this processing, the CPU 1401 proceeds to S252.

The view range of each surveillance camera is preparatorily mapped (registered) in the floor map. The view range can be registered to the floor map manually or automatically. Manually means that an operator sets the view range of each surveillance camera to the floor map and automatically means that, based on markers provided at various spots on the floor, a computer analyzes the images captured by each surveillance camera to set the view range onto the floor map.

At S252, the CPU 1401 conducts screen display control. More specifically, the CPU 1401 outputs an instruction to display the floor map showing the view ranges of the surveillance cameras 1611 to 1613 on the LCD 1408 to the graphic board 1405. Upon completion of this processing, the CPU 1401 proceeds to S254.

At S254, the CPU 1401 determines whether the normal mode is ON. If the determination is that the normal mode is ON, the CPU 1401 proceeds to S256; if the determination is that the normal mode is OFF, the CPU 1401 proceeds to S258.

At S256, the CPU 1401 conducts screen display control. More specifically, the CPU 1401 outputs an instruction to display a surveillance camera screen showing the captured-image information stored in the external storage device 1404 on the LCD 1408 to the graphic board 1405. Upon completion of this processing, the CPU 1401 proceeds to S264.

At S258, the CPU 1401 determines whether the designation mode is ON. If the determination is that the designation mode is ON, the CPU 1401 proceeds to S260; if the determination is that the designation mode is OFF, the CPU 1401 proceeds to S264.

At S260, the CPU 1401 requests the image storage control apparatus 1601 for captured-image information of the designated surveillance camera (by sending a designation instruction). Upon completion of this processing, the CPU 1401 proceeds to S262.

At S262, the CPU 1401 sets the designation mode to OFF and proceeds to S256.

At S264, the CPU 1401 determines whether the end mode is ON. If the determination is that the end mode is ON, the CPU 1401 exits the surveillance camera change processing; if the determination is that the end mode is OFF, the CPU 1401 proceeds to S254.

The surveillance camera change processing is not limited to the above-described configuration.

For example, the processing of S250 may include icons representing the optical axes of the surveillance cameras in the floor map. Arranging the surveillance cameras to be able to change the orientation in accordance with a user operation of the optical axis icon enables captured-image information at a desired angle to be acquired easily.

Meanwhile, the processing of S250 may include only the optical axis icon of a designated surveillance camera. Such a configuration eliminates a large number of optical axis icons from disturbing reading the floor map.

Figure 38:
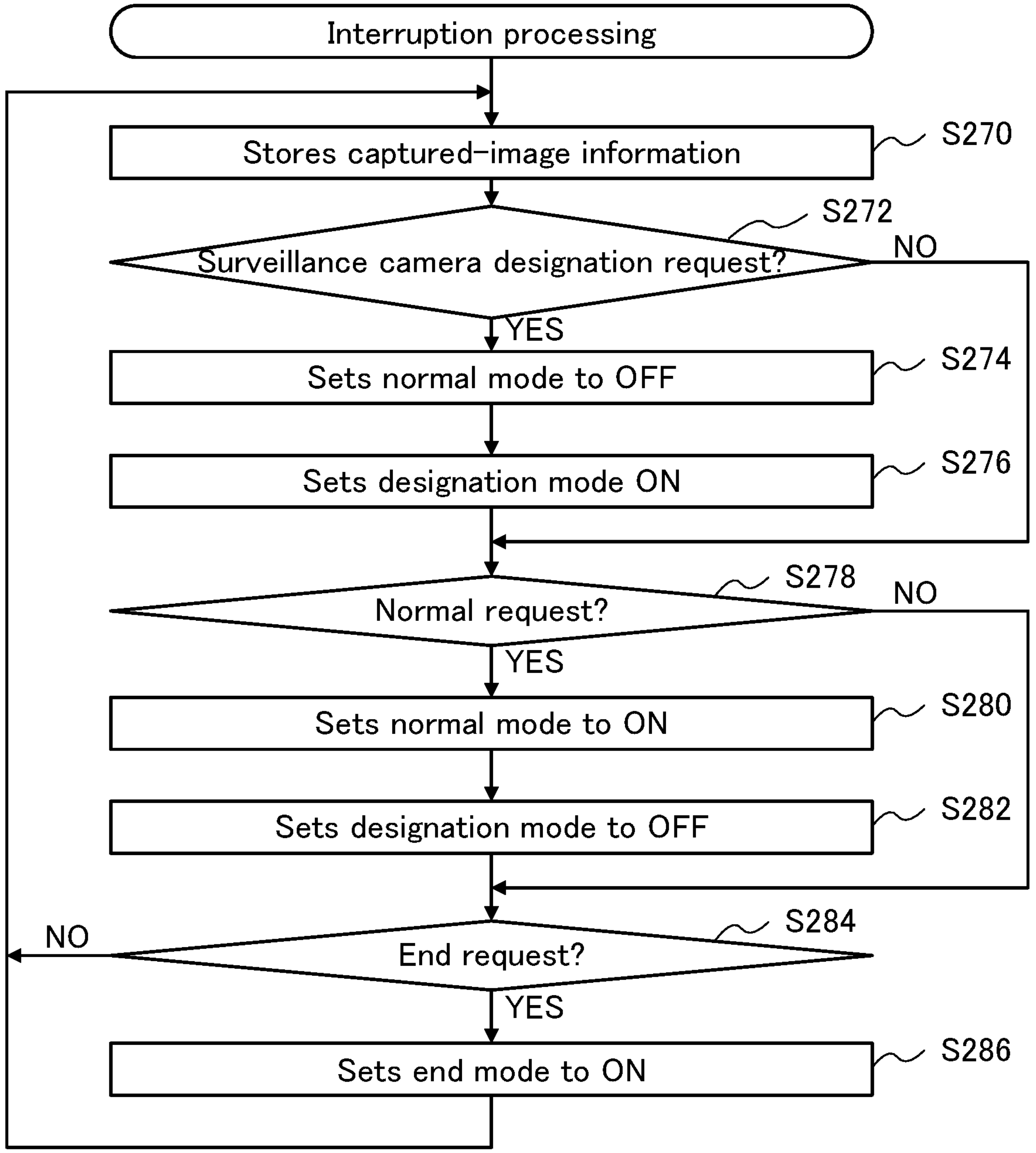
FIG. 38 is a flowchart for illustrating a procedure of interruption processing of a monitoring server in an embodiment of the present invention.

FIG. 38 is an example of a flowchart of interruption processing. The CPU 1401 conducts this interruption processing while executing surveillance camera change processing.

At S270, the CPU 1401 stores captured-image information. More specifically, upon receipt of captured-image information and an apparatus identification code from the image storage control apparatus 1601, the CPU 1401 stores the captured-image information to the external storage device 1404 together with the apparatus identification code. Upon completion of this processing, the CPU 1401 proceeds to S272.

At S272, the CPU 1401 determines whether a surveillance camera designation request is received. More specifically, the CPU 1401 determines whether a signal indicating a press of a surveillance camera icon on the surveillance camera screen is received from the input control unit 1406. If the determination is that a surveillance camera designation request is received, the CPU 1401 proceeds to S274; if the determination is that no surveillance camera designation request is received, the CPU 1401 proceeds to S278.

At S274, the CPU 1401 sets the normal mode to OFF and proceeds to S276.

At S276, the CPU 1401 sets the designation mode to ON and proceeds to S278.

At S278, the CPU 1401 determines whether a normal request is received. More specifically, the CPU 1401 determines whether a signal indicating a press of an AUTOMATIC CHANGE button on the surveillance camera screen is received from the input control unit 1406. If the determination is that a normal request is received, the CPU 1401 proceeds to S280; if the determination is that no normal request is received, the CPU 1401 proceeds to S284.

At S280, the CPU 1401 sets the normal mode to ON and proceeds to S282.

At S282, the CPU 1401 sets the designation mode to OFF and proceeds to S284.

At S284, the CPU 1401 determines whether an end request is received. More specifically, the CPU 1401 determines whether a signal indicating a press of the end button on the surveillance camera screen is received from the input control unit 1406. If the determination is that an end request is received, the CPU 1401 proceeds to S286; if the determination is that no end request is received, the CPU 1401 proceeds to S270.

At S286, the CPU 1401 sets the end mode to ON and proceeds to S270.

Figure 39:
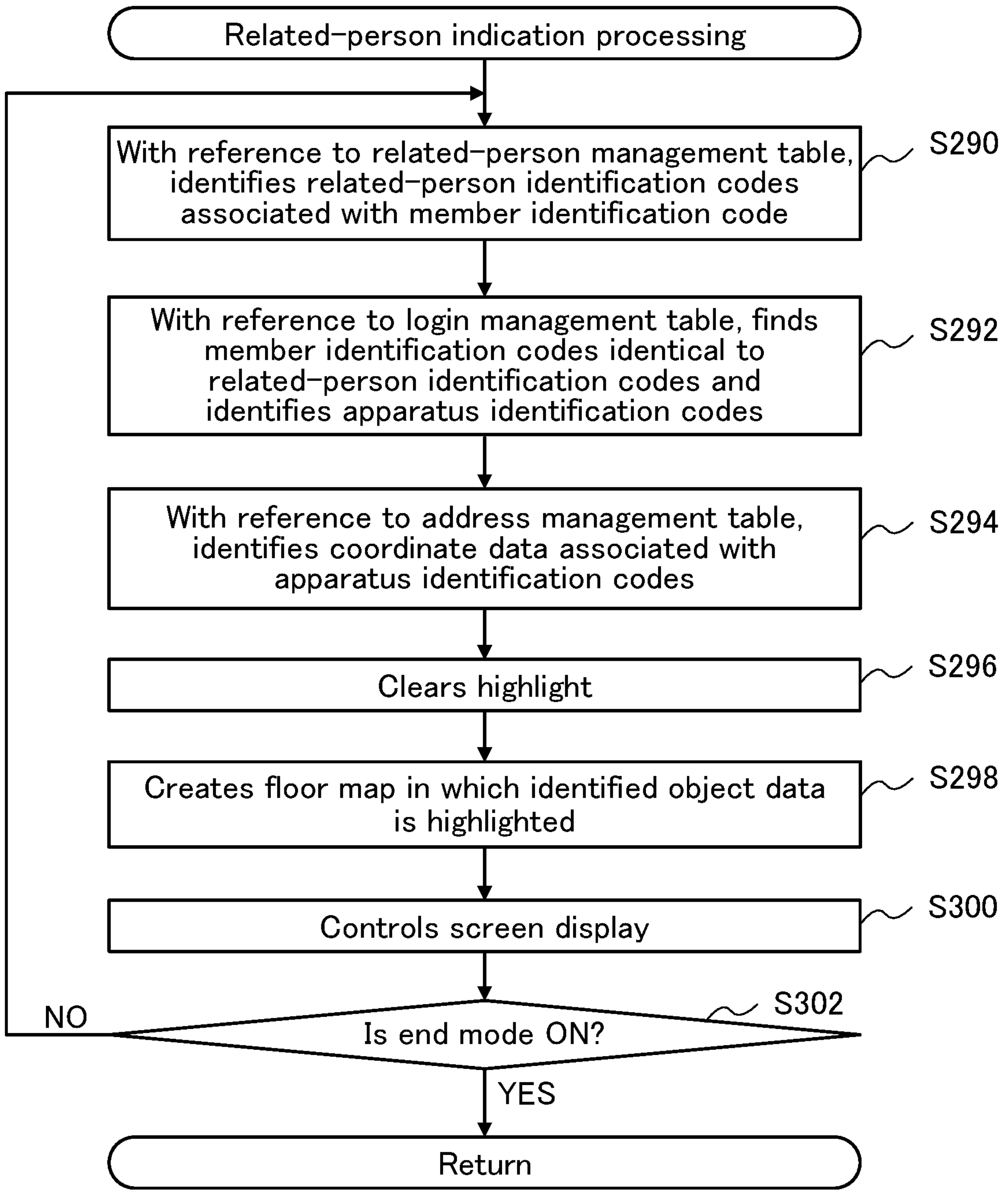
FIG. 39 is a flowchart for illustrating a procedure of related-person indication processing of a monitoring server in an embodiment of the present invention.

FIG. 39 is an example of a flowchart of related-person indication processing.

At S290, the CPU 1401 identifies related-person identification codes associated with a member identification code with reference to the related-person management table. For example, for the member identification code 0002, the CPU 1401 acquires related-person identification codes 0001, 0003, and 0008 based on the related-person management table (FIG. 23). Upon completion of this processing, the CPU 1401 proceeds to S292.

At S292, the CPU 1401 finds the member identification codes identical to the related-person identification codes and identifies apparatus identification codes with reference to the login management table. For example, the CPU 1401 acquires apparatus identification codes 0003, 0006, and 0010 based on the member identification codes 0001, 0003, and 0008 identical to the related-person identification codes 0001, 0003, and 0008 with reference to the login management table (FIG. 25). Upon completion of this processing, the CPU 1401 proceeds to S294.

At S294, the CPU 1401 identifies object data and coordinate data associated with the apparatus identification codes with reference to the address management table. For example, the CPU 1401 acquires coordinate data (x3, y3), (x6, y6), and (x10, y10) for the apparatus identification codes 0003, 0006, and 0010 based on the address management table (FIG. 24). Upon completion of this processing, the CPU 1401 proceeds to S296.

At S296, the CPU 1401 cancels highlighting the objects that has been applied since the previous processing (at the login of the last member). Upon completion of this processing, the CPU 1401 proceeds to S298.

At S298, the CPU 1401 creates a floor map showing highlighted icons of the predetermined object data (such as a figure of human). Upon completion of this processing, the CPU 1401 proceeds to S300. The object data may be specified differently for individual members in the member management table.

The highlighted icons can take various appearances. For example, the icon of the member who has logged in and the icons of the related persons may be blinked. Alternatively, the icons may be displayed in different colors; for example, the icon of the member may be displayed in the first color (for example, red), the icons of the related persons may be displayed in the second color (for example, blue), and the icons of the other persons may be displayed in the third color (for example, black). Still alternatively, the icons of the member and the related persons may be displayed larger than the icons of the other persons.

At S300, the CPU 1401 conducts screen display control. More specifically, the CPU 1401 outputs an instruction to display the floor map in which highlighted icons of the member who has logged in and the related persons are mapped on the LCD 1408 to the graphic board 1405. Upon completion of this processing, the CPU 1401 proceeds to S302.

At S302, the CPU 1401 determines whether the end mode is ON. If the determination is that the end mode is ON, the CPU 1401 terminates the related-person indication processing; if the determination is that the end mode is OFF, the CPU 1401 proceeds to S290.

The related-person indication processing is not limited to the above-described configuration.

For example, prior to S290, the CPU 1401 may create a floor map showing the apparatuses of the members currently logged in distinguishably from the other apparatuses. This configuration enables grasp of the occupancy at a glance of the floor map.

For another example, the member management table may be configured to include information (such as apparatus codes) on recommended machines and at S298, the CPU 1401 may include highlighted icons of the recommended gaming machines. The information on the recommended machines may be registered manually or otherwise, may be registered automatically depending on the behavioral history of the member such as the total number of played games, the average number of played games, the number of bet credits, the number of paid credits, and/or the number of times of winning a jackpot.

Figure 40:
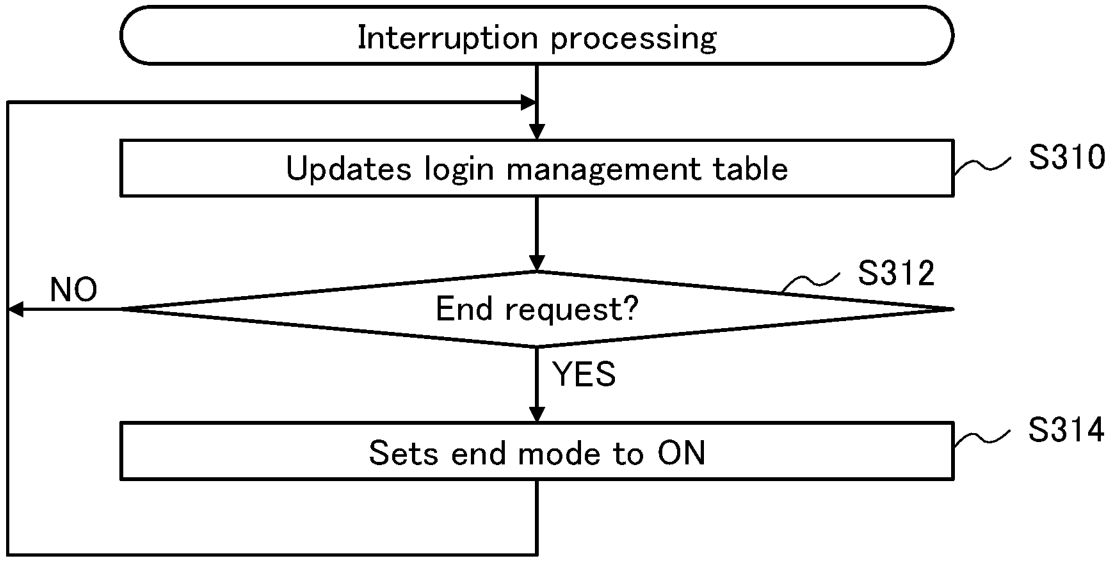
FIG. 40 is a flowchart for illustrating a procedure of interruption processing of a monitoring server in an embodiment of the present invention.

FIG. 40 is an example of a flowchart of interruption processing. The CPU 1401 conducts this interruption processing while executing related-person indication processing.

At S310, the CPU 1401 updates the login management table. More specifically, upon receipt of a member identification code and an apparatus identification code from a PTS terminal 1700, a signage apparatus 100, or a kiosk terminal 200, the CPU 1401 adds the member identification code to the login management table in the external storage device 1404 together with the apparatus identification code. Upon completion of this processing, the CPU 1401 proceeds to S312.

When the CPU 1401 receives logout information (including a member identification code) indicating that a member has logged out from a PTS terminal 1700, a signage apparatus 100, or a kiosk terminal 200, the CPU 1401 may delete the record corresponding to the member identification code from the login management table or set a flag for identifying that the member has logged out.

At S312, the CPU 1401 determines whether an end request is received. More specifically, the CPU 1401 determines whether a signal indicating that the end button is pressed on the related-person indication screen is received from the input control unit 1406. If the determination is that an end request is received, the CPU 1401 proceeds to S314; if the determination is that no end request is received, the CPU 1401 proceeds to S310.

At S314, the CPU 1401 sets the end mode to ON and proceeds to S310.

Figure 41:
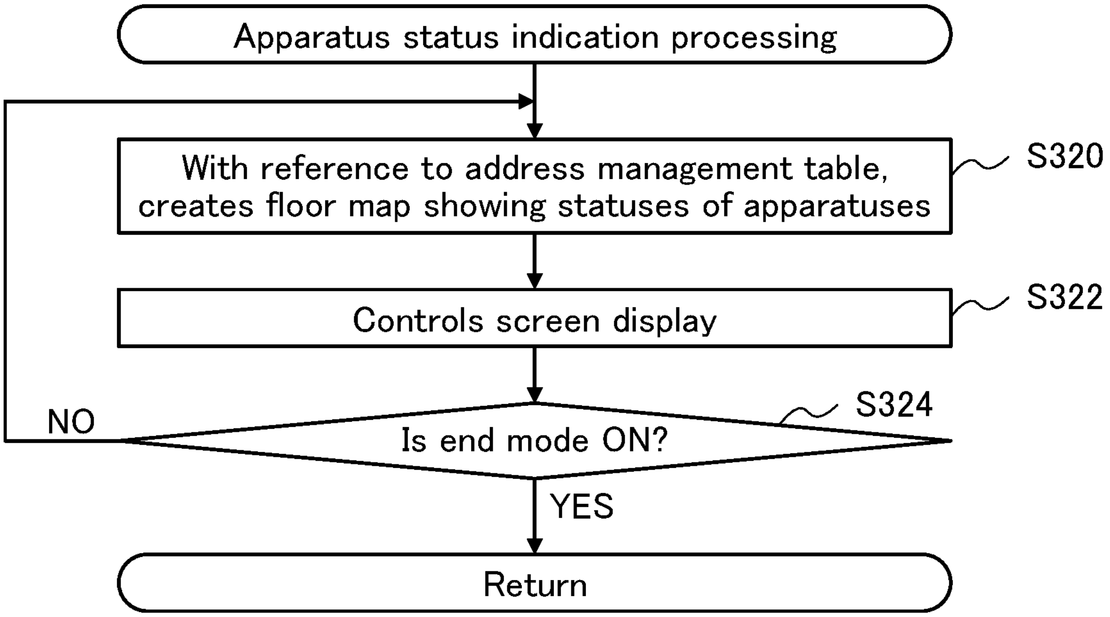
FIG. 41 is a flowchart for illustrating a procedure of apparatus status indication processing of a monitoring server in an embodiment of the present invention.

FIG. 41 is an example of a flowchart of apparatus status indication processing. At S320, the CPU 1401 creates a floor map (image information) showing the statuses of the apparatuses. More specifically, the CPU 1401 determines the positions of the apparatuses on the floor map based on the coordinate data in the address management table and creates a floor map in which the apparatuses statuses are mapped (a floor map showing icons representing the apparatus statuses at the corresponding positions). Upon completion of this processing, the CPU 1401 proceeds to S322.

At S322, the CPU 1401 conducts screen display control. More specifically, the CPU 1401 outputs an instruction to display the floor map showing the apparatus statuses on the LCD 1408 to the graphic board 1405. Upon completion of this processing, the CPU 1401 proceeds to S324.

At S324, the CPU 1401 determines whether the end mode is ON. If the determination is that the end mode is ON, the CPU 1401 terminates the apparatus status indication processing; if the determination is that the end mode is OFF, the CPU 1401 proceeds to S320.

Figure 42:
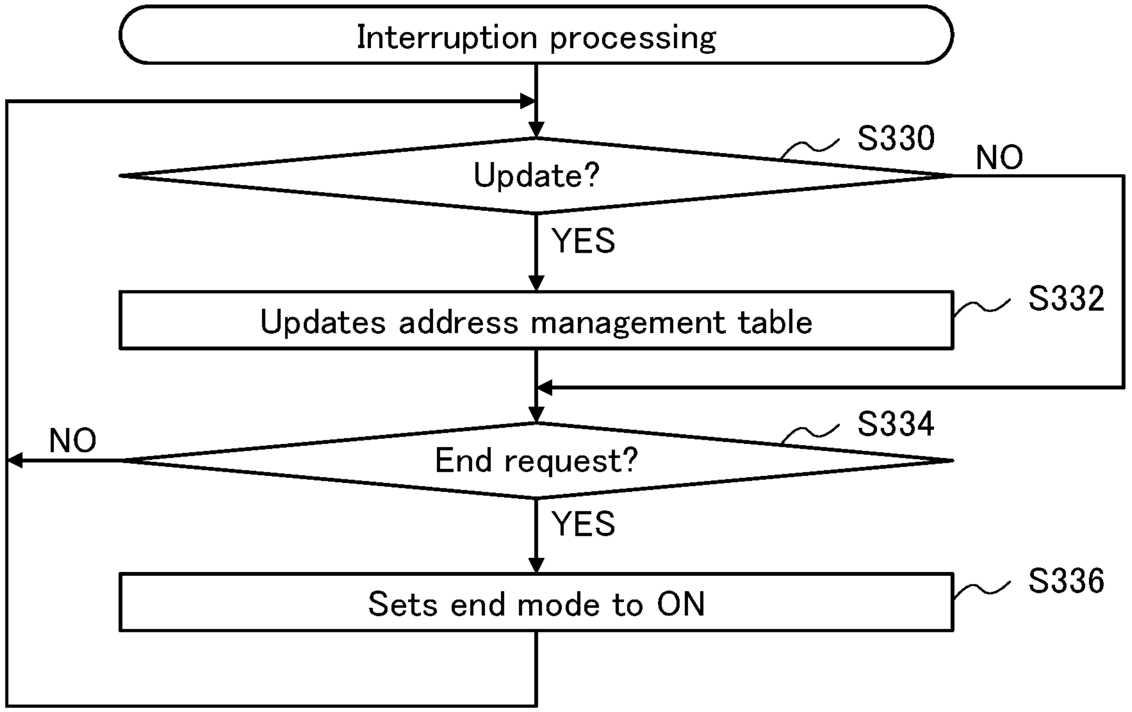
FIG. 42 is a flowchart for illustrating a procedure of interruption processing of a monitoring server in an embodiment of the present invention.

FIG. 42 is an example of a flowchart of interruption processing. The CPU 1401 conducts this interruption processing while executing apparatus status indication processing.

At S330, the CPU 1401 determines whether status information in the address management table needs to be updated. More specifically, upon receipt of status information and an apparatus identification code from a PTS terminal 1700, the CPU 1401 determines whether the received status information is identical to the status information associated with the apparatus identification code stored in the address management table. If the CPU 1401 determines that the address management table needs to be updated, the CPU 1401 proceeds to S332; if the CPU 1401 determines that the address management table does not need to be updated, the CPU 1401 proceeds to S334.

At S334, the CPU 1401 determines whether an end request is received. More specifically, the CPU 1401 determines whether a signal indicating a press of the end button on the apparatus status indication screen is received from the input control unit 1406. If the determination is that an end request is received, the CPU 1401 proceeds to S336; if the determination is that no end request is received the CPU 1401 proceeds to S330.

At S336, the CPU 1401 sets the end mode to ON and proceeds to S330.

The apparatus status indication processing is not limited to the above-described configuration where the floor map is updated in real time.

For example, the floor map may be updated at predetermined intervals.

Alternatively, the floor map may be updated when some apparatus status is updated. In the case of employment of this configuration, the CPU 1401 sets a flag to ON if the determination at S330 is to update the address management table (YES), and executes S320 and S322 in the apparatus status indication processing if the flag is ON. This configuration reduces the replacements of the floor map in the screen display control. For example, in the situation where the floor includes a large number of apparatuses, the replacements of the floor map result in frequent screen flickers. However, this configuration reduces the screen flickers.

Figure 43:
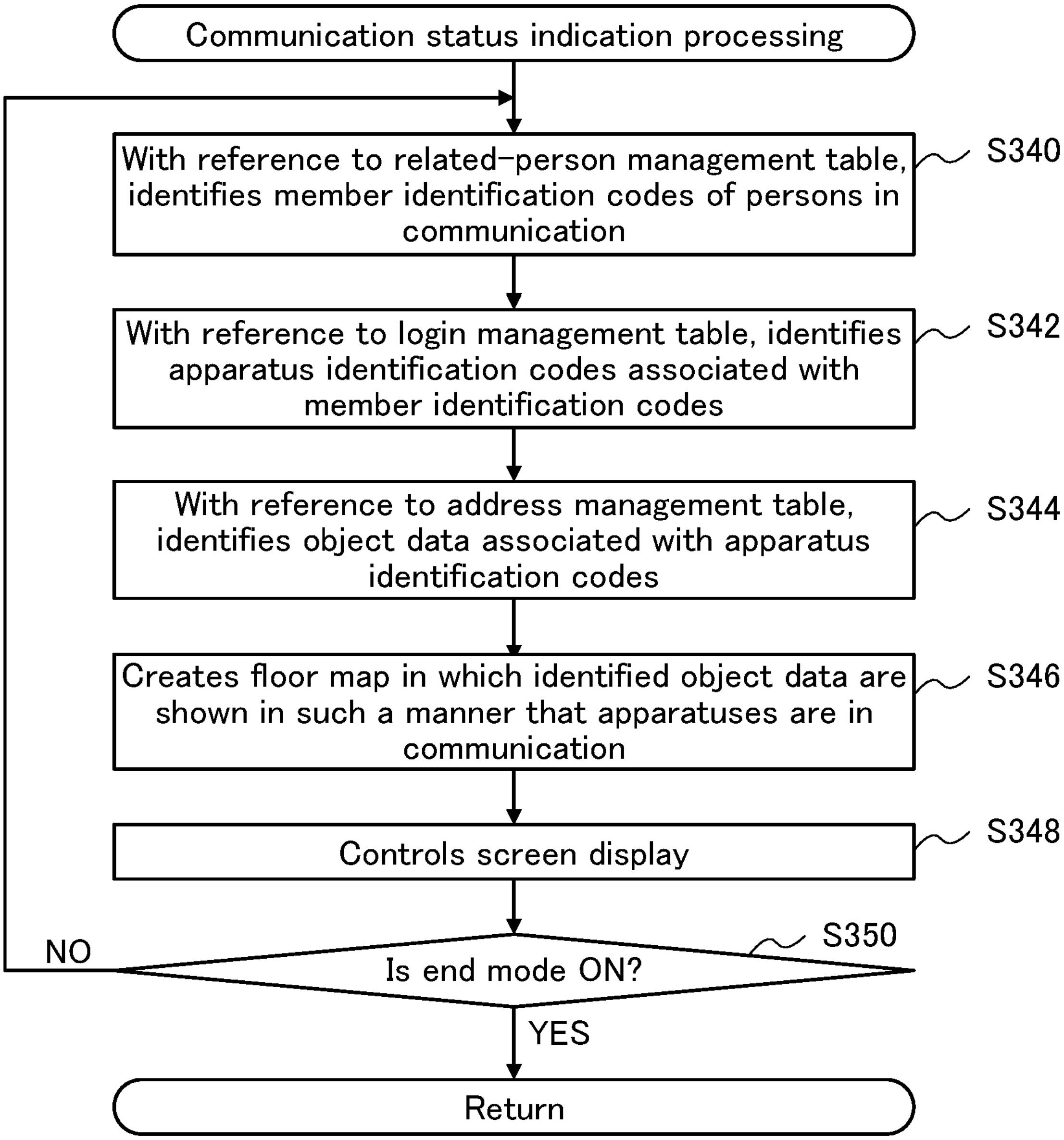
FIG. 43 is a flowchart for illustrating a procedure of communication status indication processing of a monitoring server in an embodiment of the present invention.

FIG. 43 is an example of a flowchart of communication status indication processing. At S340, the CPU 1401 identifies the member identification codes of a pair of persons in communication with reference to the related-person management table. For example, the CPU 1401 acquires the member identification codes 0002 and 0003 of the entries showing the status "communication" in the related-person management table (FIG. 23). Upon completion of this processing, the CPU 1401 proceeds to S342.

At S342, the CPU 1401 identifies the apparatus identification codes associated with the member identification codes with reference to the login management table. For example, the CPU 1401 acquires the apparatus identification codes 0005 and 0006 associated with the member identification codes 0002 and 0003 based on the login management table (FIG. 25). Upon completion of this processing, the CPU 1401 proceeds to S344.

At S344, the CPU 1401 identifies the object data associated with the apparatus identification codes with reference to the address management table. For example, the CPU 1401 acquires the object data obj0005 and obj0006 and coordinate data (x5, y5) and (x6, y6) for the apparatus identification codes 0005 and 0006 based on the address management table (FIG. 24). Upon completion of this processing, the CPU 1401 proceeds to S346.

At S346, the CPU 1401 creates a floor map showing the icons of the object data acquired at S344 in such a manner that the apparatuses are in communication. Upon completion of this processing, the CPU 1401 proceeds to S348.

At S348, the CPU 1401 conducts screen display control. More specifically, the CPU 1401 outputs an instruction to display the floor map showing the icons of the apparatuses in such a manner that the apparatuses are in communication on the LCD 1408 to the graphic board 1405. Upon completion of this processing, the CPU 1401 proceeds to S350.

At S350, the CPU 1401 determines whether the end mode is ON. If the determination is that the end mode is ON, the CPU 1401 terminates the apparatus status indication processing; if the determination is that the end mode is OFF, the CPU 1401 proceeds to S340.

The communication status indication processing is not limited to the above-described configuration.

For example, at S348, the CPU 1401 may determine whether the number of sessions being held is a predetermined number or more. If the number of sessions being held is the predetermined number or more, the CPU 1401 may create a floor map for each of the predetermined number of sessions.

In the case of employment of this configuration, the communication status indication screen may include a button for changing the floor map to be displayed so that a plurality of floor maps can be displayed one by one. It should be noted that the screen may be split or a plurality of display devices may be used to display the plurality of floor maps concurrently (simultaneously).

This configuration shows a predetermined number of sessions on one floor map and shows the remaining sessions on one or more other floor maps.

Figure 44:
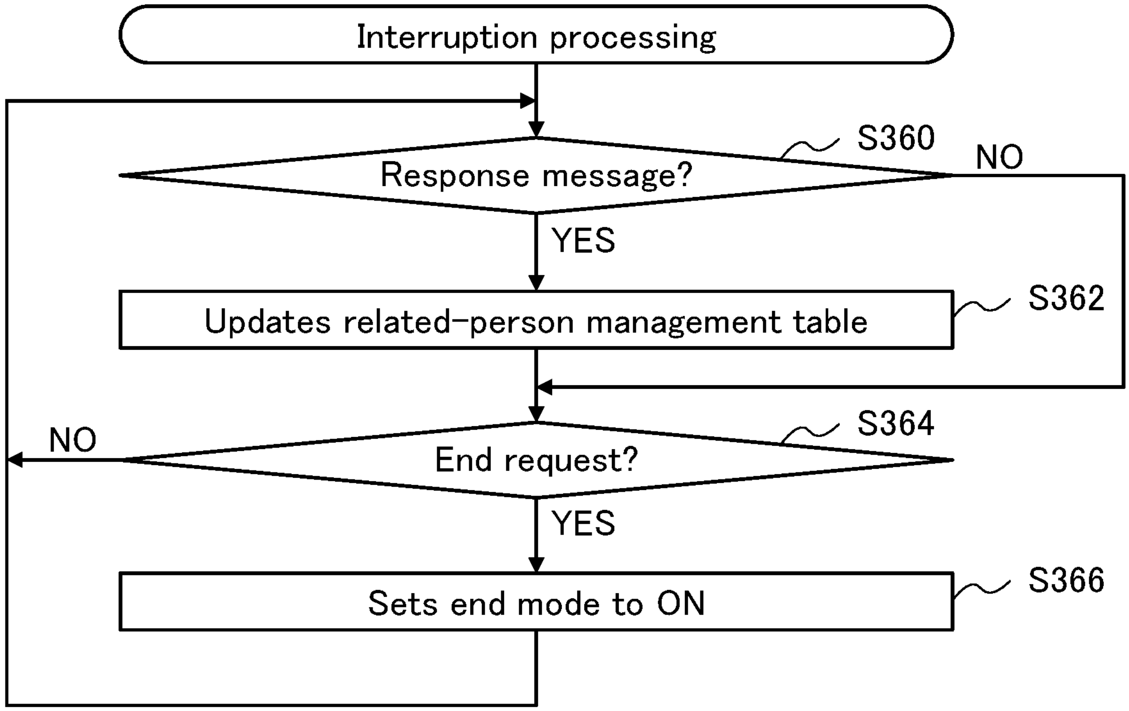
FIG. 44 is a flowchart for illustrating a procedure of interruption processing of a monitoring server in an embodiment of the present invention.

FIG. 44 is an example of a flowchart of interruption processing. The CPU 1401 conducts this interruption processing while executing communication status indication processing.

At S360, the CPU 1401 determines whether any PTS terminal 1700 has sent a response message. In other words, the CPU 1401 determines whether communication (talk or text chat) between apparatuses has started. More specifically, the CPU 1401 determines whether the CPU 1401 has received a message to accept a call (response message) from a PTS terminal 1700 called by another PTS terminal 1700. If the CPU 1401 determines that the CPU 1401 has received a response message, the CPU 1401 proceeds to S362. If the CPU 1401 determines that the CPU 1401 has not received a response message, the CPU 1401 proceeds to S364. The response message includes the member identification codes of the persons in communication and the apparatus identification code.

At S362, the CPU 1401 updates the related-person management table. More specifically, the CPU 1401 updates the statuses in the related-person management table with "communication" based on the member identification codes of the persons in communication.

At S364, the CPU 1401 determines whether an end request is received. More specifically, the CPU 1401 determines whether a signal indicating a press of the end button on the communication status indication screen is received from the input control unit 1406. If the determination is that an end request is received, the CPU 1401 proceeds to S366; if the determination is that no end request is received, the CPU 1401 proceeds to S360.

At S366, the CPU 1401 sets the end mode to ON and proceeds to S330.

Figure 45:
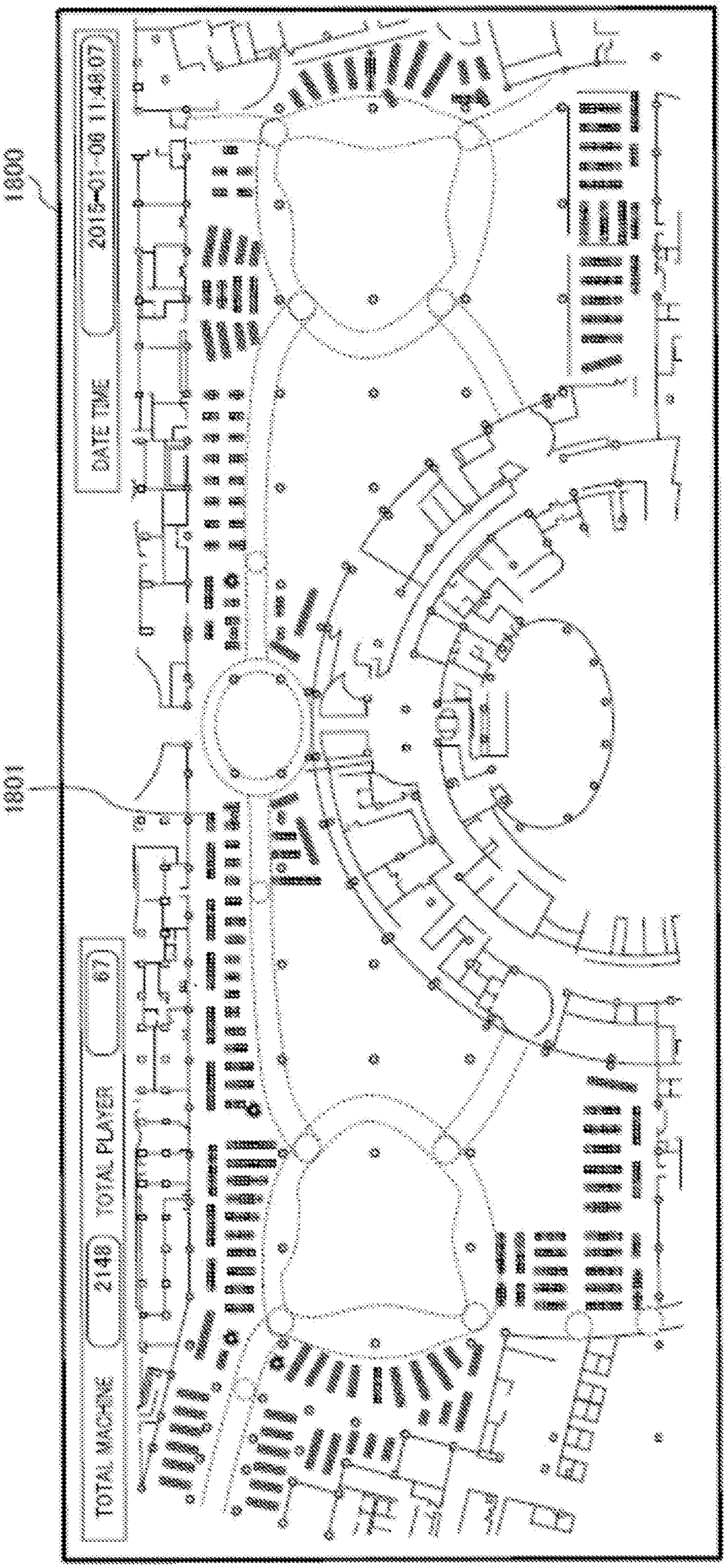
FIG. 45 is a diagram for illustrating an example of a floor map in an embodiment of the present invention.

FIG. 45 is a diagram for illustrating an example of a floor map (floor map 1800). The floor map 1800 is a vector data of a two-dimensional figure representing the floor and is stored in the external storage device 1404.

The floor map 1800 is not limited to two-dimensional vector data. For example, the floor map 1800 may be three-dimensional vector data or otherwise, may be raster data (bitmap data).

The floor map 1800 is designed to provide cells 1801 (examples of icons) at the positions corresponding to the apparatuses (such as gaming machines, signage apparatuses 100, and kiosk terminals 200) installed on the floor. The coordinates of the center of each cell 1801 are stored as the coordinate data in the address management table. The colors, the shapes, and the sizes of the cells 1801 may be designed to be different depending on the kind of the apparatus.

When an apparatus identification code is identified, the coordinate data and the object data can be identified based on the address management table; accordingly, another object (icon) or a variety of information can be mapped to the floor map 1800 to be overlapped with a cell 1801. In addition, the appearance (such as the color, size, and shape) of the cell 1801 can be changed as appropriate.

The description of the floor map 1800 herein is based on the configuration where the floor map 1800 is displayed on the LCD 1408; however, the configuration is not limited to this. The floor map 1800 can be displayed over a plurality of display devices.

For example, a plurality of display device may be configured to function as a single display device.

Alternatively, a plurality of display devices may be configured to function as a desired number of display devices. That is to say, in the case of 16 (4×4) display devices, a plurality of first display devices (for example, the upper two rows (2×4) of display devices) may display a floor map 1800 and a plurality of second display devices (for example, the lower two rows (2×4) of display devices) may display images of surveillance cameras and images of apparatus cameras (motion sensors 105, 106, motion sensors 202, 203, and human detection cameras 1713).

The displaying a floor map on a desired number of display devices enables displaying an optimum size of floor map even if the floor is large like the floor of a casino.

Figure 46:
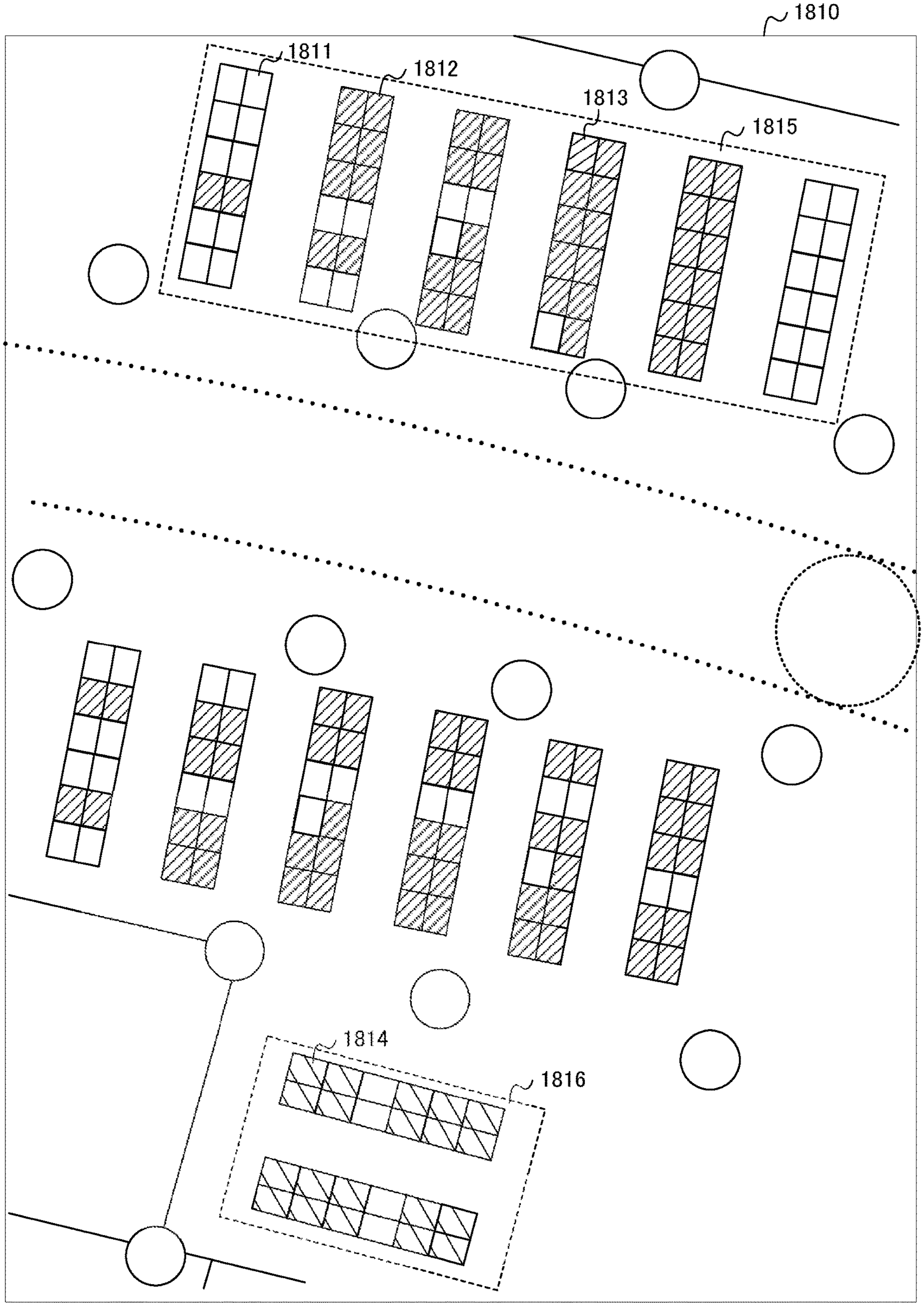
FIG. 46 is a diagram for illustrating a part of an environment monitoring screen in an embodiment of the present invention.

FIG. 46 is a diagram for illustrating a part of an environment monitoring screen (environment monitoring screen 1810) displayed in response to selection of the environment monitoring menu in the main menu. Although not shown in the drawing, the environment monitoring screen includes a button (end button) to return to the main menu.

The environment monitoring screen 1810 shows a first area 1815 and a second area 1816. The environment monitoring screen 1810 includes cells 1811 where no temperature information is mapped and cells 1812, 1813, and 1814 where temperature information is mapped.

Each cell 1812 indicates a first temperature T1 (t0<T1<tn) which represents a normal value (a temperature higher than a given temperature (t0) but not higher than a specified temperature (tn)); each cell 1813 indicates a second temperature T2 which is higher than the first temperature; and each cell 1814 indicates a third temperature T3 which is lower than the first temperature.

The cells 1812 may be in a first color (for example, yellow); the cells 1813 may be in a second color (for example, red); and the cells 1814 may be in the third color (for example, blue). Such coloring enables grasp of temperature distribution on the floor at a glance.

Among the cells including temperature information in the first area 1815, one cell is a cell 1813 and all the remaining cells are cells 1812. That is to say, only the gaming machine of the cell 1813 has a higher temperature than the other gaming machines in the first area 1815; accordingly, the gaming machine can be determined to be failed.

As to the second area 1816, all the cells including temperature information are cells 1814. That is to say, the room temperature in the second area 1816 is determined to be lower than the specified temperature.

The manner of mapping temperature information is not limited to the above-described one. For example, temperature information (a value thereof) may be provided with a leading line from each cell. This configuration enables grasp of more accurate temperatures. In another configuration, each cell and the area around the cell may be displayed in a color representing the temperature information. This configuration emphasizes the temperature information, enabling easier grasp of temperature distribution.

Figure 47:
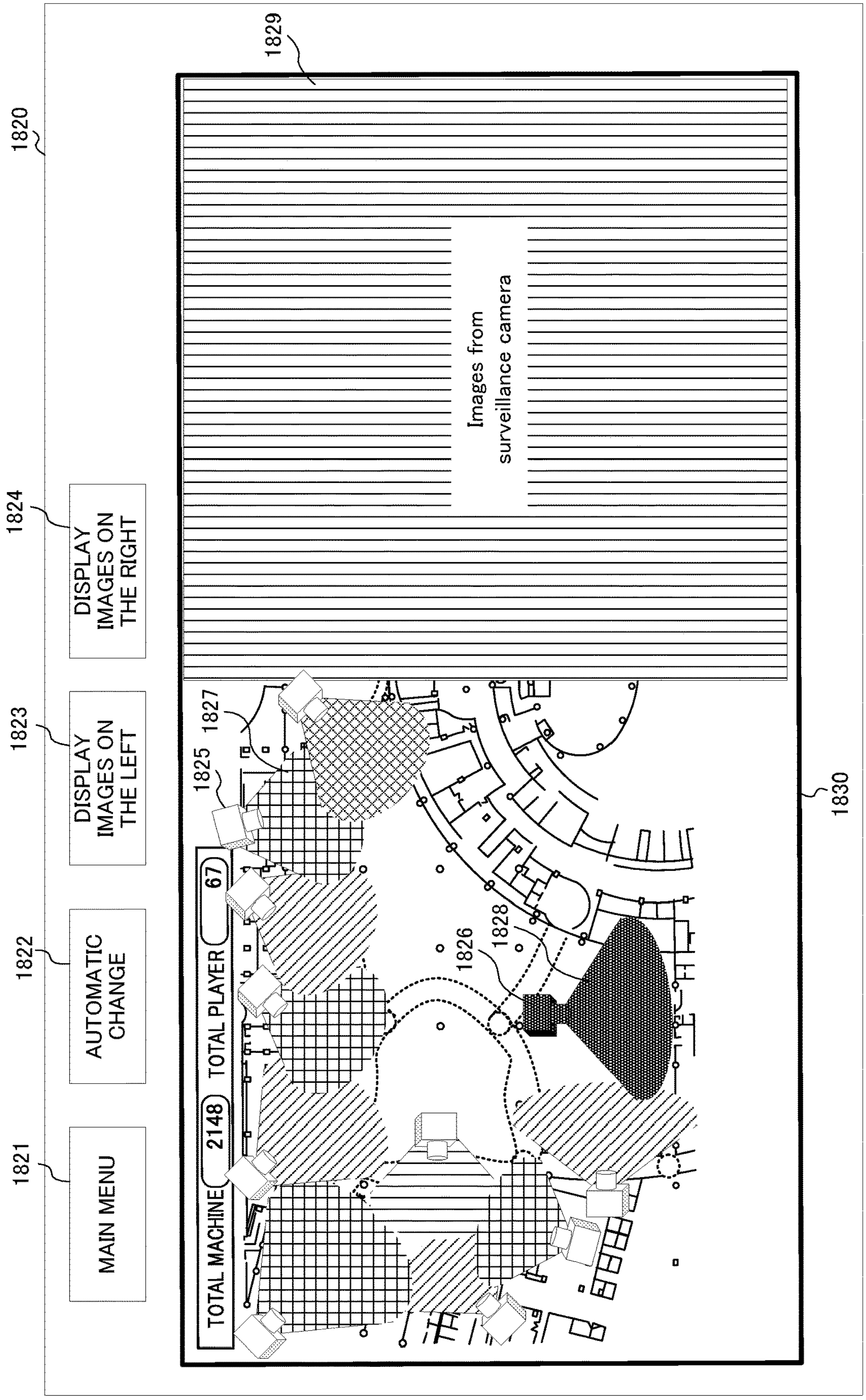
FIG. 47 is a diagram for illustrating a part of a surveillance camera screen in an embodiment of the present invention.

FIG. 47 is a diagram for illustrating an example of a surveillance camera screen (surveillance camera screen 1820) displayed in response to selection of the surveillance camera menu in the main menu.

The surveillance camera screen 1820 includes a plurality of buttons 1821 to 1824, a floor map 1830, and an image display region 1829.

The MAIN MENU button 1821 is a button (end button) to return to the main menu. The AUTOMATIC CHANGE button 1822 is a button to select the setting for automatically changing the images displayed in the image display region 1829. The DISPLAY IMAGES ON THE LEFT button 1823 is a button to set the image display region 1829 to the left side of the screen. The DISPLAY IMAGES ON THE RIGHT button 1824 is a button to set the image display region 1829 to the right side of the screen.

In the surveillance camera screen 1820, the surveillance camera providing the images being displayed is located on the left of the screen; accordingly, the surveillance camera screen 1820 is an example of a case where the image display region 1829 is set to the right side of the screen. In this connection, when the surveillance camera on the right side of the screen is providing the images being displayed, the image display region 1829 is automatically set to the left side of the screen.

In the floor map 1830, surveillance camera icons (for example, surveillance camera icons 1825 and 1826) of the surveillance cameras and the view ranges (for example, view range icons 1827 and 1828) of the surveillance cameras are mapped. When the floor map shows the surveillance camera icons, the image-capturing directions can be identified easily, compared to the case where no surveillance camera icon is displayed.

The surveillance camera icon and the view range icon for the surveillance camera providing the images being displayed on the image display region 1829 are highlighted to be shown differently from the other surveillance camera icons and view range icons, like the surveillance camera icon 1826.

Meanwhile, although the cells (apparatuses) cannot be seen because of the view range icons, the configuration is not limited to this; the view range icons may be displayed translucently without being filled so that the cells (apparatuses) can be seen.

The floor map 1830 is not limited to the above-described configuration. For example, each surveillance camera icon (view range icon) can be provided with an optical axis icon. This configuration facilitates identifying image-capturing directions, compared to the case where the surveillance camera icons are displayed on the floor map.

In the AUTOMATIC CHANGE mode or the normal mode, the images displayed in the image display region 1829 are controlled to be changed at predetermined intervals. However, if the images to be replaced satisfy a predetermined condition (for example, a specific number or more of persons are being displayed or a specific number of more of persons have passed by in a specified period), a special time longer than the predetermined time is set and the images are changed after elapse of the special time.

In this connection, the appearance of the image display region 1829 (the color, the shape, or the size) can be changed depending on the number of persons being displayed or the number of persons that have passed by.

For example, if the number of persons being displayed or the number of persons that have passed by is equal to or more than a specific number, the size (height×width) of the image display region 1829 may be a size S1 (x1×y1) and if the number of persons being displayed or the number of persons that have passed by is less than the specific number, the size (height×width) of the image display region 1829 may be a size S2 (x2×y2) smaller than the size S1.

In response to selection of the surveillance camera icon 1825, the surveillance images displayed on the image display region 1829 is switched from the images of the surveillance camera of the surveillance camera icon 1826 to the images of the surveillance camera of the surveillance camera icon 1825 and the images are displayed continuously. If the AUTOMATIC CHANGE button 1822 is selected thereafter, the images are changed at predetermined intervals.

The configuration of the image display region 1829 is not limited to the above-described one. For example, although the image display region 1829 is displayed on the left side or the right side, the image display region 1829 may be displayed on the upper side or the lower side. Alternatively, the image display region 1829 may be altered freely in position and size in accordance with the user operation.

Figure 48:
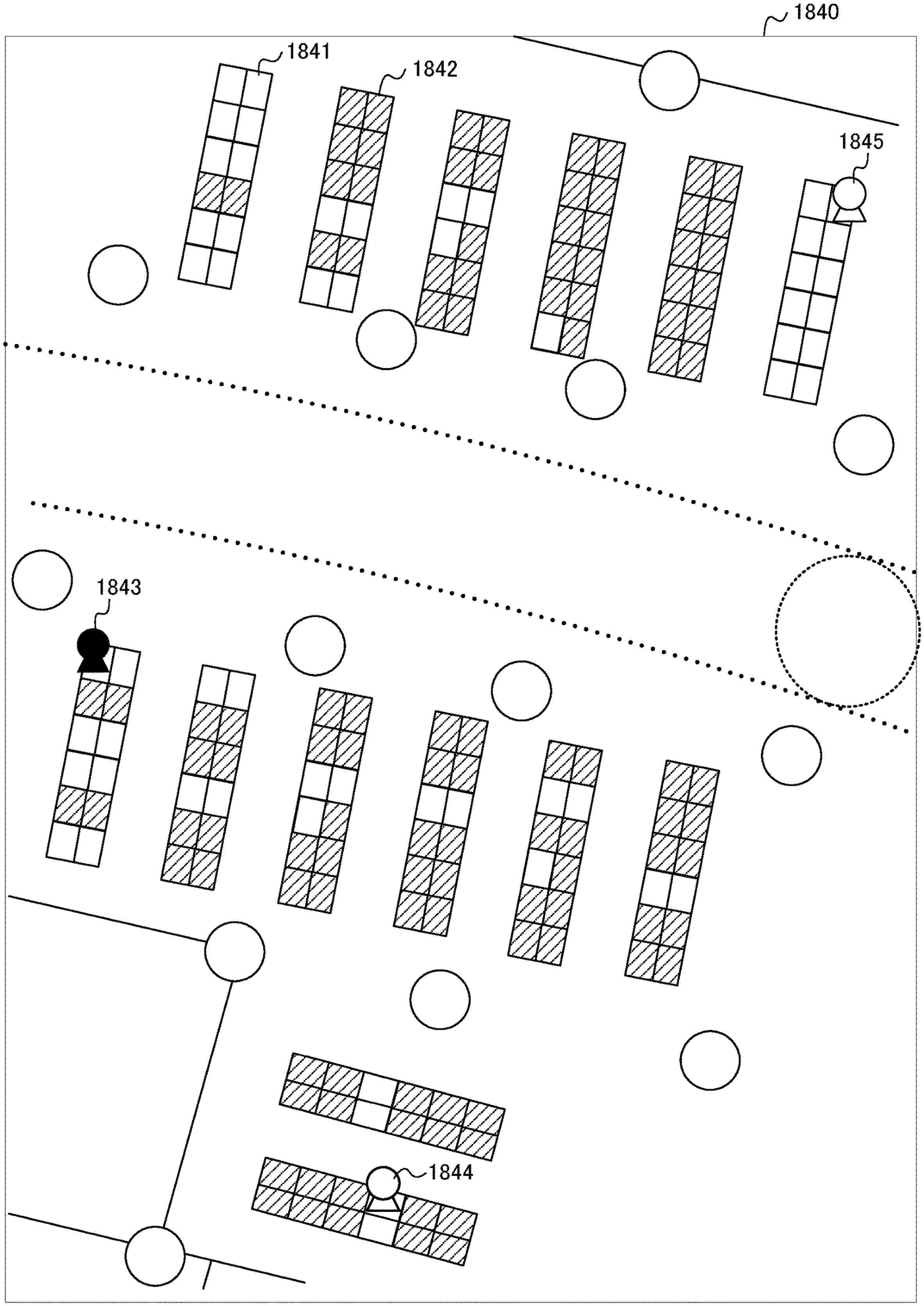
FIG. 48 is a diagram for illustrating a part of a related-person indication screen in an embodiment of the present invention.

FIG. 48 is a diagram for illustrating an example of a part of a related-person indication screen (related-person indication screen 1840) displayed in response to selection of the related-person indication menu in the main menu. Although not shown in the drawing, the related-person indication screen includes a button (end button) to return to the main menu.

The related-person indication screen 1840 shows machine icons of the apparatuses being used (for example, machine icons 1841), machine icons of the apparatuses not being used (for example, machine icons 1842), a member icon of a member who has just logged in (for example, a member icon 1843), and related-person icons of the persons who are related to the member and currently logged in (for example, related-person icons 1844 and 1845).

As to the related-person indication screen 1840, when a member logs in (for example, by inserting an IC card into a PTS terminal 1700), an icon representing the member and related-person icons representing the members related to the member are mapped to the floor map in an identifiable manner (by highlighting).

For the identifiable manner, FIG. 48 provides an example where the member icon is filled and the related-person icons are not filled; the identifiable manner is not limited to these. For example, the member icon may be lit up and the related-person icons may be blinked.

The related-person indication screen 1840 is updated at predetermined intervals or every time somebody has logged in. In the updating, the member icon and the related-person icons displayed at the previous login are erased and the member icon and the related-person icons concerning the login that has just happened.

However, the configuration is not limited to this; for example, the member icon and the related-person icons of the previous login (in a broader sense, logins in the past) and the member icon and the related-person icons of the login that has just happened can be displayed in an identifiable manner. This configuration enables the logged-in users to be located at a glance.

In addition to or instead of the member icons and related-person icons, attribute information of each player may be indicated. In this configuration, icons representing visitors, icons representing members, icons representing VIPs, icons representing suspected visitors, icons representing suspected members, or cells that can identify the attributes of the players are displayed. This configuration facilitates the grasp of the conditions of the players, such as which class of player is located where, through the floor map.

Figure 49:
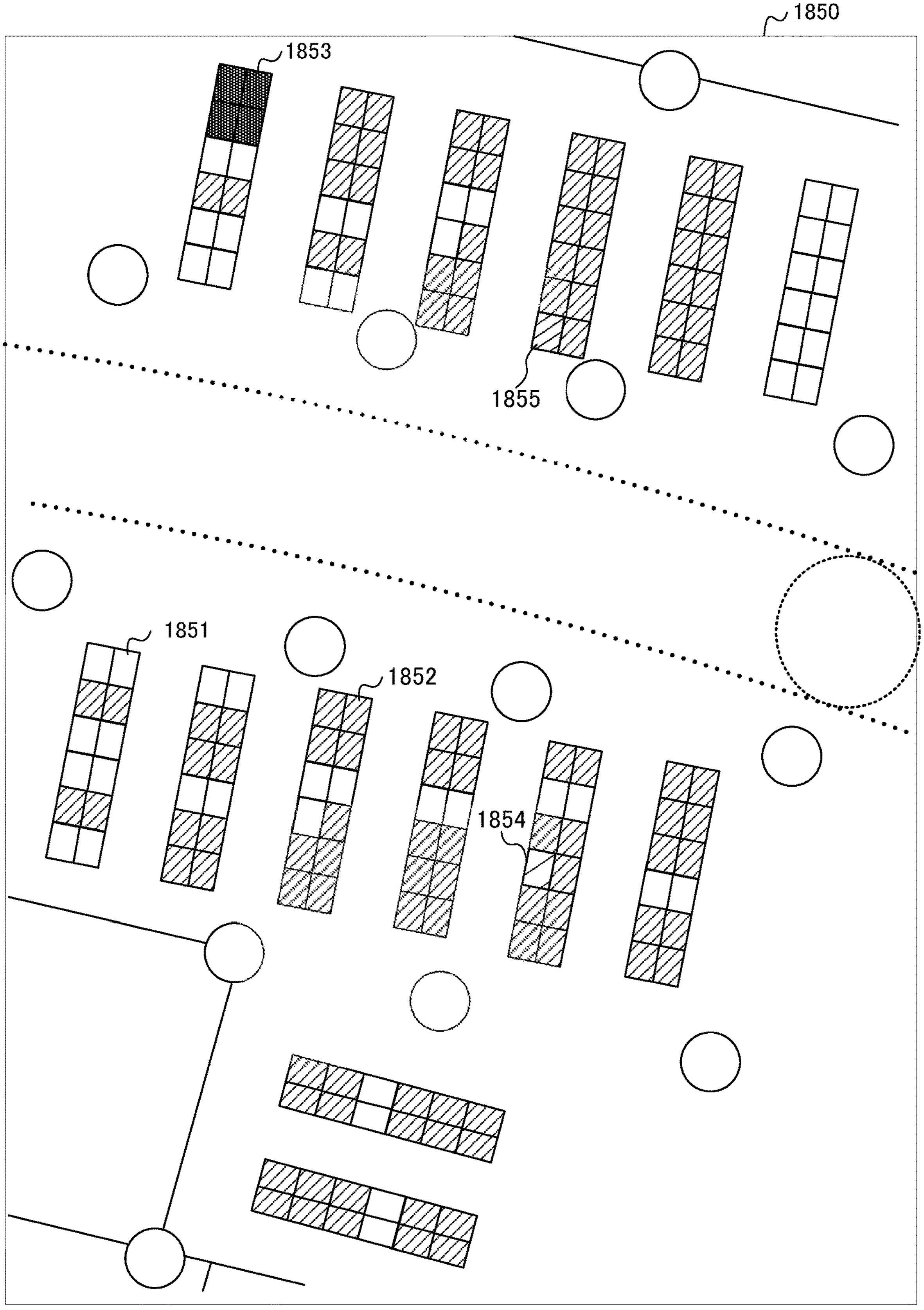
FIG. 49 is a diagram for illustrating a part of an apparatus status indication screen in an embodiment of the present invention.

FIG. 49 is a diagram for illustrating an example of a part of an apparatus status indication screen (apparatus status indication screen 1850) displayed in response to selection of the apparatus status indication menu in the main menu. Although not shown in the drawing, the apparatus status indication screen includes a button (end button) to return to the main menu.

The apparatus status indication screen 1850 shows a plurality of kinds of status icons representing apparatus statuses (for example, apparatus icons 1851 to 1855). The status icons are displayed in an identifiable manner depending on the apparatus status. For the status icons, appropriate icons can be employed. For example, icons in different colors may be provided for different apparatus statuses. Alternatively, letter icons that tell the apparatus statuses at a glance may be displayed to overlap with the icons of object data.

Each status icon 1851 represents that the apparatus is logged in. Each status icon 1852 represents that the apparatus is not logged in. Each status icon 1853 represents that the apparatus is under maintenance. Each apparatus icon 1854 represents the apparatus has won a jackpot. Each apparatus icon 1855 represents that the apparatus is out of order. Although not shown in the drawing, icons representing the statuses about handling of IC cards, such as stock statues of IC cards 1500 (STACKER NEAR EMPTY, STACKER NEAR FULL), HAND PAY, and DISABLE, may be provided. On the lower part of the apparatus status indication screen 1850, an explanatory section is provided to show a list of examples of icons and the description of the apparatus statuses represented by the icons.

The apparatus status indication screen 1850 is configured to update the floor map in real time; however, the configuration is not limited to this. For example, the floor map may be updated at predetermined intervals. Alternatively, the floor map may be updated every time any of the apparatus statuses is updated. Still alternatively, the floor map may be updated every time the apparatus statuses of a predetermined number of apparatus are updated.

FIG. 50 is a diagram for illustrating an example of a part of a communication status indication screen (communication status indication screen 1860) displayed in response to selection of the communication status indication menu in the main menu. Although not shown in the drawing, the communication status indication screen includes a button (end button) to return to the main menu.

The communication status indication screen 1860 shows machine icons of apparatuses currently logged in (for example, machine icons 1861), machine icons of the apparatuses not logged in (for example, machine icons 1862), machine icons of the apparatuses in communication (for example, communicating machine icons 1863 and 1864), and a communication highlight icon 1865 for indicating that the apparatuses are in communication.

The communicating machine icons 1863 and 1864 are mapped to the corresponding positions on the floor map at the start of communication and these icons are connected by a communication highlight icon 1865. At the end of the communication, the communicating machine icon 1863 and 1864 and the communication highlight icon 1865 are erased.

To indicate that apparatuses are in communication, various manners can be employed.

For example, an appearance showing that a radio wave is generated from the machine icons of the apparatuses may be used.

Alternatively, instead of the communicating machine icons, a member icon (human icon) may be connected with the other member icon (human icon) by a line. Together with this indication, a text "in communication" may be displayed.

Still alternatively, the icons (machine icons or human icons) may be blinked.

Still alternatively, the icons may displayed in different colors: for example, one of the two icons may be colored in a first color (for example, red) and the other icon may be colored in a second color (for example, blue), and the remaining icons may be colored in a third color (for example, black).

Still alternatively, the two icons may be displayed larger than the other icons.

[Friend Registration Service]

Next, with reference to FIGS. 51A and 51B and 52A, 52B, and 52C, friend registration service to be provided at a slot machine 1010 (PTS terminal 1700) is described. This section describes friend registration service provided at a PTS terminal 1700; the same service can be provided at a kiosk terminal 200.

Figure 51A:
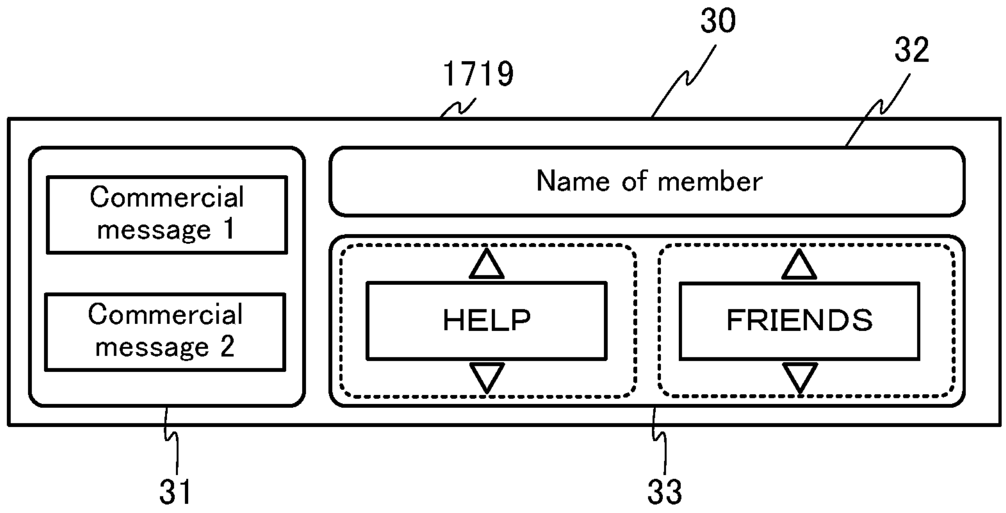
FIGS. 51A and 51B are diagrams for illustrating examples of screens for a friend registration service shown on a display device of a PTS terminal in an embodiment of the present invention.

FIG. 51A shows a menu screen 30 for a member, which is displayed on the LCD 1719 of the PTS terminal 1700 of a slot machine 1010 after a player logs in by inserting a membership card into the IC card slot 1730 of the PTS terminal 1700.

The menu screen 30 shown in FIG. 51A includes an advertisement display section 31, a member name display section 32, and a service menu display section 33. The service menu display section 33 includes two scrollable regions to show two service menus concurrently. The left scrollable region shows a HELP button (for help service to indicate how to operate the PTS terminal 1700 or the slot machine 1010) and the right scrollable region shows a FRIENDS button for friend service; a touch on the triangle or the inverse triangle in either scrollable region leads to showing a button for another service menu.

Figure 51B:
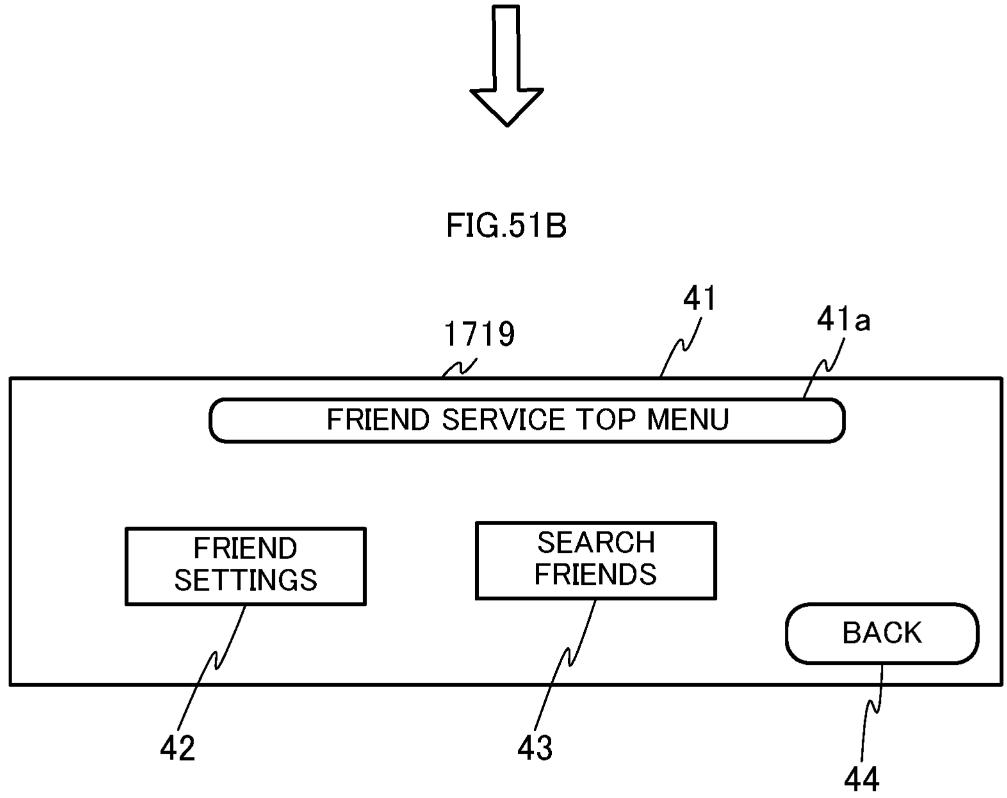

In response to a touch on the FRIENDS button by the player, the display on the LCD 1719 changes to the screen shown in FIG. 51B.

FIG. 51B shows a top menu 41 of the friend service and includes a title display section 41*a*, a FRIEND SETTINGS button display section 42, a SEARCH FRIENDS button display section 43, and a BACK button display section 44. In response to a touch on either the FRIEND SETTINGS button display section 42 or the SEARCH FRIENDS button display section 43 by the player, the corresponding sub screen is displayed. In response to a touch on the BACK button display section 44, the CPU 1751 detects the place of the touch operation and changes the display on the LCD 1719 to the menu screen 30 shown in FIG. 51A.

The system for displaying the aforementioned service menus and providing the services is implemented by interpreting and displaying HTML, data and/or images by a web browser run on the PTS terminal 1700, for example. In this case, the hall management server 10 works as a web server and sends necessary data to the PTS terminal 1700 in accordance with requests from the web browser of the PTS terminal 1700.

Figure 52A:
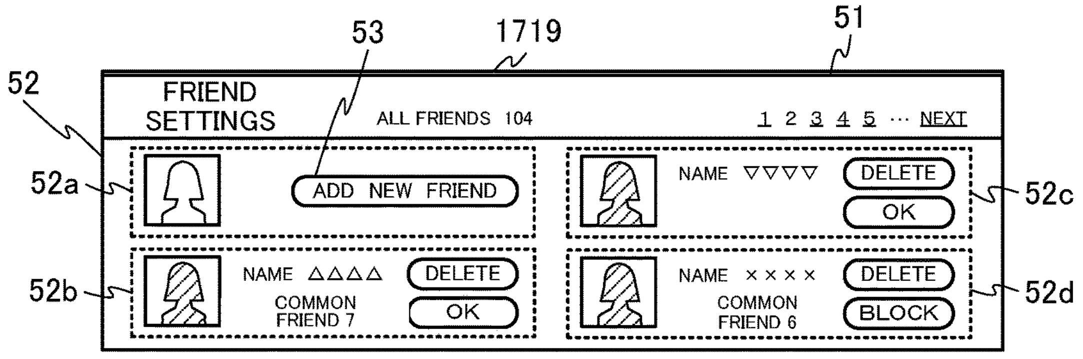
FIGS. 52A, 52B, and 52C are diagrams for illustrating examples of screens for a friend registration service shown on a display device of a PTS terminal in an embodiment of the present invention.

FIG. 52A shows a friend setting screen 51 to be displayed on the LCD 1719 in response to a touch on the FRIEND SETTINGS button display section 42 in the top menu 41 of the friend service shown in FIG. 51B. This friend setting screen 51 shows a list of friends registered in relation to the logged-in member (the member identified by the membership card) in the friend display section 52. As shown in FIG. 52A, the friend display section 52 shows only four friends at maximum but can show further friends in response to a touch on the page indicator displayed on the right side of the title display section or a flick on the touch panel.

The data on the friends displayed in the friend setting screen 51 in FIG. 52A can be acquired by, for example, acquiring the related-person identification codes associated with the identification code of the logged-in member from the related-person management table (stored in the member management server 13) in FIG. 23 and, for each of the related-person identification code, acquiring the record of the identification code identical to the related-person identification code from the member management table (stored in the member management server 13) shown in FIG. 22.

For example, assuming that the identification code retrieved from the membership card of the logged-in member is 0001, the related-person management table in FIG. 23 indicates that the identification codes of the friends associated with the identification code 0001 include 0002, 0003, 0005, and 0007. If these identification codes are registered in the login management table in FIG. 25, it can be determined that the friends of the identification codes are logged in.

The CPU 1751 of the PTS terminal 1700 acquires information (such as the names and icon data) associated with the identification codes from the member management table in FIG. 22. In this example, the name of the member having the identification code 0002 is “ΔΔΔΔ” and the icon data is “image0002.jpg”.

In FIG. 52A, the friend details display section 52*b* shows the name and the icon of the member identified by the identification code 0002; the friend details display section 52*c* shows the name and the icon of the member identified by the identification code 0003; and the friend details display section 52*d* shows the name and the icon of the member identified by the identification code 0005. These friends can be deleted from the registered friends by touching the corresponding DELETE button display section displayed on each of the friend details display sections.

As to the friend of the identification code 0005, the related-person management table in FIG. 23 indicates the status as BLOCK; accordingly, the status indicator in the friend details display section 52*d* reflects this setting and shows BLOCK. When BLOCK is set to the status, a request for a VoIP call or text chat becomes void. In the friend details display sections 52*b* and 52*c*, the status indicators show OK; accordingly, VoIP calls or text chats with the friend are available.

The friend details display section 52*a* in FIG. 52A shows a new registration button display section 53 to register a new friend; in response to a touch on this section, registration of a new friend becomes available.

Figure 52B:
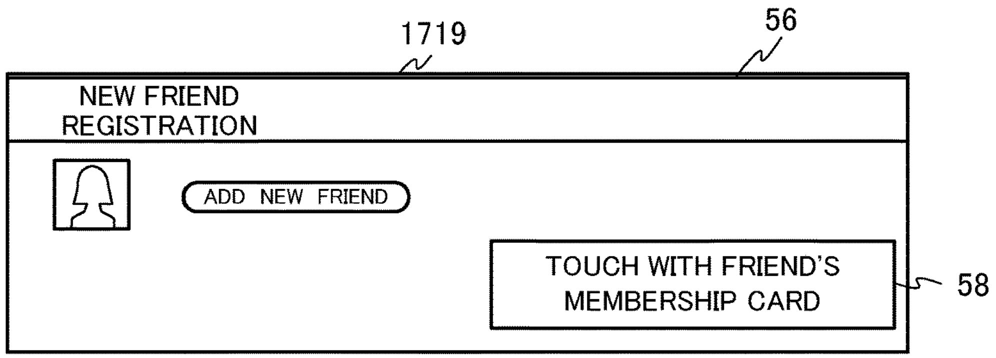

In response to a touch on the new registration button display section 53, the new registration screen 56 shown in FIG. 52B is displayed on the LCD 1719. The player who has logged in as a member touches the touch unit 1745 with the membership card of the friend to be registered in accordance with the guidance 58 that requests a touch with the membership card of the friend to be registered. This touch operation is usually made by the friend to be registered under the consent of the friend.

Figure 52C:
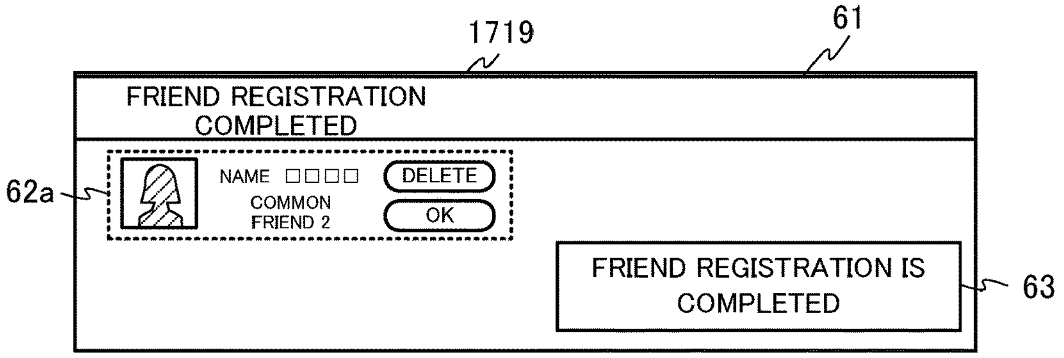

Upon completion of the touch operation, the LCD 1719 displays a friend registration completion screen 61 as shown in FIG. 52C. The friend registration completion screen 61 shows a friend registration completion notification 63 indicating that the registration of the friend has been completed and the friend details display section 62*a* for the newly registered friend.

Through the above-described friend registration, the CPU 1751 of the PTS terminal 1700 adds the record of the newly registered friend to the related-person management table shown in FIG. 23. In adding the record, the CPU 1751 checks whether the identification code retrieved from the membership card that has touched on the touch unit 174 is identical to any of the identification codes registered in the membership management table in FIG. 22, or whether the friend is an authentic member; if the friend is not an authentic member, the CPU 1751 displays an error so that the registration is failed.

As mentioned, the foregoing friend registration service can be provided at a kiosk terminal 200. Since the LCD 201 has a larger size than the LCD 1719 of a PTS terminal 1700, more friends can be listed up in the larger size of screen. The identification code of the friend’s membership card can be acquired through a touch on the touch unit 204 with the membership card of the friend.

[Family Registration Service]

The same operations as the friend registration service can be performed in family registration service; accordingly, description thereof is omitted herein.

[Calling Operations in VoIP Phone System]

Figure 53A:
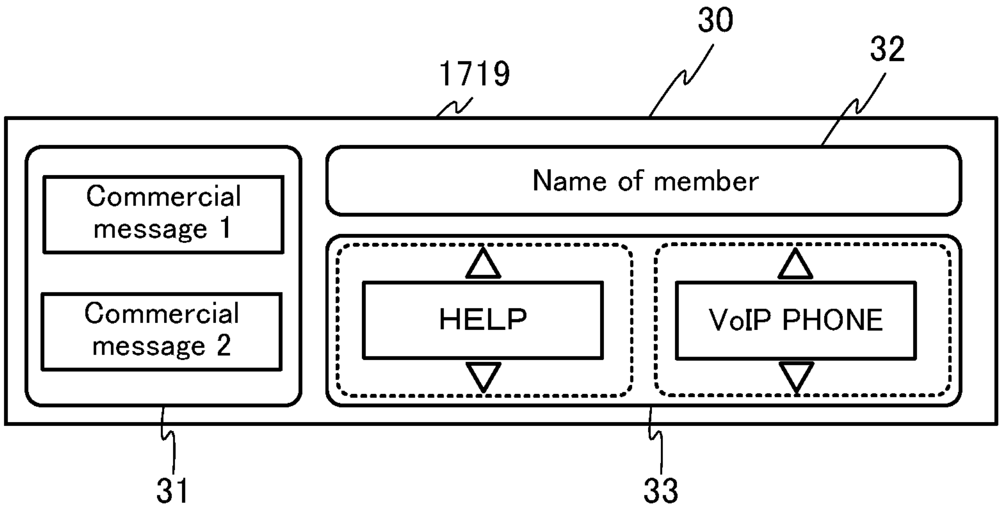
FIGS. 53A and 53B are diagrams for illustrating examples of screens associated with calling operations in VoIP phone system to be shown on a display device of a PTS terminal in an embodiment of the present invention.

Next, with reference to FIGS. 53A and 53B and 54A and 54B, calling operations in the VoIP phone system are described. A call to a friend is described hereinafter by way of example; however, the same applies to a call to a family member. FIG. 53A shows a menu screen 30 for a member, which is displayed on the LCD 1719 of the PTS terminal 1700 of a slot machine 1010 after a player logs in by inserting a membership card into the IC card slot 1730 of the PTS terminal 1700.

The menu screen 30 shown in FIG. 53A includes an advertisement display section 31, a member name display section 32, and a service menu display section 33. The service menu display section 33 shows two scrollable regions to show two service menus concurrently. The left scrollable region shows a HELP button (for help service to indicate how to operate the PTS terminal 1700 or the slot machine 1010) and the right scrollable region shows a VoIP PHONE button for enabling a VoIP call between members; a touch on the triangle or the inverse triangle in either scrollable region leads to showing a button for another service menu.

Figure 53B:
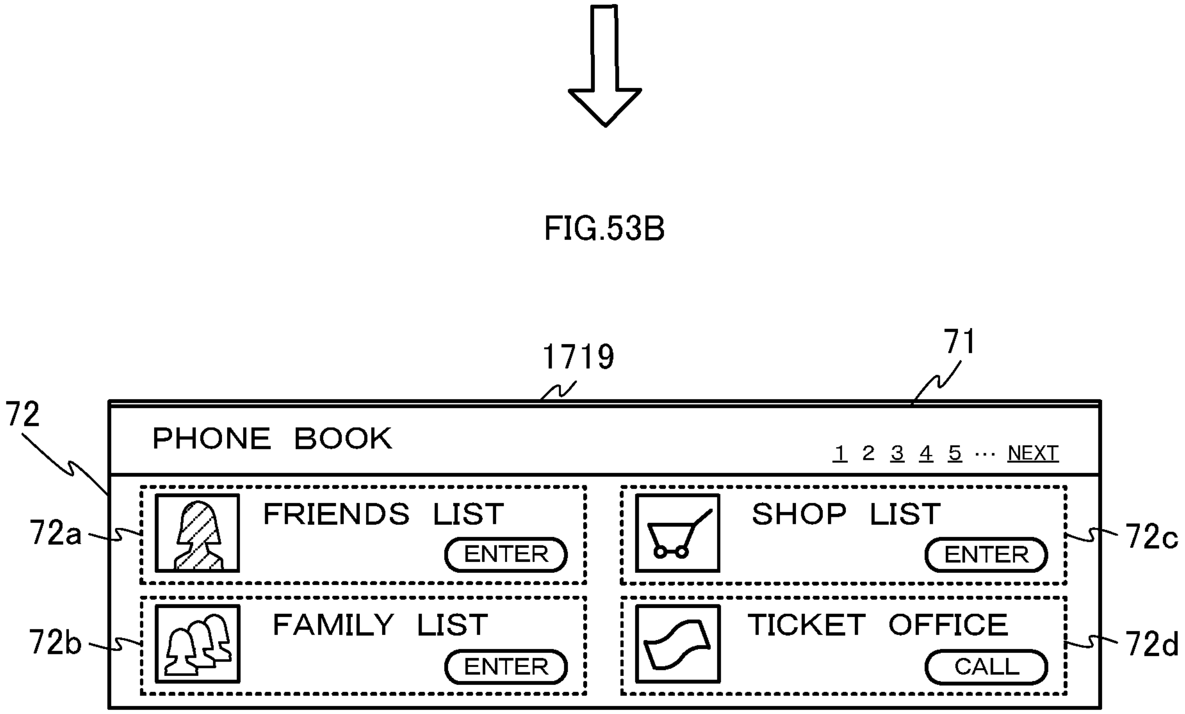

In response to a touch on the VoIP PHONE button by the player, the display on the LCD 1719 changes to the phone book screen 71 as shown in FIG. 53B. The phone book screen 71 shows a list of the parties the logged-in member (the member identified by the membership card) can talk over the VoIP phone. As shown in FIG. 53B, the phone book display section 72 shows only four parties at maximum but can show further parties in response to a touch on the page indicator displayed on the right side of the title display section or a flick on the touch panel.

In FIG. 53B, the categorized phone book display section 72*a* in the phone book display section 72 includes a display section of a link to the friend list (the ENTER button display section); the categorized phone book display section 72*b* includes a display section of a link to the family list (the ENTER button display section); the categorized phone book display section 72*c* includes a display section of a link to the shop list (the ENTER button display section); and the categorized phone book display section 72*d* shows a call instruction section to make a call to the ticket office (the CALL button display section). As noted from this example, the phone book display section 72 can include a link display section (ENTER button display section) to deploy the list and a call instruction section (CALL button display section) to make a call in the VoIP phone system together.

Figure 54A:
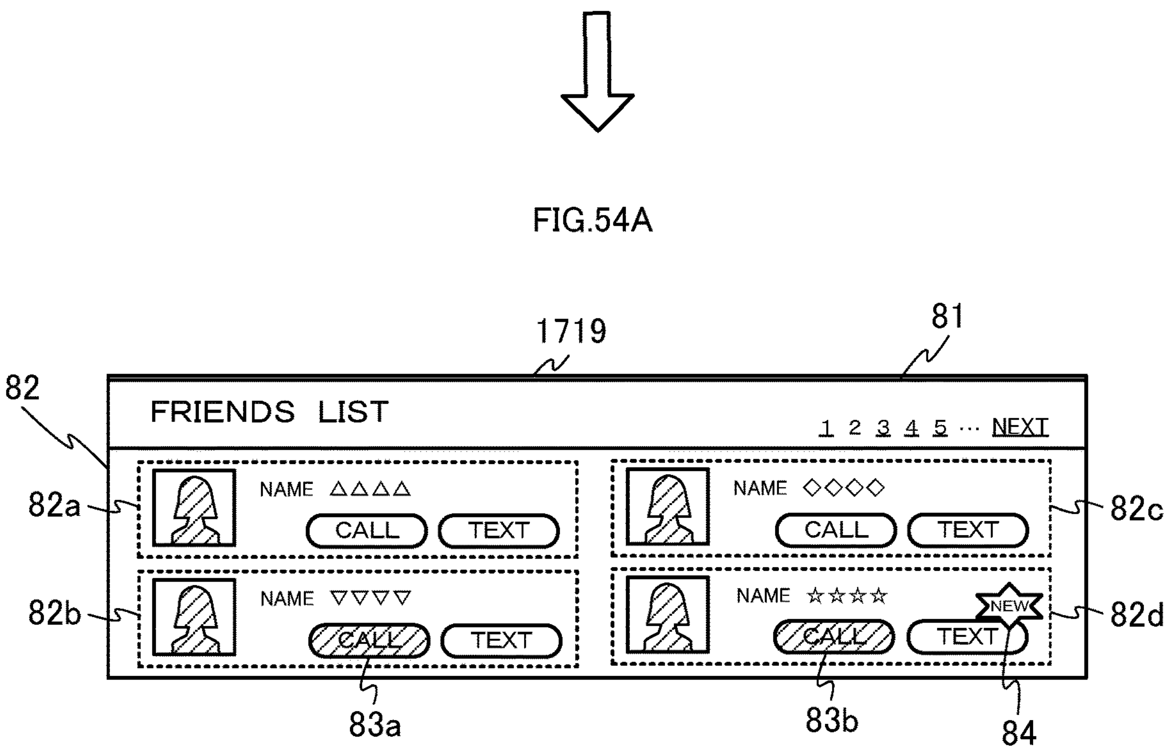
FIGS. 54A and 54B are diagrams for illustrating examples of screens associated with calling operations in VoIP phone system to be shown on a display device of a PTS terminal in an embodiment of the present invention.

In response to a touch on the link display section to the friend list in the categorized phone book display section 72*a*, the display on the LCD 1719 of the PTS terminal 1700 changes to the friend list screen 81 shown in FIG. 54A. This screen displays a list of the friends registered by the logged-in member. This example shows a friend list of the player of an identification code 0001.

As shown in FIG. 54A, the friend list screen 81 shows only four friends at maximum but can show further friends in response to a touch on the page indicator displayed on the right side of the title display section or a flick on the touch panel.

In this example, each of the contact details display sections 82*a* to 82*d* includes a call instruction section (CALL button display section) and a TEXT button display section. The CALL button display section is to make a call in the VoIP phone system to the corresponding member in response to a touch on this section. This operation corresponds to sending a call request (INVITE) described with reference to FIG. 33. The CALL button display section 83*a* of the contact details display section 82*b* and the CALL button display section 83*b* of the contact details display section 82*d* are grayed out and are not allowed to be touched. This means that these friends are registered by the player of this slot machine 1010 but cannot talk over the VoIP phone because they are not using slot machines 1010 (have not logged in with membership cards) or have not logged in through kiosk terminals 200.

The contacts display section 82 shows friends registered by the member of the identification code 0001 (see FIGS. 22 and 23). The contact details display section 82*a* shows information on the member of the identification code 0002; the contact details display section 82*b* shows information on the member of the identification code 0003; the contact details display section 82*c* shows information on the member of the identification code 0007; and the contact details display section 82*d* shows information on the member of the identification code 0009. As to the member of the identification code 0005, the member does not come up to the contacts display section 82 since the status is BLOCK, although the member is registered in the friend list.

The TEXT button display section enables sending and receiving text messages with the corresponding member in response to a touch on this section. In the contact details display section 82*d*, "NEW" 84 is displayed on the upper right of the TEXT button display section. This means that a text message has been sent from the member; the player can display the message sent from the member on the LCD 1719 of the PTS terminal 1700 by touching the TEXT button display section.

Figure 54B:
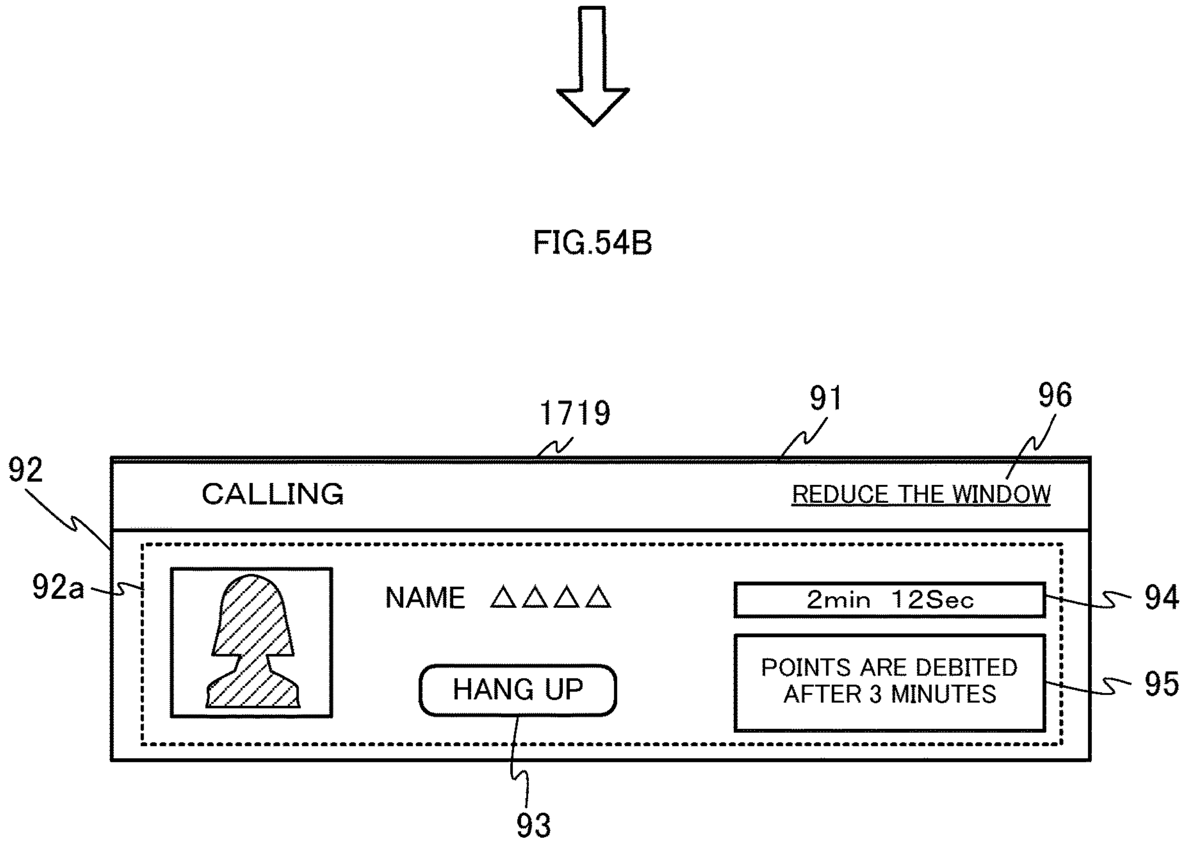

When the player touches the CALL button display section in the contact details display section 82*a*, a VoIP call is made to the corresponding member (the member of the identification code 0002) and a calling screen 91 as shown in FIG. 54(B) is displayed on the LCD 1719 of the PTS terminal 1700. The callee display section 92 shows the name and the icon of the member of the callee shown in the contact details display section 82*a* in FIG. 54A and further, shows a HANG UP button display section 93, a talk time display section 94, and a point spending notice 95.

In response to a touch on the HANG UP button display section 93, the VoIP call is disconnected. The talk time indication section 94 shows the elapsed time in the current call.

The point spending notice 95 shows a notification that call charge will apply and be debited from the points owned by the member if the talk time exceeds a predetermined time (in this example, three minutes). The VoIP calls can be arranged to debit the call charge from the points or credit-related data for the calls taking longer than a predetermined time. Such charging for calls can be applied only to the calls to the outside of the hall or otherwise, conditions on charging can be determined differently between the calls within the hall and the calls to the outside of the hall.

As noted from the phone book screen 71 in FIG. 53B, VoIP calls can be made to a party outside of the hall, such as a ticket office or a shop, as well as a party inside the hall; the call control server 16 controls the calls with the telephones connected with the PSTN 18 through the PSTN gateway 17 (see FIG. 28).

Furthermore, in response to a touch on the window reduction instruction section 96 shown on the upper right of the calling screen 91 in FIG. 54(B), the calling screen 91 is reduced to display other information.

As mentioned above, the VoIP phone service can also be provided through a kiosk terminal 200. Since the LCD 201 has a larger size than the LCD 1719 of a PTS terminal 1700, the phone book screen 71 can list up more parties. The VoIP phone service can also be provided through a signage apparatus 100.

Second Embodiment

The present embodiment describes an example where environmental information acquired by the PTS terminal 1700 is captured-image information with reference to FIGS. 54 to 58. In the present embodiment, elements different from those described in the first embodiment are mainly described; the same elements as those described in the first embodiment are denoted by the same reference signs and description thereof is omitted as appropriate.

[Environment Monitoring Service]

Figure 55:
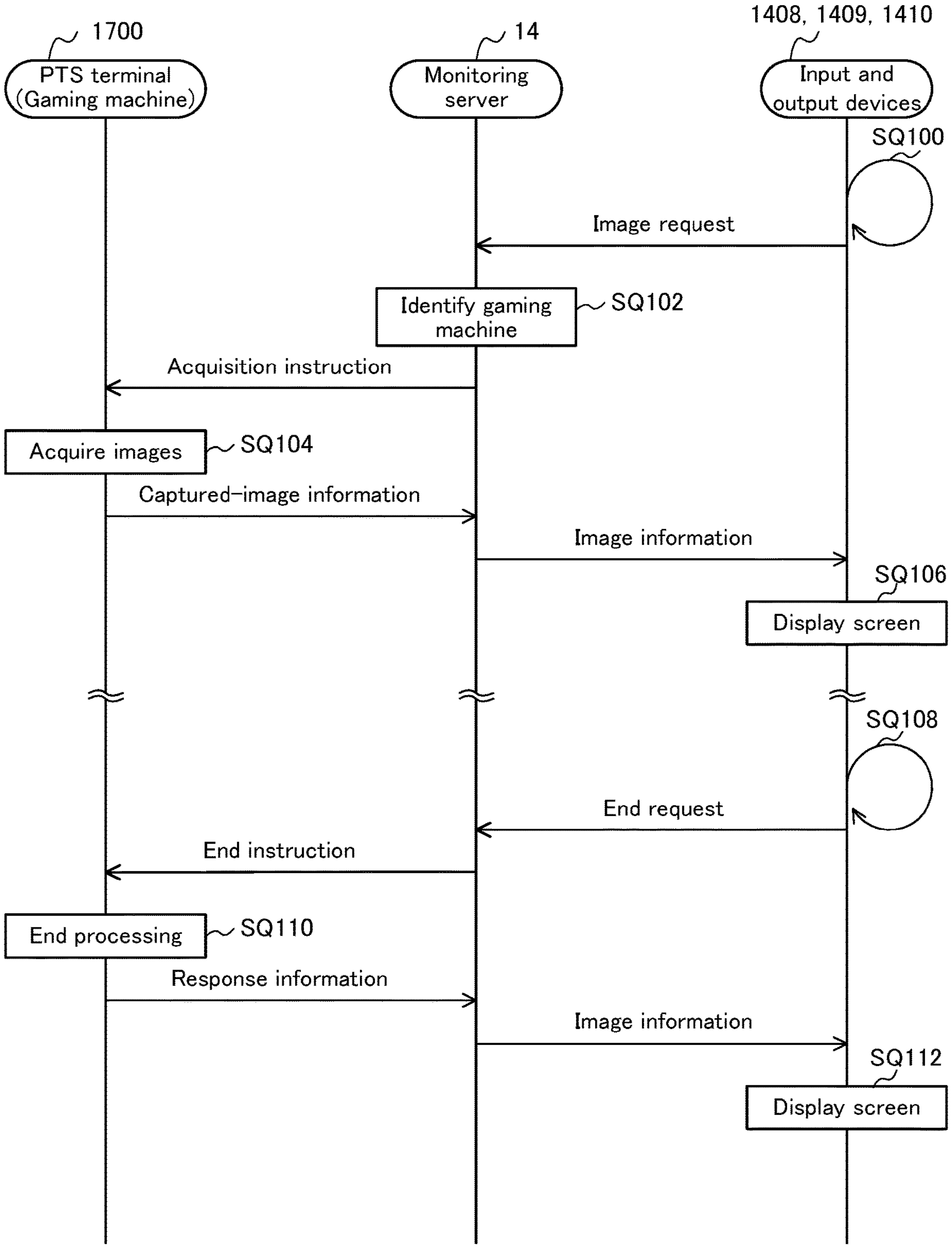
FIG. 55 is a diagram for illustrating a processing sequence of an environment monitoring service in another embodiment of the present invention.

FIG. 55 illustrates an example of a sequence of environment monitoring service (image monitoring service). An outline of the environment monitoring service is described with reference to this sequence diagram.

At SQ100, in response to selection (user operation) of a gaming machine where to request images in the environment monitoring screen (image monitoring screen) displayed on the LCD 1408, an image request is sent to the monitoring server 14. The image request is sent together with a signal (such as coordinate signal or positional signal) for identifying the gaming machine.

Upon receipt of the image request and the signal for identifying the gaming machine, the monitoring server 14 identifies the apparatus identification code of the gaming machine where to acquire images based on the signal for identifying the gaming machine (SQ102). The monitoring server 14 acquires the IP address associated with the identified apparatus identification code based on the address management table and sends an instruction for acquiring captured-image information (acquisition instruction) to the gaming machine (the PTS terminal 1700 thereof) assigned the IP address.

Upon receipt of the acquisition instruction, the PTS terminal 1700 acquires captured-image information and sends the acquired captured-image information to the monitoring server 14 (SQ104).

Upon receipt of the captured-image information, the monitoring server 14 stores the received captured-image information to the external storage device 1404 together with the apparatus identification code. The monitoring server 14 creates an environment monitoring screen (image information) including the stored captured-image information and the floor map. The monitoring server 14 sends the created image information to the LCD 1408.

Upon receipt of the image information, the LCD 1408 displays an environment monitoring screen (SQ106).

At SQ108, in response to selection (user operation) of the end button in the environment monitoring screen displayed on the LCD 1408, an end request is sent to the monitoring server 14. Upon receipt of the end request, the monitoring server 14 sends an instruction (end instruction) to terminate the acquisition of captured-image information to the PTS terminal 1700. The monitoring server 14 further sends an instruction to close the environment monitoring screen (for example, an instruction to display the main menu screen) and image information therefor to the LCD 1408.

Upon receipt of the end instruction, the PTS terminal 1700 performs processing (end processing) to terminate the acquiring captured-image information (SQ110). After completion of the end processing, the PTS terminal 1700 sends response information to the monitoring server 14.

The LCD 1408 receives the image information and displays the main menu screen (SQ112).

Figure 56:
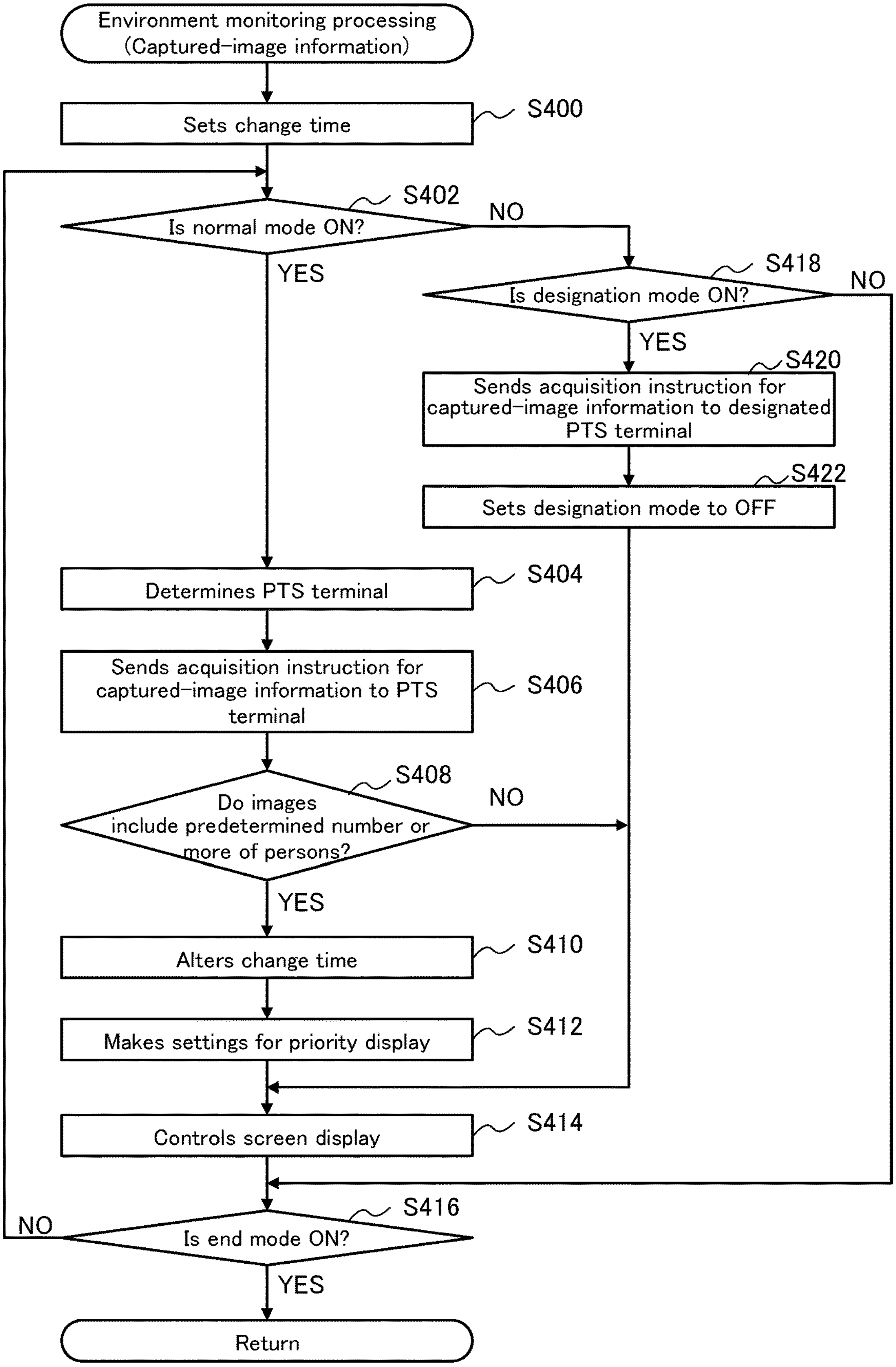
FIG. 56 is a flowchart for illustrating a procedure of environment monitoring processing of a monitoring server in another embodiment of the present invention.

FIG. 56 is an example of a flowchart of environment monitoring processing. This section describes an example of environment monitoring processing in which the environmental information is captured-image information.

At S400, the CPU 1401 sets a change time (first time) for changing images of a PTS terminal 1700 to images of another PTS terminal 1700. Upon completion of this processing, the CPU 1401 proceeds to S402.

At S402, the CPU 1401 determines whether the normal mode is ON. If the determination is that the normal mode is ON, the CPU 1401 proceeds to S404; if the determination is that the normal mode is OFF, the CPU 1401 proceeds to S418.

At S404, the CPU 1401 determines the PTS terminal 1700 where to acquire images. At this step, the CPU 1401 selects a gaming machine from the gaming machines the apparatus statuses of which are OFF LINE by rotation with reference to the address management table. Upon completion of this processing, the CPU 1401 proceeds to S406.

This step selects and determines a gaming machine without a player sitting in front thereof or a kiosk terminal 200 without a person standing in front thereof; accordingly, situations such that the peripheral information cannot be acquired or is hard to be acquired because of the person in front of the apparatus can be reduced.

At S406, the CPU 1401 sends an acquisition instruction for captured-image information to the determined PTS terminal 1700. Upon completion of this processing, the CPU 1401 proceeds to S408.

At S408, the CPU 1401 analyzes the images and determines whether the captured images include a predetermined number or more of persons. If the determination is that the captured images include a predetermined number or more of persons, the CPU 1401 proceeds to S410; if the determination is that the captured images do not include a predetermined number or more of persons, the CPU 1401 proceeds to S414.

At S410, the CPU 1401 alters the change time. More specifically, the CPU 1401 alters the display time for these images to a second time longer than the first time. Upon completion of this processing, the CPU 1401 proceeds to S412.

At S412, the CPU 1401 makes settings for priority display. More specifically, the CPU 1401 creates a floor map indicating that the images are being displayed with high priority. Upon completion of this processing, the CPU 1401 proceeds to S414.

At S414, the CPU 1401 conducts screen display control. More specifically, the CPU 1401 outputs an instruction to display the floor map showing the captured-image information received from the PTS terminal 1700 on the LCD 1408 to the graphic board 1405. Upon completion of this processing, the CPU 1401 proceeds to S416.

At S416, the CPU 1401 determines whether the end mode is ON. If the determination is that the end mode is ON, the CPU 1401 terminates the environment monitoring processing; if the determination is that the end mode is OFF, the CPU 1401 proceeds to S402.

At S418, the CPU 1401 determines whether the designation mode is ON. If the determination is that the designation mode is ON, the CPU 1401 proceeds to S420; if the determination is that the designation mode is OFF, the CPU 1401 proceeds to S416.

At S420, the CPU 1401 sends an acquisition instruction for captured-image information to the PTS terminal 1700 of the gaming machine designated by the user operation. Upon completion of this processing, the CPU 1401 proceeds to S422.

At S422, the CPU 1401 sets the designation mode to OFF and proceeds to S414.

The environment monitoring processing is not limited to the above-described processing.

For example, in the processing of S404, the CPU 1401 may select a gaming machine by rotation from the gaming machines apparatus statuses of which are either ON LINE or OFF LINE, instead of only the gaming machines apparatus statuses of which are OFF LINE.

In addition to or instead of S410, the CPU 1401 may change the size of the screen to show the images from a first size to be used when the number of persons in the images is not more than the predetermined number to a second size larger than the first size.

In addition to or instead of S410 and S412, the CPU 1401 may count the persons standing in front of the gaming machine and reflect the result to the floor map by indicating the number or icons at the place of the gaming machine or by indicating an icon in different sizes or colors depending on the number of persons.

This configuration facilitates the grasp of disproportion of persons on the wide floor of the casino.

In addition to or instead of S410 and S412, the CPU 1401 may analyze the direction of movement of the persons and reflect the result to the floor map by including an icon of an arrow associated with the amount of movement (a thicker arrow or a larger arrow when the amount of movement is larger).

This configuration facilitates the grasp the movement of persons on the wide floor of the casino.

It should be noted that the foregoing configurations of the environment monitoring processing are also applicable to the surveillance camera change processing as appropriate.

Figure 57:
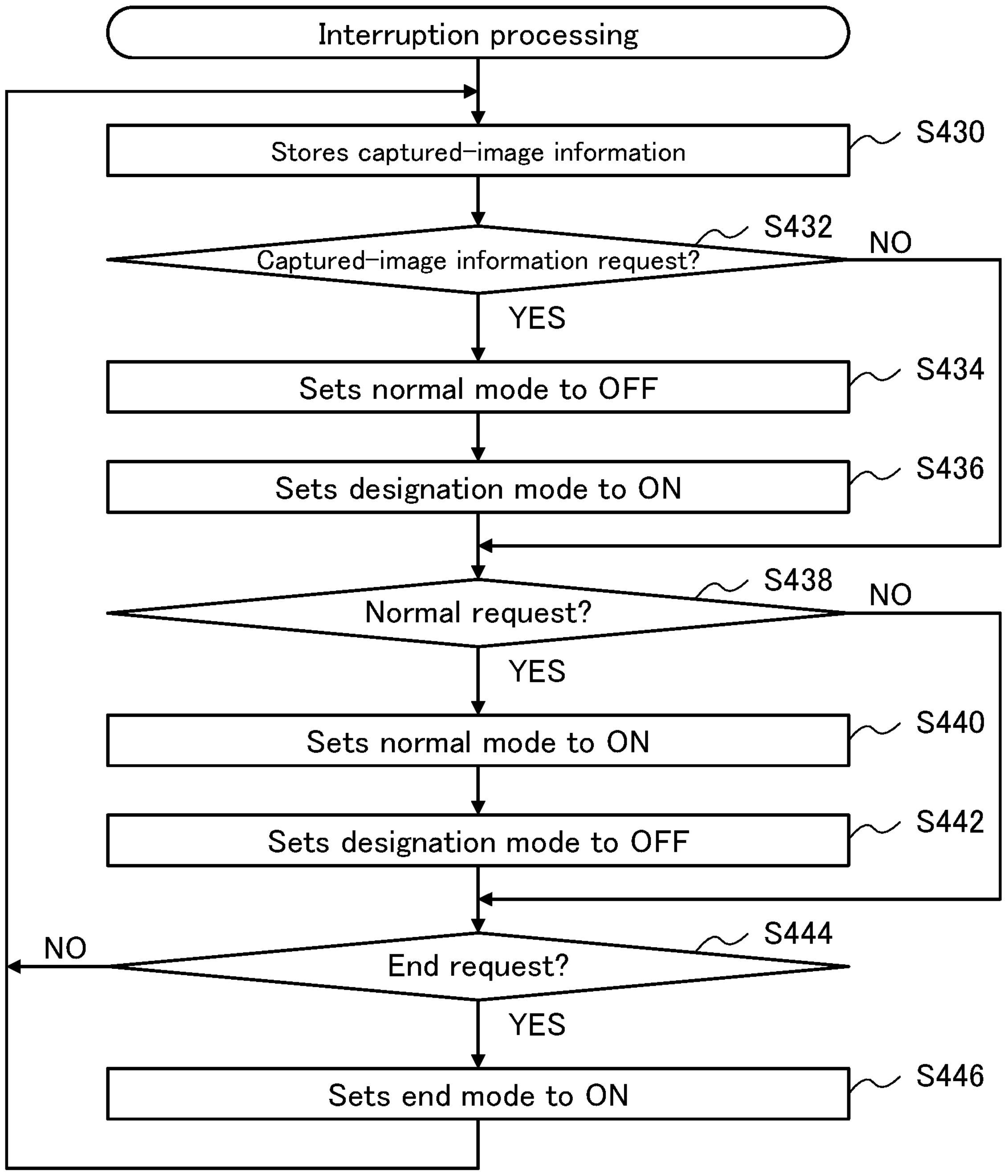
FIG. 57 is a flowchart for illustrating a procedure of interruption processing of a monitoring server in another embodiment of the present invention.

FIG. 57 is an example of a flowchart of interruption processing. The CPU 1401 conducts this interruption processing while executing environment monitoring processing (captured-image information).

At S430, the CPU 1401 stores captured-image information. More specifically, upon receipt of captured-image information and the apparatus identification code from a PTS terminal 1700, the CPU 1401 stores the captured-image information to the external storage device 1404 together with the apparatus identification code. Upon completion of this processing, the CPU 1401 proceeds to S432.

At S432, the CPU 1401 determines whether a request for captured-image information is received. More specifically, the CPU 1401 determines whether a signal indicating a press of a gaming machine icon on the environment monitoring screen is received from the input control unit 1406. If the determination is that a request for captured-image information is received, the CPU 1401 proceeds to S434; if the determination is that no request for captured-image information is received, the CPU 1401 proceeds to S438.

At S434, the CPU 1401 sets the normal mode to OFF and proceeds to S436.

At S436, the CPU 1401 sets the designation mode to ON and proceeds to S438.

At S438, the CPU 1401 determines whether a normal request is received. More specifically, the CPU 1401 determines whether a signal indicating a press of the AUTOMATIC CHANGE button on the environment monitoring screen is received from the input control unit 1406. If the determination is that a normal request is received, the CPU 1401 proceeds to S440; if the determination is that no normal request is received, the CPU 1401 proceeds to S444.

At S440, the CPU 1401 sets the normal mode to ON and proceeds to S442.

At S442, the CPU 1401 sets the designation mode to OFF and proceeds to S444.

At S444, the CPU 1401 determines whether an end request is received. More specifically, the CPU 1401 determines whether a signal indicating a press of the end button on the environment monitoring screen is received from the input control unit 1406. If the determination is that an end request is received, the CPU 1401 proceeds to S446; if the determination is that no end request is received, the CPU 1401 proceeds to S430.

At S446, the CPU 1401 sets the end mode to ON and proceeds to S430.

Figure 58:
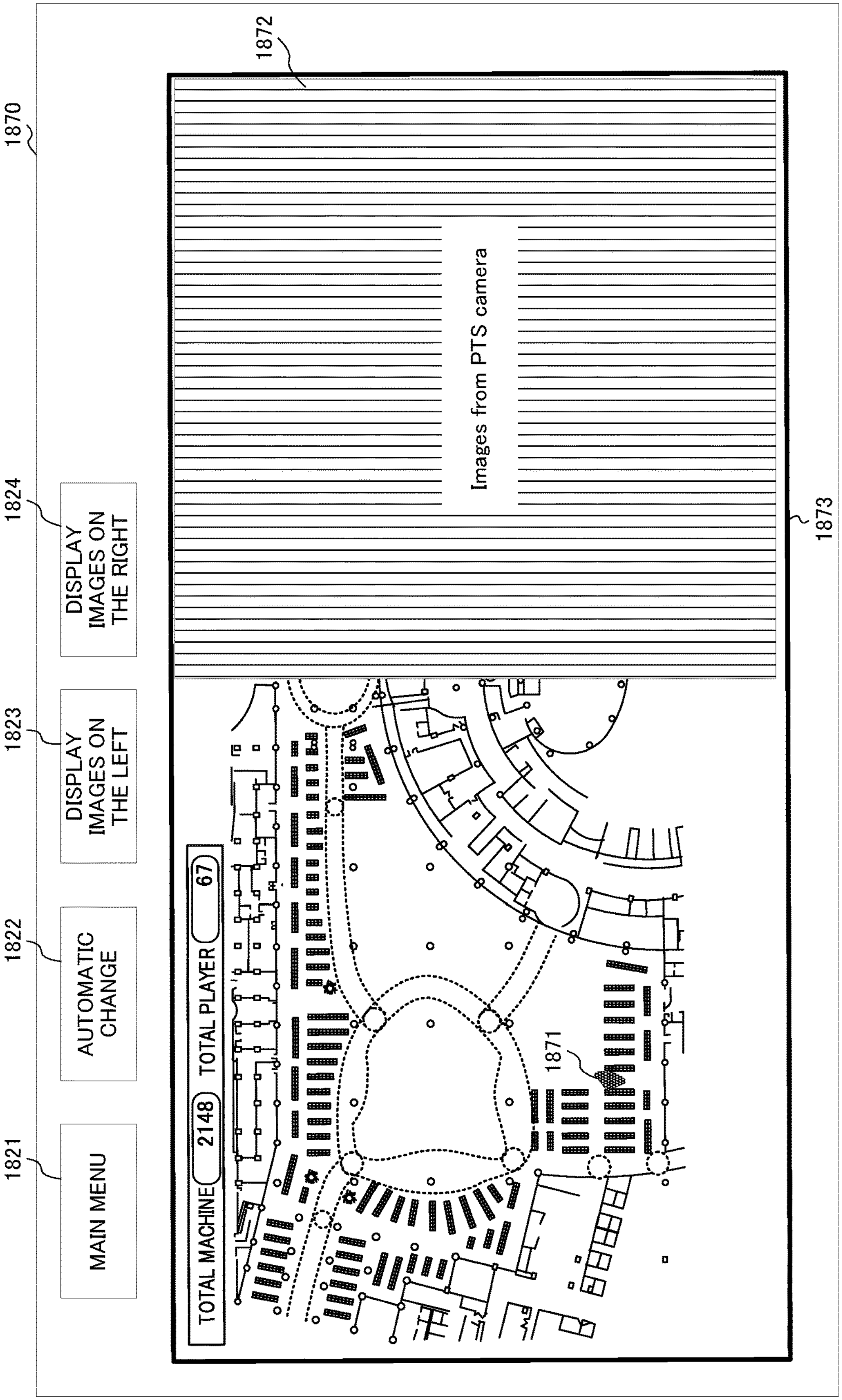
FIG. 58 is a diagram for illustrating an example of an environment monitoring screen in another embodiment of the present invention.

FIG. 58 is a diagram for illustrating an example of an environment monitoring screen (environment monitoring screen 1870) displayed in response to selection of the PTS image display menu in the main menu.

The environment monitoring screen 1870 includes a plurality of buttons 1821 to 1824, a floor map 1873, and an image display region 1872.

In the floor map 1873, an imaging range icon 1871 corresponding to the PTS terminal 1700 that has acquired the images being displayed in the image display region 1872. The imaging range icon 1872 indicates which part of a wide casino is being captured at a glance.

In response to selection of a gaming machine icon on the floor map, the images being displayed in the image display region 1872 is changed to the images captured by the PTS terminal 1700 corresponding to the selected gaming machine icon (in this example, cell) and the images is displayed continuously.

The changing the image source is not limited to the above-described configuration. For example, the image source can be changed by inputting an apparatus identification code.

This configuration enables quick and accurate acquisition of captured-image information of a specific gaming machine.

Alternatively, in response to a click on a desired place on the floor map, the CPU 1401 of the monitoring server 14 may locate a PTS terminal 1700 (gaming machine) installed closest to the place and changes the display to the images of the PTS terminal 1700.

This configuration facilitates the acquisition of images at a desired place.

Still alternatively, in response to a click on a desired place on the floor map, the CPU 1401 of the monitoring server 14 may list up the PTS terminals 1700 installed around the place (the PTS terminals included in a specific range or a predetermined number of PTS terminals 1700 located within a shorter distance) and change the display to the images of the PTS terminals 1700.

In this configuration, the candidate images at the desired place are displayed on the LCD 1408 by rotation. The candidate images cover the environment of the desired place. Furthermore, the candidate images can be efficiently narrowed down to the preferable images at the desired place.

Although the image monitoring service has been described using the example of the PTS terminals 1700 (gaming machines), the same applies to the signage apparatuses 100 or the kiosk terminals 200; accordingly, description thereof is omitted herein.

Third Embodiment

Figure 59:
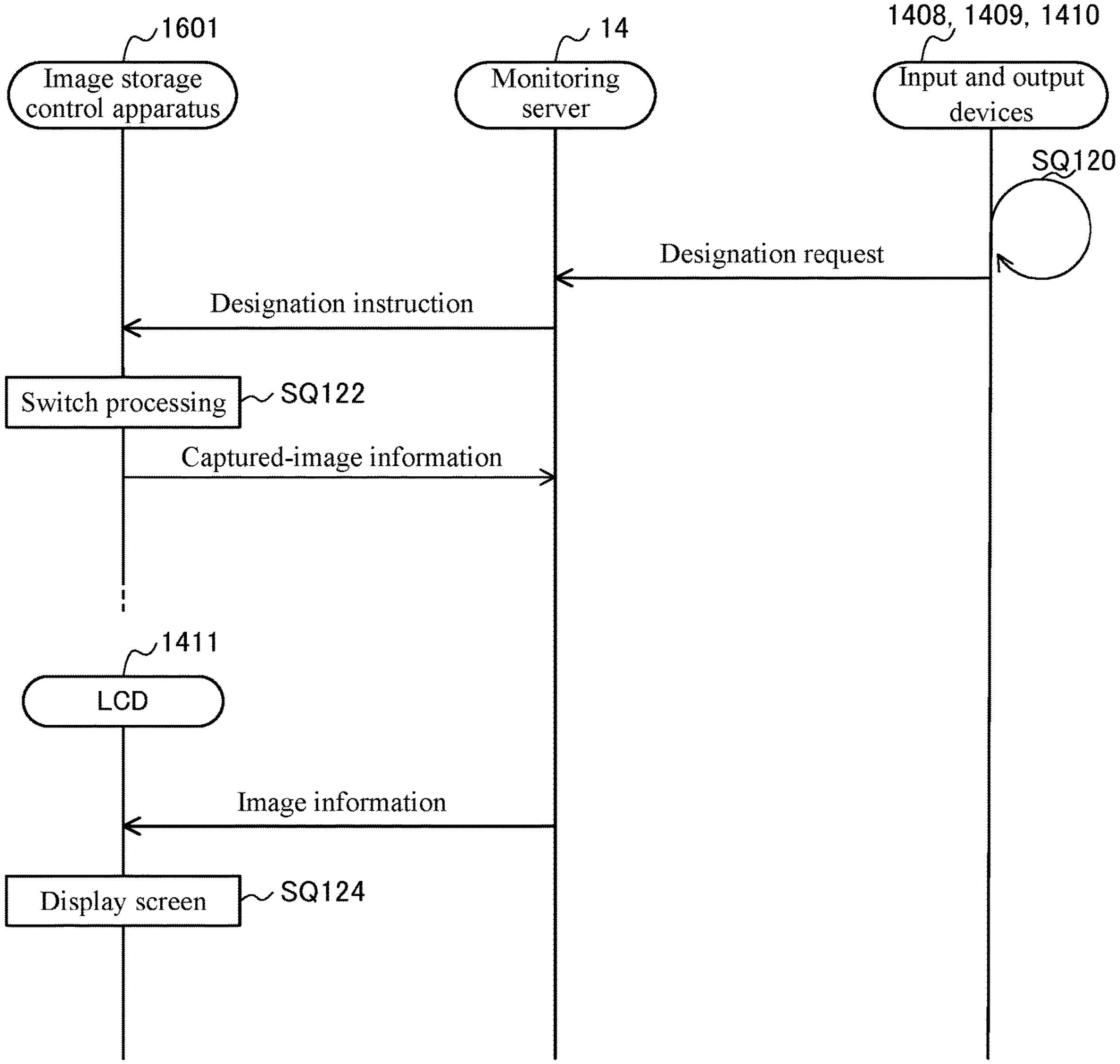
FIG. 59 is a diagram for illustrating a processing sequence of a surveillance camera service in another embodiment of the present invention.
Figure 60:
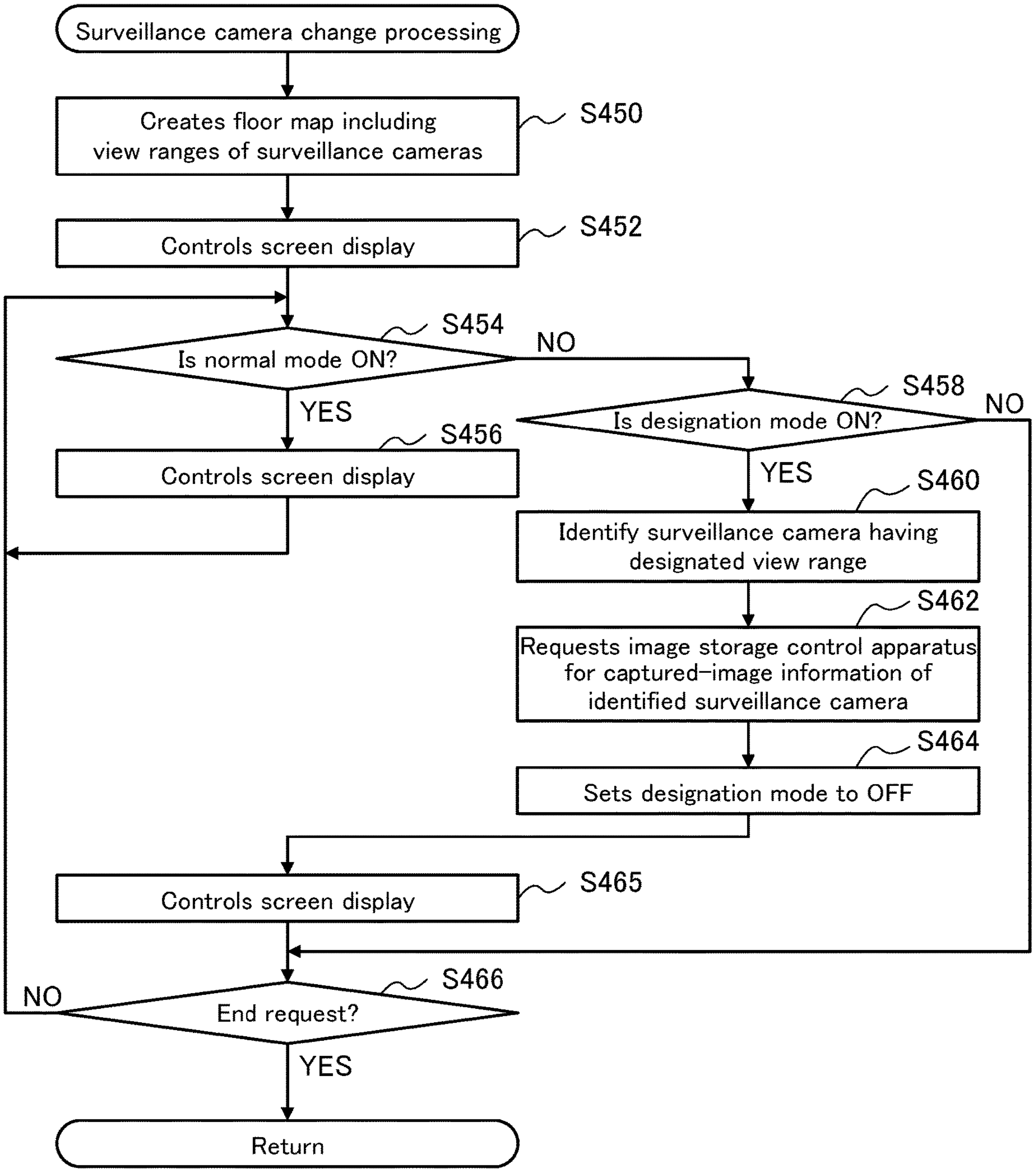
FIG. 60 is a flowchart for illustrating a procedure of surveillance camera switch processing of a monitoring server in another embodiment of the present invention.

The present embodiment mainly describes a method of changing and displaying captured-image information acquired by the surveillance cameras 1611 to 1613 with reference to FIGS. 59 and 60. In the present embodiment, elements different from those described in the first embodiment are mainly described; the same elements as those described in the first embodiment are denoted by the same reference signs and description thereof is omitted as appropriate.

[Surveillance Camera Service]

FIG. 59 illustrates an example of a sequence of changing captured-image information in the surveillance camera service. This sequence is a sequence performed subsequent to SQ32 in FIG. 30.

In response to selection of a view range icon in the surveillance camera screen at SQ120, a designation request is sent to the monitoring server 14. In this sequence, a signal for identifying the coordinates of the selected view range icon is sent from the input controller 1406 connected with the mouse 1410. Upon receipt of the designation request, the monitoring server 14 identifies the surveillance camera having the designated view range and sends an instruction (designation instruction) for acquiring captured-image information of the designated surveillance camera to the image storage control apparatus 1601. The monitoring server 14 sends the apparatus identification code of the designated surveillance camera with the designation instruction.

Upon receipt of the designation instruction and the apparatus identification code of the surveillance camera, the image storage control apparatus 1601 performs switch processing to switch from sending captured-image information while changing the information source at predetermined intervals to sending captured-image information of the designated surveillance camera (SQ122).

The image storage control apparatus 1601 sends the captured-image information of the designated surveillance camera to the monitoring server 14.

Upon receipt of the captured-image information, the monitoring server 14 sends the received captured-image information as image information to the LCD 1411 connected with the monitoring server 14 and different from the LCD 1408.

The LCD 1411 receives the image information and displays the screen (surveillance camera image display screen) (SQ124). The LCD 1408 keeps displaying the surveillance camera screen and the LCD 1411 displays the images taken by the designated surveillance camera continuously.

FIG. 60 is an example of a flowchart of surveillance camera change processing. The processing at S450, S452, S454, S456, S464, and S466 are respectively the same as the processing at S250, S252, S254, S256, S262, and S264 in FIG. 37; the explanation is omitted herein.

At S458, the CPU 1401 determines whether the designation mode is ON. If the determination is that the designation mode is ON, the CPU 1401 proceeds to S460; if the determination is that the designation mode is OFF, the CPU 1401 proceeds to S466.

At S460, the CPU 1401 identifies the surveillance camera having the view range including the coordinates designated by the user operation. Upon completion of this processing, the CPU 1401 proceeds to S462.

At S462, the CPU 1401 requests the image storage control apparatus 1601 for captured-image information of the identified surveillance camera (by sending a designation instruction). Upon completion of this processing, the CPU 1401 proceeds to S464. If the user designates a point where view ranges are overlapped, captured-image information is acquired from the surveillance cameras having the view ranges.

At S465, the CPU 1401 conducts screen display control. More specifically, the CPU 1401 outputs an instruction to display a surveillance camera image display screen showing the captured-image information stored in the external storage device 1404 on the LCD 1411 to the graphic board 1405. Upon completion of this processing, the CPU 1401 proceeds to S466.

The LCD 1411 may display the captured-image information while changing the image sources by rotation or display the captured-image information on a multi-split screen.

The above-described configuration displays captured-image information in the designated view range on a display device different from the display device showing the floor map.

This configuration enables the designated captured-image information to be checked on a different display device without changing the size of the floor map or overlaying the captured-image information on the floor map.

Fourth Embodiment

Figure 61:
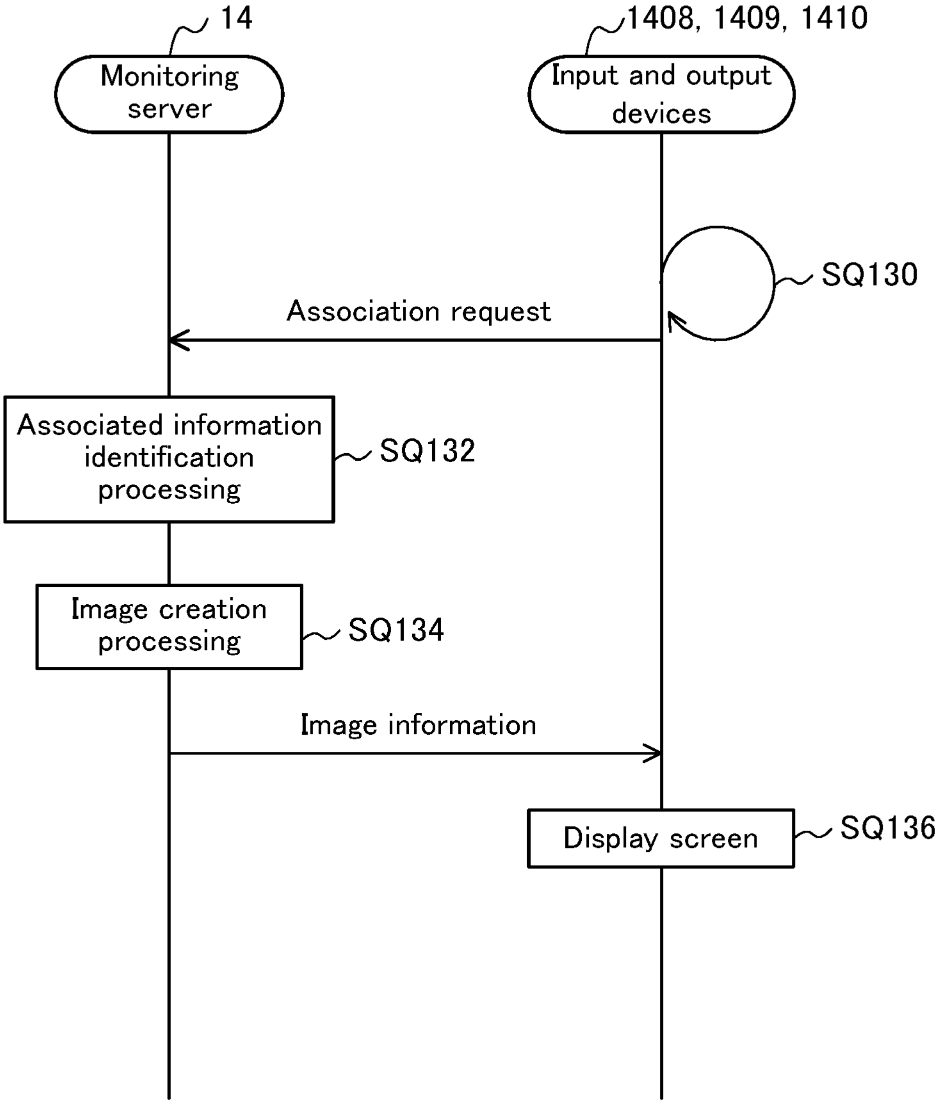
FIG. 61 is a diagram for illustrating a processing sequence of a related-person indication service in another embodiment of the present invention.
Figure 62:
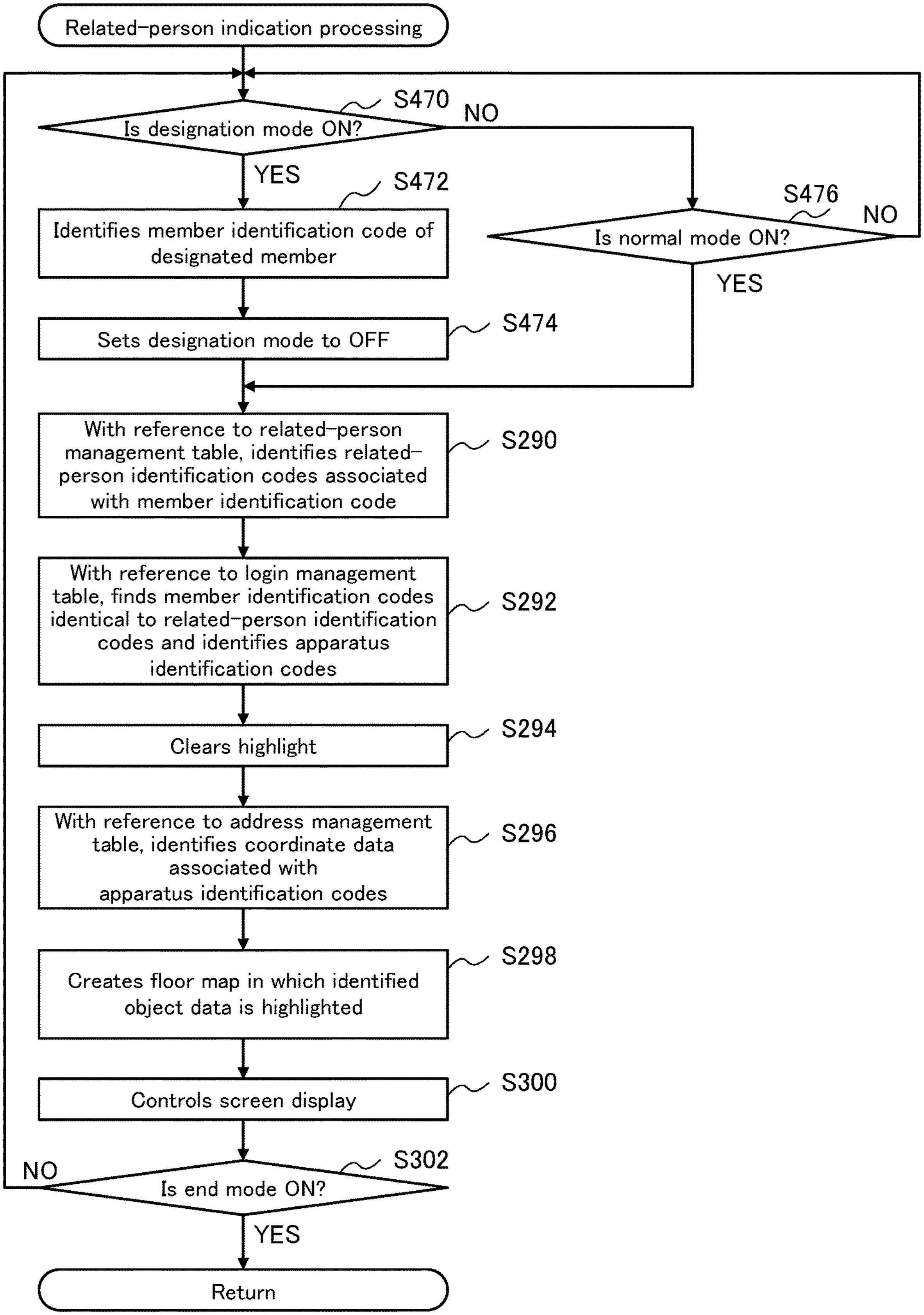
FIG. 62 is a flowchart for illustrating a procedure of related-person indication processing of a monitoring server in another embodiment of the present invention.

The present embodiment mainly describes a method of displaying information associated with a member with reference to FIGS. 61 and 62. In the present embodiment, elements different from those described in the first embodiment are mainly described; the same elements as those described in the first embodiment are denoted by the same reference signs and description thereof is omitted as appropriate.

[Related-Person Indication Service]

FIG. 61 illustrates an example of a sequence of changing the indication in the related-person indication service. This sequence is a sequence that can be performed subsequent to SQ48 in FIG. 31.

In response to selection of a logged-in machine icon in the related-person indication screen at SQ130, an association request is sent to the monitoring server 14. In this sequence, a signal for identifying the coordinates of the selected machine icon is sent from the input controller 1406 connected with the mouse 1410.

Upon receipt of the association request, the monitoring server 14 identifies the gaming machine and the member at the designated point and identifies the related persons associated with the identified member (SQ132).

The monitoring server 14 creates a floor map showing the identified member and the related persons in a highlighted manner (SQ134). The monitoring server 14 sends the created image information to the LCD 1408.

Upon receipt of the image information, the LCD 1408 displays a screen (related-person indication screen) (SQ136).

FIG. 62 is an example of a flowchart of related-person indication processing. The processing from S290 to S302 is the same as the processing of FIG. 39; the explanation is omitted herein.

At S470, the CPU 1401 determines whether the designation mode is ON. If the determination is that the designation mode is ON, the CPU 1401 proceeds to S472; if the determination is that the designation mode is OFF, the CPU 1401 proceeds to S476.

At S472, the CPU 1401 identifies the member identification code of the member associated with the designated machine icon. More specifically, the CPU 1401 identifies the apparatus identification code for the machine icon at the coordinates designated by the user operation with reference to the address management table and identifies the member identification code associated with the apparatus identification code with reference to the login management table. Upon completion of this processing, the CPU 1401 proceeds to S474.

At S474, the CPU 1401 sets the designation mode to OFF and proceeds to S290.

At S476, the CPU 1401 determines whether the normal mode is ON. If the determination is that the normal mode is ON, the CPU 1401 proceeds to S290; if the determination is that the normal mode is OFF, the CPU 1401 proceeds to S470.

The above-described configuration highlights the persons (friends or family members) associated with an apparatus (member) in response to designation of a logged-in machine icon on the floor map.

That is to say, the configuration facilitates grasping the related persons of not only the member who has just logged in but also a member who has previously logged in.

Although not shown in the drawing, in the interruption processing, the normal mode is set to ON (the designation mode is set to OFF) in response to a press of the latest login status indication button, and the designation mode is set to ON (the normal mode is set to OFF) in response to selection of a machine icon.

Fifth Embodiment

Figure 63:
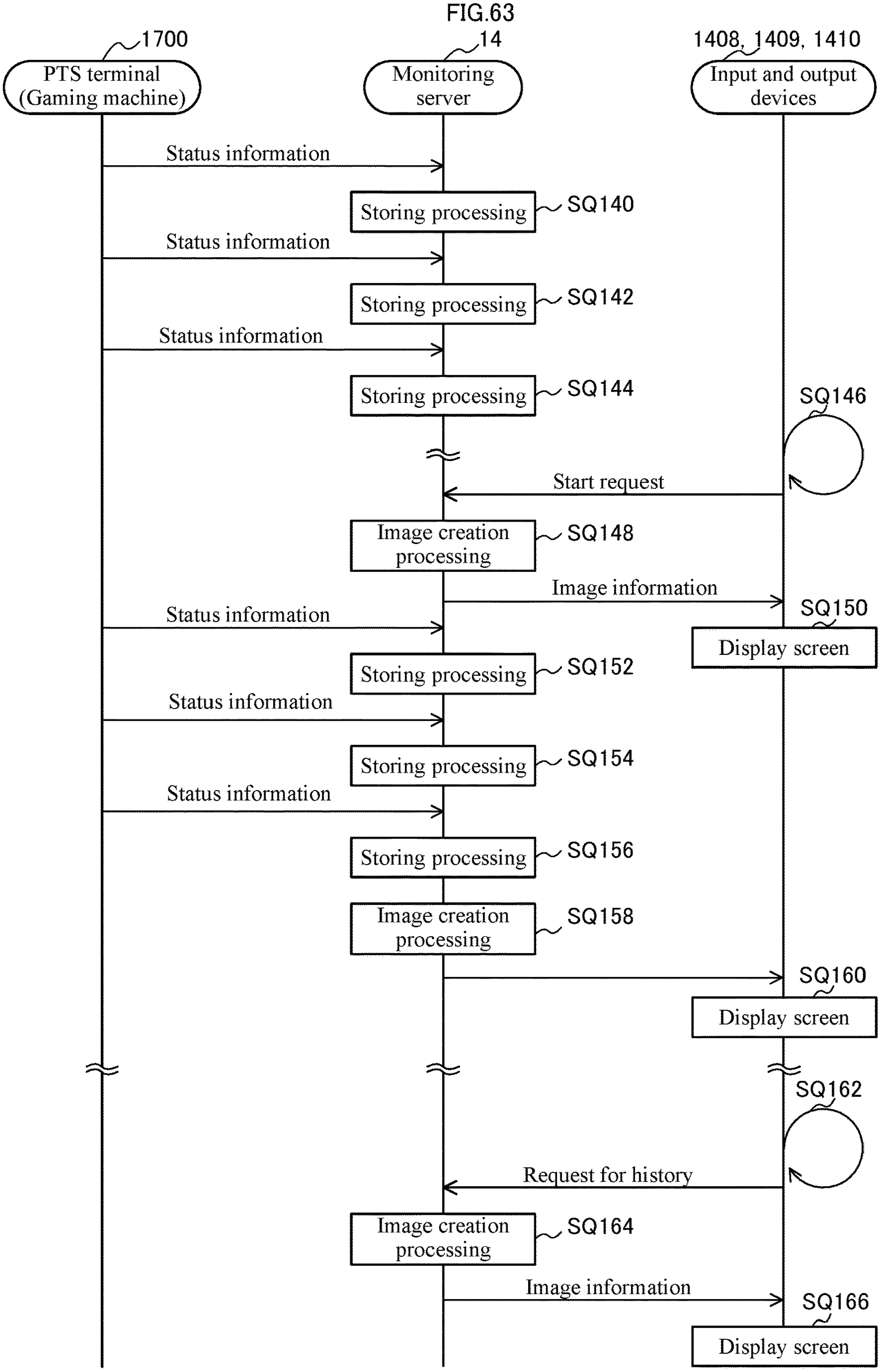
FIG. 63 is a diagram for illustrating a processing sequence of a machine status indication service in another embodiment of the present invention.

The present embodiment mainly describes displaying the history of apparatus status with reference to FIG. 63. In the present embodiment, elements different from those described in the first embodiment are mainly described; the same elements as those described in the first embodiment are denoted by the same reference signs and description thereof is omitted as appropriate.

[Apparatus Status Indication Service]

FIG. 63 is an example of a sequence of apparatus status indication service. An outline of displaying the history of apparatus status is described with reference to this sequence diagram. The monitoring server 14 receives status information representing the statuses (conditions) of the gaming machines from the PTS terminals 1700 and stores the received status information in the apparatus status history table in the external storage device 1401 (SQ140, SQ142, SQ144, SQ152, SQ154, and SQ156).

The processing at SQ146, SQ148, SQ150, SQ158, and SQ160 are respectively the same as SQ50, SQ52, SQ54, SQ56, and SQ58 in FIG. 32; the explanation thereof is omitted herein.

At SQ162, in response to designation of a time and selection of a DISPLAY HISTORY button in the apparatus status indication screen, a request for history is sent to the monitoring server 14. In this sequence, a signal for identifying the designated time is sent from the input controller 1406 connected with the mouse 1410. Upon receipt of the request for history, the monitoring server 14 acquires the apparatus statuses of the gaming machines as of the designated time with reference to the apparatus status history table and creates a floor map in which the apparatus statuses are mapped (SQ164). The monitoring server 14 sends the created image information to the LCD 1408.

Upon receipt of the image information, the LCD 1408 displays a screen (apparatus status indication screen) (SQ166).

The above-described configuration enables grasp of the apparatus statuses in real time and further, grasp of the apparatus statuses in the past as necessary.

The configurations described in the first embodiment to the fifth embodiment can be combined as appropriate.

In the foregoing embodiments, the present invention has been described using the examples where the present invention has been applied to a gaming hall, but the embodiments are not limited to these. The present invention is applicable to facilities other than the amusement facilities represented by a gaming hall. For example, the present invention is applicable to commercial facilities such as a department store and a shopping center inclusive of an outlet mall and, in addition to such commercial facilities and amusement facilities, is also applicable to a commercial complex, which is a building or an area including a plurality of facilities such as restaurants and movie theaters. Furthermore, the present invention is applicable to facilities such as a hotel, an airport, and a station.

As set forth above, embodiments of the present invention have been described; however, they are merely specific examples and not to limit the present invention. The specific elements such as the individual units can be modified in design as appropriate. The effects described in the embodiments are merely the most advantageous effects achieved by the present invention and the effects of the present invention are not limited to the effects described in the embodiments.

In addition, the foregoing detailed description has mainly provided characteristic features for better understanding of the present invention. The present invention is not limited to the embodiments provided in the foregoing detailed description and can be applied to other embodiments to achieve a broader application range. Further, the terms and expressions used in the present specification are to appropriately describe the present invention, and not to limit the interpretation of the present invention. In addition, it would be obvious for those skilled in the art to conceive of configurations, systems, and/or methods other than those included in the concept of the present invention in view of the concept of the invention described in the present specification. Therefore, recitations of the claims must be regarded to include equivalent features within the scope of the technical idea of the present invention. The Abstract is provided for patent offices, general public institutions, or those skilled in the art who are not fully familiarized with patents, legal terms, and professional terminology to be able to readily understand the technical features and the essences of the present invention through simple investigation. Accordingly, the Abstract is not to limit the scope of the invention to be evaluated by the recitations of the claims. To fully understand the object(s) of the present invention and advantageous effect(s) unique to the present invention, it is encouraged to sufficiently refer to the documents already disclosed.

The detailed description provided hereinabove includes processing executed by a computer. The foregoing description and expressions are provided for those skilled in the art to most efficiently understand the present invention. In the present specification, each of the steps employed to derive a result is to be understood as processing without self-contradiction. In each of the steps, an electric or magnetic signal is transmitted, received, and/or recorded. Such a signal is expressed in the form of bit, value, symbol, character, term, number, or the like; however, it should be noted that these expressions are employed for clarity of explanation. Although some steps in the present specification are described using expressions common with human acts, the processing is actually executed by various devices. Furthermore, other elements necessary to perform the steps are obvious from the above description.

I claim:

1. An information processing apparatus comprising:

an interface capable of receiving identification information on a user retrieved by an information reading apparatus installed in a gaming hall and determination information determinable of the location of the information reading apparatus, a storage device that stores the identification information of the user in association with the determination information of the information reading apparatus; and a controller configured to retrieve identification information based on the identification information on the user and perform image processing to create a floor map of the gaming hall in which information reading apparatus installed in the gaming hall are mapped to corresponding position in the floor map and a position the user is displayed to a corresponding position in the floor map by using the identification information, wherein the interface is configured to receive identification information of a first information reading apparatus installed in the gaming hall, and receive identification information of other information reading apparatus, and receive information generated in response to, and indicative of the existence of, communication between one specifically identified user at the first information reading apparatus and another specifically identified user at the other apparatus, and wherein the controller is configured to create a floor map which indicates, with emphasis, the communication between the first and other information reading apparatus is ongoing based on the identification information of the first and other information reading apparatus.

2. The information processing apparatus according to claim 1, wherein the controller is configured to dispose a first icon at a corresponding position of the information reading apparatus and a second icon at a corresponding position of the other information reading apparatus on the floor map, highlight the second icon if determining that the first icon is selected by a user operation, and highlight the first icon if determining that the second icon is selected by a user operation.

3. The information processing apparatus according to claim 1, wherein the interface is configured to receive information indicating that communication different from the communication between the information reading apparatus and the other information reading apparatus is started; and the controller is configured to create the floor map by showing that the different communication is being held in addition to showing that the information reading apparatus is communicating with the other information reading apparatus, based on the information indicating that the different communication is started.

4. The information processing apparatus according to claim 1, wherein the controller is configured to determine whether the number of communications being held between information reading apparatuses installed in the gaming hall exceeds a predetermined number and if determining that the number of communications exceeds the predetermined number, reflect excessive communications over the predetermined number to a floor map different from the floor map.

5. The information processing apparatus according to claim 1, wherein the storage device includes a login management table for managing member users registered as members among the users, and wherein the controller performs image processing relating to the floor map in a display mode in which the member user and the non-member user can be identified based on the login management table.

6. An information processing apparatus comprising:

an interface capable of receiving identification information on a user retrieved by an information reading apparatus installed in a facility and determination information determinable of the location of the information reading apparatus, a storage device for storing the identification information of the user in association with the determination information of the information reading apparatus; and a controller configured to retrieve identification information based on the identification information on the user and perform image processing to create a floor map of the facility in which information reading apparatus installed in the facility are mapped to corresponding position in the floor map and a position the user is displayed to a corresponding position in the floor map by using the identification information, wherein the interface is configured to receive identification information of a first information reading apparatus installed in the facility, and receive identification information of other information reading apparatus, and receive information generated in response to, and indicative of the existence, of communication between one specifically identified user at the first information reading apparatus and another specifically identified user at the other apparatus, wherein the controller is configured to create a floor map which indicates, with emphasis, the communication between the first and other information reading apparatus is ongoing based on the identification information of the first and other information reading apparatus, wherein the storage device further stores attribute information associated with the identification information of the user, wherein the controller further performs image processing relating to the floor map in the display state based on the attribute information according to a specified position of the user during the communication.

7. The information processing apparatus according to claim 6, wherein the controller updates the attribute information based on a behavioral history of the user.

8. An information reading apparatus installed in a gaming hall and comprising:

an input device capable of receiving a start request indicating that one specifically identified user at the information reading apparatus is to start communication with another specifically identified user at another information reading apparatus installed in the gaming hall in accordance with a user operation; and an interface configured to send, based on the start request indicating that the one specifically identified user at the information reading apparatus is to start communication with said another specifically identified user at said another information reading apparatus installed in the gaming hall, locational information for locating the information reading apparatus installed in the gaming hall to an information processing apparatus configured to perform image processing on a floor map of the gaming hall in which information reading apparatuses installed in the gaming hall are mapped to corresponding positions of the information reading apparatuses, wherein the interface is configured to receive the floor map created by indicating that the communication is being held from the information processing apparatus.

* * * * *